(12) United States Patent
Hou et al.

(10) Patent No.: US 11,482,774 B2
(45) Date of Patent: Oct. 25, 2022

(54) BASE STATION ANTENNAS HAVING AN ACTIVE ANTENNA MODULE AND RELATED DEVICES AND METHODS

(71) Applicant: CommScope Technologies LLC, Hickory, NC (US)

(72) Inventors: Xiaohua Hou, Richardson, TX (US); Yongjie Xu, Shanghai (CN); Xiang Li, Shanghai (CN); Peter J. Bisiules, LaGrange Park, IL (US); Samantha Merta, Richardson, TX (US); Haifeng Li, Richardson, TX (US); Mohammad Vatankhah Varnoosfaderani, Richardson, TX (US); Bo Wu, Jiangsu (CN); Xiaohua Tian, Jiangsu (CN); Junfeng Yu, Jiangsu (CN); Dongmin Wang, Jiangsu (CN); Shanguang Zhang, Jiangsu (CN); Jian Liu, Jiangsu (CN)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/209,562

(22) Filed: Mar. 23, 2021

(65) Prior Publication Data
US 2021/0305717 A1    Sep. 30, 2021

Related U.S. Application Data

(60) Provisional application No. 63/136,757, filed on Jan. 13, 2021, provisional application No. 63/124,442, (Continued)

(51) Int. Cl.
*H01Q 1/24* (2006.01)
*H01Q 21/00* (2006.01)
(Continued)

(52) U.S. Cl.
CPC .............. *H01Q 1/246* (2013.01); *H01Q 1/42* (2013.01); *H01Q 1/48* (2013.01);
(Continued)

(58) Field of Classification Search
CPC ........ H01Q 1/1214; H01Q 1/246; H01Q 1/42; H01Q 1/48; H01Q 15/0013; H01Q 15/14;
(Continued)

(56) References Cited

U.S. PATENT DOCUMENTS

| 7,907,096 B2 | 3/2011 | Timofeev et al. |
| 2004/0169612 A1 | 9/2004 | Song et al. |

(Continued)

FOREIGN PATENT DOCUMENTS

| CN | 201528038 U | 7/2010 |
| CN | 101950846 A | 1/2011 |

(Continued)

OTHER PUBLICATIONS

International Search Report and the Written Opinion of the International Searching Authority corresponding to International Patent Application No. PCT/US2021/023617 (17 pages) (dated Sep. 27, 2021).

(Continued)

*Primary Examiner* — Robert Karacsony
(74) *Attorney, Agent, or Firm* — Myers Bigel, P.A.

(57) ABSTRACT

Base station antennas include an externally accessible active antenna module releasably coupled to a recessed segment that is over a chamber in the base station antenna and that is longitudinally and laterally extending along and across a rear of a base station antenna housing. The base station antenna housing has a passive antenna assembly that cooperates with the active antenna module.

25 Claims, 94 Drawing Sheets

Related U.S. Application Data filed on Dec. 11, 2020, provisional application No. 63/082,265, filed on Sep. 23, 2020, provisional application No. 63/075,344, filed on Sep. 8, 2020, provisional application No. 62/993,925, filed on Mar. 24, 2020.

(51) Int. Cl.

| | | |
|---|---|---|
| *H01Q 19/10* | (2006.01) | |
| *H01Q 1/42* | (2006.01) | |
| *H01Q 19/185* | (2006.01) | |
| *H01Q 15/00* | (2006.01) | |
| *H01Q 21/06* | (2006.01) | |
| *H01Q 23/00* | (2006.01) | |
| *H01Q 1/48* | (2006.01) | |

(52) U.S. Cl.
CPC ......... *H01Q 15/0013* (2013.01); *H01Q 19/10* (2013.01); *H01Q 19/108* (2013.01); *H01Q 19/185* (2013.01); *H01Q 21/0025* (2013.01); *H01Q 21/061* (2013.01); *H01Q 23/00* (2013.01)

(58) Field of Classification Search
CPC ...... H01Q 15/23; H01Q 19/10; H01Q 19/108; H01Q 19/18; H01Q 19/185; H01Q 21/0025; H01Q 21/061; H01Q 21/065; H01Q 23/00

See application file for complete search history.

(56) References Cited

U.S. PATENT DOCUMENTS

| | | |
|---|---|---|
| 2004/0259597 A1 | 12/2004 | Gothard et al. |
| 2005/0264463 A1 | 12/2005 | Gottl et al. |
| 2006/0273865 A1 | 12/2006 | Timofeev et al. |
| 2007/0229385 A1 | 10/2007 | Deng et al. |
| 2009/0224994 A1 | 9/2009 | Le et al. |
| 2012/0087284 A1 | 4/2012 | Linehan et al. |
| 2012/0280874 A1 | 11/2012 | Kim et al. |
| 2014/0313095 A1* | 10/2014 | Pu .................... H01Q 1/246 343/836 |
| 2015/0084823 A1 | 3/2015 | Wang et al. |
| 2015/0097739 A1 | 4/2015 | Samuel |
| 2017/0040679 A1 | 2/2017 | Fröhler et al. |
| 2018/0323513 A1 | 11/2018 | Varnoosfaderani et al. |
| 2019/0123426 A1 | 4/2019 | Bryce |
| 2019/0267701 A1 | 8/2019 | Kim et al. |
| 2019/0312338 A1 | 10/2019 | Guntupalli et al. |
| 2019/0312394 A1 | 10/2019 | Paynter et al. |
| 2020/0076079 A1 | 3/2020 | Shan et al. |
| 2020/0288495 A1 | 9/2020 | Gao et al. |

FOREIGN PATENT DOCUMENTS

| | | |
|---|---|---|
| CN | 201893434 U | 7/2011 |
| CN | 102800956 A | 11/2012 |
| CN | 103490175 A | 1/2014 |
| CN | 103715521 A | 4/2014 |
| CN | 104319486 A | 1/2015 |
| CN | 206225553 U | 6/2017 |
| CN | 110323564 A | 10/2019 |
| CN | 114094347 A | 2/2022 |
| EP | 1204161 A1 | 5/2002 |
| EP | 2784876 A1 | 10/2014 |
| EP | 2827449 A2 | 1/2015 |
| EP | 3544204 A2 | 9/2019 |
| EP | 3751665 A1 | 12/2020 |
| WO | 9700586 A1 | 1/1997 |
| WO | 2019100325 A1 | 5/2019 |
| WO | 2019154362 A1 | 8/2019 |
| WO | 2019236203 A2 | 12/2019 |
| WO | 2020010039 A1 | 1/2020 |
| WO | 2020072880 A1 | 4/2020 |

OTHER PUBLICATIONS

Shepard et al. "Argos: Practical Many-Antenna Base Stations" Proceedings of the 18th Annual International Conference on Mobile Computing and Networking (12 pages) (Aug. 26, 2012).

He, Yejun, et al., "Novel Dual-Band, Dual-Polarized, Miniaturized and Low-Profile Base Station Antenna", IEEE Transactions on Antennas and Propagation, vol. 63, No. 12, Dec. 2015, 5399-5408.

Ben A. Munk, Frequency Selective Surfaces: Theory and Design, ISBN: 978-0-471-37047-5; DOI:10.1002/0471723770; Apr. 2000, Copyright © 2000 John Wiley & Sons, Inc.

* cited by examiner

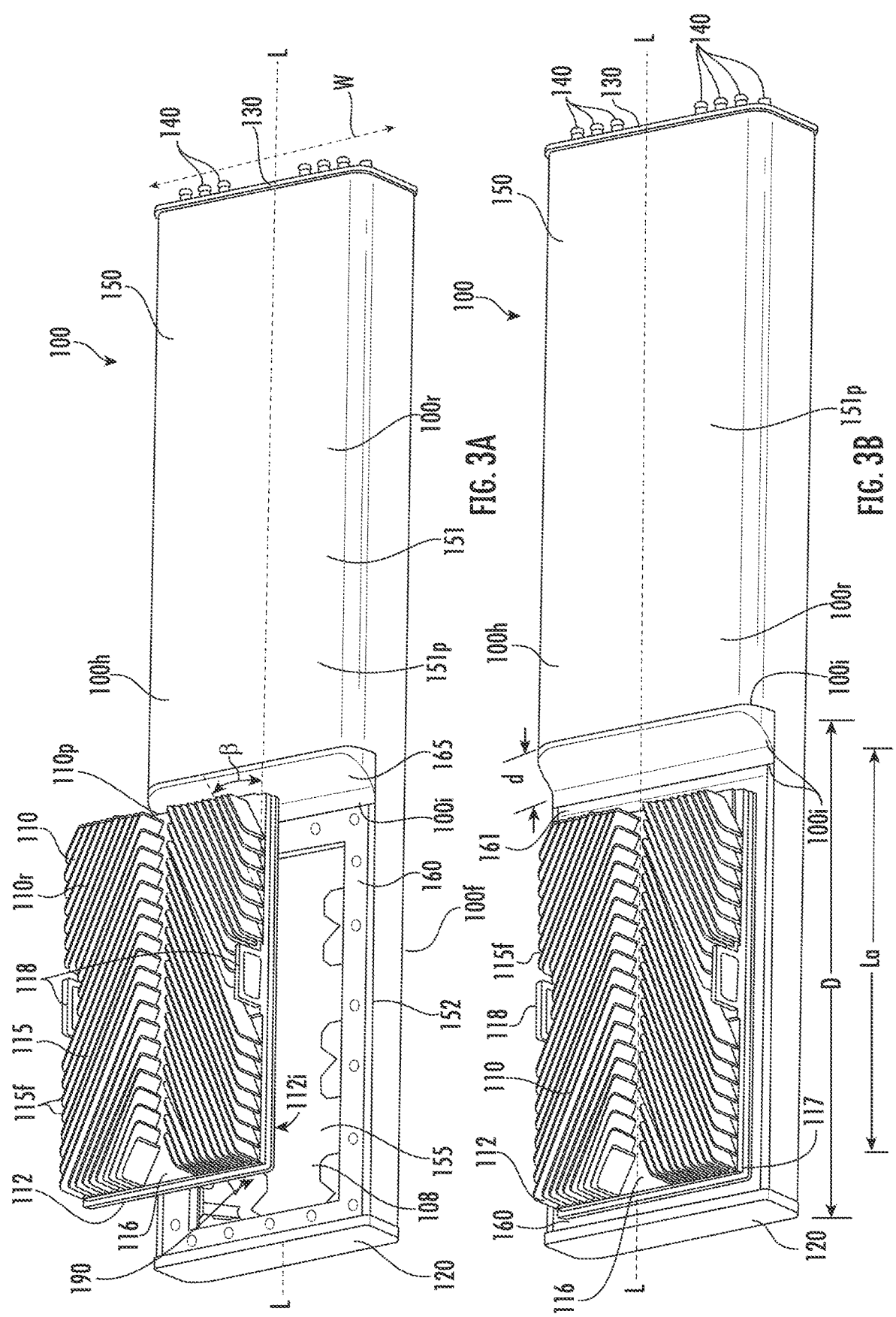

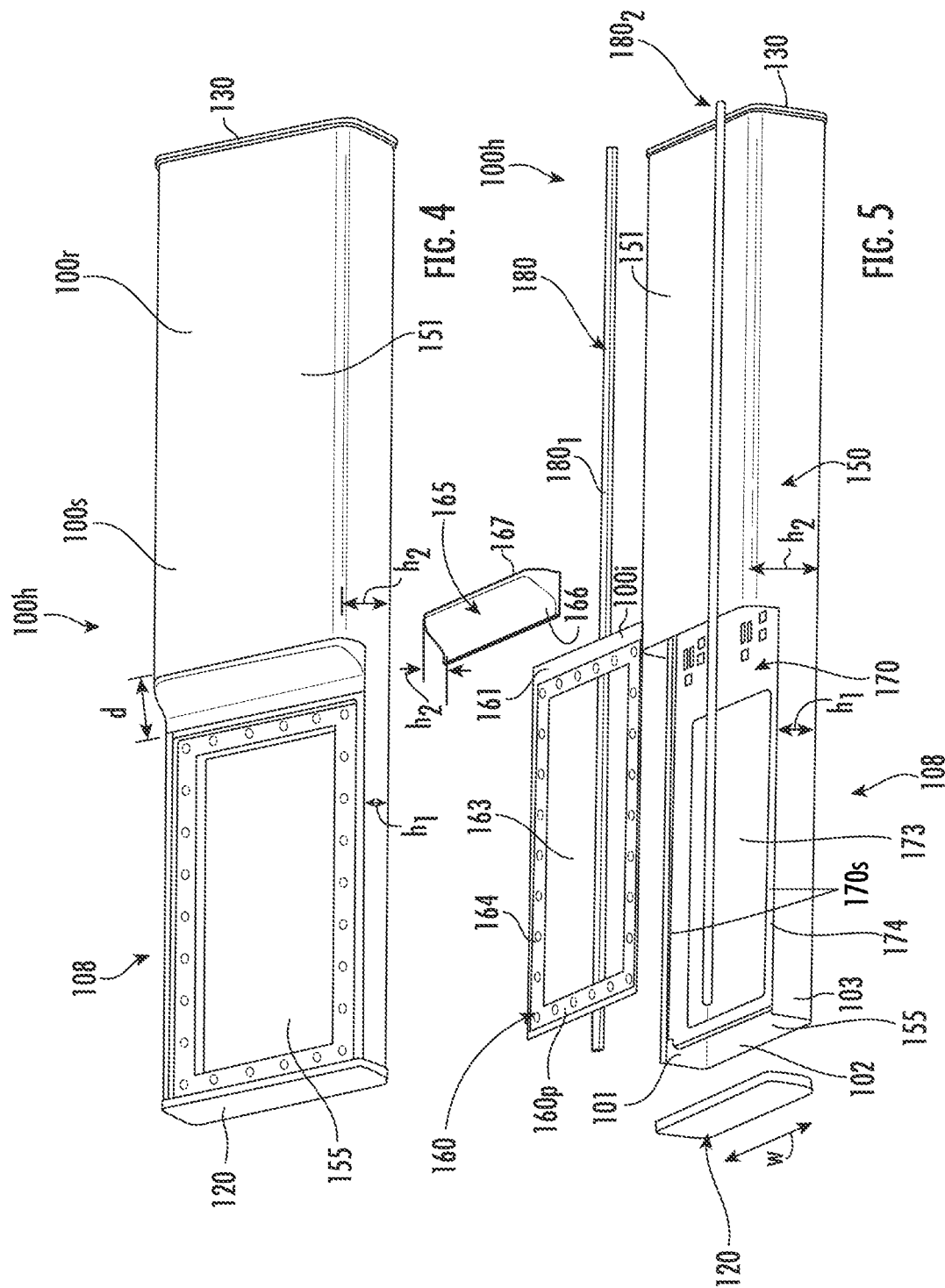

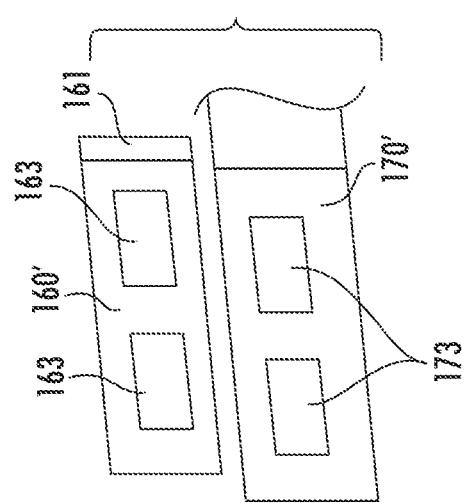
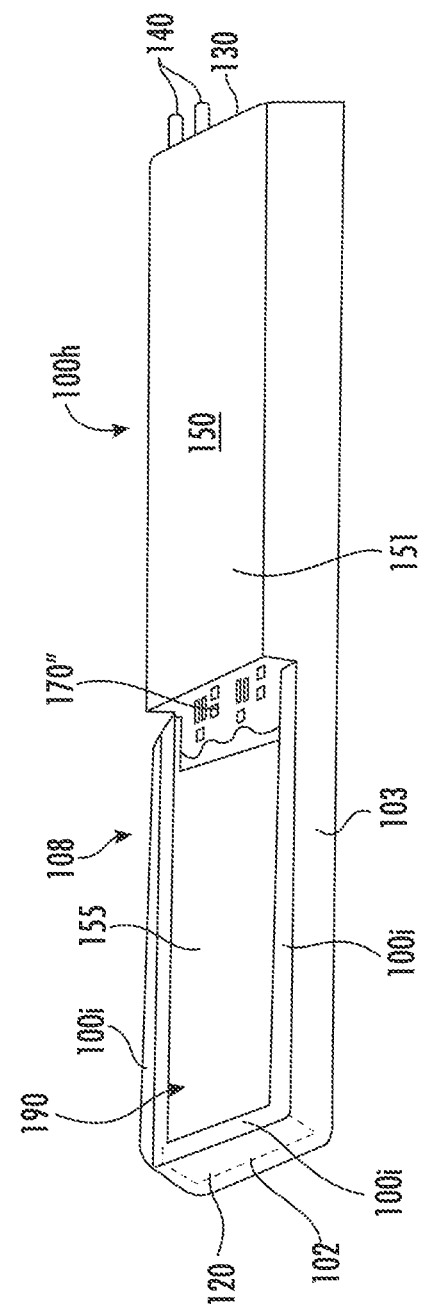

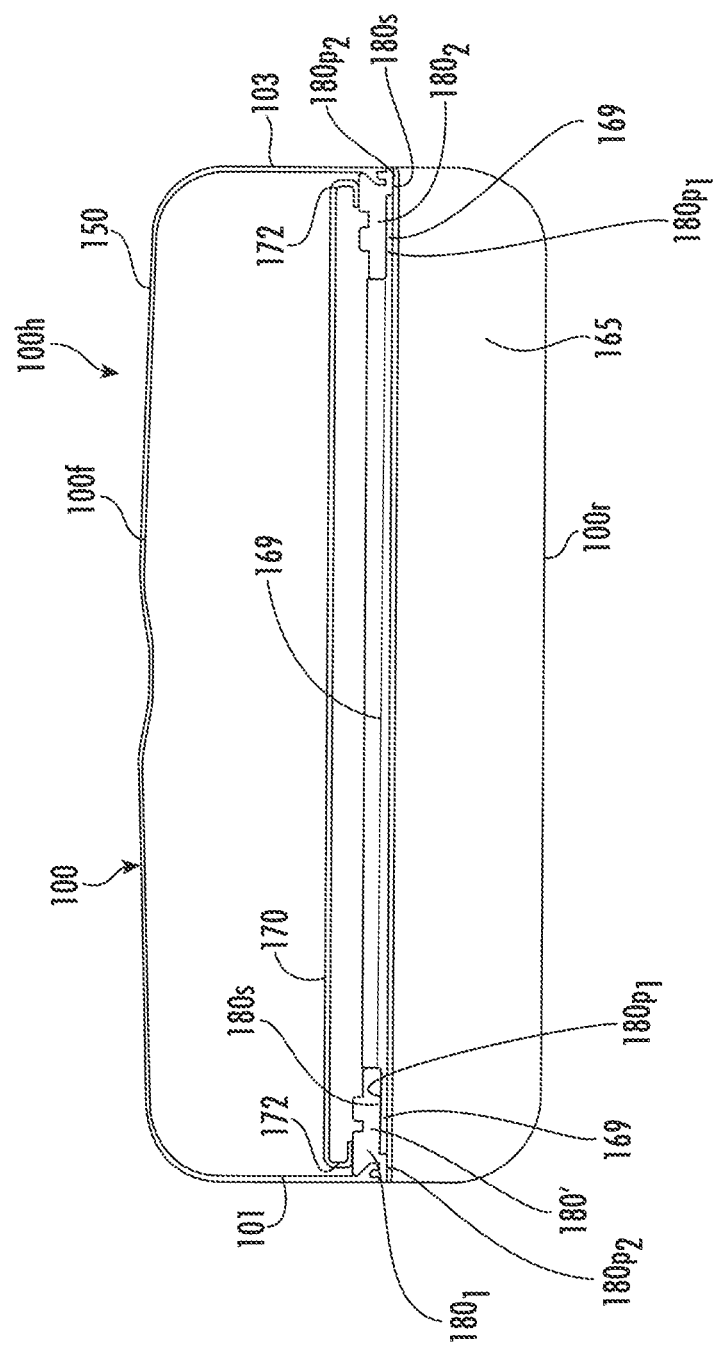

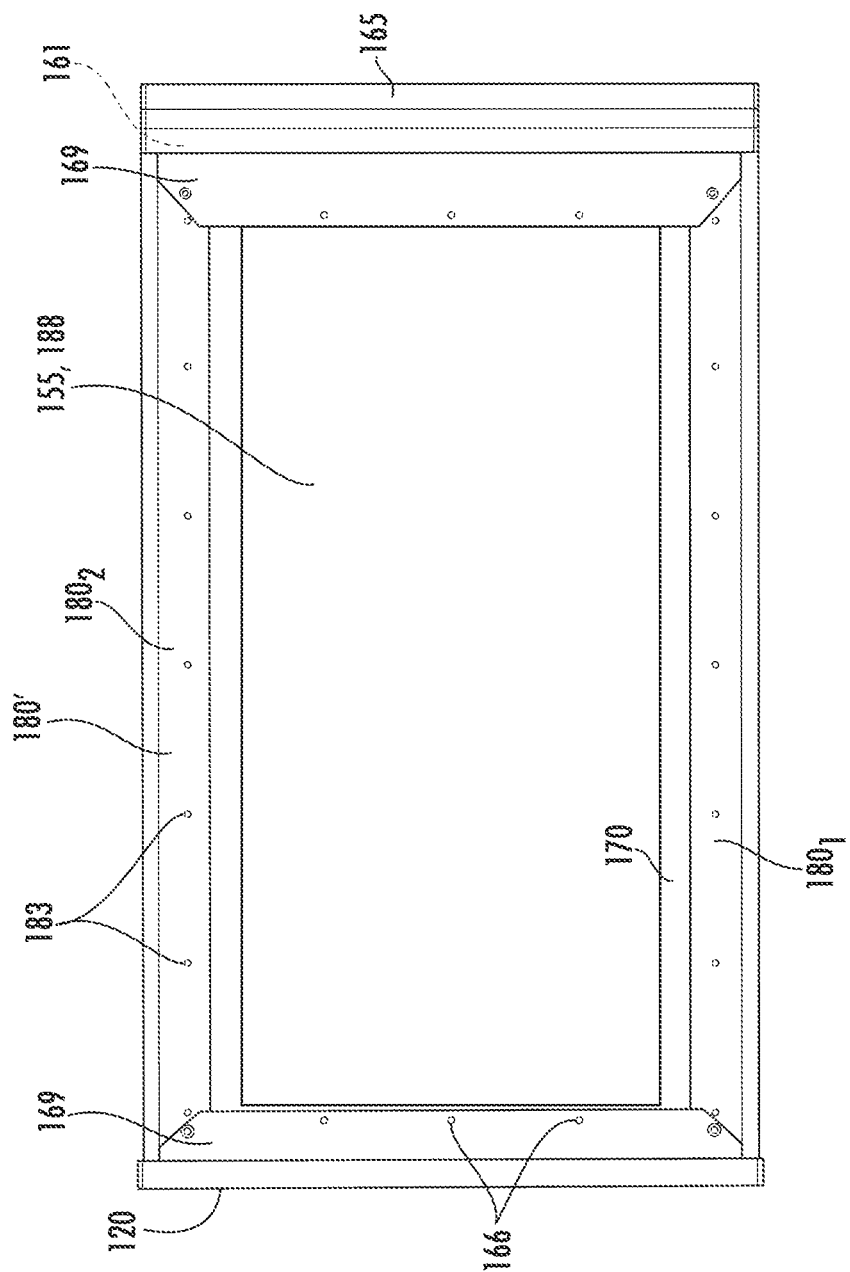

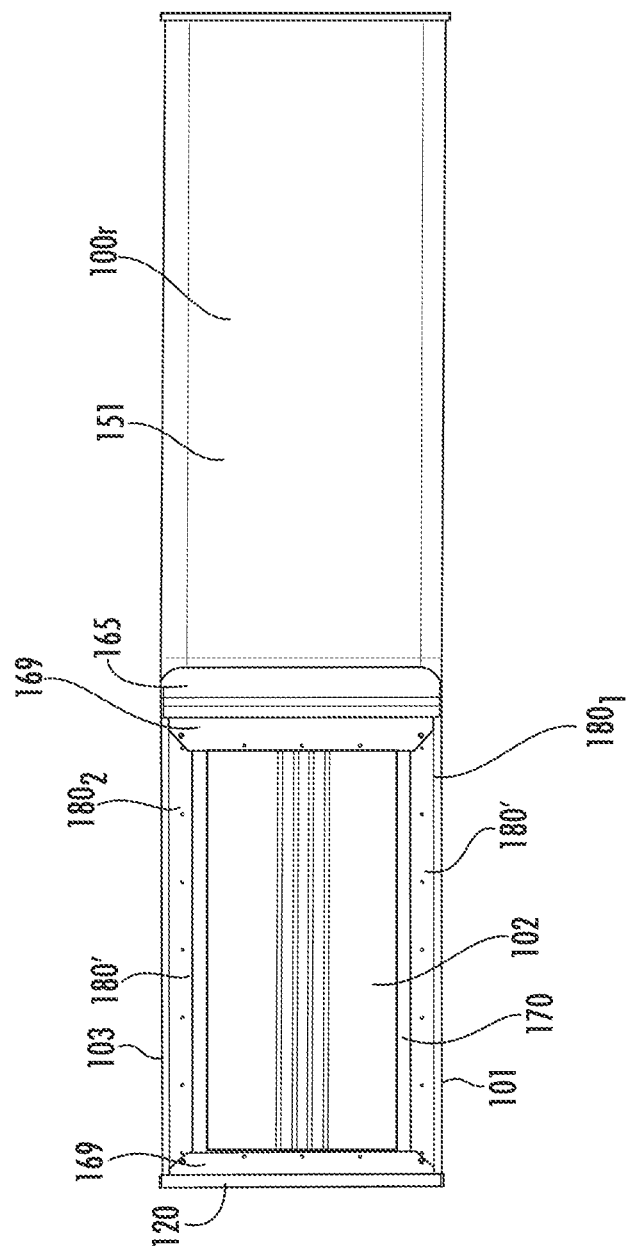

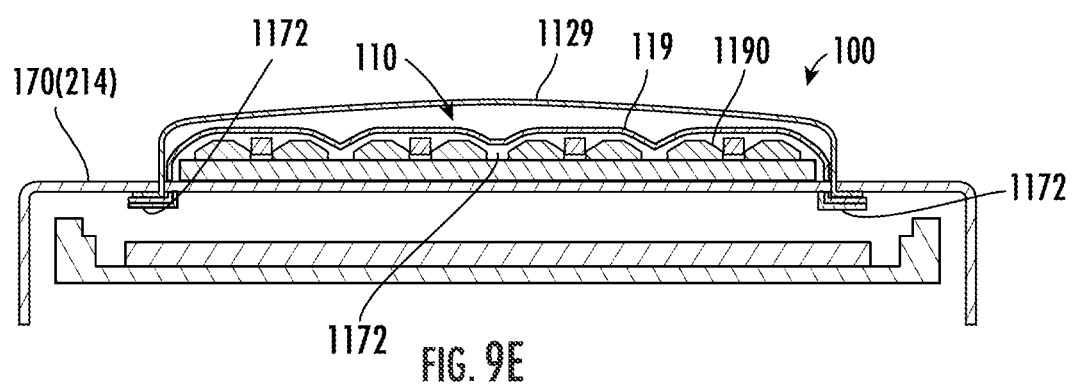

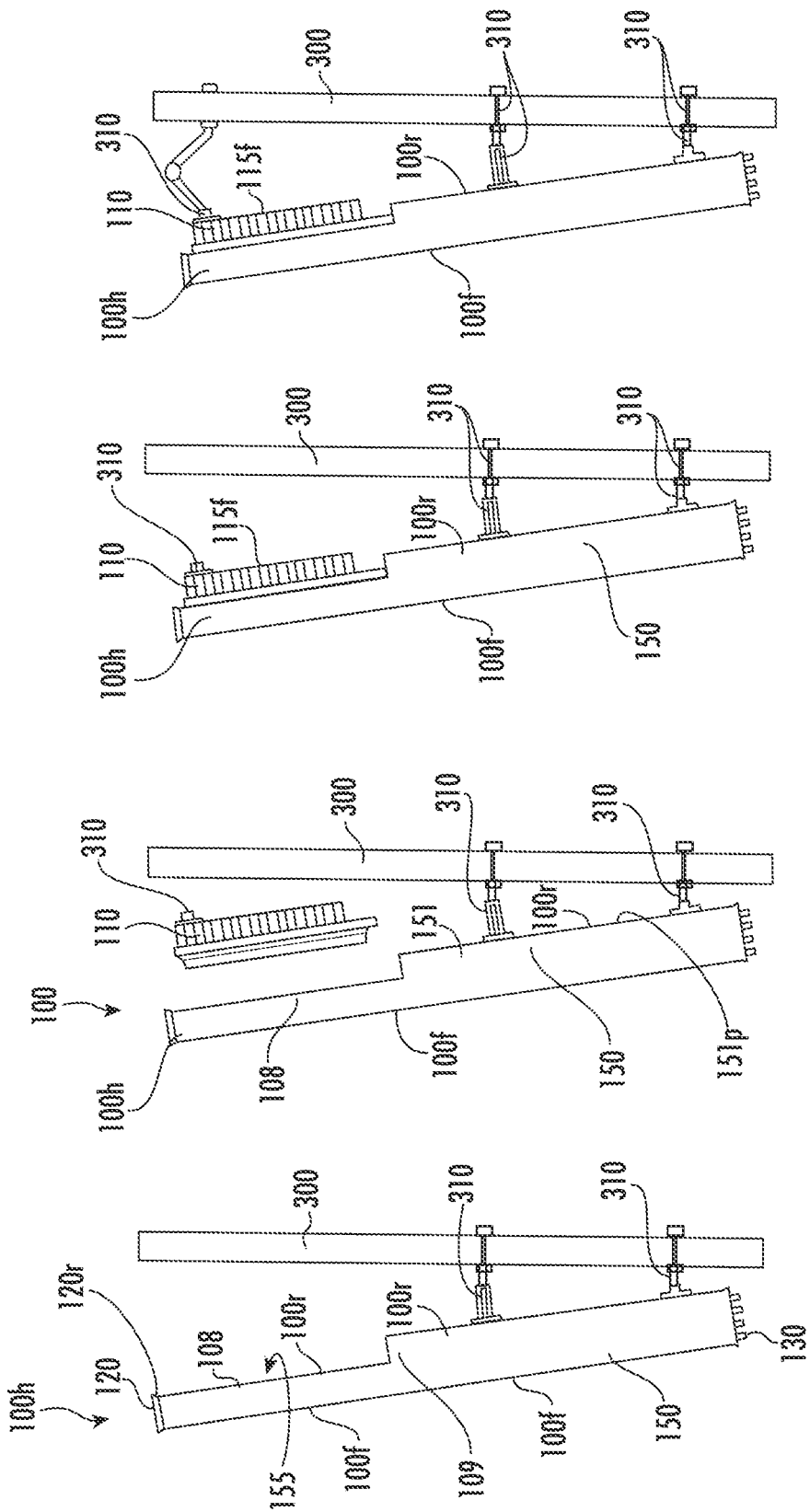

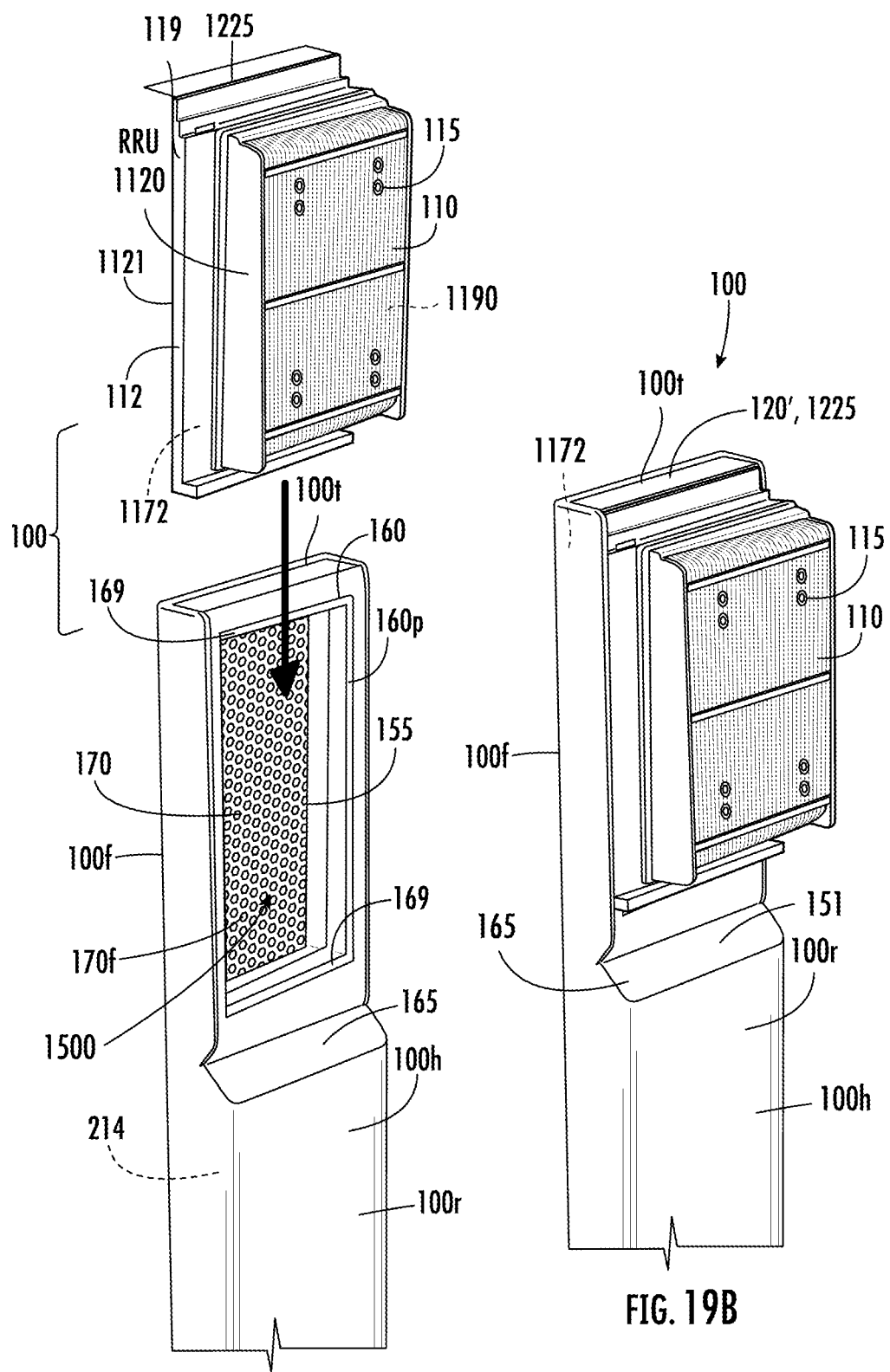

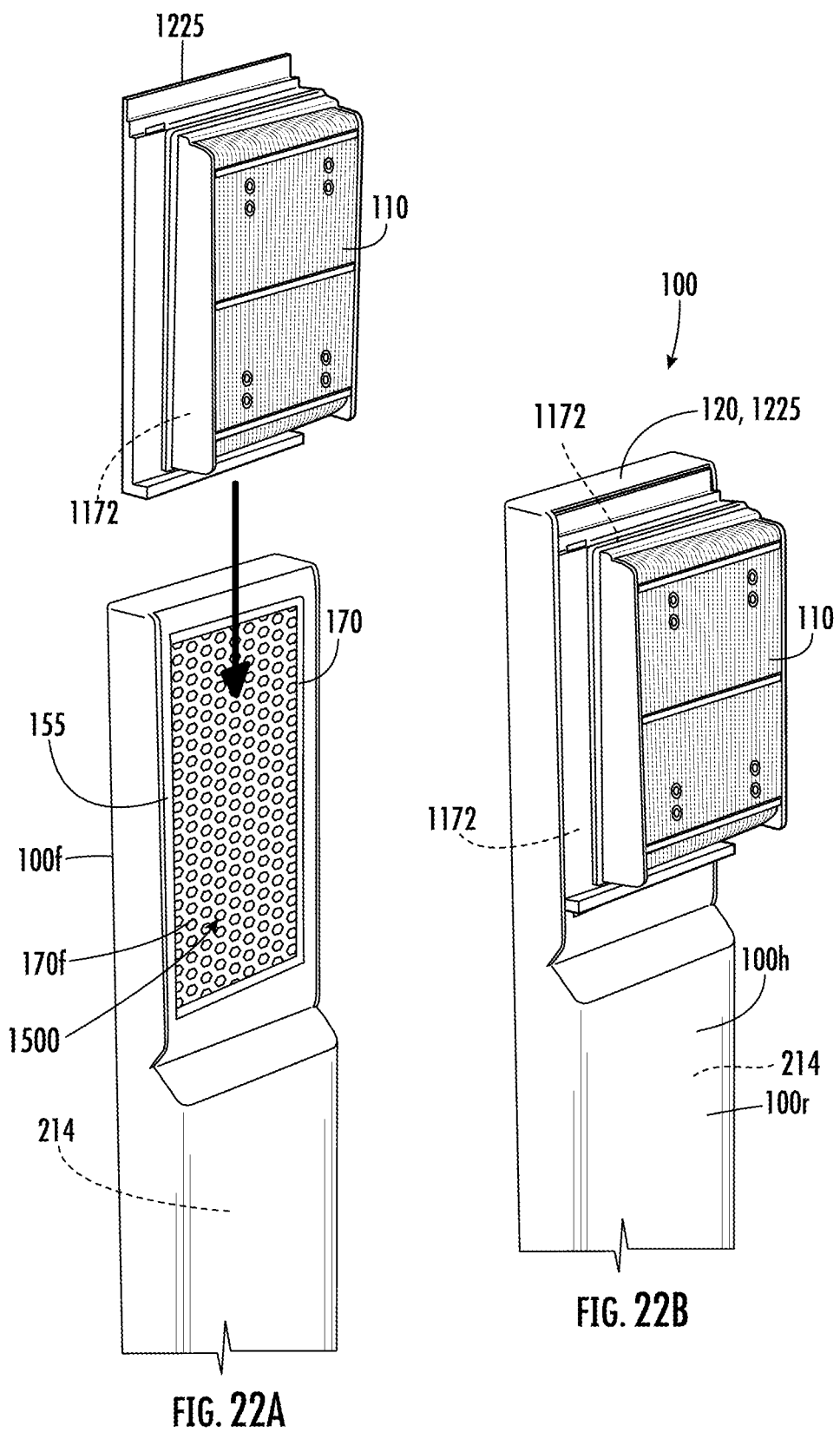

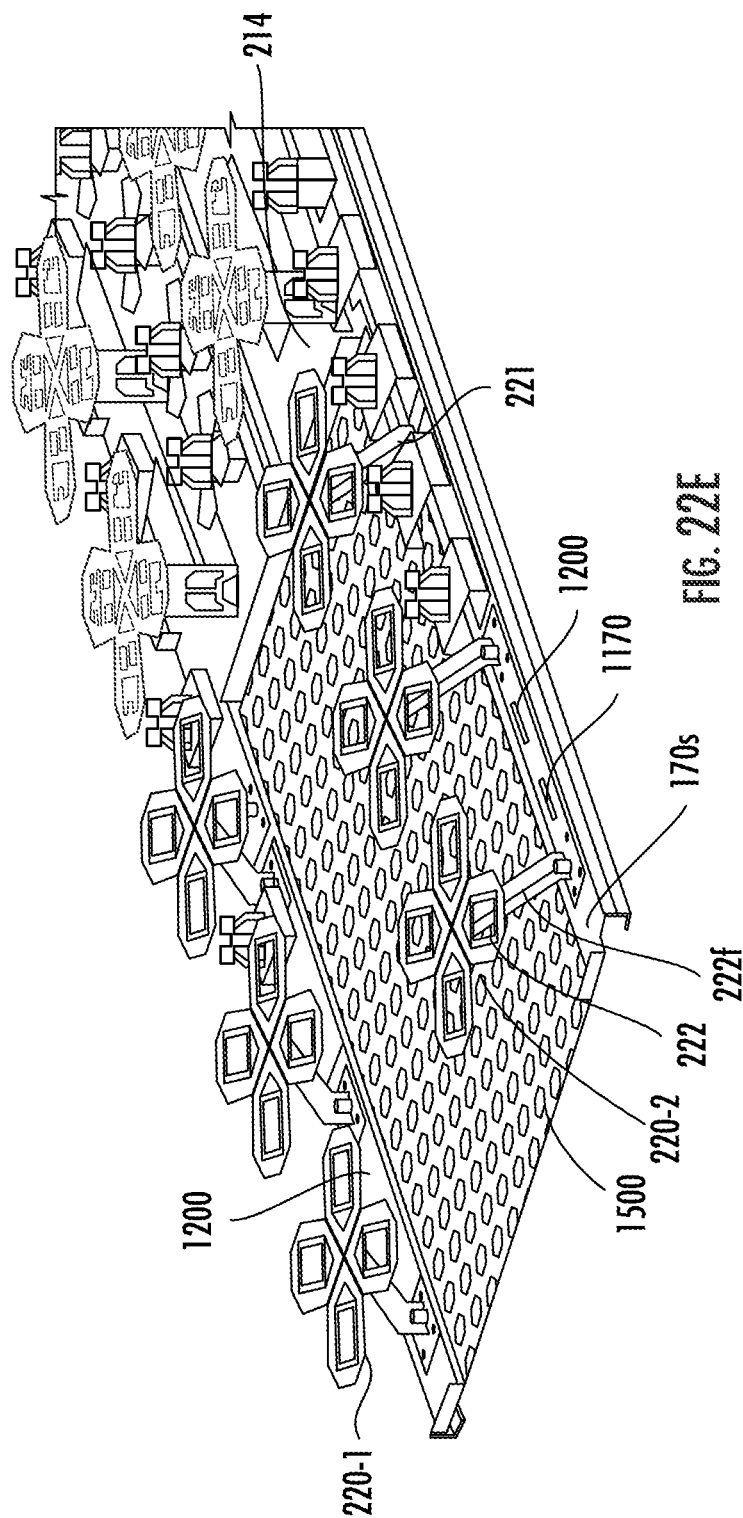

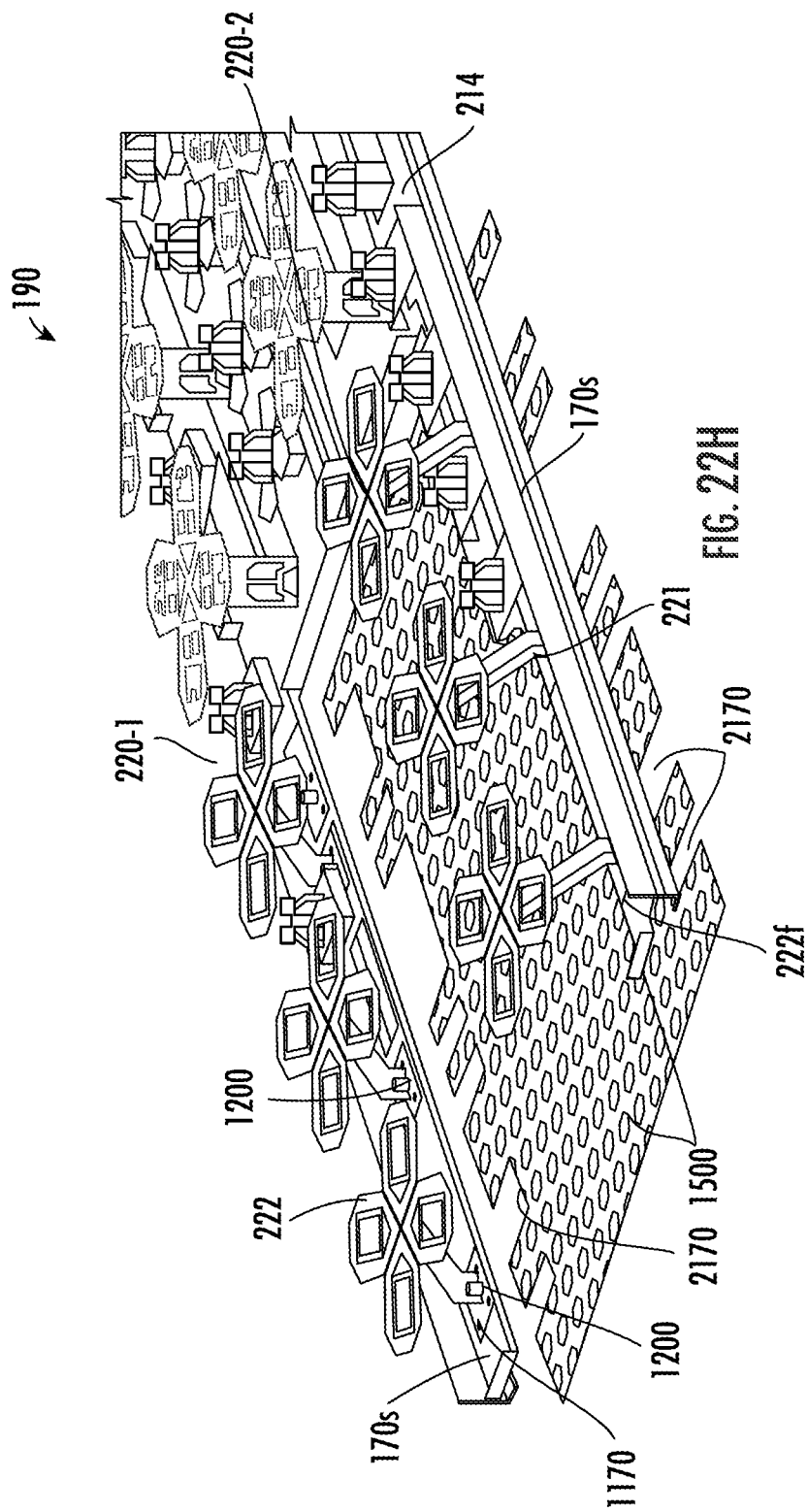

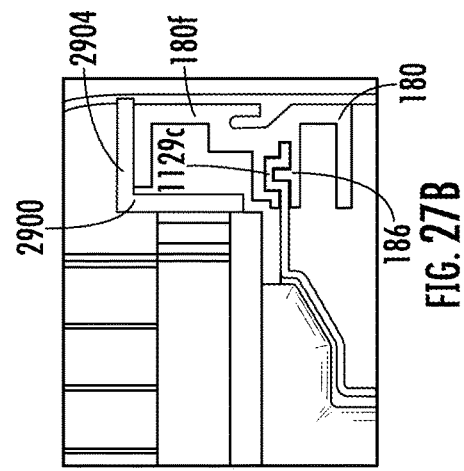
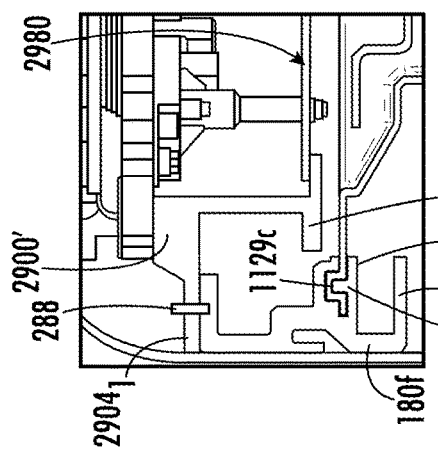
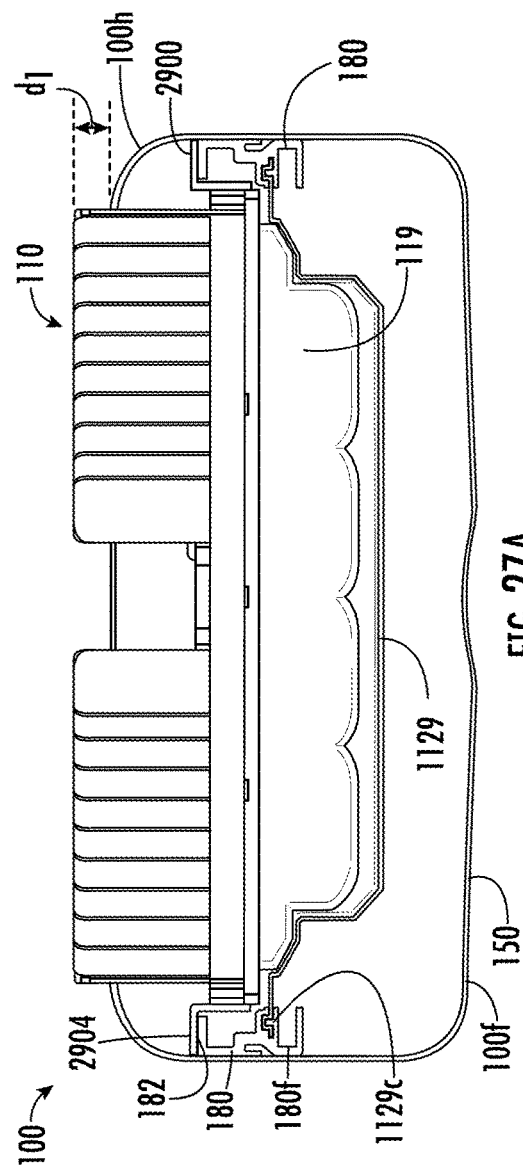
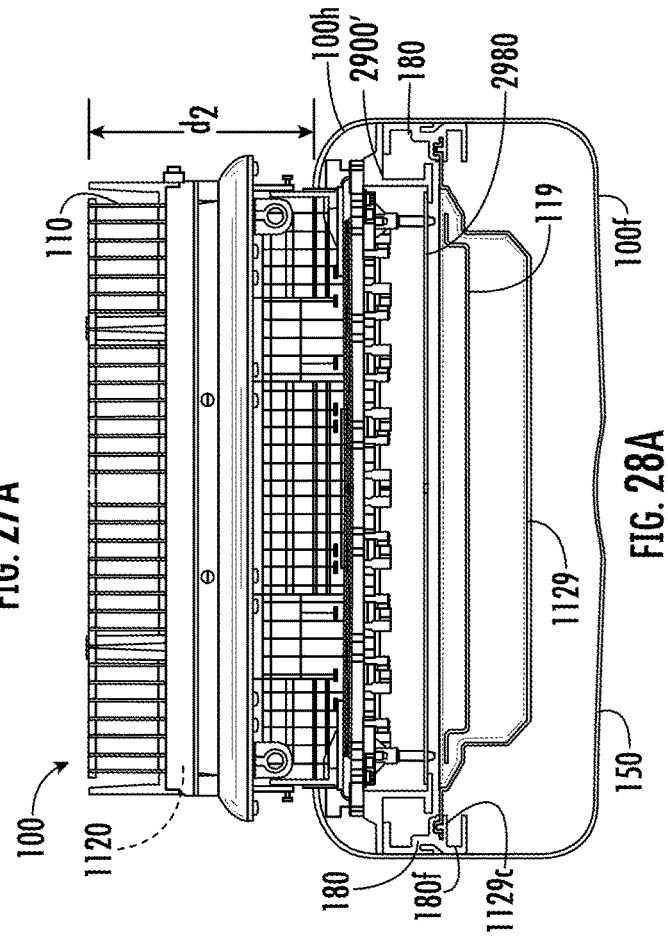

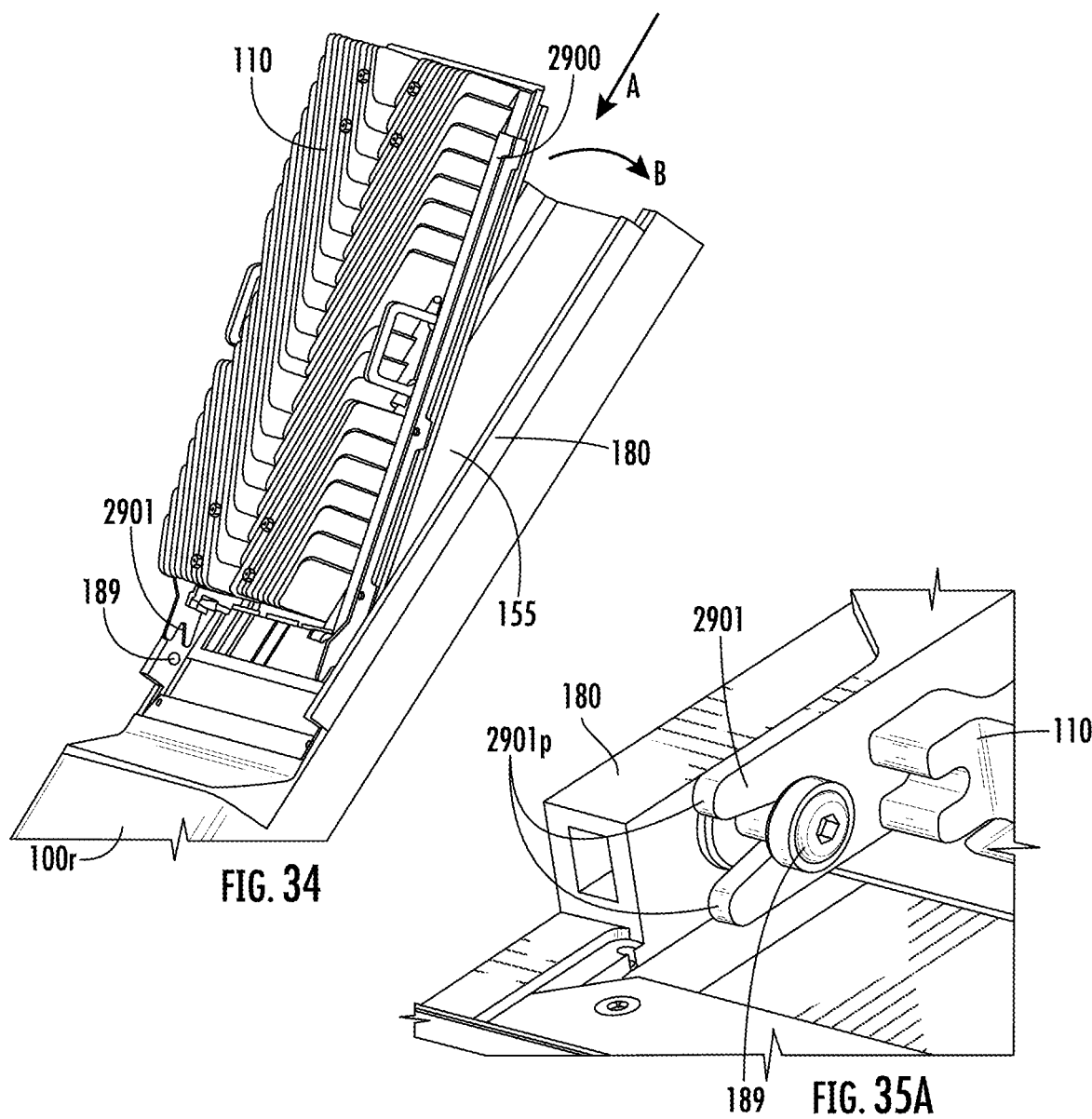
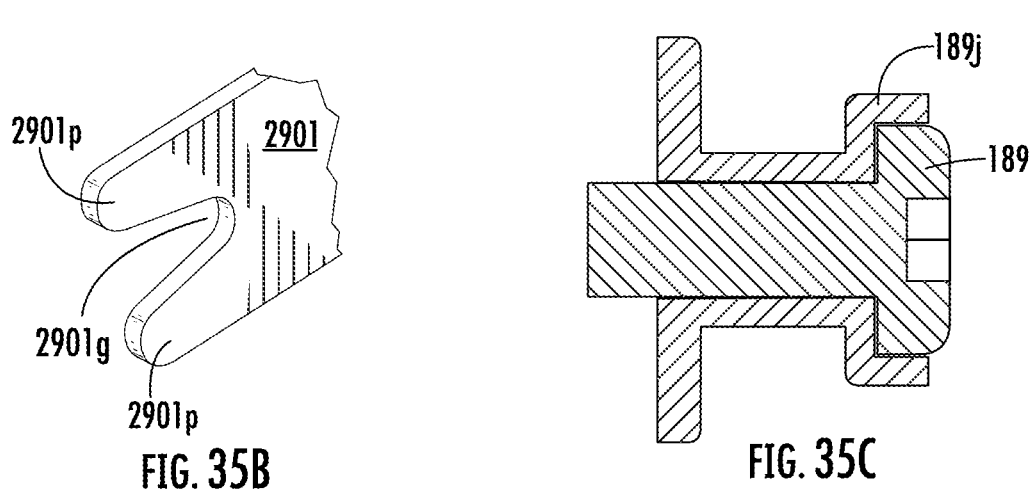

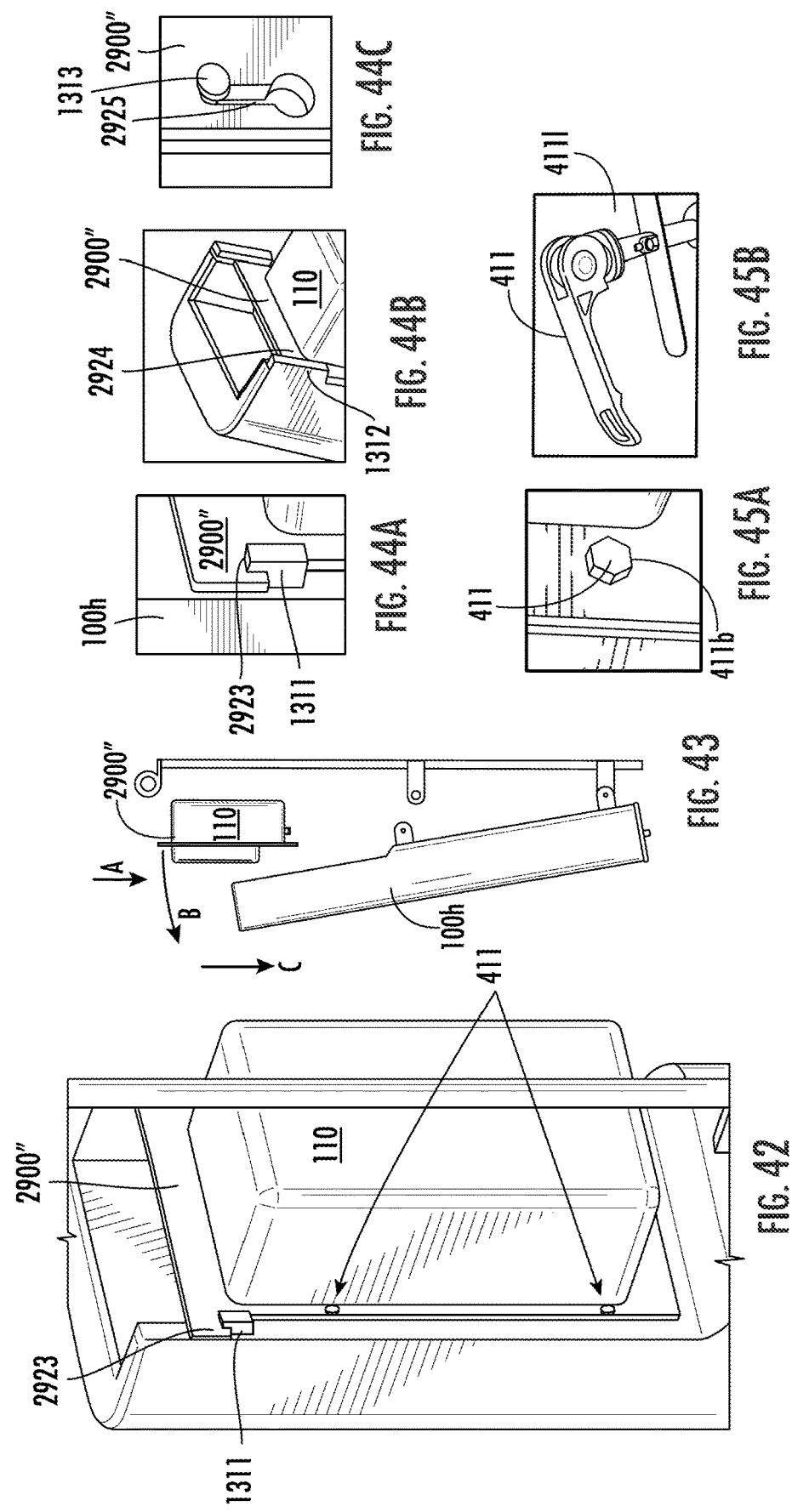

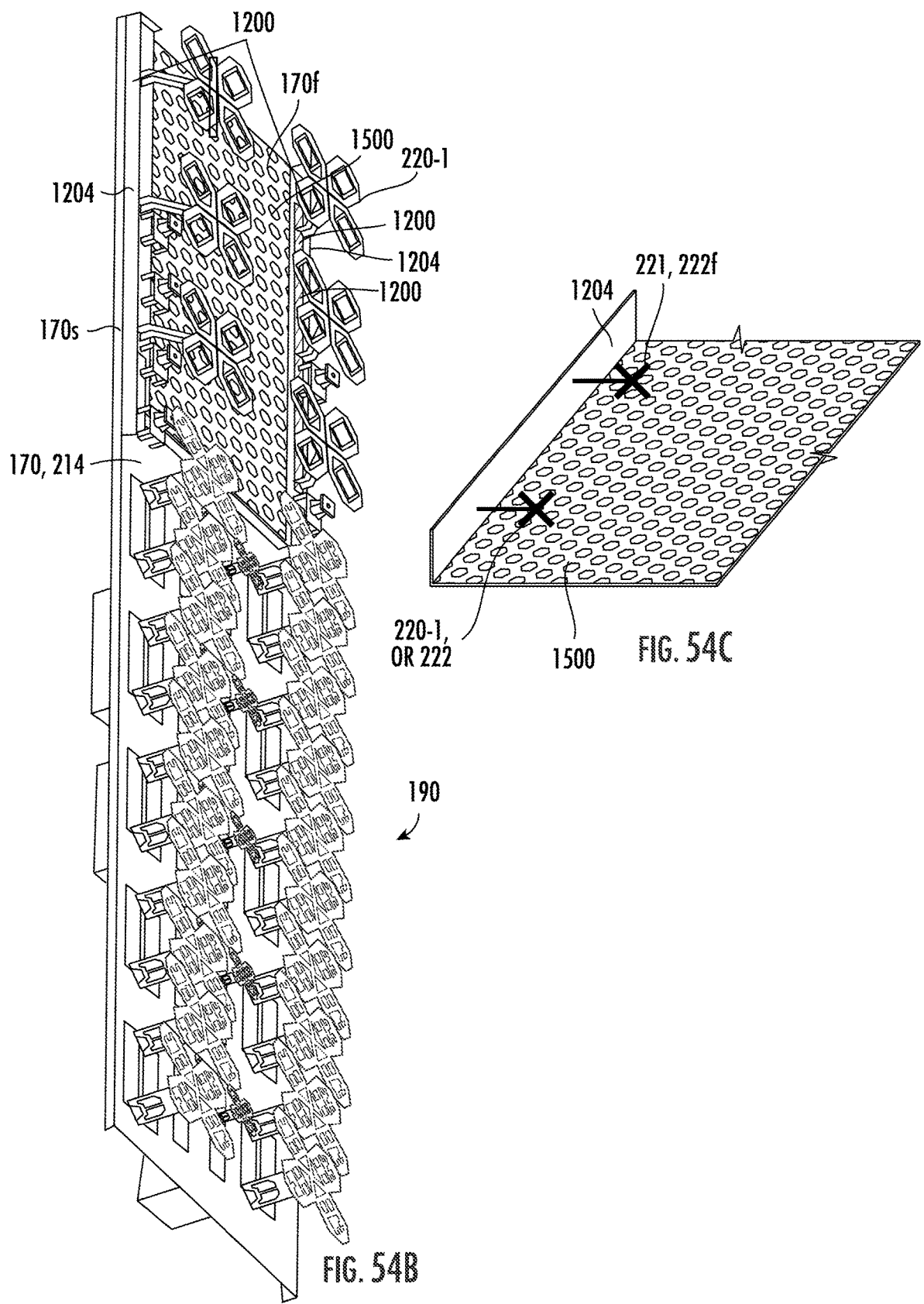

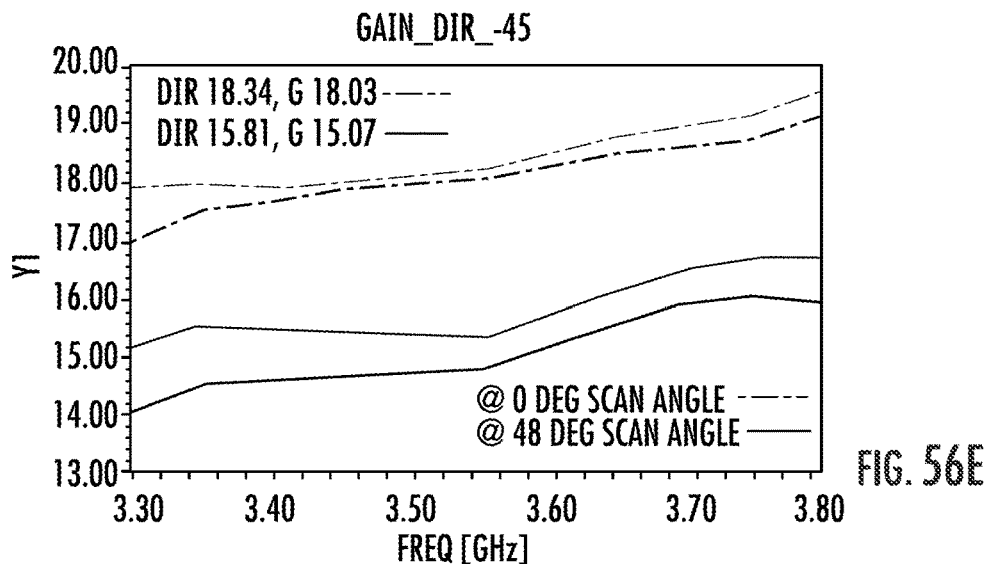
FIG. 56E
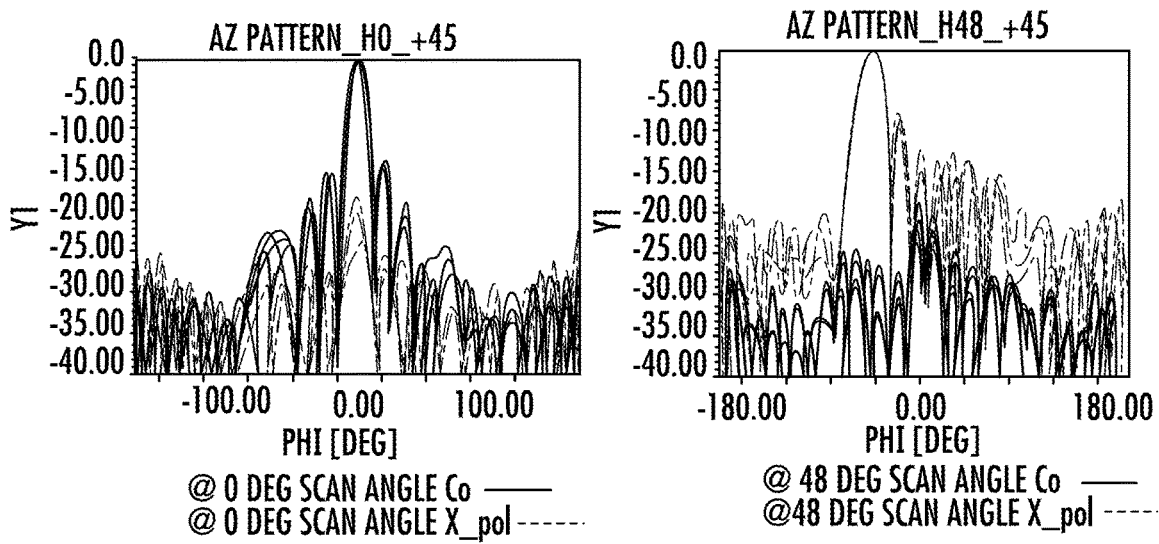
FIG. 57A
FIG. 57B
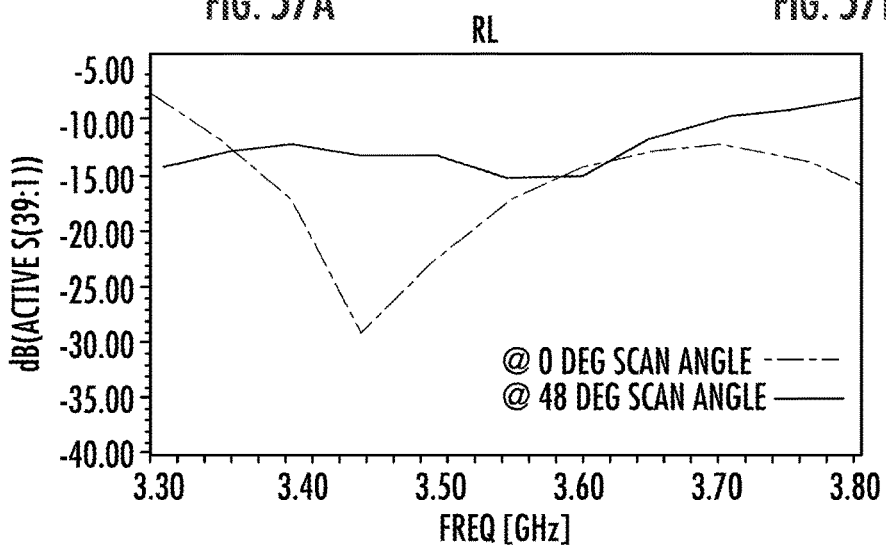
FIG. 57C

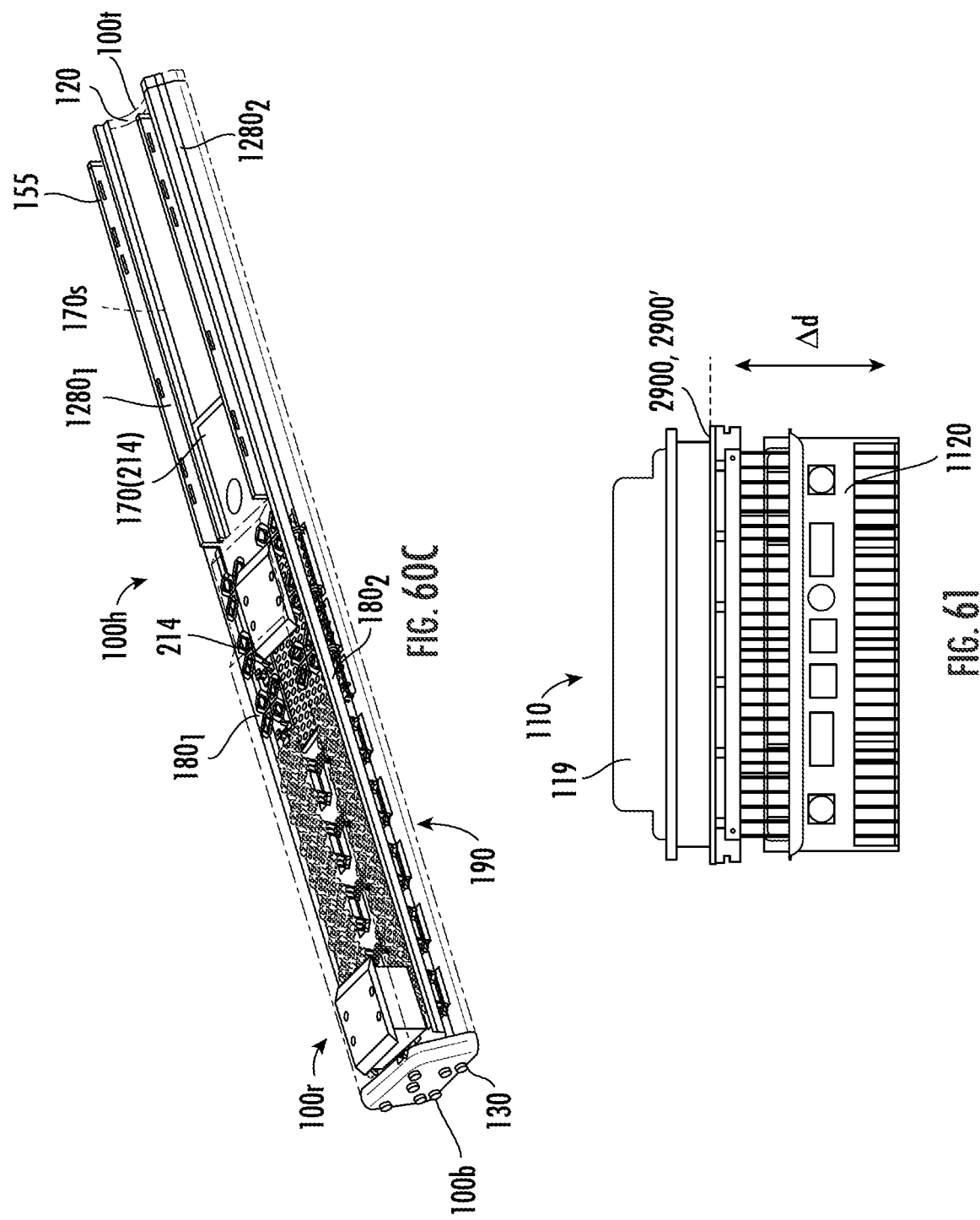

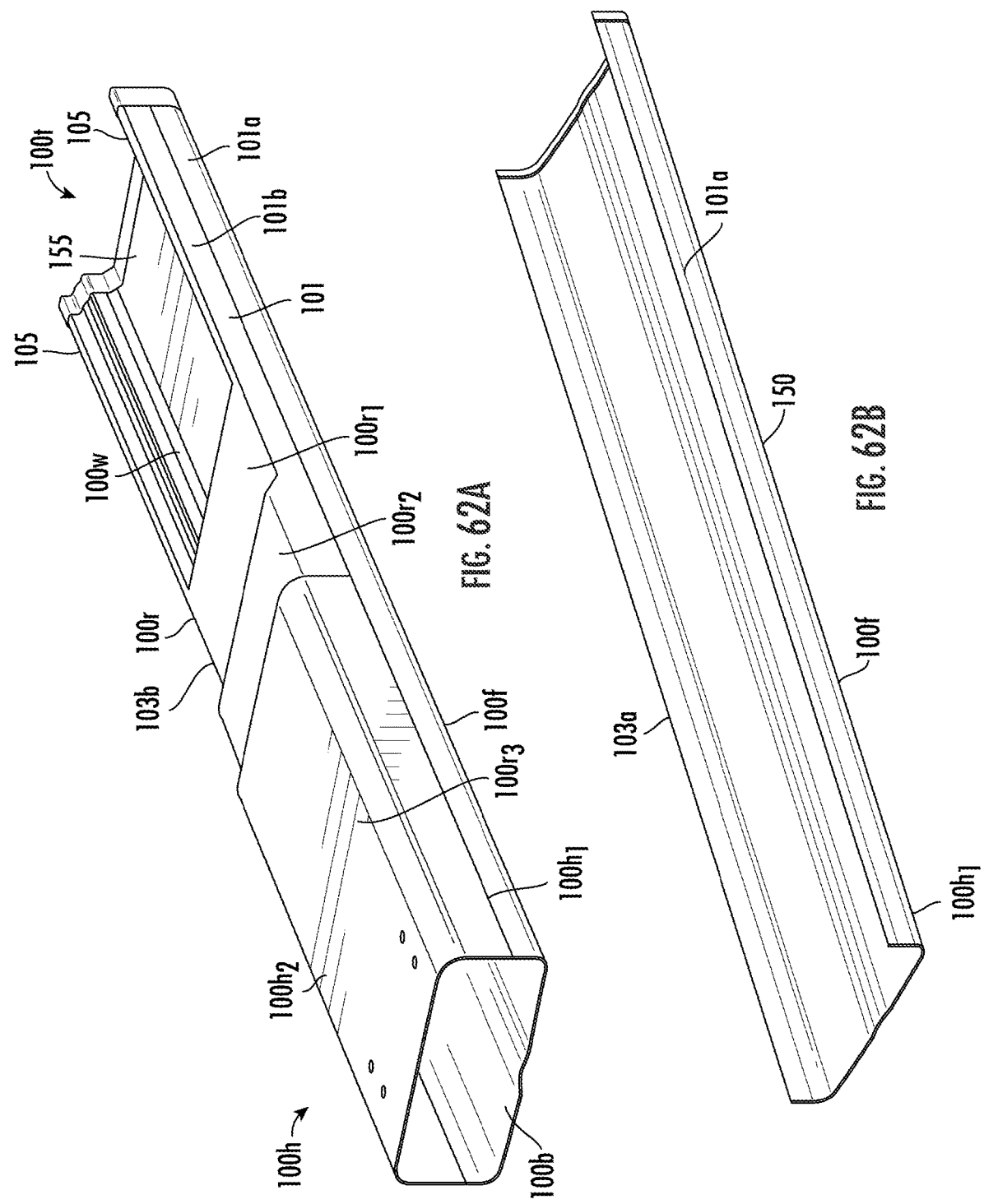

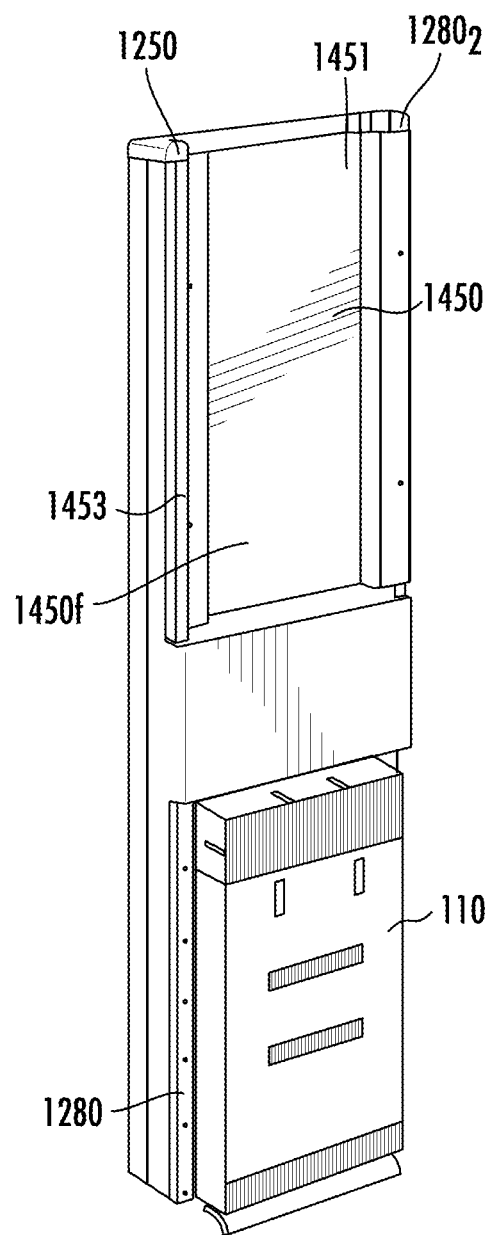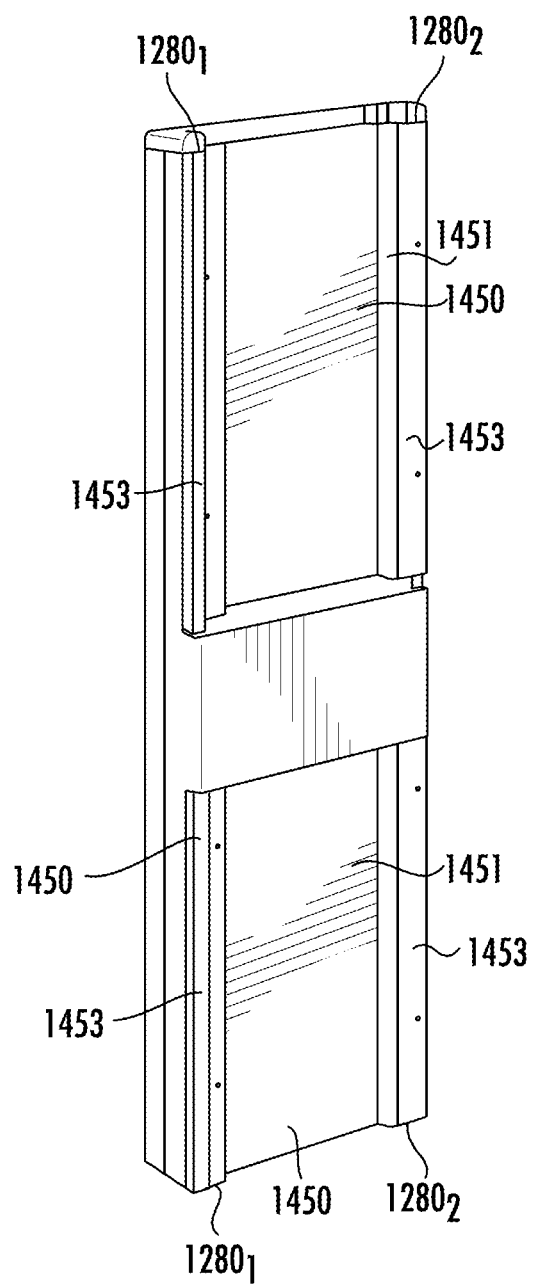

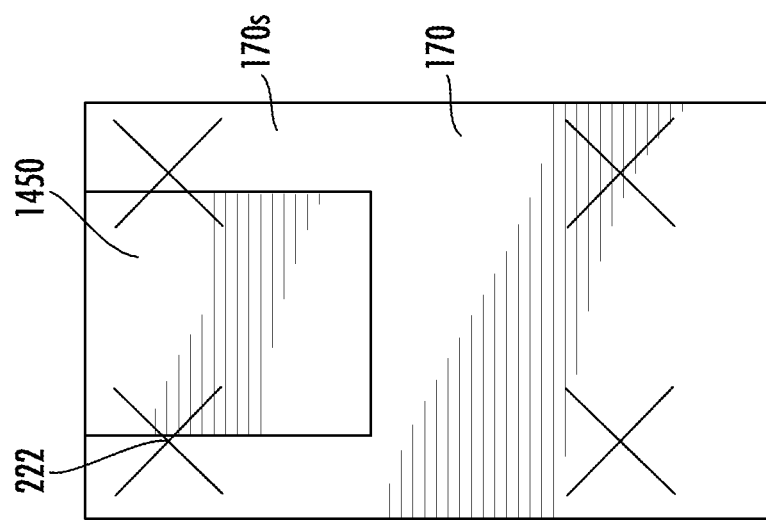
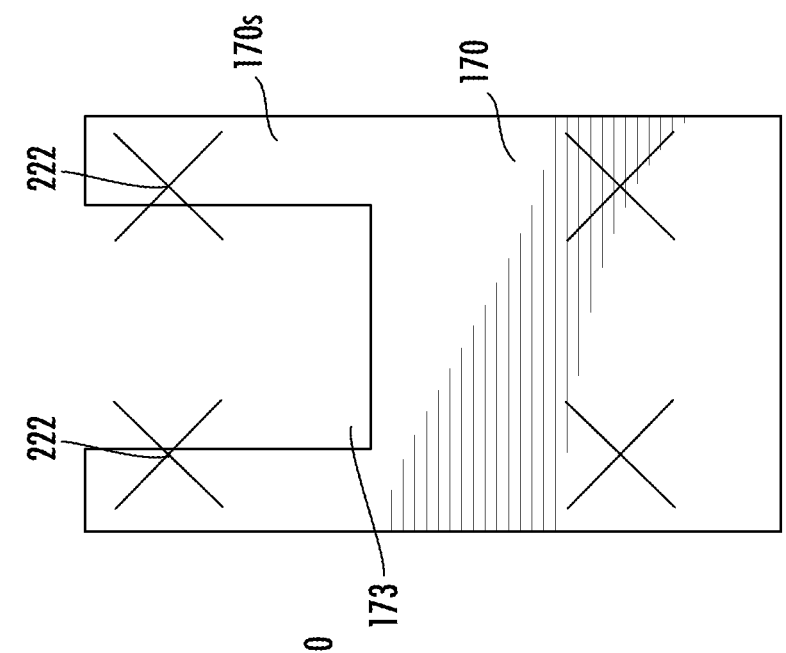
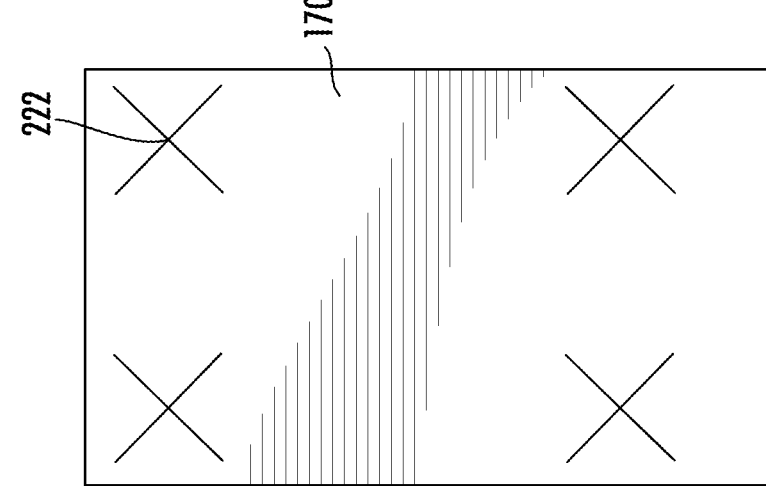

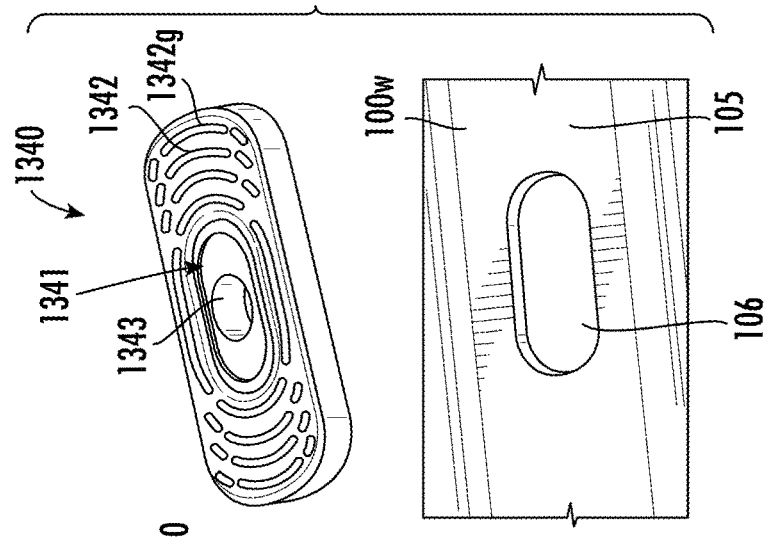
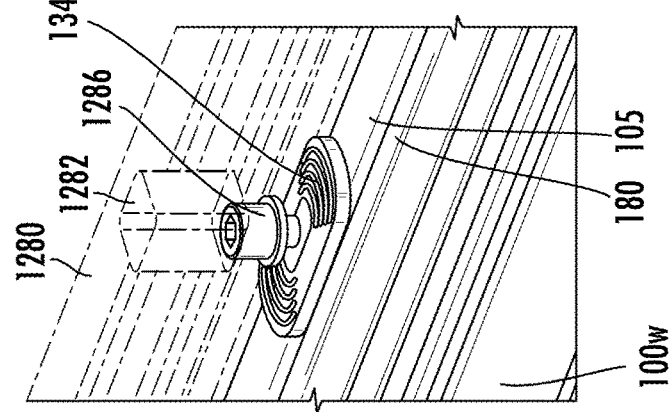
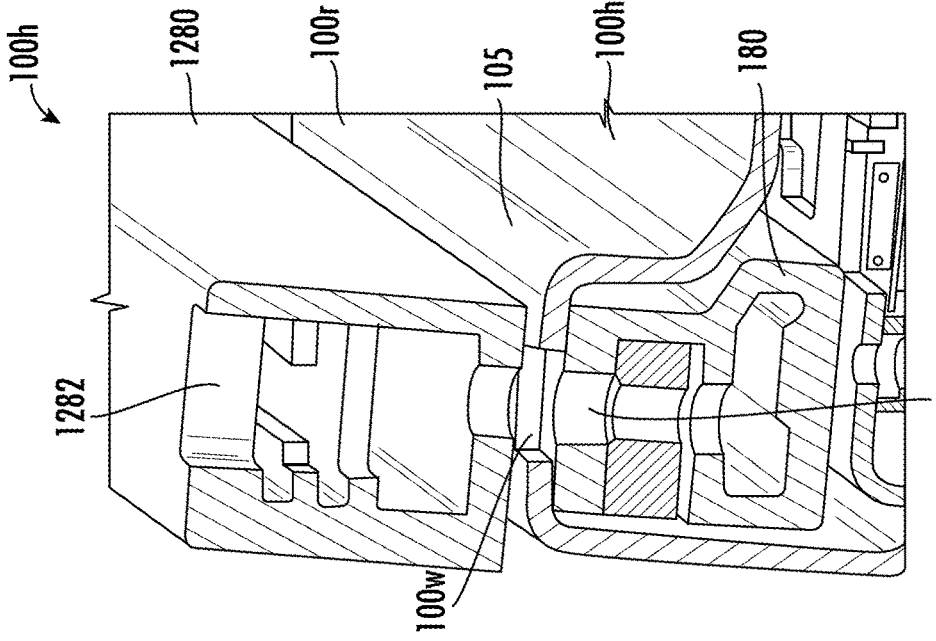
FIG. 70B
FIG. 70A
FIG. 69

US 11,482,774 B2

BASE STATION ANTENNAS HAVING AN ACTIVE ANTENNA MODULE AND RELATED DEVICES AND METHODS

RELATED APPLICATIONS

This application claims priority to and the benefit of U.S. Provisional Application Ser. No. 62/993,925, filed Mar. 24, 2020, U.S. Provisional Application Ser. No. 63/075,344, filed Sep. 8, 2020, U.S. Provisional Application Ser. No. 63/082,265, filed Sep. 23, 2020, U.S. Provisional Application Ser. No. 63/124,442, filed Dec. 11, 2020, and 63/136,757, filed Jan. 13, 2021, the contents of which are hereby incorporated by reference as if recited in full herein.

BACKGROUND

The present invention generally relates to radio communications and, more particularly, to base station antennas for cellular communications systems.

Cellular communications systems are well known in the art. In a cellular communications system, a geographic area is divided into a series of regions that are referred to as "cells" which are served by respective base stations. The base station may include one or more antennas that are configured to provide two-way radio frequency ("RF") communications with mobile subscribers that are within the cell served by the base station. In many cases, each cell is divided into "sectors." in one common configuration, a hexagonally shaped cell is divided into three 120° sectors in the azimuth plane, and each sector is served by one or more base station antennas that have an azimuth Half Power Beamwidth (HPBW) of approximately 65°. Typically, the base station antennas are mounted on a tower or other raised structure, with the radiation patterns (also referred to herein as "antenna beams") that are generated by the base station antennas directed outwardly. Base station antennas are often implemented as linear or planar phased arrays of radiating elements.

In order to accommodate the increasing volume of cellular communications, cellular operators have added cellular service in a variety of new frequency bands. While in some cases it is possible to use a single linear array of so-called "wide-band" radiating elements to provide service in multiple frequency bands, in other cases it is necessary to use different linear arrays (or planar arrays) of radiating elements to support service in the different frequency bands.

As the number of frequency bands has proliferated, and increased sectorization has become more common (e.g., dividing a cell into six, nine or even twelve sectors), the number of base station antennas deployed at a typical base station has increased significantly. However, due to, for example, local zoning ordinances and/or weight and wind loading constraints for the antenna towers, there is often a limit as to the number of base station antennas that can be deployed at a given base station. In order to increase capacity without further increasing the number of base station antennas, multi-band base station antennas have been introduced which include multiple linear arrays of radiating elements. One common multi-band base station antenna design includes two linear arrays of "low-band" radiating elements that are used to provide service in some or all of the 617-960 MHz frequency band and two linear arrays of "mid-band" radiating elements that are used to provide service in some or all of the 1427-2690 MHz frequency band. The four linear arrays are mounted in side-by-side fashion. There is also interest in deploying base station antennas that include one or more linear arrays of "high-band" radiating elements that operate in higher frequency bands, such as some, or all, of the 3.3-4.2 GHz frequency band.

FIGS. 1 and 2 illustrate examples of prior art base station antennas 10. The base station antenna 10 is typically mounted with the longitudinal axis L of the antenna 10 extending along a vertical axis (e.g., the longitudinal axis L may be generally perpendicular to a plane defined by the horizon) when the antenna 10 is mounted for normal operation. The front surface of the antenna 10 is mounted opposite the tower or other mounting structure, pointing toward the coverage area for the antenna 10. The antenna 10 includes a radome 11 and a top end cap 20. The radome 11 and the top end cap 20 can be a single integral unit, which may be helpful for waterproofing the antenna 10. The antenna 10 also includes a bottom end cap 30 which includes a plurality of connectors 40 mounted therein. As shown, the radome 11, top cap 20 and bottom cap 30 define an external housing 10$h$ for the antenna 10. An antenna assembly is contained within the housing 10$h$.

FIG. 2 illustrates that the antenna 10 can include one or more radios 50 that are mounted to the housing 10$h$. Antennas having integrated radios that can adjust the amplitude and/or phase of the sub-components of an RF signal that are transmitted through individual radiating elements or small groups thereof are referred to as "active antennas." Active antennas can steer the generated antenna beams in different directions by changing the amplitudes and/or phases of the sub-components of RF signals that are transmitted through the antenna. As the radios 50 may generate significant amounts of heat, it may be appropriate to vent heat from the active antenna in order to prevent the radios 50 from overheating. Accordingly, each radio 50 can include a (die cast) heat sink 54 that is mounted on the rear surface of the radio 50. The heat sinks 54 are thermally conductive and include a plurality of fins 54$f$. Heat generated in the radios 50 passes to the heat sink 54 and spreads to the fins 54$f$. As shown in FIG. 2, the fins 54$f$ are external to the antenna housing 10$h$. This allows the heat to pass from the fins 54$f$ to the external environment. Further details of example conventional antennas can be found in co-pending WO2019/236203 and WO2020/072880, the contents of which are hereby incorporated by reference as if recited in full herein.

SUMMARY

Pursuant to embodiments of the present invention, base station antennas are provided with housings that enclose a passive antenna assembly and that are configured to releasably couple to an active antenna module that is at least partially external to the housing of the base station antenna.

Embodiments of the present invention include a base station antenna that includes: a passive antenna assembly having a housing and a first reflector. The housing has a rear wall. The base station antenna also includes a separate active antenna module with a second reflector coupleable to or coupled to the housing of the passive antenna assembly. In position, the second reflector resides adjacent or inside the rear wall of the housing.

The housing has a front that can define an external radome with an internal chamber between the front and the rear wall. The rear wall can have or define a recess. The second reflector can reside adjacent the first reflector inside the recess.

The housing can have a front that defines an external radome with an internal chamber between the front and the rear wall. The rear wall can have or defines a recess and the second reflector can reside adjacent the first reflector inside the recess.

The first reflector can have an aperture and at least a portion of the second reflector can be positioned in the aperture of the first reflector.

The first reflector can have a longitudinal and lateral extent and defines a reflector wall with wall segments that at least partially surrounds the aperture thereof.

The wall segments of the reflector wall of the first reflector can entirely surround the aperture.

The first reflector can be capacitively coupled to the second reflector.

At least one of the first reflector or the second reflector can be provided by a frequency selective surface and/or substrate that can be configured to allow RF energy to pass through at one or more defined frequency range and that is configured to reflect RF energy at a different frequency band.

The first reflector can have the frequency selective surface and/or substrate and can be configured to reflect RF energy at a low band and pass RF energy at a higher band.

The frequency selective surface and/or substrate can reside in the housing behind low band dipole radiating antenna elements.

The base station antenna can further include low band dipole antenna with feed stalks. The feed stalks and/or radiating elements of the low band dipole antenna can project forward of the frequency selective substrate.

The base station antenna can include a third reflector that is an extension of the first reflector or that is coupled to the first reflector. The third reflector can extend in a longitudinal direction and has a lateral extent. The third reflector can reside in the housing and extend longitudinally a distance greater than the first reflector.

The frequency selective surface and/or substrate can be co-planar with the third reflector.

The frequency selective surface and/or substrate can be parallel to the third reflector and can reside closer to an external, front radome of the housing than the third reflector.

The first reflector can have a longitudinal and lateral extent. The second reflector can have a longitudinal and lateral extent. The longitudinal extent of the second reflector can be less than the longitudinal extent of the first reflector.

The aperture of the first reflector and the recess provided by or in the rear wall of the housing can be aligned and each can have a rectangular perimeter.

Other embodiments of the present invention are directed to base station antennas that have a base station antenna housing with a top, a bottom, a front, a rear and right and left side walls extending between the top and the bottom and joining the front and rear. The rear has a recessed segment that extends longitudinally and laterally across the rear of the base station housing. The base station antenna also has a passive antenna assembly in the base station antenna housing and an active antenna module that includes radio circuitry and a plurality of radiating elements that resides in the recessed segment of the rear of the base station antenna housing.

The front and the right and left side walls form at least part of a radome and the active antenna module can be configured to sealably couple to the recessed segment.

The base station antenna can further include a back plate with an open aperture. The open aperture can extend longitudinally and laterally across the rear of the base station antenna housing. The active antenna module can be sealably attached to the back plate and the active antenna module can cover the open aperture of the back plate.

The active antenna module and/or the back plate can have a seal extending about a perimeter portion thereof.

The right and left side walls can have a first height along the recessed segment. The right and left side walls can have a second height that is greater than the first height at a second segment longitudinally spaced apart from the recessed segment. A difference between the first and second heights can be in a range of 0.25 inches and 6 inches.

The recessed segment can extend a length that can be in a range of 20%-60% of a length of the rear of the base station antenna housing and can extend in a width direction, perpendicular to the length direction, that can be in a range of 30-110% of a width of the rear of the antenna base housing The base station antenna can further include a seal cap sealably coupled to the left and right side walls and the rear of the housing.

The base station antenna can further include a reflector in the base station antenna housing. At least a portion of the reflector can reside forward of the back plate.

The reflector can have an open aperture that, with the base station antenna in operative position, resides forwardly of the open aperture of the back plate.

The recessed segment can reside adjacent the top of the base station antenna housing and terminate above a medial segment of the rear of the base station antenna housing.

The back plate can be rectangular and can have a rectangular perimeter that surrounds the open aperture and can be sealably coupled to the active antenna module.

The base station antenna can further include first and second rails that are laterally spaced and that longitudinally extend inside the base station antenna.

The first and second rails can be coupled to the radome.

The base station antenna can further include first and second cross-members coupled to the first and second rails that, together with the first and second rails, surround a window configured to receive the active antenna module.

The first and second rails can be sealably coupled to the radome and/or sealably coupled to the active antenna module.

The first and second rails can be coupled to the reflector.

The reflector can be positioned a distance in a range of 0.5 inches to 4 inches from a back plate, or from the front, in a front to back direction between the front and rear of the base station antenna housing.

Other aspects are directed to base station antennas that include: a base station antenna housing having a top, a bottom, a front, a rear and right and left sides joining the front and rear. The rear has a longitudinally and laterally extending recessed segment or chamber. The base station antenna also includes a passive antenna assembly in the base station antenna housing and an active antenna module sealably coupled to the rear of the base station housing and extends over the recessed segment or chamber.

The active antenna module can have radio circuitry and a plurality of radiating elements.

The base station antenna can further include a back plate with an open aperture. The open aperture can extend longitudinally and laterally across the rear of the base station housing over the open chamber. The active antenna module can be sealably attached to the back plate.

The active antenna module and/or the back plate can have a seal extending about a perimeter portion thereof.

The right and left side walls can have a first height along a recessed segment of the rear. The right and left side walls can have a second height that is greater than the first height at a second segment of the rear that is longitudinally spaced apart from the recessed segment. A difference between the first and second heights can be in a range of 0.25 inches and 6 inches.

The recessed segment can extend a length that is in a range of 20%-60% of a length of the rear of the base station antenna housing and can extend in a width direction, perpendicular to the length direction, that can be in a range of 30-110% of a width of the rear of the base station antenna housing.

The base station antenna can further include a seal cap that can be sealably coupled to the left and right side walls and the rear of the base station antenna housing.

The base station antenna can further include a reflector in the base station antenna housing. At least a portion of the reflector can reside forward of the back plate.

The recessed segment can reside adjacent the top of the base station antenna housing and can terminate above a medial segment of the rear of the base station antenna housing.

The back plate can be rectangular and can have a rectangular perimeter that surrounds the open aperture and can be sealably coupled to the active antenna module.

The base station antenna can further have first and second rails that are laterally spaced and that longitudinally extend inside the base station antenna. The first and second rails can be coupled to the radome and/or are sealably coupled to the active antenna module.

The base station antenna can further include first and second rails that are laterally spaced and that longitudinally extend inside the base station antenna; and first and second cross members that attach to the first and second rails. The first and second cross members and the first and second rails can cooperate to form a window that receives an inner facing portion of the active antenna module.

The first and second rails and the first and second cross members can be sealably coupled to the active antenna module.

The first and second rails can be coupled to the reflector via respective U-shaped connectors.

The reflector can be positioned a distance in a range of about 0.5 to about 4 inches from a back plate in a front to back direction between the front and rear of the base station antenna housing or from the front of the housing that same distance where a back plate is not used. The back plate can be sealably coupled to the active antenna module.

Still other aspects of the present invention are directed to active antenna modules. The active antenna modules include a remote radio unit, an integrated filter and calibration board assembly coupled to the remote radio unit, an antenna assembly coupled to the remote radio unit, and a radome coupled to the antenna assembly with the antenna assembly sandwiched between the radome and the integrated filter and calibration board assembly.

The active antenna module can have a seal interface extending about a perimeter of the radome that is configured to sealably couple the active antenna module to a base station antenna.

The radome can be a first radome and the active antenna module can further include a second radome that is coupled to and covers the first radome.

Still other aspects of the present invention are directed to methods of assembling a base station antenna. The methods include: mounting a base station antenna housing to a mounting structure; aligning an active antenna module with a recessed rear segment and/or chamber along a rear of the base station antenna housing before or after mounting the base station antenna housing; then attaching the active antenna module against the base station antenna housing to couple the active antenna module to the base station antenna housing.

Embodiments of the present invention provide antenna housings that have a back plate that resides adjacent a reflector and that also have a passive antenna assembly. The back plate can have a perimeter that optionally surrounds an aperture and that sealably engages an active antenna module.

Embodiments of the present invention provide a base station antenna housing with a passive antenna assembly, a top cap, a bottom cap with connectors and a radome extending between the top and bottom end caps. The radome has a front and a rear. The rear can have an external recessed segment that receives an active antenna module.

The antenna housing can have a seal cap that extends across a width of the radome and can be coupled to the rear of the antenna housing.

Embodiments of the present invention provide at least one active antenna module that sealably couples to a rear of the base station antenna housing. The base station antenna housing encloses a passive antenna assembly. When assembled and/or in operation, the at least one active antenna module is externally accessible thereby allowing for ease of assembly, installation and/or replacement.

Embodiments of the present invention provide base station housings that enclose a passive antenna and that sealably couple to an externally accessible active antenna module thereby allowing user selectable active antenna modules (typically having respective antenna(s), filter(s) and radio(s)) to be coupled to a respective base station antenna housing.

Embodiments of the present invention provide a base station antenna that has a base station antenna housing with a top, a bottom, a front, a rear, and right and left sides joining the front and rear; a passive antenna assembly in the base station antenna housing; and an active antenna module slidably mountable to the base station antenna housing through the top of the base station antenna housing.

In position, the active antenna module can be sealably coupled to a top portion of the rear of the base station housing.

In position, the active antenna module can reside over and closes an open chamber provided by the base station antenna housing.

The active antenna module can include a radome that resides in the open chamber and that faces an external radome of the front of the base station antenna housing.

The rear of the base station antenna housing can have a longitudinally and laterally extending open chamber that receives a radome of the active antenna module.

The active antenna module can have an inwardly projecting top member that extends inwardly further than the radome of the active antenna module.

The active antenna module can have rail couplers that slidably couple to rails of the base station antenna housing.

The base station antenna housing can have outwardly projecting side members that can extend for a sub-length of the base station antenna housing at a top portion of the base station antenna housing and that can couple to mounting hardware configured to mount the base station antenna to a mounting structure.

The active antenna module can be coupled to the base station antenna housing and can be devoid of mounting hardware that mounts to the mounting structure.

The active antenna module can have mounting hardware on a rear surface thereof that is configured to attach to a mounting structure.

Yet other embodiments are directed to a base station antenna that includes at least one radome with one or more segments thereof interposed between first and second reflectors.

The at least one radome can include first and second radomes with segments thereof positioned between coupling surfaces of the first and second reflectors.

The first and/or second reflector can have a frequency selective surface/substrate.

The first and second reflector can be capacitively coupled.

Still other aspects are directed to a base station antenna that includes a base station antenna housing with a fixed reflector and a removable reflector that is configured to couple with the fixed reflector to thereby provide a common electrical ground.

The removable reflector can be capacitively coupled to the fixed reflector.

The removable reflector can be provided in an active antenna module that is removably attached to the base station antenna housing.

Other embodiments are directed to a base station antenna that includes a passive antenna assembly having a housing and a first reflector and a separate active antenna module having a second reflector coupleable to or coupled to the housing of the passive antenna assembly.

The housing can have a rear wall and, in position, the second reflector can reside inside the aperture of the rear wall of the housing.

The housing can have a front that defines an external radome with an internal chamber between the front and the rear wall. The second reflector can reside adjacent the first reflector inside the housing.

The first reflector can have an aperture and at least a portion of the second reflector can be positioned in the aperture of the first reflector.

The first reflector has a longitudinal and lateral extent and can define a reflector wall with wall segments that at least partially surrounds the aperture thereof.

The wall segments of the reflector wall of the first reflector can entirely surround the aperture.

The first reflector can be capacitively coupled to the second reflector.

At least one of the first reflector or the second reflector can be provided by a frequency selective substrate that is configured to allow RF energy to pass through at one or more defined frequency range and that is configured to reflect RF energy at a different frequency band.

The first reflector can be configured with a frequency selective substrate and can be configured to reflect RF energy at a low band and pass RF energy at a higher band.

The frequency selective substrate can reside in the housing behind (feed) stalks of low band dipole antenna elements.

The base station can include low band dipole antenna with feed stalks, the feed stalks can project forward of a frequency selective surface and/or substrate, optionally the frequency selective substrate has open spaces that extend (adjacently) about the feed stalks.

Yet other embodiments are directed to a base station antenna that extends along a longitudinal direction. The base station antenna includes a plurality of columns of first radiating elements configured for operating in a first operational frequency band, each column of first radiating elements comprising a plurality of first radiating elements arranged in the longitudinal direction. The base station antenna also includes a reflector positioned behind the plurality of columns of first radiating elements and extending in the longitudinal direction. The reflector has a frequency selective surface(s) and is configured such that electromagnetic waves within the first operational frequency band are substantially blocked by the reflector.

The frequency selective surface can be configured to reflect the electromagnetic waves within the first operational frequency band.

The base station antenna can include a plurality of columns of second radiating elements configured for operating in a second operational frequency band that is different from and does not overlap with the first operational frequency band. Each column of second radiating elements can have a plurality of second radiating elements arranged in the longitudinal direction. The frequency selective surface(s) is further configured such that electromagnetic waves within the second operational frequency band can propagate through the reflector.

The second operational frequency band can be higher than the first operational frequency band.

The reflector can provide the frequency selective surface(s) on a printed circuit board.

The reflector can include a dielectric board having opposite first and second sides, the first and second sides facing respective columns of the first radiating elements, each can be formed with a periodic conductive structure, the periodic conductive structures forming the frequency selective surface.

The periodic conductive structure on the first side of the dielectric board can have a first array structure and the periodic conductive structure on the second side of the dielectric board can have a second array structure that has a different pattern than the first array structure.

The frequency selective surface(s) can have a periodic conductive structure a repeating pattern of polygonal shapes of metal elements.

The periodic conductive structures on the first and second sides of the dielectric board can be formed of metal.

The frequency selective surface(s) of the reflector can be provided by a multi-layer printed circuit board.

The reflector can be implemented as a multi-layer printed circuit board, one or more layers of which can be formed with a frequency selective surface configured such that electromagnetic waves within a predetermined frequency range can propagate through the reflector. A combination of predetermined frequency ranges associated with the one or more layers of the multi-layer printed circuit board can reflect electromagnetic waves in the first operational frequency band.

The reflector can be a first reflector that is provided by a passive antenna housing. The first radiating elements can be low band radiating elements. The base station antenna can also include a second reflector that resides behind the first reflector.

The base station antenna can include at least one radome that resides between the first and second reflectors.

The at least one radome that resides between the first and second reflectors can include first and second radomes stacked and spaced apart in a front to back direction behind a front surface of a housing of the base station antenna. The front surface of the housing can define an external radome.

The second reflector can be provided by an active module that detachably couples to the base station antenna.

The second reflector can reside behind a plurality of columns of second radiating elements, each column of second radiating elements can include a plurality of second radiating elements arranged in the longitudinal direction that operate in a second operational frequency band that is higher than the first operational frequency band. Electromagnetic waves within the second operational frequency band can pass through the first reflector.

The reflector can have a vertically extending primary surface that resides between an internal radome and an external radome defined by a front of the base station antenna.

The base station antenna can have feed boards on right and left sides of the base station antenna that are perpendicular to a primary surface of the reflector.

The reflector can be attached to an internal radome.

The reflector can be provided by a flexible substrate.

The reflector can be malleable and/or flexible to have different configurations, a pre-installation configuration and a fully installed configuration. The fully installed configuration can be a configuration that conforms to a primary surface of an internal radome.

The internal radome is a first radome, the active antenna module can have a second radome that is coupled to and extends across and along at least part of the first radome.

Yet other embodiments are directed to a base station antenna that includes: a first reflector and a second reflector. The first and second reflectors are capacitively coupled with at least one radome therebetween.

The at least one radome can define a dielectric.

The at least one radome can have a forwardmost surface that merges into side portions that extend rearwardly. The side portions can have laterally extending outer edge portions. The laterally extending outer edge portions can reside between the first and second reflectors.

The second reflector can have a forward primary surface that is forward of a primary surface of the first reflector.

The at least one radome can include a radome provided by a detachable active antenna module that provides the second reflector.

The first reflector can be a passive antenna assembly reflector. A plurality of linear arrays of radiating antenna elements can reside forward of the second reflector.

The base station antenna can further include at least one feed board that is orthogonal to a primary surface of the first and/or second reflector and positioned adjacent a right and/or left side of the base station antenna.

The base station antenna can further include at least one radiating element that is coupled to the at least one feed board. The at least one radiating element can extend forward of the first and/or second reflector.

Yet other embodiments are directed to a base station antenna that includes a reflector having an opening extending longitudinally and laterally between spaced apart left and right side portions of the reflector and a removable reflector portion having a length and width that are +/−20% of a length and width of the opening and extends across and along the opening.

The reflector and/or the removable reflector portion can have a frequency selective surface.

The base station antenna can further include a pair of longitudinally extending rails. The removable reflector portion can be coupled to the rails.

The right and left side portions can have a width that is less than 50% of the width of the opening in a width direction of the base station antenna.

At least one row of radiating antenna elements can extend along the right side portion and/or the left side portion of the reflector.

One or more radiating elements of the at least one row of radiating elements can extend laterally across at least a portion of the right or left side of the reflector and an adjacent portion of the removable reflector.

Yet other embodiments are directed to a base station antenna that includes a first housing member defining a front half of a housing of the base station antenna and a second housing member defining a back half of the housing of the base station antenna. The first and second housing members extend laterally and longitudinally and are sealed together.

The first housing member can have a front surface that merges into right and left side portions that extend rearward. The second housing member can have a rear surface that merges into right and left side portions that extend forward. The right and left side portions of the first housing member can be coupled to the right and left side portions of the second housing member along a joint interface that extends longitudinally a length of the housing.

The second housing member can provide at least one laterally and longitudinally extending recess adjacent a lower or upper end of the housing. The recess can extend along a sub-length of the housing. The recess can have a lateral extent that is 60-99% of a lateral extent of the housing.

The second housing member can have at least one external stepped region that rises above the recess and extends laterally and longitudinally about another sub-length of the housing The base station antenna can further include a support member that resides between the first and second housing members about a top and/or bottom end portion of the housing.

The support member can have a front that faces the first housing member and a back that an inner surface of the second housing member. The back can have a laterally extending medial segment that is recessed relative to right and left sides of the support member. The right and left sides of the support member can extend between the right and left sides of the first and second housing members.

Yet other embodiments are directed to a base station antenna that includes: a housing; at least one internal rail coupled to the housing that extends longitudinally and has a first length; and at least one external rail that extends longitudinally and that optionally has a second length that is less than the first length. One or more of the at least one internal rail is coupled to one or more of the at least one external rail.

The at least one internal rail can have a right side internal rail and a left side internal rail that are laterally spaced apart. The at least one external rail can have a right side second external rail and a left side external rail that are laterally spaced apart across a recessed portion of a rear of the housing.

A first one of the at least one internal rail can be sealably attached to a first one of the at least one external rail to thereby inhibit water flow into the housing.

The base station antenna can further include a bolt that extends through a first one of the at least one internal rail, a rear wall of the housing and a first one of the at least one external rail.

The base station antenna can further include a spacer with a first portion comprising a bolt hole surrounded by a second portion of a different material. The first portion of the spacer can reside in a hole in a rear wall of the housing that has an opening with a shape that corresponds to the first portion of the spacer. The bolt can extend through the external rail, through the bolt hole of the spacer and into the internal rail.

The first portion of the spacer can have increased rigidity relative to the second portion. The second portion can be formed of a resilient, compressible seal material.

The spacer can have an elongate shape such that it has a length that is greater than a width thereof.

The second portion can reside against an outer surface of the rear wall of the housing, abutting an inner facing wall of the external rail, while the first portion of the spacer resides in the hole in the rear wall of the housing The external rail can have a groove surrounding a bolt channel and a resilient seal member in the groove. The bolt can extend through the bolt channel with a head of the bolt and/or a collar extending forward of the head of the bolt configured to compress the resilient seal member thereby sealing the external rail against the rear wall of the housing.

The bolt comprises a resilient member extending in front of a bolt head. The resilient member can reside against a surface of the external rail about a bolt opening in the external rail.

BRIEF DESCRIPTION OF THE DRAWINGS

FIG. 3A is a partially exploded, side perspective view of a base station antenna according to embodiments of the present invention, FIG. 3B is an assembled, side perspective view of the base station antenna shown in FIG. 3A.

FIG. 4 is a rear, side perspective view of a base station antenna housing according to embodiments of the present invention.

FIG. 5 is a schematic partially exploded of the base station antenna housing shown in FIG. 4.

FIG. 6A is a partial schematic illustration of a back plate and reflector for the base station antenna housing according to embodiments of the present invention.

FIG. 6B is a rear perspective view of another embodiment of a base station antenna according to embodiments of the present invention.

FIG. 8A is an enlarged schematic section view of a base station antenna with another embodiment of an internal rail configuration according to embodiments of the present invention.

FIG. 8E is a greatly enlarged view of the back plate assembly shown in FIG. 8D.

FIG. 8F is a rear view of the base station antenna show in in FIGS. 8A and 8B without the active antenna module coupled thereto according to embodiments of the present invention.

FIG. 9E: is a partial section view of a base station antenna showing cooperating reflectors according to embodiments of the present invention.

FIGS. 11A-11D illustrate a series of actions that can be used to install an active antenna module to a target base station antenna housing and mounted to mounting structure according to embodiments of the present invention.

FIG. 168 is a rear, side perspective assembled view of the embodiment shown in FIG. 16A.

FIG. 19A is a rear side perspective view of another embodiment of a base station antenna housing and active antenna unit according to embodiments of the present invention.

FIG. 19B is an assembled view of the device shown in FIG. 19A.

FIG. 22A is a rear side perspective view of another embodiment of a base station antenna housing, illustrating the frequency selective substrate/surface at a different depth dimension, and an active antenna unit according to embodiments of the present invention.

FIG. 22B is an assembled view of the device shown in FIG. 22A.

FIG. 22E is an enlarged top, side perspective view of the device shown in FIG. 22C.

FIG. 22H is a front, side perspective view of a portion of a base station antenna comprising a frequency selective substrate/surface according to embodiments of the present invention.

FIG. 27A is a lateral section view of a base station antenna comprising an active antenna unit according to embodiments of the present invention.

FIG. 27B is a greatly enlarged section view of a portion of the base station antenna with the assembled active antenna shown in FIG. 27A.

FIG. 28A is a lateral section view of a base station antenna comprising an active antenna unit according to embodiments of the present invention.

FIG. 28B is an enlarged view of a portion of the section view shown in FIG. 28A.

FIG. 34 is a side perspective view of a portion of a base station antenna with an active antenna module for installation thereto according to embodiments of the present invention.

FIG. 35A is an enlarged view of the bottom end portion of the active antenna module and base station housing interface shown in FIG. 34.

FIG. 35B is an end side perspective view of the bottom portion of the adapter plate shown in FIG. 35A.

FIG. 35C is a section view of the bolt and sleeve subassembly shown in FIG. 35A.

FIG. 42 is a side perspective view of a portion of a base station antenna with an active antenna module according to additional embodiments of the present invention.

FIG. 43 is a side perspective view of the base station antenna with the active antenna module for installation thereto shown in FIG. 42.

FIGS. 44A and 44B are side perspective views of a top portion of the active antenna module and base station antenna shown in FIGS. 42 and 43 illustrating a top hook arrangement for facilitating attachment for field installation.

FIG. 44C is a side perspective view of a top portion of the active antenna module and base station antenna comprising a different attachment configuration according to embodiments of the present invention.

FIGS. 45A and 45B are side perspective views of example attachment features for securing the active antenna module to the base station antenna shown in FIG. 42 according to embodiments of the present invention.

FIG. 54B is a side perspective, partial view of a portion of a base station antenna according to embodiments of the present invention.

FIG. 54C is a schematic, side perspective partial view of a portion of the base station antenna shown in FIG. 54B.

FIGS. 56A and 56B are graphs of the azimuth pattern (scan angles of 0 deg, 48 deg, respectively) for an antenna beam generated by one of the lower-band linear arrays included in the base station antenna of FIGS. 55A, 55B, as generated by a computational model.

FIG. 56C is a graph return loss (dB) versus frequency (GHz) at 0 and 48 degree scan angles for an antenna beam generated by one of the lower-band linear arrays included in the base station antenna of FIGS. 55A, 55B, as generated by a computational model.

FIG. 56D is a polar active (RL) chart of 0 and 48 degree scan angles of one of the lower-band linear arrays included in the base station antenna of FIGS. 55A, 55B, as generated by a computational model.

FIG. 56E is a graph of gain (dB) versus frequency (GHz) at 0 and 48 degree scan angles of one of the lower-band linear arrays included in the base station antenna of FIGS. 55A, 55B, as generated by a computational model.

FIGS. 57A and 57B are graphs of the azimuth pattern (scan angles of 0 deg, 48 deg, respectively) for an antenna beam generated by one of the lower-band linear arrays included in the base station antenna of FIGS. 55A, 55B and taken at a different horizontal (in the orientation shown in FIG. 55A) cut position from that of FIGS. 56A and 56B, as generated by a computational model.

FIG. 57C is a graph of return loss (dB) versus frequency (GHz) at 0 and 48 degree scan angles for an antenna beam generated by one of the lower-band linear arrays included in the base station antenna of FIGS. 55A, 55B, taken at a different horizontal (in the orientation shown in FIG. 55A) cut position from that of FIG. 56C, as generated by a computational model.

FIG. 57D is a polar active (RL) chart of 0 and 48 degree scan angles of one of the lower-band linear arrays included in the base station antenna of FIGS. 55A, 55B taken at a different horizontal (in the orientation shown in FIG. 55A) cut position from that of FIG. 56D, as generated by a computational model.

FIG. 57E is a graph of gain (dB) versus frequency (GHz) at 0 and 48 degree scan angles for one of the lower-band linear arrays included in the base station antenna of FIGS. 55A, 55B, taken at a different horizontal (in the orientation shown in FIG. 55A) cut position from that of FIG. 56E, as generated by a computational model.

FIG. 58A is a simplified side perspective view of a portion of a base station antenna (shown without the front (external) radome of the base station antenna) with an active antenna module and a detachable guide member according to yet other embodiments of the present invention.

FIG. 58B illustrates the assembly shown in FIG. 58A without the guide member shown in FIG. 58A according to embodiments of the present invention.

FIG. 59A is a simplified section view of the assembly shown in FIG. 58A (shown in housing of the base station antenna) according to embodiments of the present invention.

FIG. 59B is a simplified section view of the assembly shown in FIG. 58B (shown in housing of the base station antenna) with the detachable guide member removed and the reflector in position adjacent and/or residing on the active antenna reflector according to embodiments of the present invention.

Figure 60A:
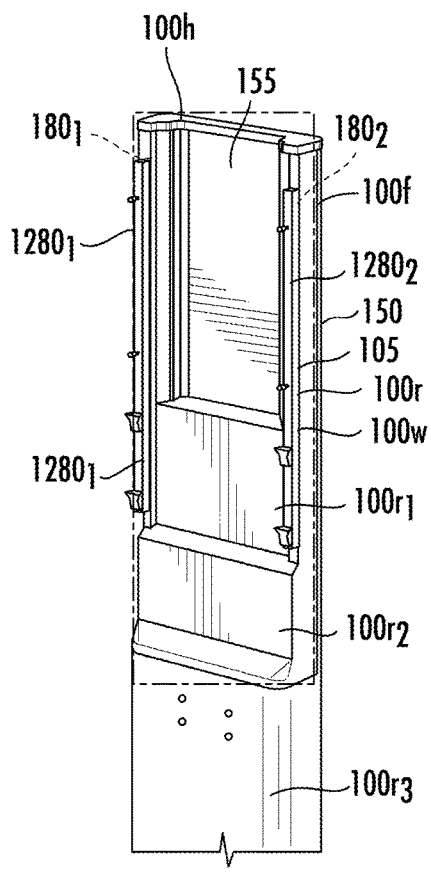

FIG. 60A is a rear perspective view of a base station antenna housing with external and internal cooperating rails and a recess or cavity configured to receive an active antenna module according to embodiments of the present invention.

Figure 60B:
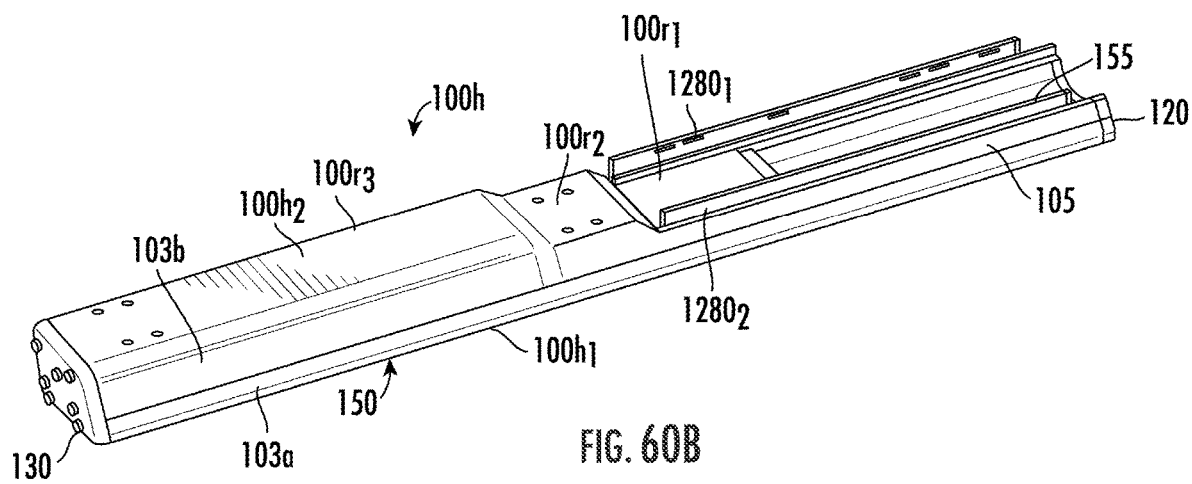

FIG. 60B is a rear, side perspective view of the base station antenna housing shown in FIG. 60A.

FIG. 60C is a rear, side perspective view of the base station antenna housing shown in FIG. 60B but illustrates with the rear wall of the housing in phantom or removed.

FIG. 61 is an end view of the base station antenna housing shown in FIG. 60A but with an example active antenna module coupled to the cavity according to embodiments of the present invention.

FIG. 62A is a rear, side perspective view of an example front and back cooperating housing configuration according to embodiments of the present invention.

FIG. 62B is a rear, side perspective view of the front housing shown in FIG. 62A.

Figure 62C:
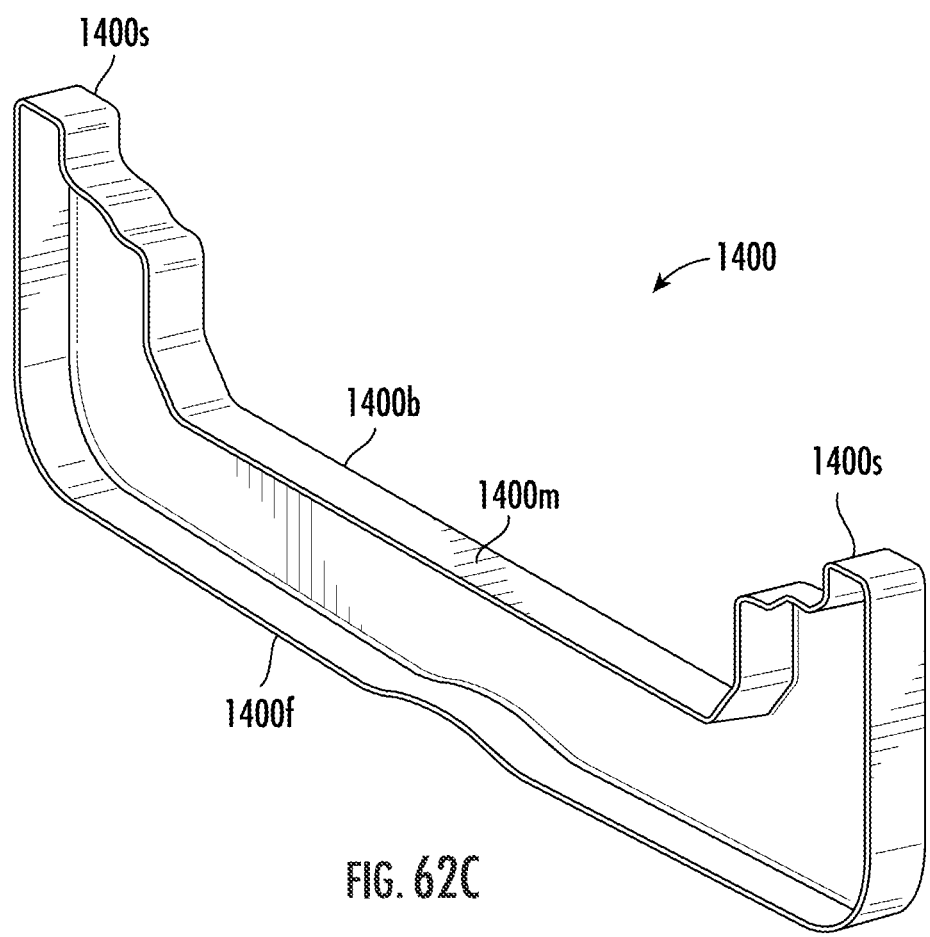

FIG. 62C is a side perspective view of an example internal support member of the housing shown in FIG. 62A according to embodiments of the present invention.

FIGS. 63A-63E are rear, side perspective views of example base station antenna configurations according to example embodiments of the present invention.

Figure 64A:
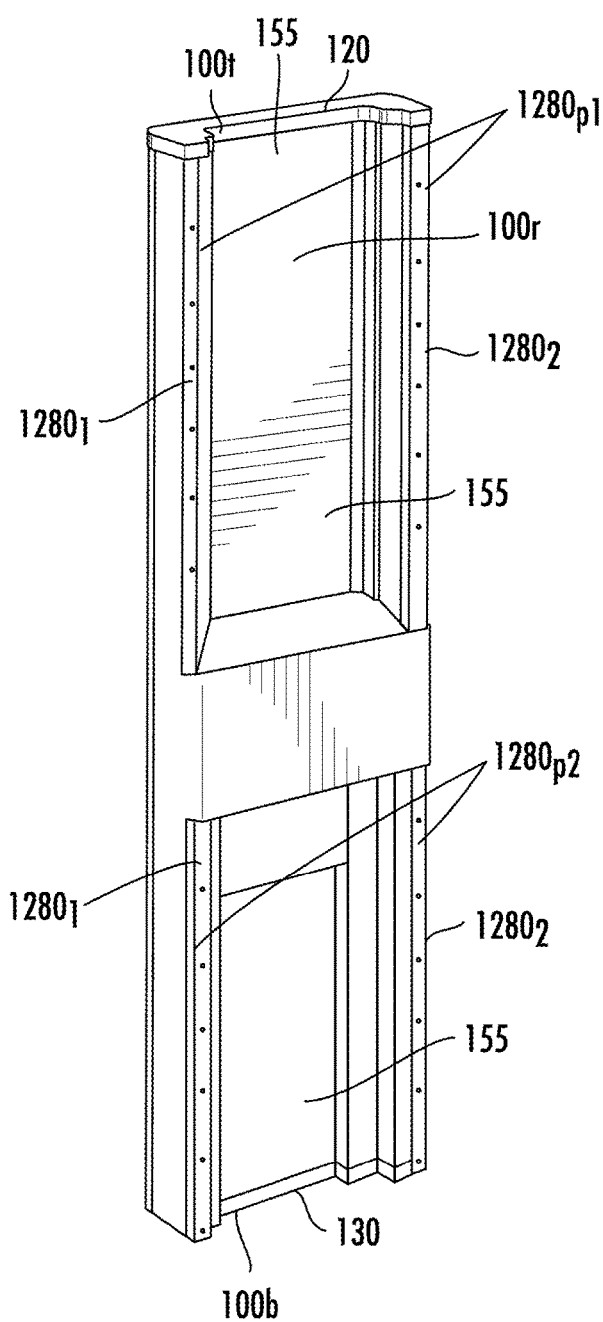

FIG. 64A is a rear, side perspective view of a base station antenna housing configured to receive two active antenna modules according to embodiments of the present invention.

Figure 64B:
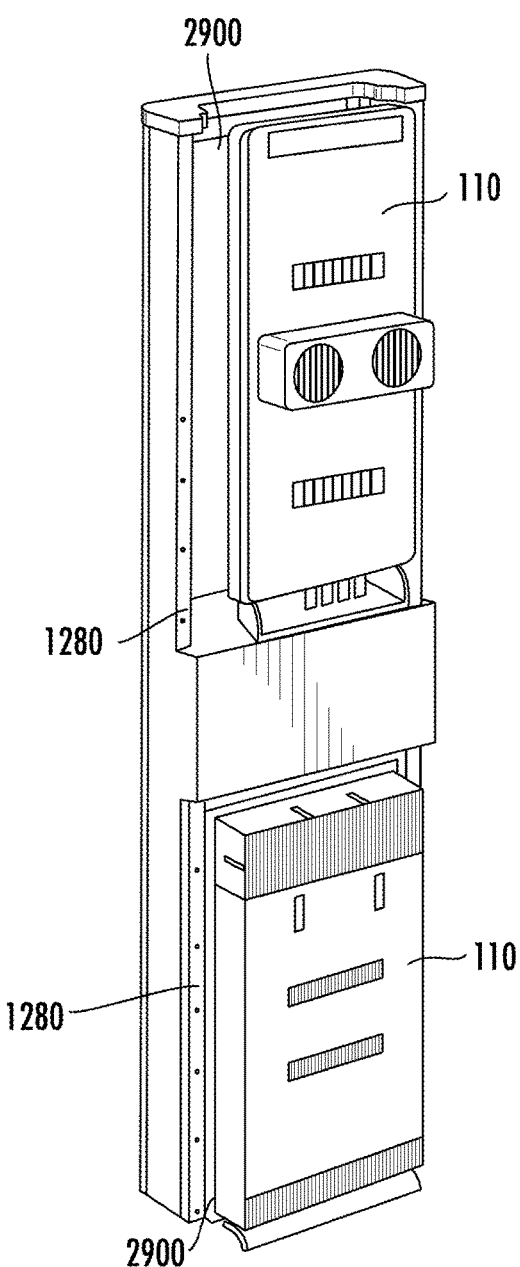

FIG. 64B is a rear, side perspective view of the base station antenna housing shown in FIG. 64A with two active antenna modules coupled thereto according to embodiments of the present invention.

FIG. 65 is a rear, side perspective view of the base station antenna housing shown in FIG. 64A but shown with a removable external reflector coupled to the top portion of the base station antenna housing while an active antenna module is held at the bottom portion according to embodiments of the present invention.

FIG. 66 is a rear, side perspective view of the base station antenna housing shown in FIG. 64A illustrating two removable external reflectors according to embodiments of the present invention.

FIG. 67A is a schematic front view of a reflector with radiating elements according to embodiments of the present invention.

FIG. 67B is a schematic front view of another reflector with a cutout and radiating elements according to embodiments of the present invention.

FIG. 67C of the reflector shown in FIG. 67B and also illustrating a removable reflector extending behind some of the radiating elements according to embodiments of the present invention.

Figure 68A:
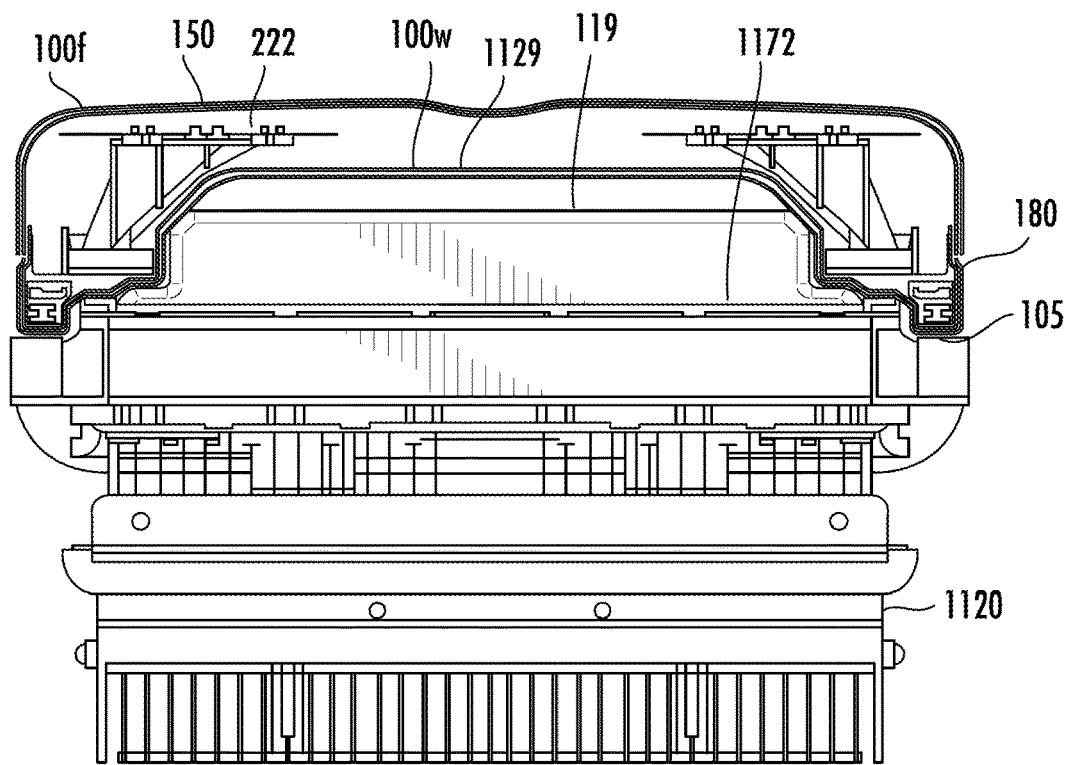

FIG. 68A is a lateral section view of a base station antenna with an active antenna module and internal radome(s) according to embodiments of the present invention.

Figure 68B:
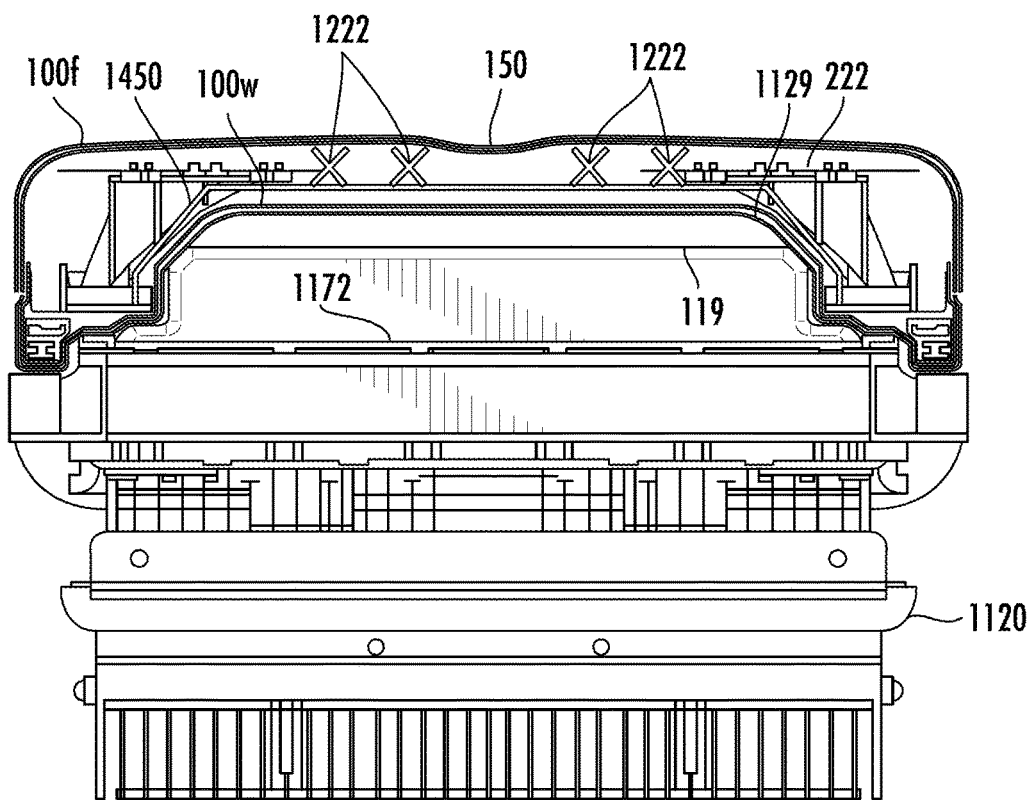

FIG. 68B is a lateral section view of a base station antenna with an active antenna module and internal radome(s) with a reflector and radiating elements held forward of the internal radome(s) according to embodiments of the present invention.

FIG. 69 is an enlarged partial section view of a portion of the base station antenna housing with an example external rail to internal rail interface according to embodiments of the present invention.

FIG. 70A is an enlarged, partial side perspective view of the interface shown in FIG. 70A illustrating an example spacer positioned at the interface according to embodiments of the present invention.

FIG. 70B is an enlarged side perspective view of the spacer and external wall of the housing configured to receive at least a portion of the spacer shown in FIG. 70A according to embodiments of the present invention.

Figure 71A:
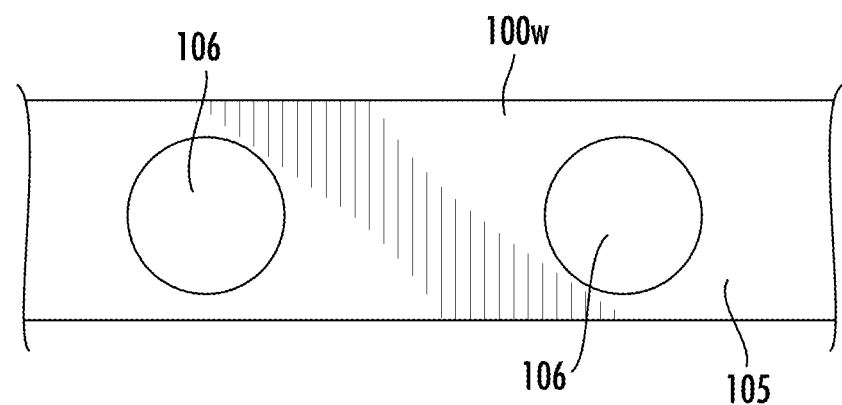

FIG. 71A is an enlarged front partial view of a portion of the external wall of the housing shown in FIG. 70A illustrating a different configuration of the wall from that shown in FIG. 70B according to embodiments of the present invention.

Figure 71B:
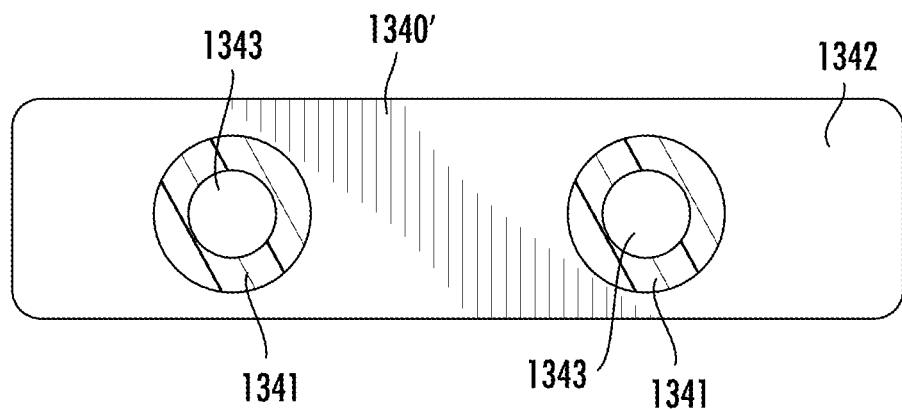

FIG. 71B is an enlarged top view of a spacer configured to couple to the external wall configuration shown in FIG. 71A according to embodiments of the present invention.

Figure 72A:
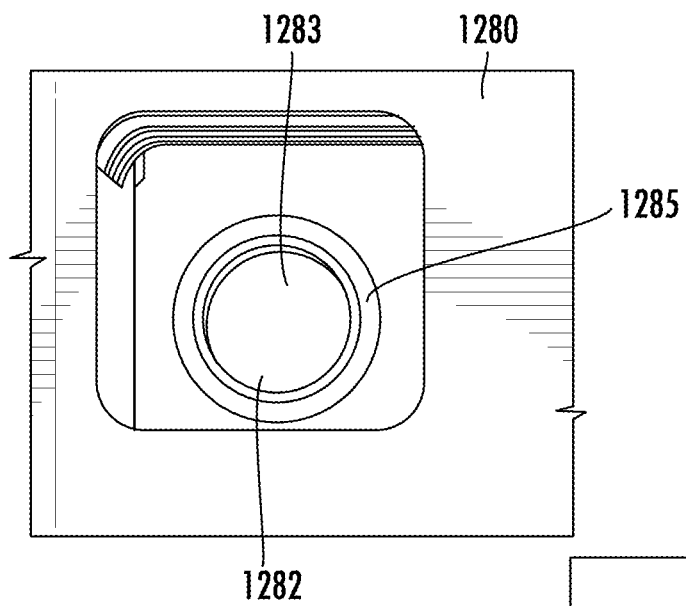

FIG. 72A is an enlarged partial view of the external rail shown in FIG. 69 according to embodiments of the present invention.

Figure 72B:
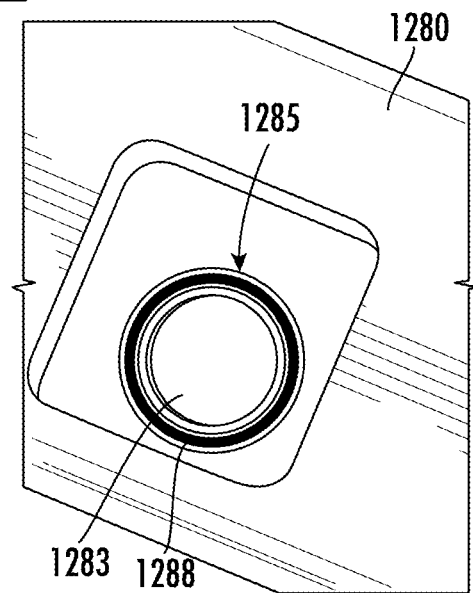

FIG. 72B is an enlarged side perspective view of the portion of the external rail shown in FIG. 72A.

Figure 72C:
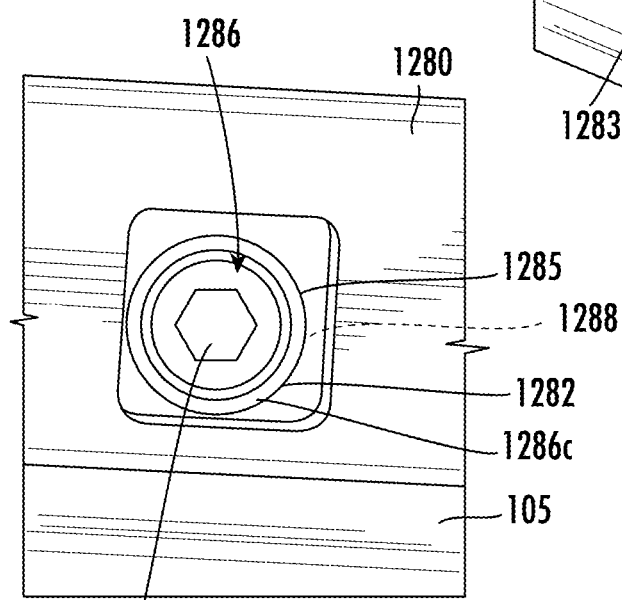

FIG. 72C is a front view of the portion of the external rail shown in FIGS. 72A and 72B illustrated with a bolt coupled thereto according to embodiments of the present invention.

Figure 73:
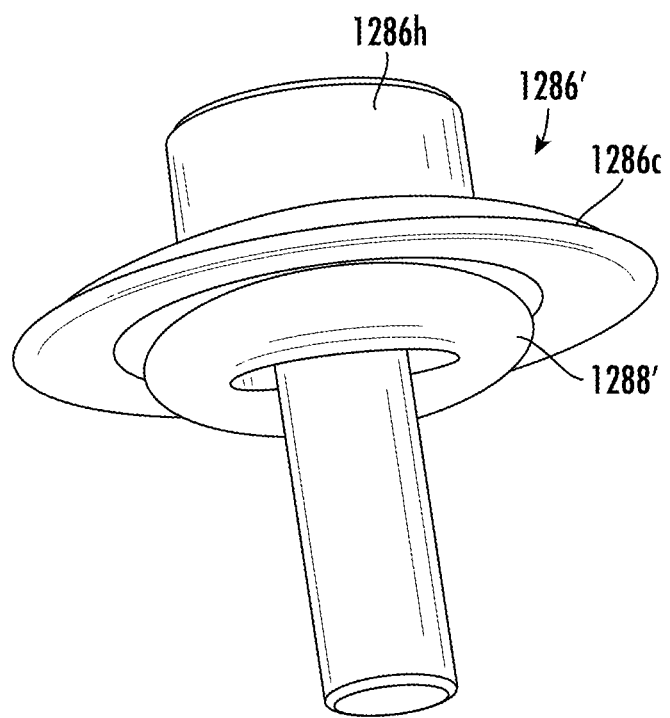

FIG. 73 is an enlarged side perspective view of an example bolt assembly for coupling the external rail and internal rail according to embodiments of the present invention.

Figure 74:
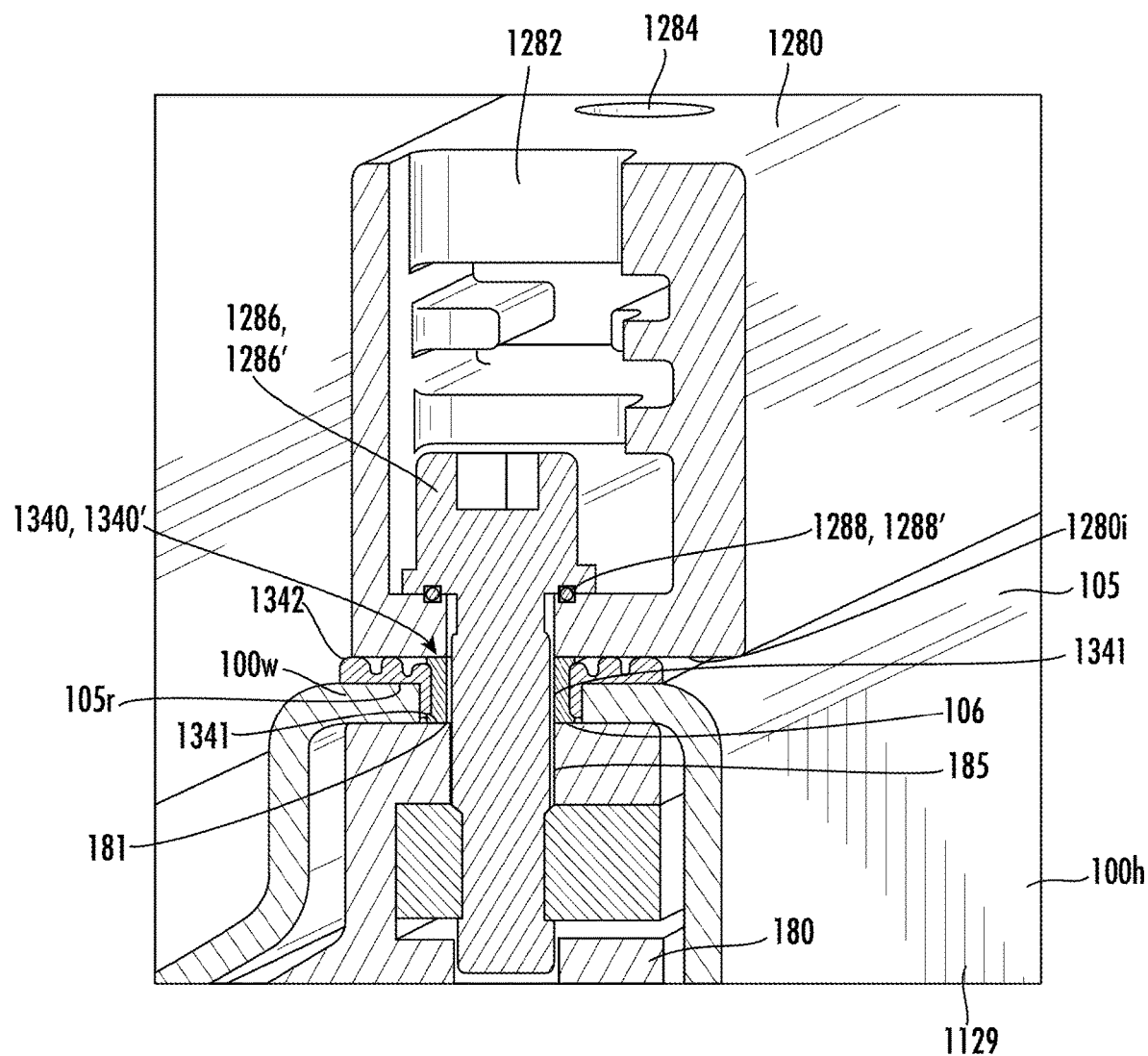

FIG. 74 is an enlarged view of the portion of the base station antenna shown in FIG. 69 illustrated with a spacer and bolt assembly coupled thereto according to embodiments of the present invention.

DETAILED DESCRIPTION

FIGS. 3A and 3B illustrate a base station antenna 100 according to certain embodiments of the present invention. In the description that follows, the base station antenna 100 will be described using terms that assume that the base station antenna 100 is mounted for use on a tower, pole or other mounting structure 300 (FIGS. 11A-11D) with the longitudinal axis L of the antenna 100 extending along a vertical axis and the front of the base station antenna 100 mounted opposite the tower, pole or other mounting structure pointing toward the target coverage area for the base station antenna 100 and the rear of the base station antenna 100 facing the tower or other mounting structure. It will be appreciated that the base station antenna 100 may not always be mounted so that the longitudinal axis L thereof extends along a vertical axis. For example, the base station antenna 100 may be tilted slightly (e.g., less than 10°) with respect to the vertical axis so that the resultant antenna beams formed by the base station antenna 100 each have a small mechanical downtilt.

Referring to FIGS. 3A and 3B, the base station antenna 100 includes a housing 100h with the front and rear 100f, 100r and a top end 120 and a bottom end 130. The bottom end 130 includes a plurality of connectors 140 mounted thereto. In some embodiments, the rear 100r can include a longitudinally and laterally extending recessed segment 108. The recessed segment 108 can longitudinally extend a sub-length "D" of the rear 100r of the housing 100h. The distance D (the overall length of the active module 110) can be in a range of about 25%-95% of an overall length L of the (passive) antenna housing 100h, typically in a range of about 25%-60%, more typically in a range of about 25-40%, such as, for example, a range of about 18-48 inches, in some embodiments.

The base station antenna 100 can include at least one active antenna module 110. The term "active antenna module" refers to a cellular communications unit comprising radio circuitry including a remote radio unit (RRU) and associated antenna elements that are capable of electronically adjusting the amplitude and/or phase of the subcomponents of an RF signal that are output to different antenna elements or groups thereof. The active antenna module 110 comprises the RRU and antenna elements (e.g., a massive MIMO array) but may include other components such as filters, a, calibration network, antenna interface signal group (AISG) controller and the like. As will be discussed further below, the active antenna module 110 can be provided as a single integrated unit or provided as a plurality of stackable units, including, for example, first and second sub-units such as a radio sub-unit (box) with the radio circuitry and an antenna sub-unit (box) with massive multi-input-multi-output (mMIMO) antenna elements and the first and second sub-units stackably attach together in a front to back direction of the base station antenna 100, with the antenna unit closer to the front (external radome) of the base station antenna 100 than the radio unit.

The active antenna module 110 can be sealably coupled to the housing 100h and, when installed, can form part of the rear 100r of the antenna 100. The active antenna module 110 can have an inner facing surface that has a seal interface 112i that is be sealably and releasably coupled to the rear 100r of the housing 100h to provide a water-resistant or water-tight coupling therebetween. The active antenna module 110 can be mounted to the recessed segment 108 of the antenna housing 100h so that a rear face 110r is externally accessible and exposed to environmental conditions. The active antenna module 110 can have an inner facing surface with an outer perimeter portion 110p.

As will be discussed further below, the antenna housing 100h can include a passive antenna assembly 190 comprising radiating elements. The term "passive antenna assembly" refers to an antenna assembly having radiating elements. The passive antenna assembly can be held in the base station antenna housing 100h and the base station antenna housing 100h can be releasably coupled to one or more active antenna modules 100 comprising radio circuitry that is/are separate from the antenna elements of the passive antenna assembly 190.

Figure 13:
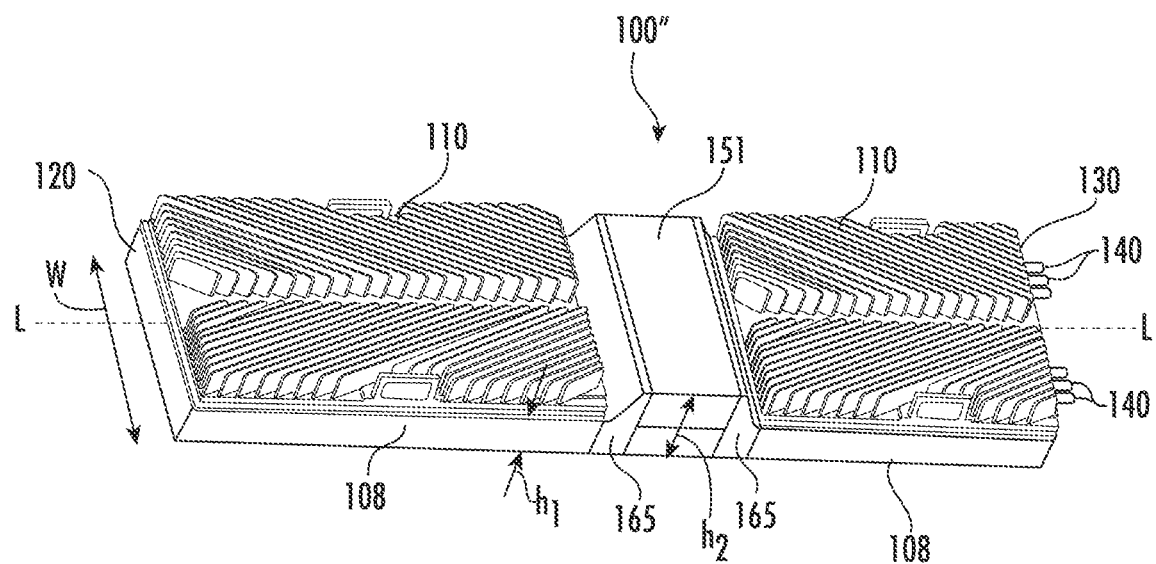
FIG. 13 is a rear, side perspective view of another embodiment of a base station antenna according to embodiments of the present invention.
Figure 63A:
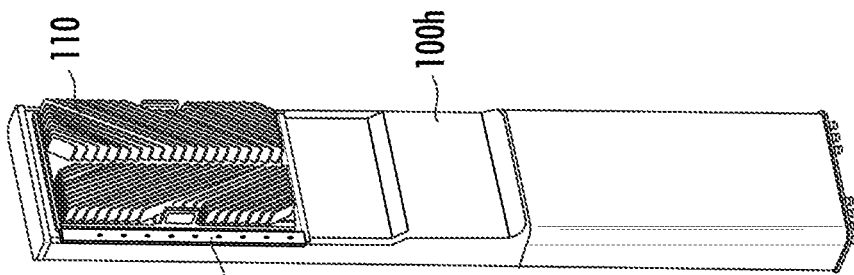
Figure 63B:
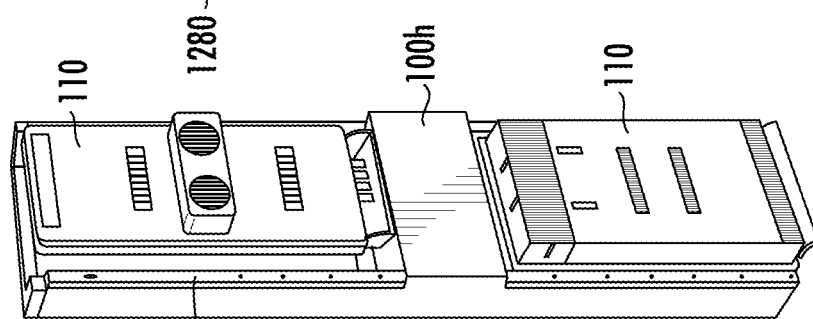
Figure 63C:
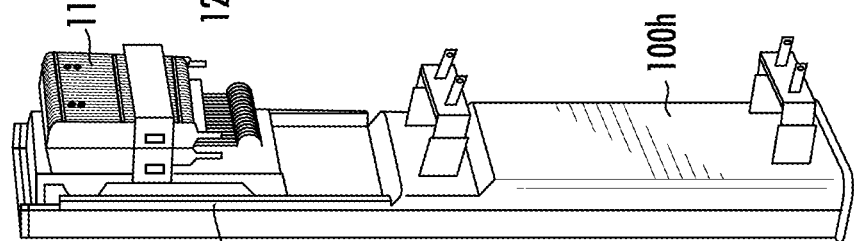
Figure 63D:
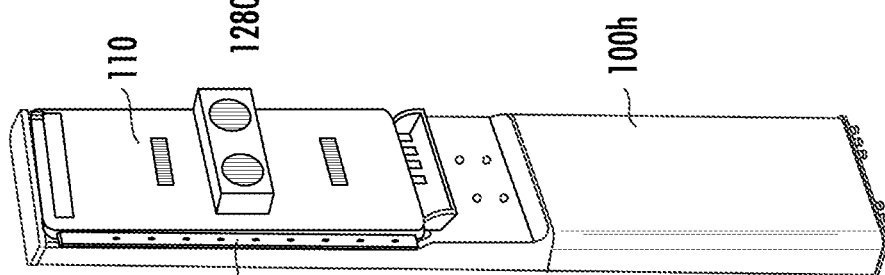
Figure 63E:
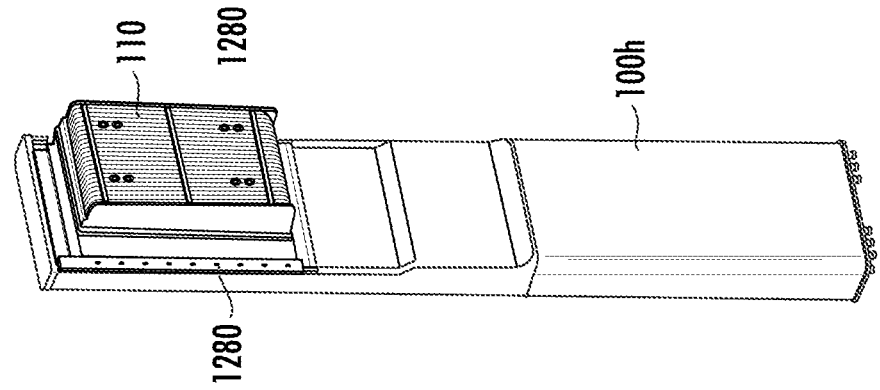

Different active antenna modules 110 may be configured to have different radios, radiating elements or other components whereby the active antenna modules 110 can be different for different cellular service providers. The active antenna module 110 can be interchangeably replaced with another active antenna module 110 from the original equipment manufacturer (OEM) or from the same cellular communications service provider or from different cellular communications service providers. Thus, a plurality of different active antenna modules 110 that have different configurations can be interchangeably coupled to the base station antenna housing 100h. The different active antenna modules 110 can each have the same exterior (perimeter) footprint and connectors or may have different exterior footprints and/or connectors. The different active antenna modules 110 can have different depth dimensions (front to back). A respective base station antenna 100 can, for example, accept different active antenna modules 110 from different service providers at a field installation and/or factory installation site using different adapter members or other mounting configurations that allow the interchangeable field installation/assembly. The base station antenna 100/antenna housing 100h can thereby allow different active antenna modules 110 to be interchangeably installed, upgraded, or replaced. The base station antenna 100 can concurrently hold first and second active antenna units 110, one above the other (FIGS. 13, 63D, 64B, for example).

The length D of the recessed segment 108 can substantially correspond to a length dimension La of the active antenna module 110 that couples to the housing 100h. The length dimension La of the active antenna module 110 is in a direction that corresponds to the longitudinal axis and length dimension of the base station antenna 100. The distance D is typically greater than and within a range of +10%-+30% of the length La of the active antenna module 110 (i.e., the length D of recess 108 may be 10-30% larger than the length La of the active antenna module 110). The active antenna module 110 can be configured to extend across substantially an entire width dimension W of the rear 100r of the antenna housing 100h and optionally may extend outside the width dimension a distance. The active antenna module 110 can have a width that is, for example, within about +/−20% of the width dimension W of the rear 100r of the housing 100h, and optionally can have a width that fits within the footprint of the front 100f and rear 100r of the housing 100h.

In some embodiments, the length D of the recessed segment may be within a range of about 20%-60% of the length of the rear 100r of the base station antenna housing 100h and may extend in a width direction, perpendicular to the length direction, in a range of about 30-110% of a width of the rear of the base station antenna housing 100h.

The base station antenna 100 can have an elongate structural configuration with a length dimension that extends along the longitudinal axis L and with a width dimension W that is perpendicular to the length dimension. The width dimension W is typically less than the length dimension L. In some embodiments, L is >2×W, typically in a range of 2×W-10×W, more typically in a range of 2×W and 5×W.

Still referring to FIGS. 3A and 3B, the rear 100r of the antenna housing 100h can have an outer facing external rear surface 100s that includes the recessed segment 108. The recessed segment 108 can extend over a sub-length of the overall length L of the antenna housing 100h and can merge into a second segment 151 that extends over a different sub-length of the overall length L of the antenna housing 100h. The second segment 151 can terminate at the bottom 130. The recessed segment 108 can reside closer to the top 120 than the second segment 151. The second segment 151 can have a closed outer surface that is defined by a portion of the radome 150. The recessed segment 108 can have an open outer surface exposing a rear facing open chamber 155. The second segment 151 may optionally have a length (in a direction corresponding to the longitudinal axis L of the base station antenna 100) that is less than, the same as, or greater than that of the recessed segment 108.

As shown in FIGS. 3A and 3B, the active antenna module 110 can include a heat sink 115 with thermally conductive fins 115f. The fins 115f may be arranged in a pattern of parallel angled fins. The fins 115f may be configured as first and second sets of fins 115f spaced apart across a medially located and longitudinally extending gap space 116. Some or all of the thermally conductive fins 115f can be provided at an angle "β" in a range of 30-60 degrees from horizontal or an axis perpendicular to the longitudinal axis L, in a use orientation, more typically at an angle from the axis perpendicular to the longitudinal axis that is about 45%. Some fins 115f can be longer than others, as shown. The active antenna module 110 can include one or more finger grips 118, which are shown as laterally spaced apart pairs of finger grips 118, one positioned on each side of the active antenna module 110 for ease in installation or removal. In other embodiments, finger grips 118 may alternatively or additionally be located at the top and bottom of the active antenna module 110 and/or at different locations about the active antenna module 110.

Referring to FIGS. 3A, 3B, 4 and 5, the base station antenna housing 100h can comprise a back plate 160 that includes an opening 163 (FIG. 5). A seal 112 can be provided between the back plate 160 and the inner facing surface of the active antenna module 110. In some embodiments, the outer perimeter portion 110p of the active antenna module 110 can comprise a seal interface 112i with the seal on an internal facing surface that can be sealably coupled to the back plate 160. In some embodiments, the seal 112 can be provided on the back plate 160 or in a housing interface 100i.

One or both of a rear facing surface of the back plate 160 and the seal interface 112i of the inner facing surface of the active antenna module 110 can comprise an O-ring, gasket or other seal 112 to sealably couple the active antenna module 110 to the back plate 160 and therefore, the housing 100h.

The back plate 160 can have an outer perimeter portion 160p that externally surrounds the active antenna module 110. The outer perimeter portion 160p of the back plate 160 can have a lower end 161 that sealably couples to a seal cap 165 and defines a seal interface 100i to the housing 100h.

As shown in FIG. 5, the housing 100h can include a first side wall 101, a front wall 102, and a second side wall 103 that cooperate to define a chamber 155. The first side wall 101, the front wall 102 and the second side wall 103 can be provided as a "u-shaped" unitary formed structure defining part of the radome 150 with the closed end of the "u" being longer than the sides. In some embodiments, two or more of the side walls 101, 103 and front wall 101 can be separate walls attached together at joints, although more typically they are formed as a monolithic structure.

Still referring to FIG. 5, the side walls 101, 103 can have a first rearwardly extending length "$h_1$" over a sub-length of the housing 100h that extends to the top 120 and a second greater rearwardly extending length $h_2$ over a different sub-length of the housing 100h that extends to the bottom 130, each rearwardly extending length $h_1$, $h_2$ can be less than a width dimension "W" of the front wall 102. The difference in the rearwardly extending lengths $h_2$-$h_1$ can define a size of the step forming the stepped recess 108 in the rear surface 100s. In some embodiments, $h_2$-$h_1$ and/or the step measured from the rear surface height at the recess to the height adjacent maximal segment of the rear 100r of the housing 100h can be in a range of 0.2 inches to 4 inches, more typically in a range of about 0.5 inches to 2 inches.

The second segment 151 of the radome 150 at the rear 100r of the housing 100h can extend from a first location adjacent the lower end 161 of the back plate 160 to the bottom 130. The chamber 155 can extend an entire length of the housing 100h, with an upper portion of the chamber 155 being forward of the back plate 160 and at least a portion of the active antenna module 110. The chamber 155 can hold the passive antenna assembly 190 (FIG. 9).

Figure 1:
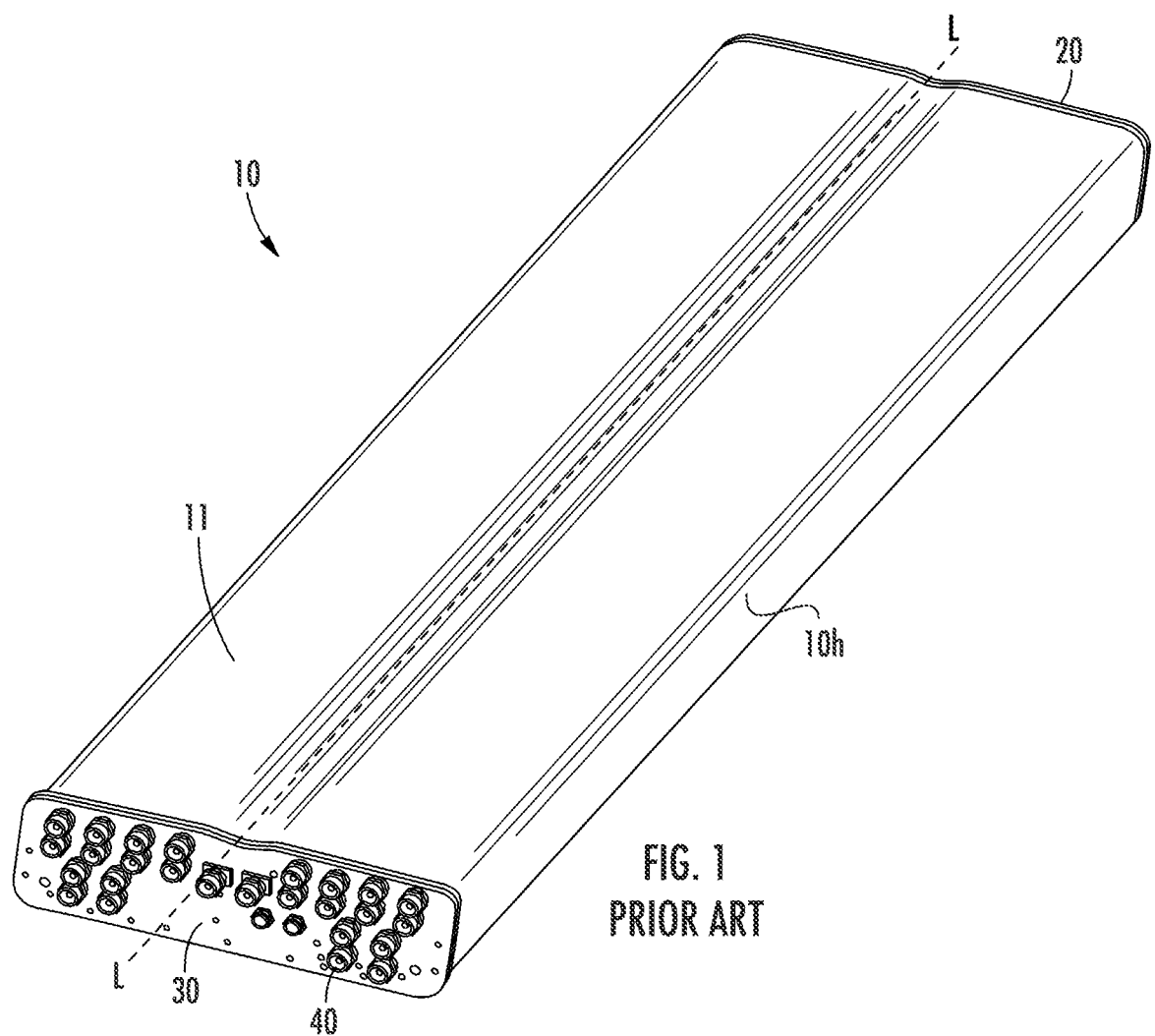
FIG. 1 is a perspective view of a prior art base station antenna.
Figure 2:
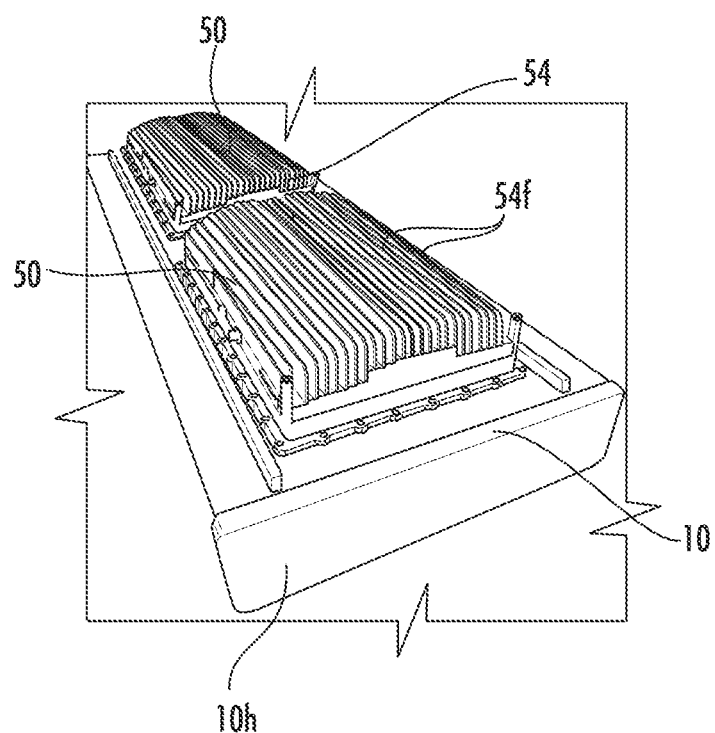
FIG. 2 is a back view of another prior art base station antenna.
Figure 7:
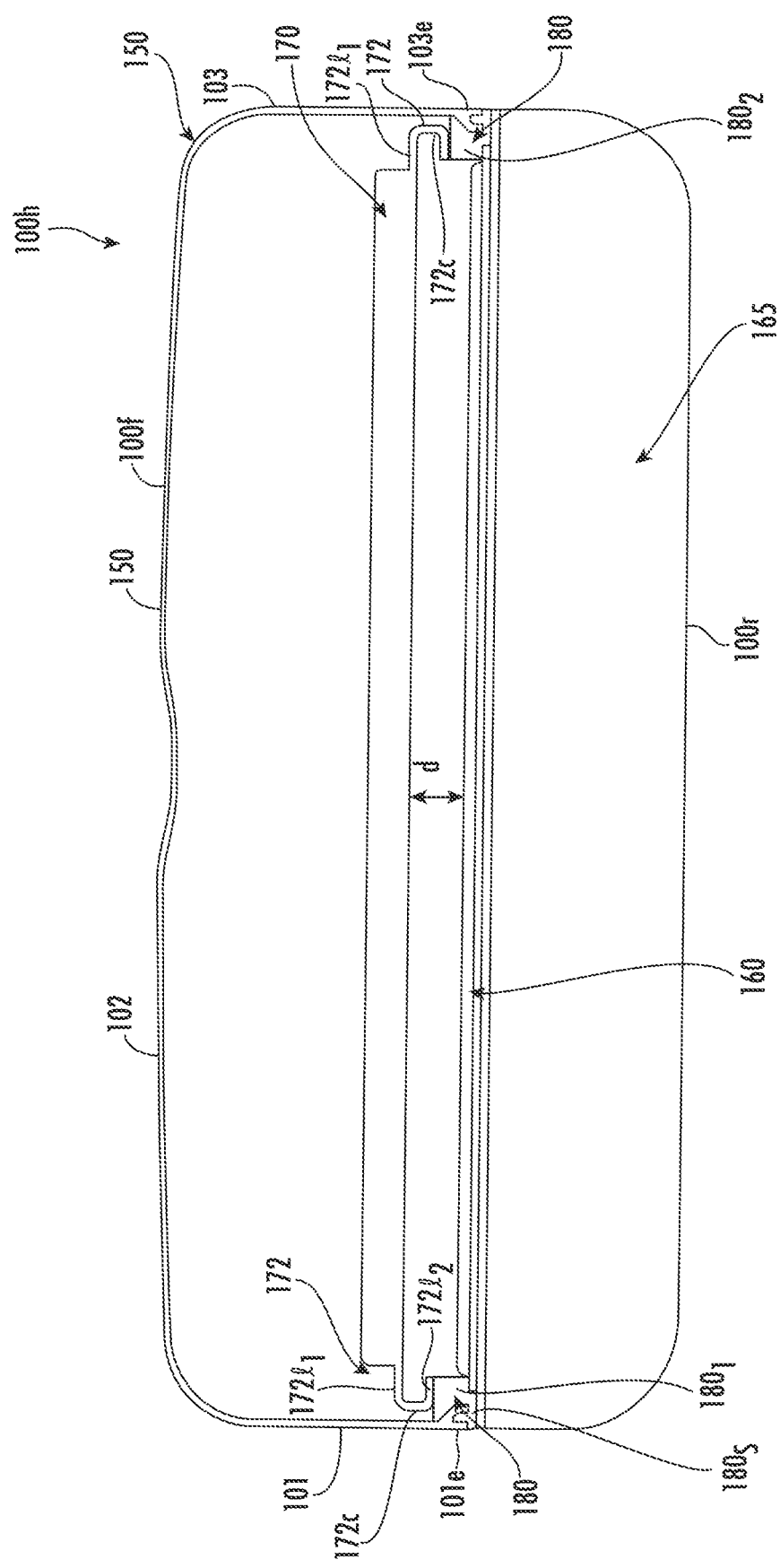
FIG. 7 is an enlarged schematic section view of a base station antenna housing with a passive antenna assembly therein that includes a reflector according to embodiments of the present invention.

The back plate 160 can reside behind a portion of a reflector 170 (FIG. 5) of the passive antenna assembly 190. Referring to FIG. 7, the back plate 160 can be a distance "d", in a front to back direction of the antenna housing 100h, from the reflector 170 of the passive antenna assembly 190. The distance "d" can be in a range of about 0.01 inches to about 4 inches or in a range of about 0.5 and 4 inches, in some embodiments.

Referring to FIGS. 4 and 5, in some embodiments, the outer perimeter portion 160p of the back plate 160 can surround an aperture 163 that extends through the back plate 160. The outer perimeter portion 160p and aperture 163 can be polygonal, typically rectangular. A seal 112 can be provided in either or both the outer facing surface of the back plate 160 and/or the inner facing surface of the active antenna module 110 and the seal 112 and seal interface 112i can have a closed endless configuration, such as a rectangular, oval or circular shape extending about the chamber 155. However, other shaped perimeters, seals and apertures may be used.

The aperture 163 of the back plate 160 can be aligned with an aperture 173 formed in the reflector 170 of the passive antenna assembly 190. The aperture 173 in the reflector 170 of the passive antenna assembly 190 can also be polygonal, shown as rectangular. The aperture 173 of the reflector 170 of the passive antenna assembly 190 can have an area that substantially corresponds to the area of the aperture 163 of the back plate 160, such as within about +/−20% of the area of the aperture 163, in some embodiments. The seal 112 can have a shape and size that extends about the aperture 163.

In some embodiments, the back plate 160 is not required and the active antenna module 110 can sealably, and preferably releasably, coupled to the housing 100h in other manners, such as directly to a rear segment of the housing 100h (FIG. 6B) while providing a water-resistant or water-tight coupling therebetween.

The back plate 160 may have a closed outer perimeter 160p that surrounds the aperture 163 defining a frame configuration 164 that surrounds the aperture 163. In other embodiments, the back plate 160 may terminate adjacent the second segment 151 of the radome 150, or the frame 164 or any side thereof is not required.

The reflector 170 of the passive antenna assembly 190 may have a closed outer perimeter 170p with a reflector wall having side segments 170s that at least partially surround the aperture 173, optionally defining a frame configuration 174 that surrounds the aperture 173. In other embodiments, the reflector 170 of the passive antenna assembly 190 may terminate adjacent the second segment 151 of the radome 150, or the frame 174 and/or any side thereof is not required. In some embodiments, the reflector 170 can be provided as an extension of the main reflector 214 (FIG. 9A) in the passive antenna assembly 190. In some embodiments, the reflector 170 can be separate from the main reflector 214 (FIG. 19A). As will be discussed further below, the reflector 170 can comprise and/or be configured as a frequency selective substrate and/or surface 170f. Where separate, the reflector 170 may be electrically coupled to the main reflector 214.

In some embodiments, as shown in FIG. 6A, the back plate 160 and/or reflector 170 can be replaced with a respective back plate 160' and/or reflector 170' that comprise a plurality of apertures 163, 173. As shown in FIG. 6B, the back plate 160 is not required and the active antenna module 110 can directly couple to the housing at seal interfaces 100i. Also, or alternatively, the reflector 170 can terminate adjacent the top end of the second segment 151 of the rear surface 100s of the housing 100h.

Figures 10A, 10B:
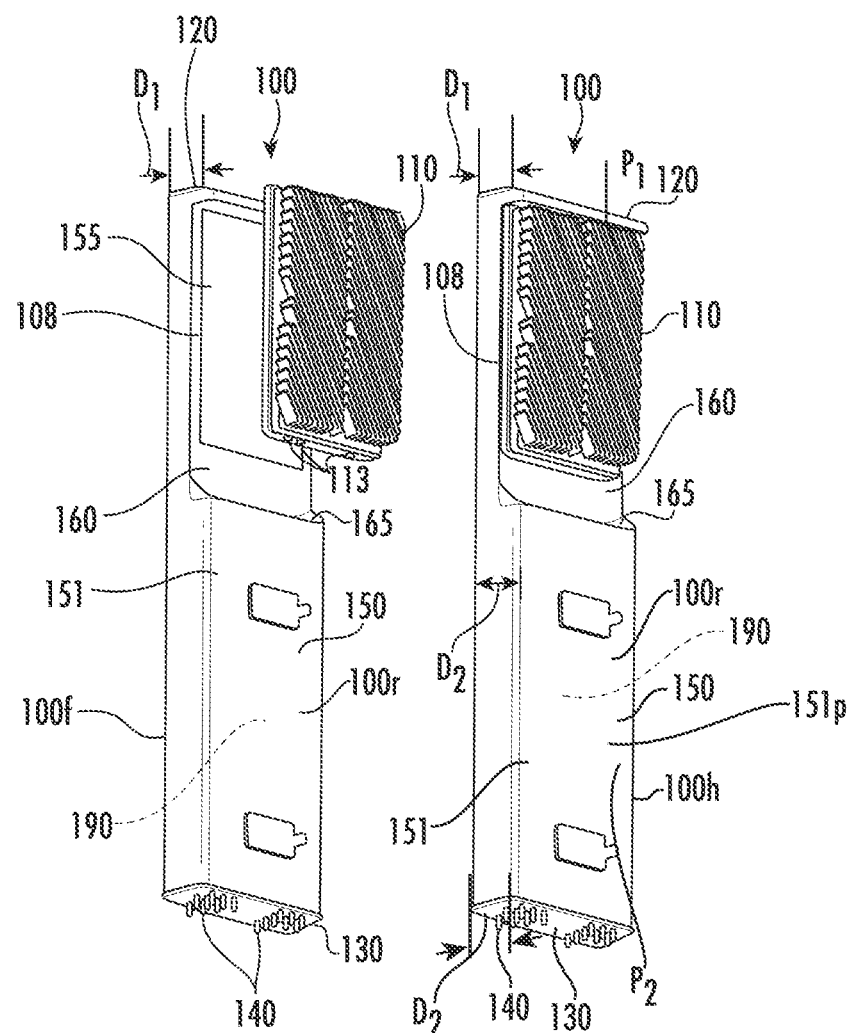
FIG. 10A is a rear, side perspective view of an example active antenna module aligned with a base station antenna housing for installation therewith according to embodiments of the present invention.
FIG. 10B is a rear, side perspective view of the active antenna module shown in FIG. 10A installed to the base station antenna housing.

The back plate 160 can reside inside the recessed segment 108 of the rear 100r of the housing 100h and/or rear surface of the radome 150. The back plate 160 can be recessed relative to the top 120 of the housing 100h (FIG. 10A). The top 120 of the housing 100h can be provided as an end cap or formed by a folded extension of the front wall 102. The bottom 130 is typically provided as an end cap having a plurality of connectors 140 mounted therein.

Referring to FIGS. 3A, 3B, 4 and 5, a seal cap 165 can be coupled to the rear 100r of the housing 100h and reside between the recessed segment 108 and the second segment 151 of the radome 150. The seal cap 165 can sealably engage longitudinally spaced apart housing interfaces 100i to enclose the internal chamber 155 (FIG. 5) thereunder created by the configuration of the recessed segment 108 and the second segment 151. The seal cap 165 can include a seal 165s on an inner facing (outer) perimeter surface. For releasably coupled configurations, the seal 165s can include one or more of a gasket, O-ring or grease. In other embodiments, epoxy, adhesive or other seal attachment configurations may be used.

Referring to FIGS. 4 and 5, the seal cap 165 can have a base segment 166 and a back segment 167 that extends rearwardly from the housing 100h a further distance than the base segment 166. The back segment 167 can reside at a rearwardly extending distance "h" that is greater than the base segment 166 and that may be, for example, in a range of about 1.0 inch and about 10 inches. The seal cap 165 can have a length "d" that extends in the longitudinal direction that is between about 0.25-5 inches, more typically in a range of about 0.5 inches and about 2 inches.

Referring to FIG. 7, the base station antenna 100 may have a generally rectangular cross-section, e.g., a pair of long sides joined by a pair of short sides. The long sides correspond to the front 100f and rear 100r of the antenna housing 100h. The short sides correspond to the side walls 101, 103.

Referring to FIGS. 5 and 7, the antenna housing 100h can comprise at least one internal rail 180. As shown, the at least one rail 180 can be provided as first and second rails $180_1$, $180_2$ that are laterally spaced apart across the width dimension of the base station antenna 100. The at least one rail 180 extends in the longitudinal direction between the top 120 and bottom 130 of the antenna housing 100h. The at least one rail 180 can extend over the entire length L of the antenna housing 100h as shown in FIG. 5 or may extend over a sub-length.

In use or with the rear of the housing 100h facing upward, the at least one rail 180 can reside adjacent the back plate 160 and behind the reflector 170 in FIG. 5. The at least one rail 180 can provide structural support, increased structural rigidity and/or structural reinforcement to the antenna housing 100h for facilitating proper positional tolerances of (e.g., blind mate) connectors and/or for accommodating the weight of the externally accessible active antenna module 110.

Referring to FIG. 7, the at least one rail 180 can have a geometrically shaped configuration that structurally and sealably couples to free end portions 101e, 103e of the side walls 101, 103 along the recessed segment 108 of the antenna housing 100h. The at least one rail 180 may also be mounted to the back plate 160.

The reflector 170 of the passive antenna assembly 190 can comprise laterally spaced apart mounting members 172. The mounting members 172 can be U-shaped members with a first leg portion $172l_1$ and a second leg portion $172l_2$ separated by a center portion 172c. This configuration may provide increased structural rigidity over a single leg configuration. The first leg portion $172l_1$ can be attached to the reflector 170 and the second leg portion $172l_2$ can be attached to the rail 180. The center portion 172c can extend perpendicular to the reflector 170.

The free ends 101e, 103e of the side walls 101, 103 can terminate into respective sets of laterally spaced apart fingers 101f, 103f of the radome 150. Each set of fingers 101f, 103f can sealably couple to a respective one the rails $180_1$, $180_2$.

The at least one rail 180 can comprise a rigid or semi-rigid substrate material such as metal and can also include a seal material such as an elastomeric and/or polymeric material for facilitating a suitable water-resistant seal with the radome 150. Sealant material can also or alternatively be provided with adapter plates and/or the active antenna module 110.

In some embodiments, the reflector 170 can be part of the main reflector 214 so that the reflector 170/214 extends substantially the entire length of the antenna 100, with the upper portion having the aperture 173. The at least one rail 180 can be a pair of rails $180_1$, $180_2$, one mounted on each side of the reflector 170/214 and together the reflector 170/214 and rails 180 (and the back plate 160 which may reside only at the top portion of the antenna 100) provide the structural integrity of the antenna 100. The internal components of the antenna 100 such as the antenna assembly 190 can be mounted directly or indirectly on the reflector 170/214. The radome 150 can be slid over all of these internal components and the three caps 120, 130, 165 can then be placed on the radome 150. Also, the antenna 100 can include internal U-shaped brackets (not shown) that extend rearwardly from the reflector 170/214 in the lower part of the antenna that provide additional support such as to help rigidize the reflector 170/214. Other brackets can be provided for mounting to a support structure such as a pole.

Referring to FIGS. 8A-8F, in some embodiments, the guide rails 180' can be configured to provide a direct contact interface to the active antenna module 110 and no back plate is required. First and second longitudinally spaced apart and laterally extending cross-members 169 can be coupled to the rails $180_1$, $180_2$ providing a window 188 over the cavity 155 provided by the side wall segments 101, 103 and front wall segment 102 of the housing 100h for receiving an inner facing portion of the active antenna module 110. The active antenna module 110 can be sealably coupled to the cross members 169 and the rails $180_1$, $180_2$.

Figure 8B:
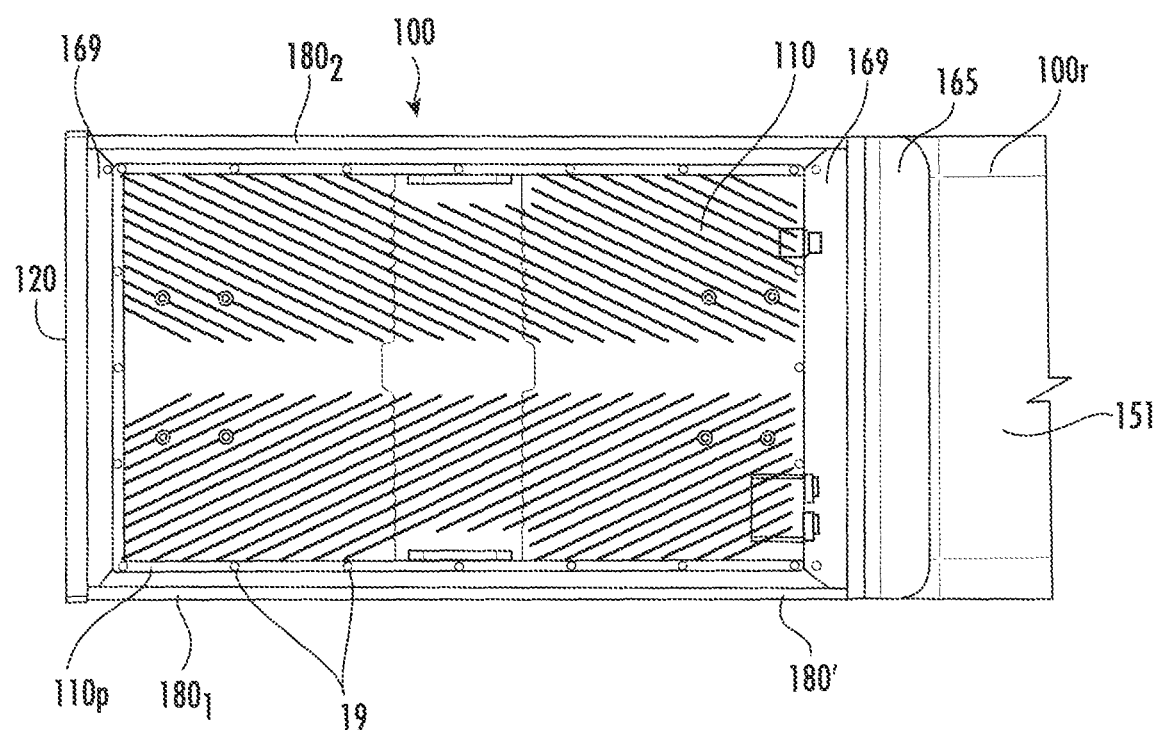
FIG. 8B is a partial rear view of the base station antenna shown in FIG. 8A.

Referring to FIGS. 8B, 8E, the cross-members 169 can include spaced apart apertures 166 and the rails $180_1$, $180_2$ can include spaced apart apertures 183 to receive fixation members 19, such as screws, pins, or rods that attach (a front facing outer perimeter portion 110p) the active antenna module 110.

Referring to FIG. 8A, the rails $180_1$, $180_2$ can each have a first planar surface 180p1 that (sealably) attaches to a respective cross-member 169, and a second planar surface 180p2 that resides in a different plane from the first planar surface and that (sealably) couples to the mating surface of the active antenna module 110. The first planar surface 180p1 can have a larger lateral extent than the second planar surface 180p2 can reside closer to the center of the housing 100h than the second planar surface 180p2.

Figure 8C:
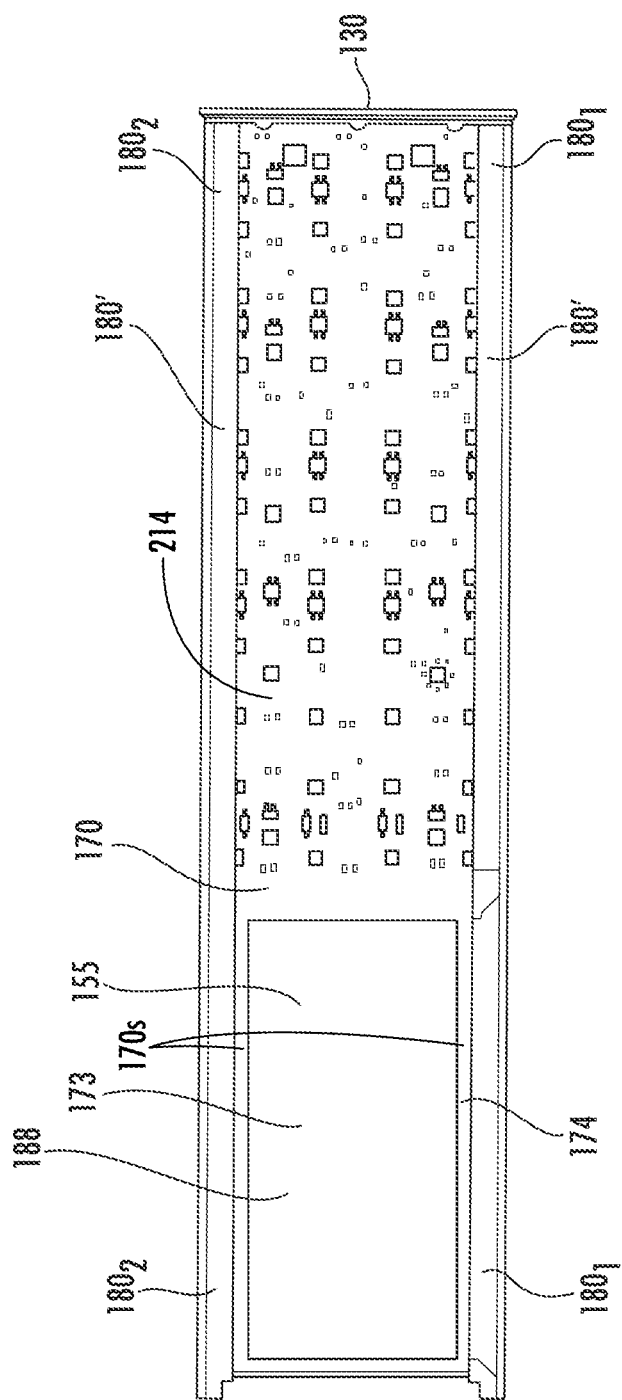
FIG. 8C is a rear view of a portion of a base station antenna showing the internal rails of FIG. 8A according to embodiments of the present invention.
Figure 8D:
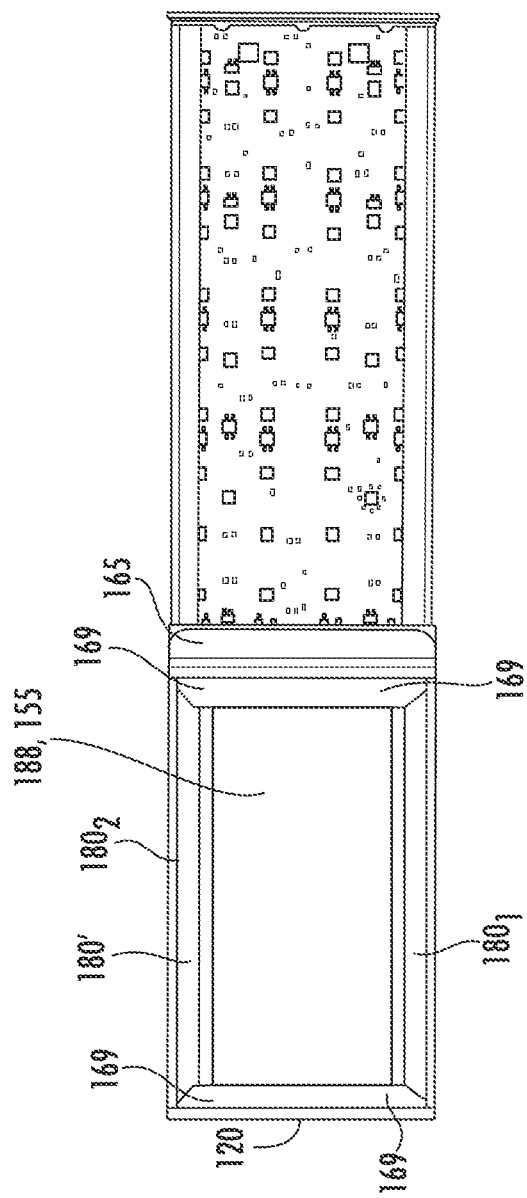
FIG. 8D is rear view of the portion of the base station antenna housing shown in FIG. 8C with additional components added that form a back plate assembly according to embodiments of the present invention.

The reflector 170 can be indirectly or directly coupled to the side wall segments 101, 103 shown as coupled via the rails 180' in FIGS. 8A, 8C.

The at least one rail 180 can be provided as an integral formed rail in one or both of the side walls 101, 103. The side wall segments 101, 103 comprise part of the radome 150 and can be formed of fiberglass, plastic or other appropriate materials.

In some embodiments, a sealant can be over molded to provide a seal material 180s (FIG. 8A) such as at planar segments 180p1, 180p2. The rails 180' can be coupled to or formed (e.g., extruded) as part of the side wall segments 101, 103.

FIGS. 9A-9D and 12B illustrate an example active antenna module 110 in greater detail. The active antenna module 110 includes radio circuitry and can be partially inserted through the rear of the housing 100r and/or back plate 160. As shown best in FIG. 12B, the active antenna module 110 can comprise an RRU (remote radio unit) unit 1120. The active antenna module 110 can also include a heat sink 115 and fins 115f. The active antenna module 110 can also include a filter and calibration printed circuit board assembly 1180, and an antenna assembly 1190 comprising a reflector 1172 and radiating elements 1195. The antenna assembly 1180 may also include phase shifters 1191, which may alternatively be part of the filter and calibration assembly 1180. The radiating elements 1195 can be provided as a massive MIMO array. The RRU unit 1120 is a radio unit that typically includes radio circuitry that converts base station digital transmission to analog RF signals and vice versa. One or more of the radio unit or RRU unit 1120, the antenna assembly 1190 or the filter and calibration assembly 1180 can be provided as separate sub-units that are attachable (stackable). The RRU unit 1120 and the antenna assembly 1190 can be provided as an integrated unit, optionally also including the calibration assembly 1180. Where configured as sub-units, different sub-units can be provided by OEMs or cellular service providers while still using a common base station antenna housing 100h and passive antenna assembly 190 thereof. The antenna assembly 1190 can couple to the filter and calibration board assembly 1180 via, for example, pogo connectors 111. Other connector configurations may be used for each of the connections, such as, for example 3-piece SMP connectors. The RRU unit 1120 can also couple to the filter and calibration board assembly 1180 via pogo connectors 111 thereby providing an all blind-mate connection assembly without requiring cable connections. Alignment of the cooperating components within a tight tolerance may be needed to provide suitable performance.

Figure 12A:
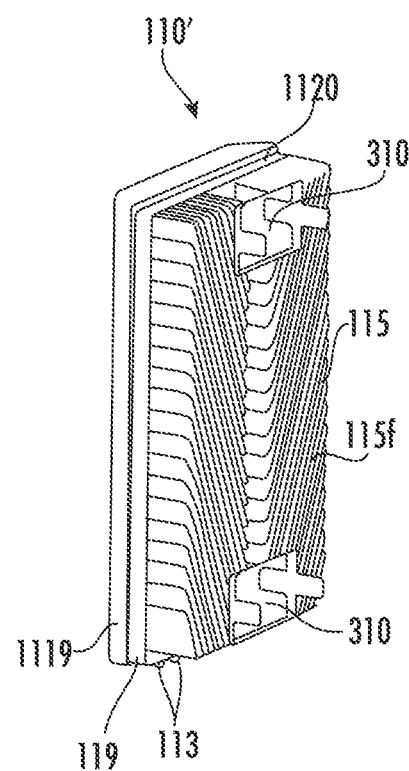
FIG. 12A is a rear, side perspective view of another embodiment of an active antenna module according to embodiments of the present invention.
Figure 12B:
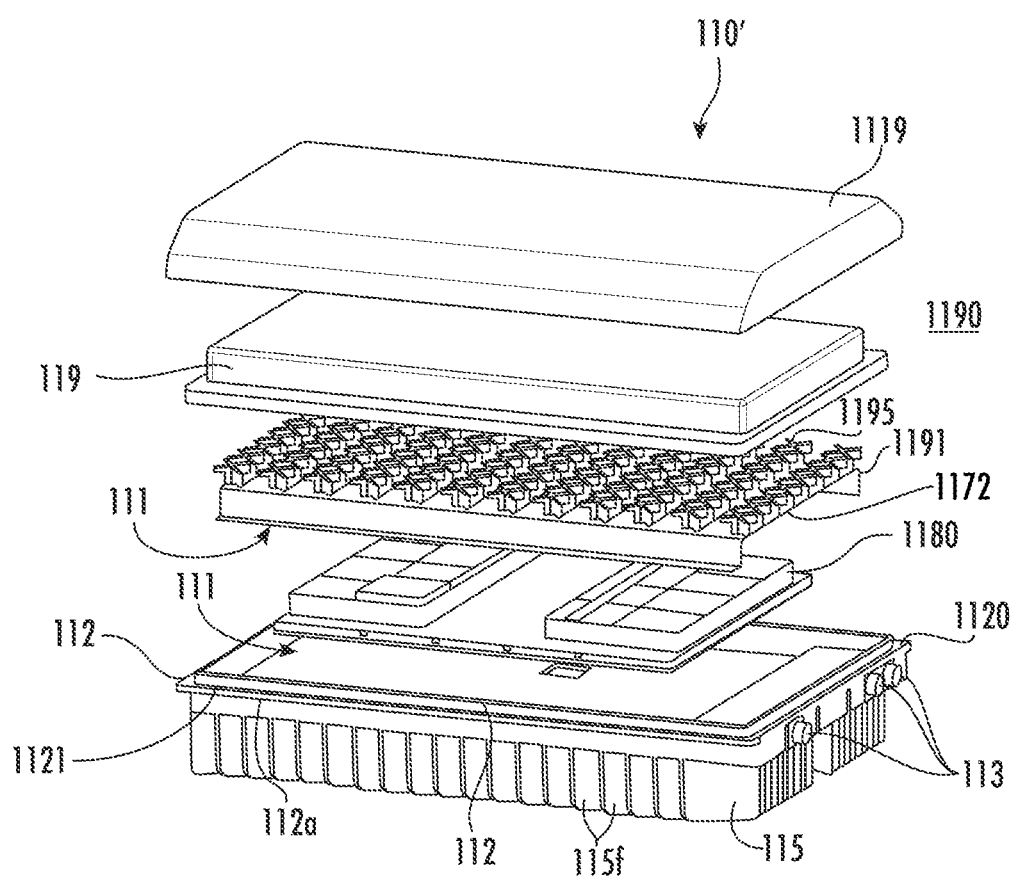
FIG. 12B is an exploded view of the active antenna module shown in FIG. 12A.

The antenna module 110 may include all of the components of the active antenna module 110' shown in FIG. 12B except for the illustrated second radome 1119. An antenna module 110' further includes such a second radome 1119. The second radome 1119 covers the first radome 119 for aesthetic purposes but is otherwise the same as the active antenna module 110 discussed above. The second radome 1119 can be used as an aesthetic cover when the active antenna module 110 is provided for shipment as a standalone product. This is due to the first radome 119 having a relatively unusual shape to fit into the window 188 and/or 173. The RRU unit 1120 can be wider than the antenna element array 1191, 1195 so the radome 119 is shaped to allow the radiating elements 1195 (FIGS. 9A, 12B) but not the radio 1120, or at least not the entire radio/radio unit 1120, to fit inside the housing 100*h*. The radiating elements 1195 (FIG. 12B) can extend through a back plate 160, a window 188 formed by the rails 180' and/or through the passive/primary reflector 214. In some embodiments, before/when the active antenna module 110 is integrated into the passive antenna housing 100*h*, the second radome or cover 1119 can be removed to allow the antenna module 110' to fit through the apertures/window 188, 173 in the antenna housing 100*h*. The first radome 119 remains intact on the active antenna module 110 as it can be configured to provide both the radome 119 of the active antenna module 110 and provide part of the (sealable) coupling to the housing 100*h*.

The RRU unit 1120 can have a rectangular body with an outer perimeter comprising a planar ledge 1121 that can define the seal interface 112*i* and a plurality of spaced apart apertures 112*a* that can receive fixation members 117 (FIG. 3B) to attach to the housing 110*h*. In particular, screws or other fixation members 117 can be positioned about the perimeter of the chamber 150 and extend through apertures 112*a* in a perimeter 110*p* of the active antenna module 110, 110' to connect the active antenna module 110, 110' to the guide rails 180 and/or back plate 160. Another connection configuration can use an adapter plate that can connect the active antenna module 110 to the rails 180, 180' in the antenna housing 100*h* (not shown).

The active antenna module 110, 110' can also include externally accessible connectors 113 on a bottom end thereof as shown in FIGS. 10A, and 12A for example. The externally accessible connectors 113 are externally accessible in-use and when the active antenna module 110 is coupled to the base station antenna housing 100*h*. The externally accessible connectors 113 are typically for connecting power and fiber optic cables to the active antenna module 110. In some embodiments, one or more connectors 113 can be conjured to couple to an AISG cable to control (passive) RET. Connectors can be provided at other locations such as sides or both ends and sides.

Figure 9A:
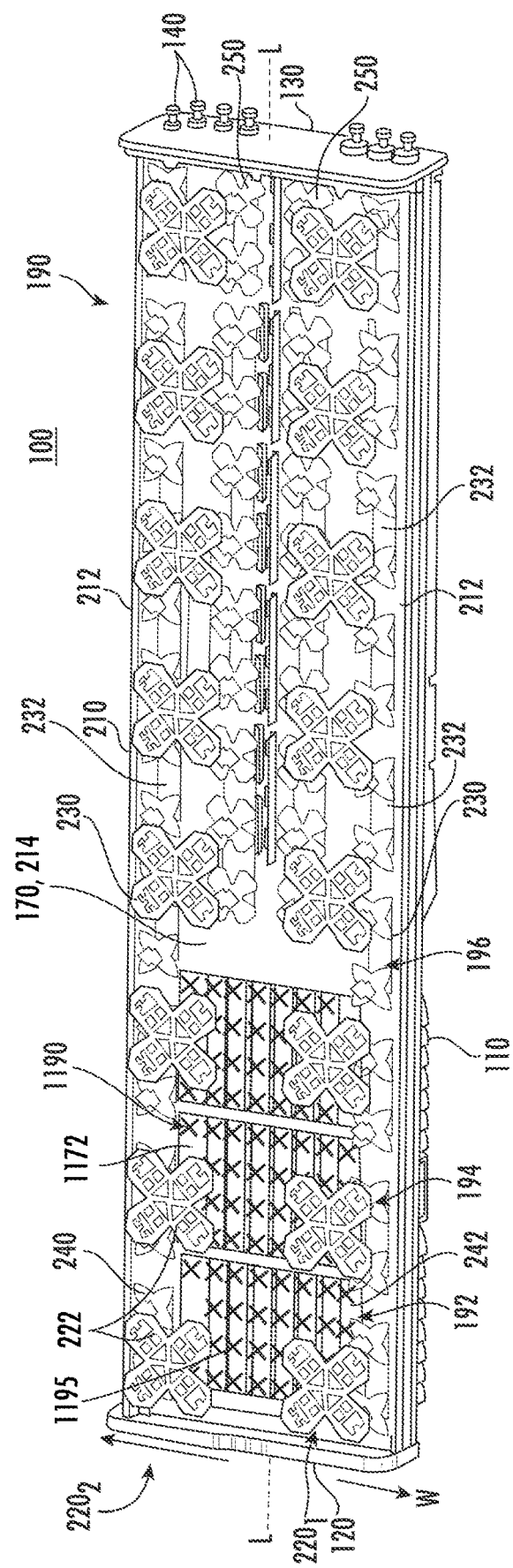
FIG. 9A is an example front, side perspective view of a base station antenna, shown with the radome omitted, according to embodiments of the present invention.
Figure 9B:
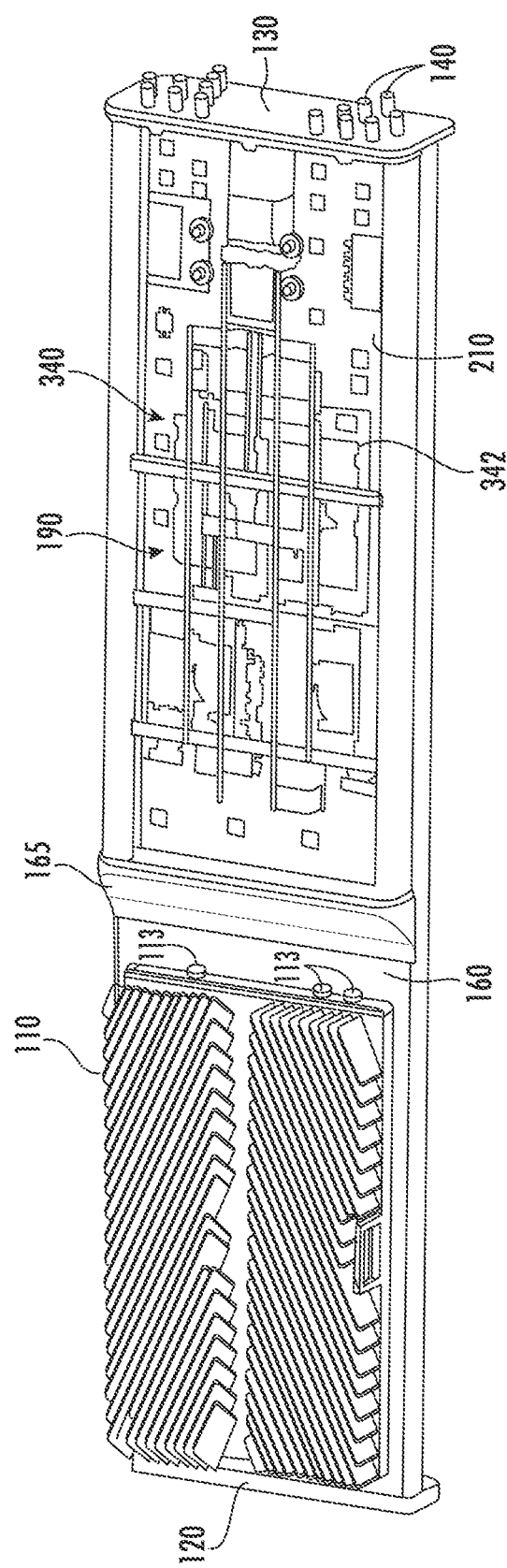
FIG. 9B is an example rear, side perspective view of a base station antenna, shown with the radome omitted, according to embodiments of the present invention.

FIGS. 9A and 9B are a front view and a rear view, respectively, of the passive antenna assembly 190 of base station antenna 100 (with the active antenna module 110 mounted thereon). As shown, the antenna assembly 190 includes a main backplane 210 that has side walls 212 and a main reflector 214. The backplane 210 may serve as both a structural component for the antenna assembly 190 and as a ground plane and reflector for the radiating elements mounted thereon. The backplane 210 may also include brackets or other support structures (not shown) that extend between the side walls 212 along the rear of the backplane 210. Various mechanical and electronic components of the antenna 100 are mounted between the side walls 212 and the back side of the main reflector 214, such as phase shifters, remote electronic tilt units, mechanical linkages, controllers, diplexers, and the like as is well known in the art.

The main backplane 210 defines a main module of the passive antenna assembly 190. The main reflector 214 may comprise a generally flat metallic surface that extends in the longitudinal direction L of the antenna 100. The main reflector 214 can be the reflector 170 discussed above or can be an extension of, coupled to or different from the reflector 170 discussed above. If the main reflector 214 is a separate reflector it is coupled to the reflector 170 to provide a common electrical ground.

Some of the radiating elements (discussed below) of the antenna 100 may be mounted to extend forwardly from the main reflector 214, and, if dipole-based radiating elements are used, the dipole radiators of these radiating elements may be mounted approximately ¼ of a wavelength of the operating frequency for each radiating element forwardly of the main reflector 214. The main reflector 214 may serve as a reflector and as a ground plane for the radiating elements of the antenna 100 that are mounted thereon.

Referring to FIG. 9A, the base station antenna 100 can include one or more arrays 220 of low-band radiating elements 222, one or more arrays 230 of first mid-band radiating elements 232, one or more arrays 240 of second mid-band radiating elements 242 and one or more arrays 250 of high-band radiating elements 1195. The radiating elements 222, 232, 242, 1195 may each be dual-polarized radiating elements. Further details of radiating elements can be found in co-pending WO2019/236203 and WO2020/072880, the contents of which are hereby incorporated by reference as if recited in full herein.

The low-band radiating elements 222 are mounted to extend forwardly from the main or primary reflector 214 (and/or the reflector 170) and can be mounted in two columns to form two linear arrays 220 of low-band radiating elements 222. Each low-band linear array 220 may extend along substantially the full length of the antenna 100 in some embodiments.

The low-band radiating elements 222 may be configured to transmit and receive signals in a first frequency band. In some embodiments, the first frequency band may comprise the 617-960 MHz frequency range or a portion thereof (e.g., the 617-896 MHz frequency band, the 696-960 MHz frequency band, etc.). The low-band linear arrays 220 may or may not be used to transmit and receive signals in the same portion of the first frequency band. For example, in one embodiment, the low-band radiating elements 222 in a first linear array 220 may be used to transmit and receive signals in the 700 MHz frequency band and the low-band radiating elements 222 in a second linear array 220 may be used to transmit and receive signals in the 800 MHz frequency band. In other embodiments, the low-band radiating elements 222 in both the first and second linear arrays 220-1, 220-2 may be used to transmit and receive signals in the 700 MHz (or 800 MHz) frequency band.

The first mid-band radiating elements 232 may likewise be mounted to extend upwardly from the main reflector 214 and may be mounted in columns to form linear arrays 230 of first mid-band radiating elements 232. The linear arrays 230 of mid-band radiating elements 232 may extend along the respective side edges of the main reflector 214. The first mid-band radiating elements 232 may be configured to transmit and receive signals in a second frequency band. In some embodiments, the second frequency band may comprise the 1427-2690 MHz frequency range or a portion thereof (e.g., the 1710-2200 MHz frequency band, the 2300-2690 MHz frequency band, etc.). In the depicted embodiment, the first mid-band radiating elements 232 are configured to transmit and receive signals in the lower portion of the second frequency band (e.g., some or all of the 1427-2200 MHz frequency band). The linear arrays 230 of first mid-band radiating elements 232 may be configured to transmit and receive signals in the same portion of the second frequency band or in different portions of the second frequency band.

The second mid-band radiating elements 242 can be mounted in columns in the upper portion of antenna 100 to form linear arrays 240 of second mid-band radiating elements 242. The second mid-band radiating elements 242 may be configured to transmit and receive signals in the second frequency band. In the depicted embodiment, the second mid-band radiating elements 242 are configured to transmit and receive signals in an upper portion of the second frequency band (e.g., some, or all, of the 2300-2700 MHz frequency band). In the depicted embodiment, the second mid-band radiating elements 242 may have a different design than the first mid-band radiating elements 232.

The high-band radiating elements 1195 can be mounted in columns in the upper medial or center portion of antenna 100 to form (e.g., four) linear arrays 250 of high-band radiating elements. The high-band radiating elements 1195 may be configured to transmit and receive signals in a third frequency band. In some embodiments, the third frequency band may comprise the 3300-4200 MHz frequency range or a portion thereof.

In the depicted embodiment, the arrays 220 of low-band radiating elements 222, the arrays 230 of first mid-band radiating elements 232, and the arrays 240 of second mid-band radiating elements 242 are all part of the passive antenna assembly 190, while the arrays 250 of high-band radiating elements 1195 are part of the active antenna module 110. It will be appreciated that the types of arrays included in the passive antenna assembly 190, and/or the active antenna module 110 may be varied in other embodiments.

It will also be appreciated that the number of linear arrays of low-band, mid-band and high-band radiating elements may be varied from what is shown in the figures. For example, the number of linear arrays of each type of radiating elements may be varied from what is shown, some types of linear arrays may be omitted and/or other types of arrays may be added, the number of radiating elements per array may be varied from what is shown, and/or the arrays may be arranged differently. As one specific example, two linear arrays 240 of second mid-band radiating elements 242 may be replaced with four linear arrays of ultra-high-band radiating elements that transmit and receive signals in a 5 GHz frequency band.

The low-band and mid-band radiating elements 222, 232, 242 may each be mounted to extend forwardly of and/or from the main reflector 214.

Each array 220 of low-band radiating elements 222 may be used to form a pair of antenna beams, namely an antenna beam for each of the two polarizations at which the dual-polarized radiating elements are designed to transmit and receive RF signals. Likewise, each array 232 of first mid-band radiating elements 232, and each array 242 of second mid-band radiating elements 242 may be configured to form a pair of antenna beams, namely an antenna beam for each of the two polarizations at which the dual-polarized radiating elements are designed to transmit and receive RF signals. Each linear array 220, 230, 240 may be configured to provide service to a sector of a base station. For example, each linear array 220, 230, 240 may be configured to provide coverage to approximately 120° in the azimuth plane so that the base station antenna 100 may act as a sector antenna for a three-sector base station. Of course, it will be appreciated that the linear arrays may be configured to provide coverage over different azimuth beamwidths. While all of the radiating elements 222, 232, 242, 1195 are dual-polarized radiating elements in the depicted embodiments, it will be appreciated that in other embodiments some or all of the dual-polarized radiating elements may be replaced with single-polarized radiating elements. It will also be appreciated that while the radiating elements are illustrated as dipole radiating elements in the depicted embodiment, other types of radiating elements such as, for example, patch radiating elements may be used in other embodiments.

Some or all of the radiating elements 222, 232, 242, 1195 may be mounted on feed boards that couple RF signals to and from the individual radiating elements 222, 232, 242, 1195, with one or more radiating elements 222, 232, 242, 1195 mounted on each feed board. Cables (not shown) and/or connectors may be used to connect each feed board to other components of the antenna 100 such as diplexers, phase shifters, calibration boards or the like.

FIG. 9B is a rear or back view of the main backplane 210. RF connectors or "ports" 140 are mounted in the bottom end cap 130 that are used to couple RF signals from external remote radio units (not shown) to the arrays 220, 230, 240 of the passive antenna assembly 190. Two RF ports can be provided for each array 220, 230, 240 namely a first RF port 140 that couples first polarization RF signals between the remote radio unit and the array 220, 230, 240 and a second RF port 140 that couples second polarization RF signals between the remote radio unit and the array 220, 230, 240. As the radiating elements 222, 232, 242 can be slant cross-dipole radiating elements, the first and second polarizations may be a −45° polarization and a +45° polarization.

A phase shifter 342 may be connected to a respective one of the RF ports 140. The phase shifters 342 may be implemented as, for example, wiper arc phase shifters such as the phase shifters disclosed in U.S. Pat. No. 7,907,096 to Timofeev, the disclosure of which is hereby incorporated herein in its entirety. A mechanical linkage 344 may be coupled to a RET actuator (not shown). The RET actuator may apply a force to the mechanical linkage 344 which in turn adjusts a moveable element on the phase shifter in order to electronically adjust the downtilt angle for one or more of the low-band or mid-band linear arrays 220, 230, 240.

It should be noted that a multi-connector RF port (also referred to as a "cluster" connector) can be used as opposed to individual RF ports 140. Suitable cluster connectors are disclosed in U.S. patent application Ser. No. 16/375,530, filed Apr. 4, 2019, the entire content of which is incorporated herein by reference.

Figure 9C:
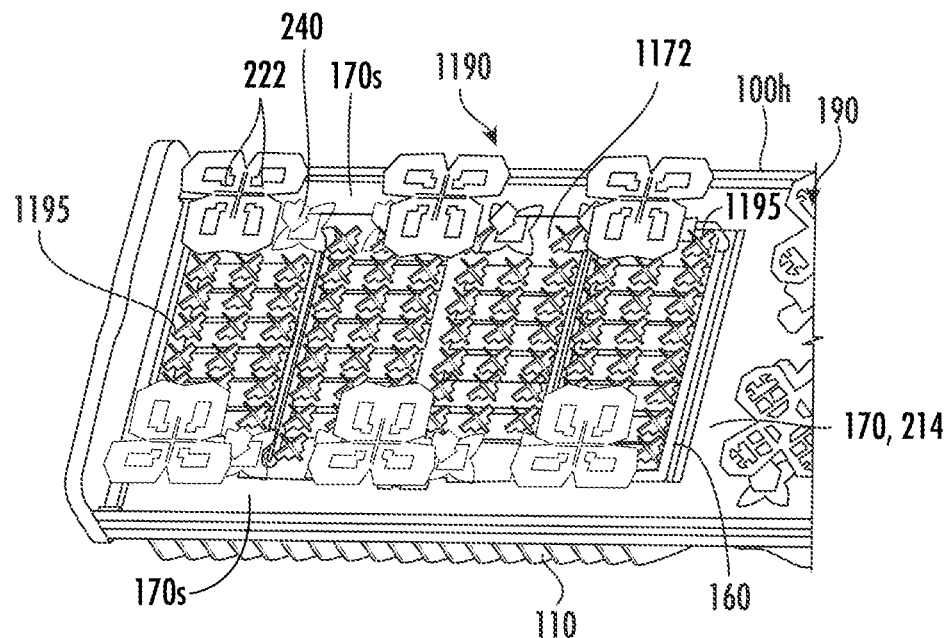
FIG. 9C is a partial side, front perspective view of an example front of an active antenna module shown inserted into the base station antenna housing according to embodiments of the present invention.

FIG. 9C illustrates the high-band radiating elements 1195 of the active antenna assembly 1190. Note that the low-band radiating elements 222 may (partially) extend in front of the outer columns of high-band radiating elements 1195. The low-band radiating elements 222 may have slanted feed stalks in some embodiments that allow the low-band radiating elements 222 to be mounted on the primary reflector 214 while still extending in front of the high-band array 250/1195.

Figure 9D:
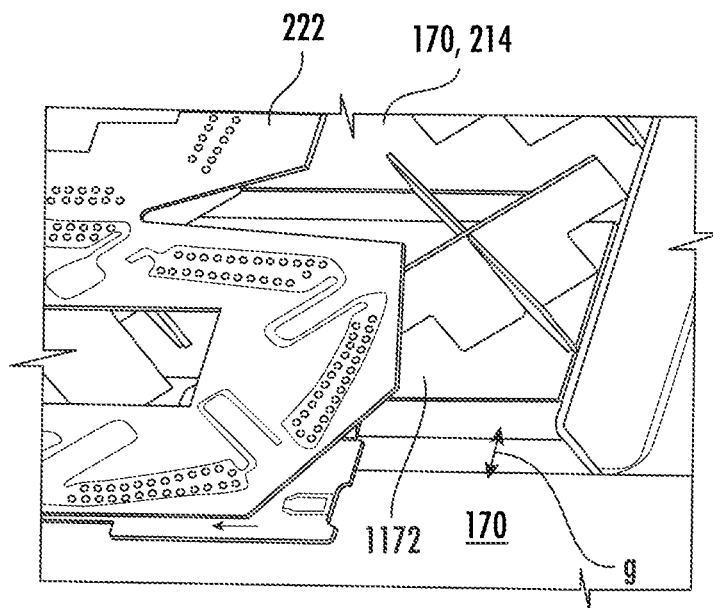
FIG. 9D is an enlarged partial front perspective view of the active antenna module in the base station antenna housing according to embodiments of the present invention.

Referring to FIGS. 9C and 9D, the active antenna assembly 1190 can include an active antenna reflector 1172 that serves as the reflector for the high-band radiating elements 1190.

The reflector 170 and/or main reflector 214 of the passive antenna assembly 190 in the base station antenna 100 typically comprises a sheet of metal and is maintained at electrical ground. It acts to redirect RF radiation that is emitted backwardly by the radiating elements in the forward direction, and also serves as a ground reference for the radiating elements. When the active antenna is configured as a separate active antenna module 110, the reflector 1172 of the active antenna module 110 can be electrically coupled, upon assembly to the base station antenna housing 100h, to the reflector 170 of the passive antenna assembly 190 so that the reflector 170 of the passive antenna assembly 190 and the reflector 1172 of the active antenna module 110 are at a common electrical ground reference.

The active antenna reflector 1172 can be spaced apart from the reflector 170 (and/or main reflector 214) of the passive antenna assembly 190 (in a front to back direction) about a small gap space "g" that is typically in a range of about 3 mm-about 10 mm, in some embodiments.

Embodiments of the present invention configure the two reflectors 1172, 170 as cooperating reflectors of the base station antenna 100. The two reflectors 1172, 170 can be in close proximity to each other, once the active antenna module 110 is assembled into the base station antenna housing 100h, allowing the two reflectors 170, 1172 to electrically couple to achieve the common ground reference. The active antenna module 110 provides the reflector 1172 as a removable reflector from the base station antenna housing 100h. The reflector 1172 of the active antenna module 110 can be configured to capacitively couple with a fixed reflector 170 in the base station antenna housing 100h associated with the passive antenna assembly 190.

The reflector 1172 of the active antenna module 110 can also serve in part as a reflector for some radiating elements (e.g., low-band radiating elements 222 at an upper portion of the base station housing adjacent the active antenna module 110) of the passive antenna assembly 190. Thus, the reflector 1172 of the active antenna module 110 can be part of the circuit of the passive antenna assembly 190.

The passive reflector 170 (214) and the active reflector 1172 can be capacitively coupled together, and thus the metal sheets forming these reflectors can be physically spaced apart/separated. Collectively, these features can allow a) field replacement of the active antenna module 110 and b) an interleaving of active/passive elements without increasing the overall width of the base station antenna housing 100h.

Referring to FIG. 9E, the outer perimeter of the reflector 1172 can be configured to couple with the reflector 170 (214) to be at a common ground reference. The coupling between the passive reflector 170 and reflector 1172 of the active antenna module 110 can be important to the performance of the passive antenna. In some embodiments, portions of the two reflectors 170 and 1172 can overlap, with a very small gap, front to back, in order to facilitate strong capacitive coupling between the two reflectors so that the two reflectors will be at a common ground reference.

The base station antenna 100 can have at least one radome 119 interposed between the two coupled reflectors 170, 1172.

Referring to FIG. 9E, the base station antenna 100 can be configured with a first radome 119 and a second radome 1129, spaced apart in a front to back direction, and positioned between reflectors 170, 1172. The first radome 119 can be part of the active antenna module 110 and be configured to seal the active antenna module 110. The second radome 1129 can be configured to be a skin or middle/intermediate radome 1129 and can be configured to seal the base station antenna housing 100h comprising the passive antenna assembly 190 at the receiving chamber 155 (FIG. 3A). The second radome 1129 defines a seal covering over the open receiving chamber 155 prior to coupling to the active antenna module 110. The second radome 1129 can have a rigid, semi-rigid (self-supporting shape) or flexible configuration. The second or intermediate radome 1129 resides between the first radome 119 and the front of the housing 100f/external radome 150. When the active antenna module 110 is assembled to the housing 100h, both the first and second radomes 119, 1129 can be internal to the housing 100h.

In some embodiments, a foil and/or a metallized surface coating or the like can be provided on or between one or more coupling surfaces of reflectors 1172, 170 and/or radomes 1129 and 119 to improve capacitive coupling, where desired or used. The radome 119 of the active antenna module 110 can be a patterned radome with a series of laterally spaced apart peak and valley segments to reduce coupling of adjacent rows of antenna elements and/or otherwise facilitate performance. Further description of patterned radomes can be found in co-pending U.S. Provisional Patent Application Ser. No. 63/083,379, the contents of which are hereby incorporated by reference as if recited in full herein.

Figure 9F:
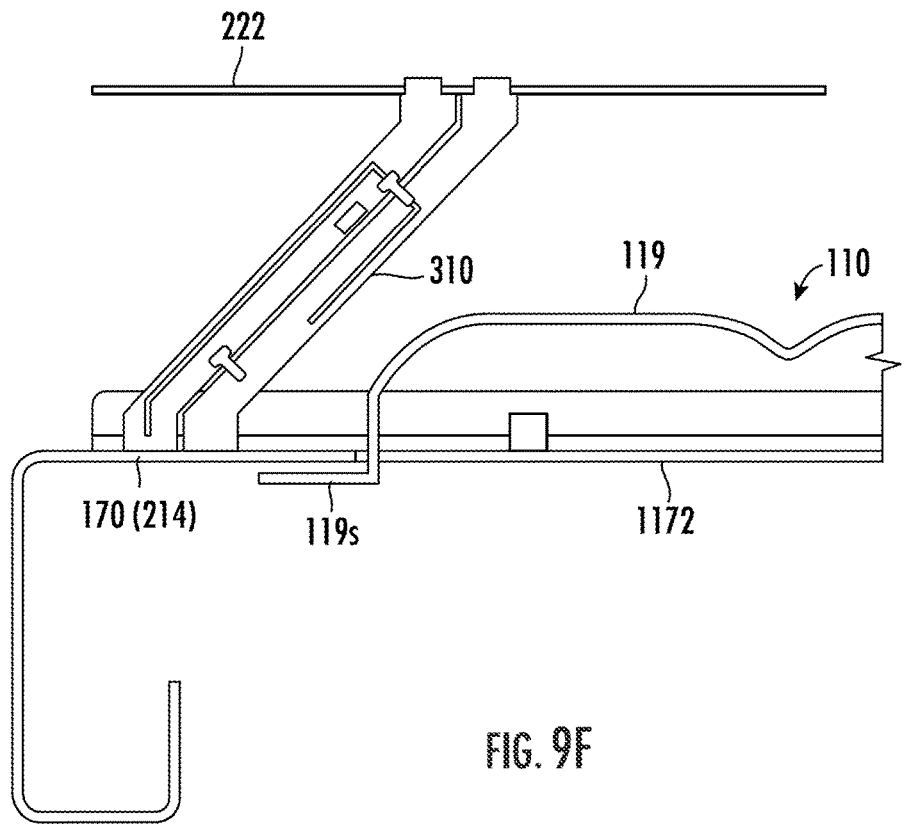
FIG. 9F is an enlarged simplified, front partial section view of one side of a base station antenna with first and second reflectors separated by a radome according to embodiments of the present invention.

FIG. 9F illustrates an example embodiment of a radiating element 222 (which may optionally be a low band element) having an angled feed stalk 310. The radiating element 222 is positioned to extend over both the first and second reflectors 170(214) and 1172 according to embodiments of the present invention. The first and second reflectors 170 (214) can be parallel, shown as co-planar. A lip or other shaped outer perimeter side segment 119s of the radome 119 can extend laterally and longitudinally under or over the side segment 170s of the first reflector 170(214).

Figure 9G:
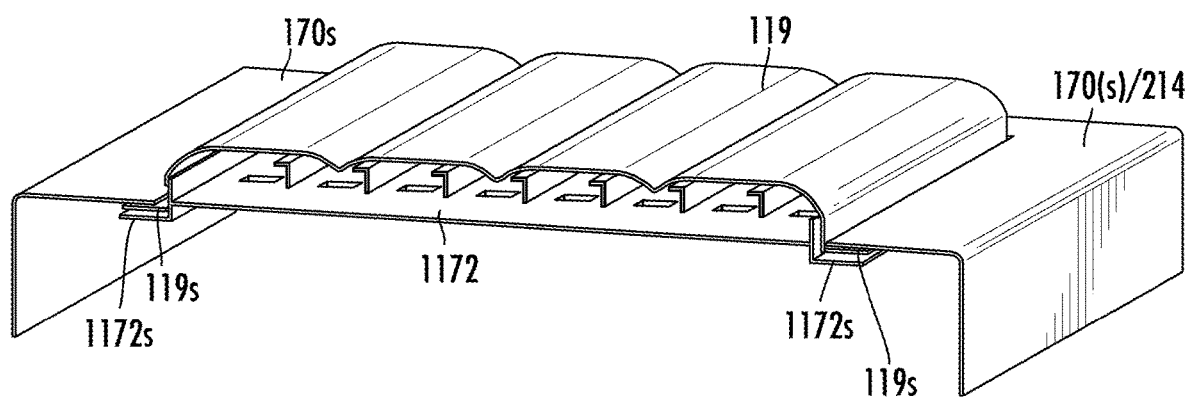
FIG. 9G is an enlarged simplified, side perspective partial section view of a base station antenna according to embodiments of the present invention.

FIG. 9G illustrates that the second reflector 1172 can have a laterally extending side segment 1172s. The side segment 119s of the radome 119 can extend between the side segment 1172s of the second reflector 1172 and the adjacent segment of the first reflector 170s. The first and second reflectors 170(214) and 1172 can be capacitively coupled via the radome 119. The radome 119 can define a dielectric or be configured to provide an air gap space or both to facilitate or provide the capacitive coupling.

Figure 9H:
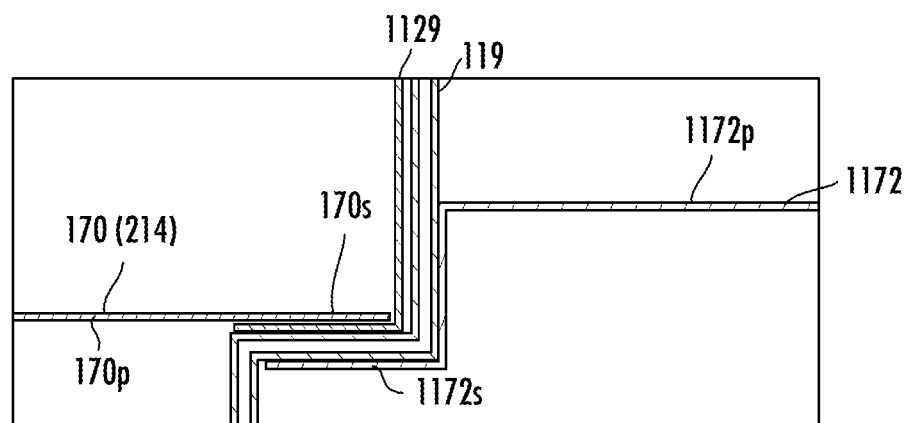
FIGS. 9H-9O are greatly enlarged views of the interface of two reflectors such as shown in one or more of FIG. 9E, 9F or 9G illustrating coupling interfaces according to embodiments of the present invention.
Figure 9I:
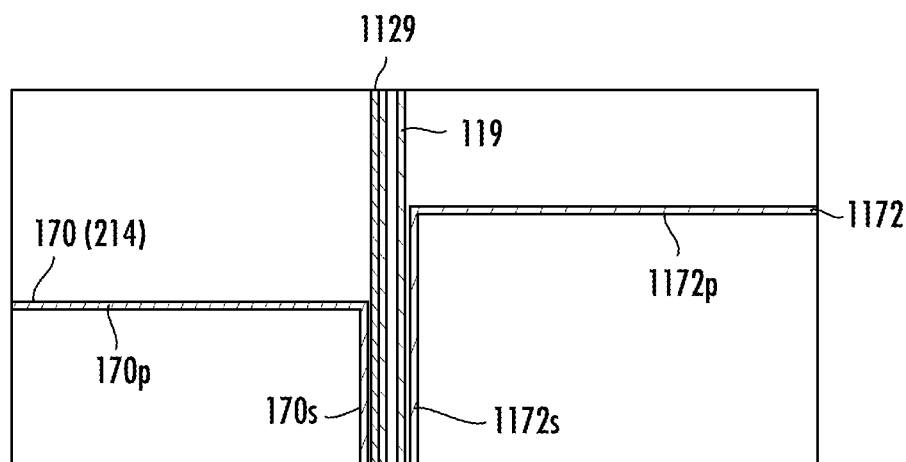
Figure 9J:
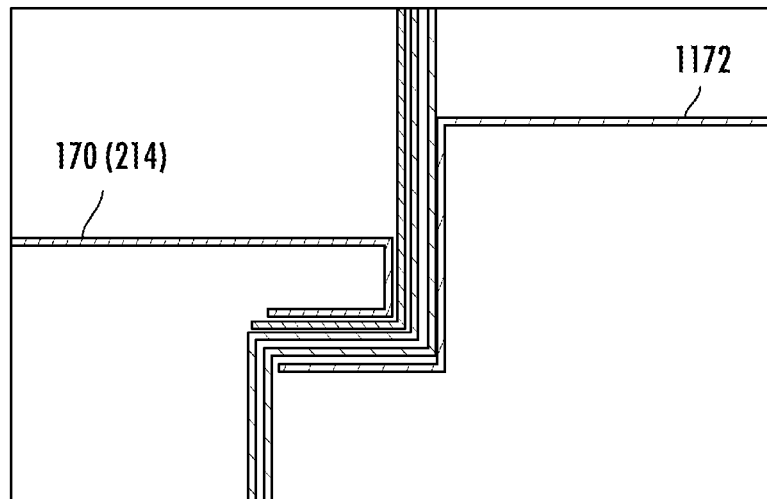
Figure 9K:
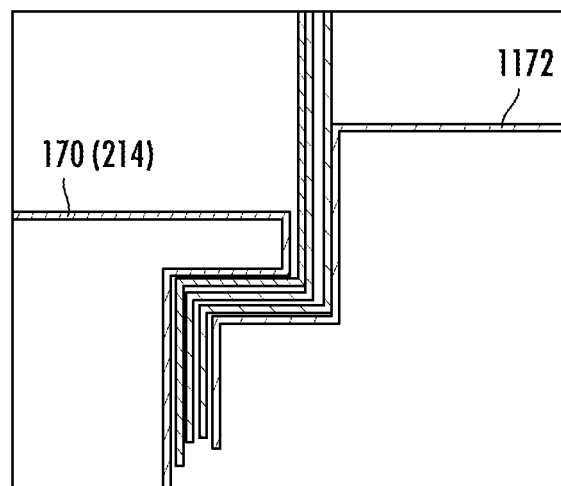
Figure 9L:
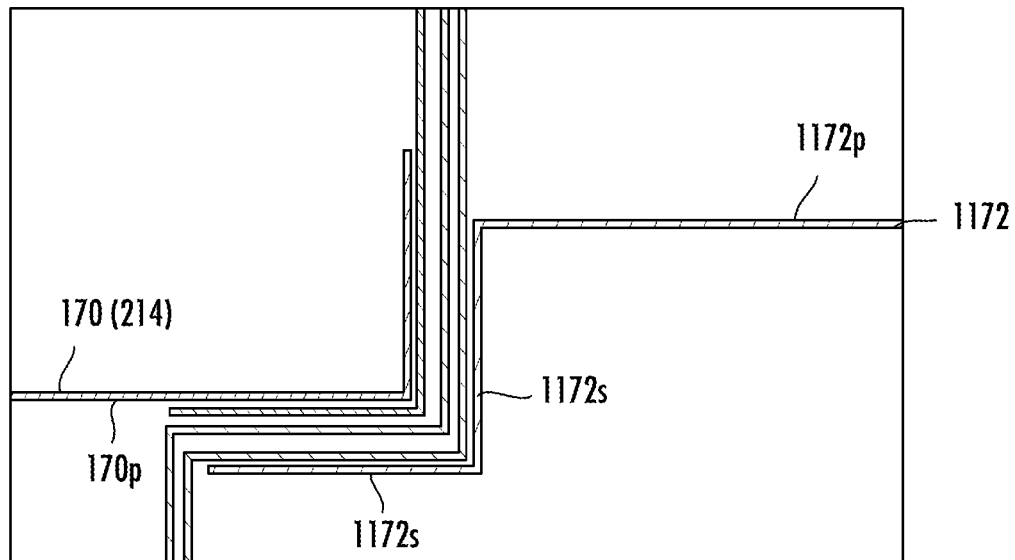

FIGS. 9H and 9I are greatly enlarged section views of example coupling surfaces of a first reflector and second reflector interfaces of the device shown in FIG. 9E, 9F or 9G. FIG. 9H illustrates a horizontal coupling configuration (in the orientation shown) between the horizontal surface of the reflector 170 and the reflector 1172 of the active antenna module 110. FIG. 9I illustrates a vertical coupling configuration (in the orientation shown) between the two reflectors 170 and 1172. Stated differently, the coupling configurations can be provided by one or both of surface area segments 1172s, 170s that are parallel to each other and may include one or more segments that are parallel to and/or perpendicular to a primary surface 1172p, 170p of the reflector 1172, 170, respectively.

FIGS. 9J-9O illustrate modifications to the coupling configurations that increase the surface area of the coupling segments 170s, 1172s of the reflector 1172 of the (removable) active antenna module 110 and the (fixed) reflector 170(214) of the base station antenna housing 100h.

Figure 9M:
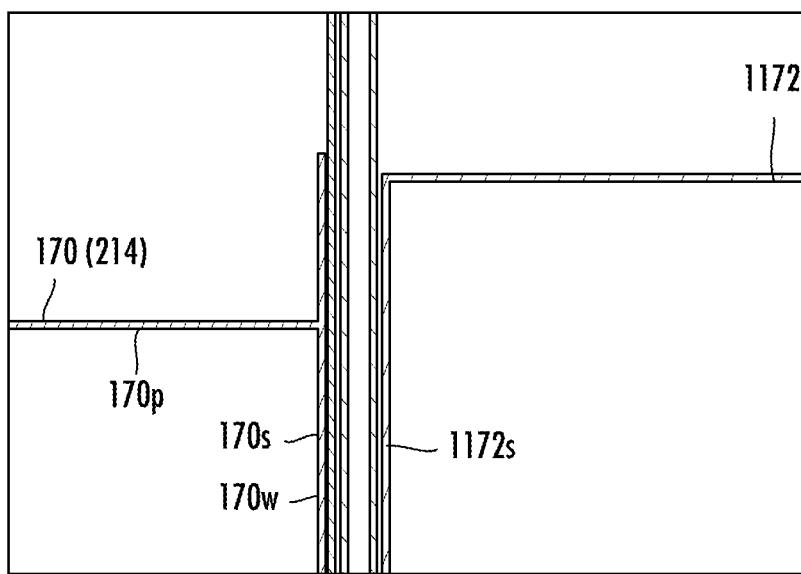
Figure 9N:
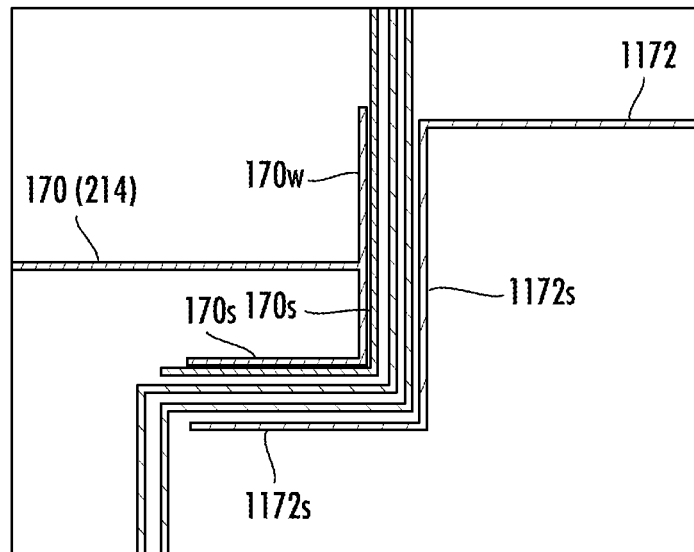
Figure 9O:
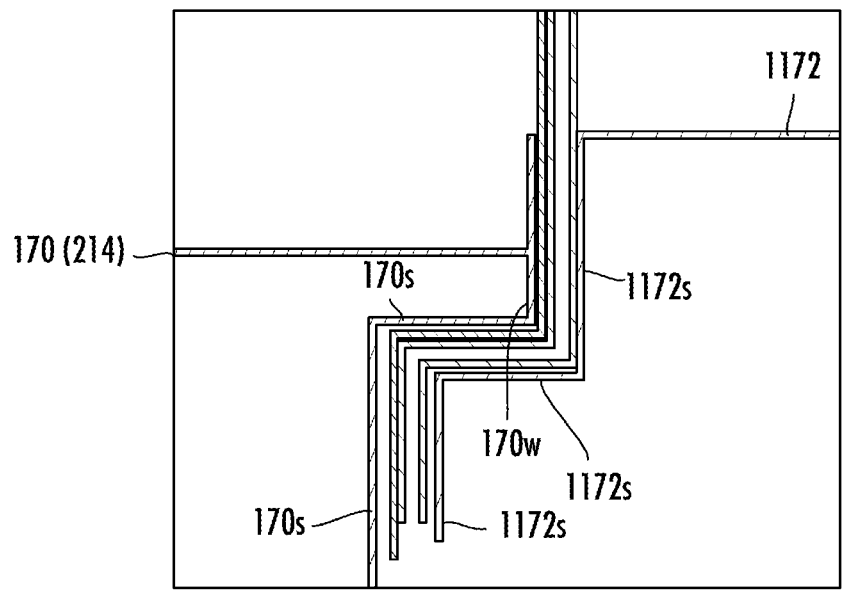

FIGS. 9M-9O illustrate that an inner side wall 170w can be provided by the passive reflector 170. The side wall 170w can be perpendicular to the primary surface 170p of the reflector 170.

The coupling of the reflectors 1172, 170 can allow the separate installation of the reflectors and can be configured to use any capacitive coupling and may include a plate capacitor type configuration.

Referring to FIGS. 10A and 10B, the active antenna module 110 can be installed by aligning the active antenna module 110 with the recessed segment 108 over the chamber 155 and inserting the active antenna module 110 toward the front 100f of the housing 100h so that the active antenna module 110 seals to the antenna housing 100h at the recessed segment 108. The inserting may be done manually by pushing inward in a single step without requiring tools. Properly engaged, the inserting/pressing can also seal the active antenna module 110 to the housing 100h.

When installed as shown in FIG. 10B, the active antenna module 110 is externally accessible and has an outermost extent that is in a plane P1 that is different from a plane P2 of a primary outer surface 151p of the second segment 151 of the radome 150 (shown as the lower portion). In some embodiments the plane P1 is at a distance D1 from a primary surface of the front 100f of the housing 100h and P2 is at a distance D2 from the primary surface of the front 100f of the housing 100. D1-D2 can be in a range of about (−1) inch to about (+6) inches, such as about +0.25 inches, +0.5 inches, +1, +2, +3, +4, +5 or +6 inches. Thus, the active antenna module 110 can project a relatively small distance outward from the lower portion of the rear of the radome 150, be flush with (e.g., co-planar), or recessed with respect to, the plane P2 to thereby provide a compact configuration and/or to avoid an offset of center of gravity of the base station antenna housing 100h.

Figure 23A:
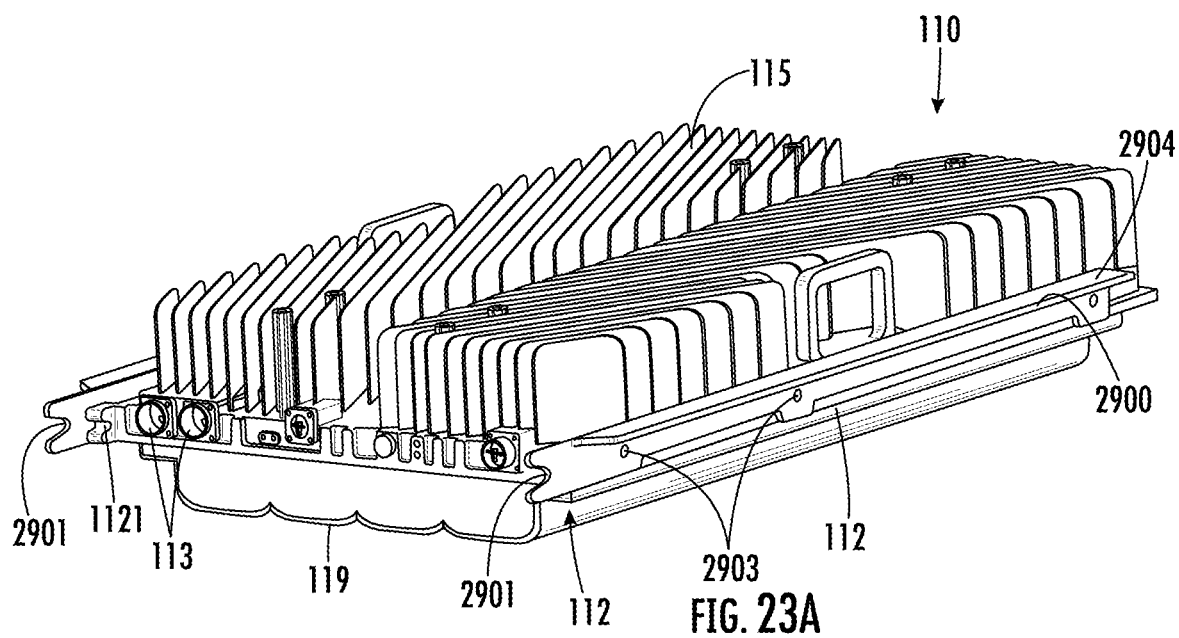
FIG. 23A is a side perspective view of an example active antenna module with an example adapter member(s) according to embodiments of the present invention.
Figure 23B:
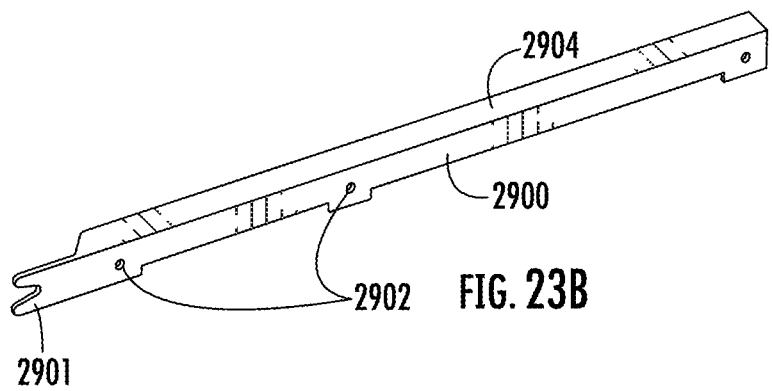
FIG. 23B is an enlarged side view of the adapter member shown in FIG. 23A.
Figure 23C:
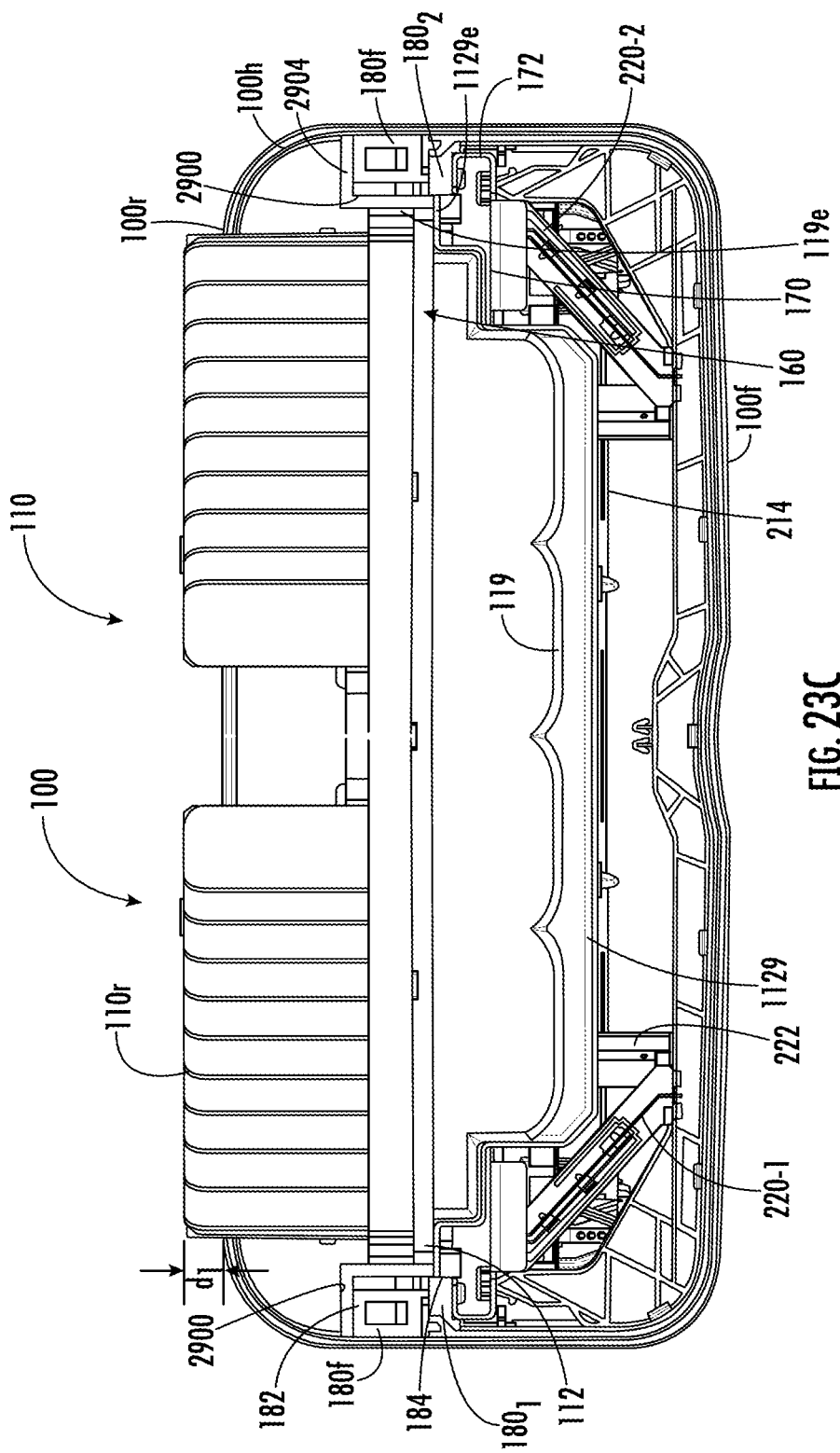
FIG. 23C is an enlarged lateral section view of a base station antenna comprising the active antenna unit shown in FIG. 23A according to embodiments of the present invention.
Figure 25A:
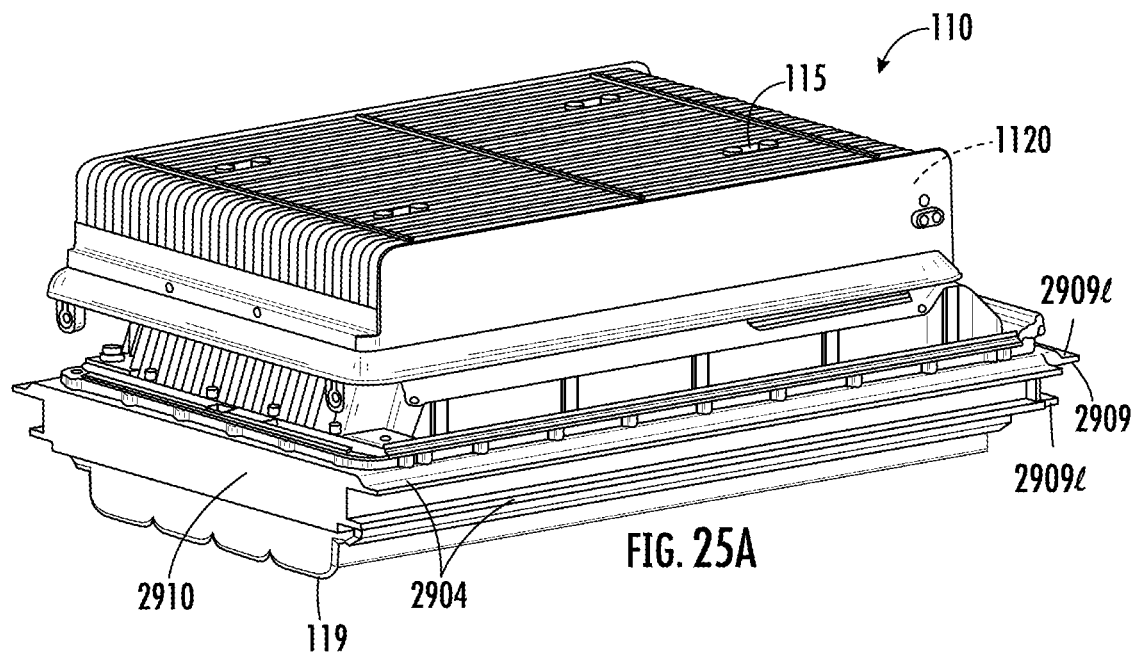
FIG. 25A is a side perspective view of an example active antenna module with an example adapter member according to embodiments of the present invention.
Figure 25B:
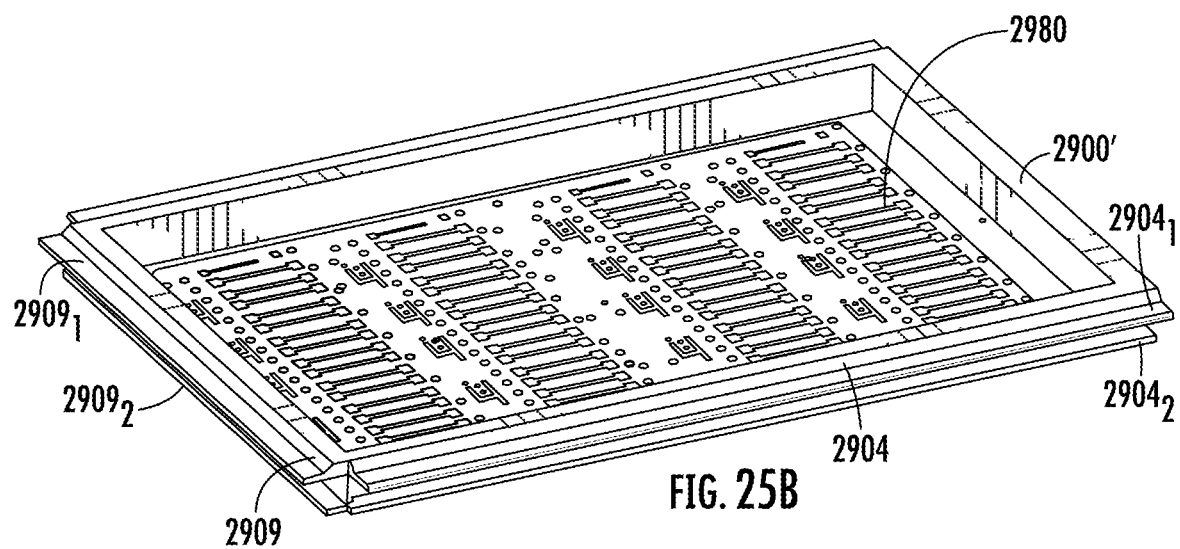
FIG. 25B is an enlarged side view of the adapter member (with calibration circuit board) shown in FIG. 25A.
Figure 25C:
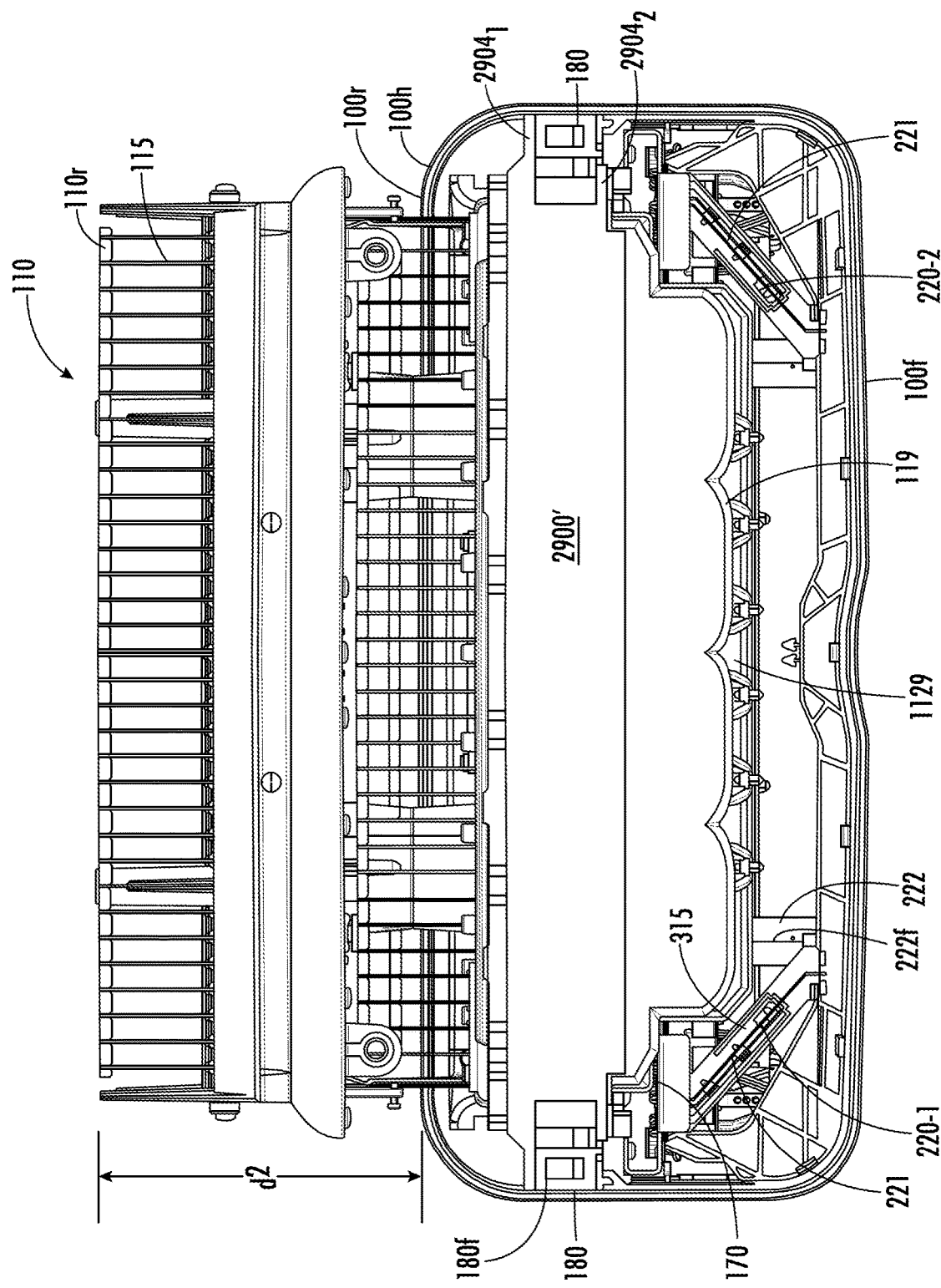
FIG. 25C is an enlarged lateral section view of a base station antenna comprising the active antenna unit shown in FIG. 25A according to embodiments of the present invention.

FIG. 23C shows the rear 110r of the active antenna module 110 at a first distance D1 and FIG. 25C shows the rear 110r of the active antenna module 110 at a greater second distance D2 from the rear surface 100r of the housing 100h, both coupled to internal rails 180 in the housing 100h via an adapter member(s) 2900, 2900' that is/are attached to the active antenna module 110. That is, different configurations of the active antenna module 110 with radio circuitry 1120 can mount different distances from the rear 100r of the antenna housing 100 making the product narrower or thicker at that location. The adapter member 2900, 2900' can be configured to position the radome 119 at substantially the same location, such as within about (+/−) 1-10 mm, in the housing 100h facing the external radome 150 and/or front of the housing 100f.

The plane P1 can be recessed, flush with or project outward from the rear surface 120r of the top 120 of the antenna housing 100h, optionally the same distance or a greater distance as the outer primary surface 151p of the second segment 151 of the radome 150, e.g., D1-D2.

FIGS. 11A-11D illustrate an example sequence of actions that can be used to install an active antenna module 110 to a base station antenna 100 while the base station antenna 100 is held by a mounting structure 300. The base station antenna 100 can include mounting hardware 310 attached to a rear 100r of the housing 100h. The active antenna module 110 can also include mounting hardware 310 and it can be coupled to the mounting structure 300 after it is attached to the base station antenna 100 (FIG. 11D).

The active antenna module 110 can be provided and/or installed as a standalone unit or in an assembled active/passive configuration when mounted to the base station antenna 100. The base station antenna housing 100h can be installed without the active antenna module 110 for future upgrade.

FIGS. 12A and 12B illustrate an example of another embodiment of an active antenna module 110' that can include a second radome 1119 as discussed above. Also, the active antenna module 110' can optionally be configured to mount to the housing 100h without requiring a sealed interface and the corresponding receiving recessed segment 108 may have a closed rearward facing surface.

Pursuant to further embodiments of the present invention, base station antennas 100 are provided which have one or more active antenna modules 110 mounted on the back 100r of the antenna 100. FIG. 13 is a rear perspective view of a base station antenna 100" comprising a pair of active antenna modules 110 mounted on the rear 100r, shown mounted in respective recessed segments 108.

Figure 14:
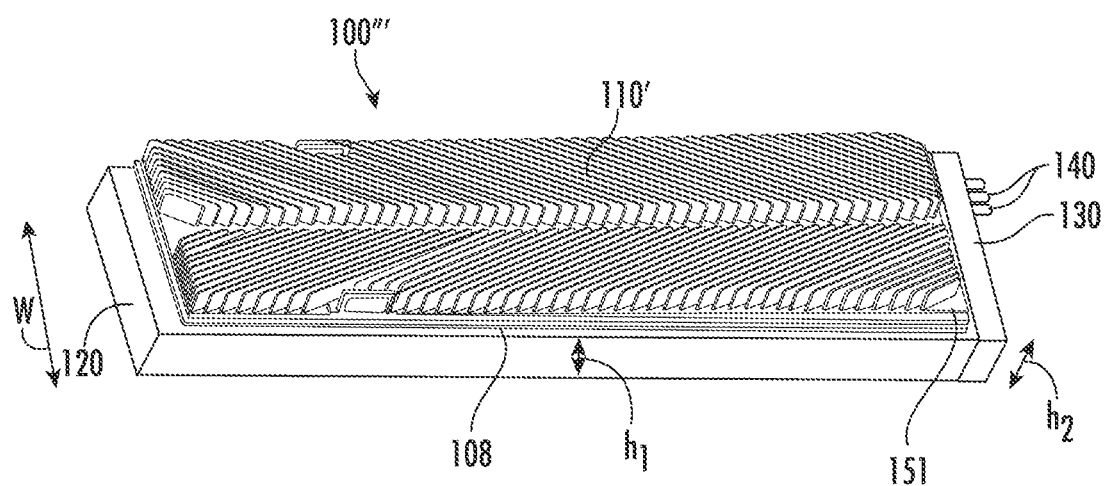
FIG. 14 is a rear, side perspective view of yet another embodiment of a base station antenna and corresponding active antenna module according to embodiments of the present invention.

FIG. 14 illustrates another embodiment with a recessed segment 108 and an active antenna module 110 can extend over more than a major portion of the length of the rear 100r of the antenna 100'''.

In some embodiments, the base station antennas may be designed so that a variety of different active antenna modules 110 can be used in a given antenna 100. The active antenna module 110 can be manufactured by any original equipment manufacturer and/or cellular service provider and mounted on the back of the antenna. This allows cellular operators to purchase the base station antennas and the radios mounted thereon separately, providing greater flexibility to the cellular operators to select antennas and radios that meet operating needs, price constraints and other considerations.

The antennas 100 may have a number of advantages over conventional antennas. As cellular operators upgrade their networks to support fifth generation ("5G") service, the base station antennas that are being deployed are becoming increasingly complex. It is desirable to minimize antenna size and/or integrate increased number of antenna or antenna elements inside a single radome. For example, due to space constraints and/or allowable antenna counts on antenna towers of existing base stations, it may not be possible to simply add new antennas to support 5G service. Accordingly, cellular operators are opting to deploy antennas that support multiple generations of cellular service by including linear arrays of radiating elements that operate in a variety of different frequency bands in a single antenna. Thus, for example, it is common now for cellular operators to request a single base station antenna that supports service in three, four or even five or more different frequency bands. Moreover, in order to support 5G service, these antennas may include multi-column arrays of radiating elements that support active beamforming. Cellular operators are seeking to support all of these services in base station antennas that are comparable in size to conventional base station antennas that supported far fewer frequency bands.

Pursuant to still further embodiments of the present invention, methods of assembling beamforming radios on base station antennas to provide base station assemblies are provided. Methods of installation are provided that are suitable for factory installation as well as methods for field installing (or replacing) beamforming radios on base station antennas. In the discussion that follows the installation methods will primarily be described with reference to installing the active antenna modules 110 with beamforming radios to base station antenna 100. It will be appreciated, however, that these techniques may be used for any of the other embodiments disclosed herein, with suitable modifications made as appropriate.

The active antenna modules 110 may also be readily replaced in the field. As is well known, base station antennas are typically mounted on towers, often hundreds of feet above the ground. Base station antennas may also be large, heavy and mounted on antenna mounts that extend outwardly from the tower. As such, replacing base station antennas may be difficult and expensive. The active antenna modules 110 with beamforming radios may be field installable and/or replaceable without the need to detach the base station antenna 100 from an antenna mount.

Figure 15:
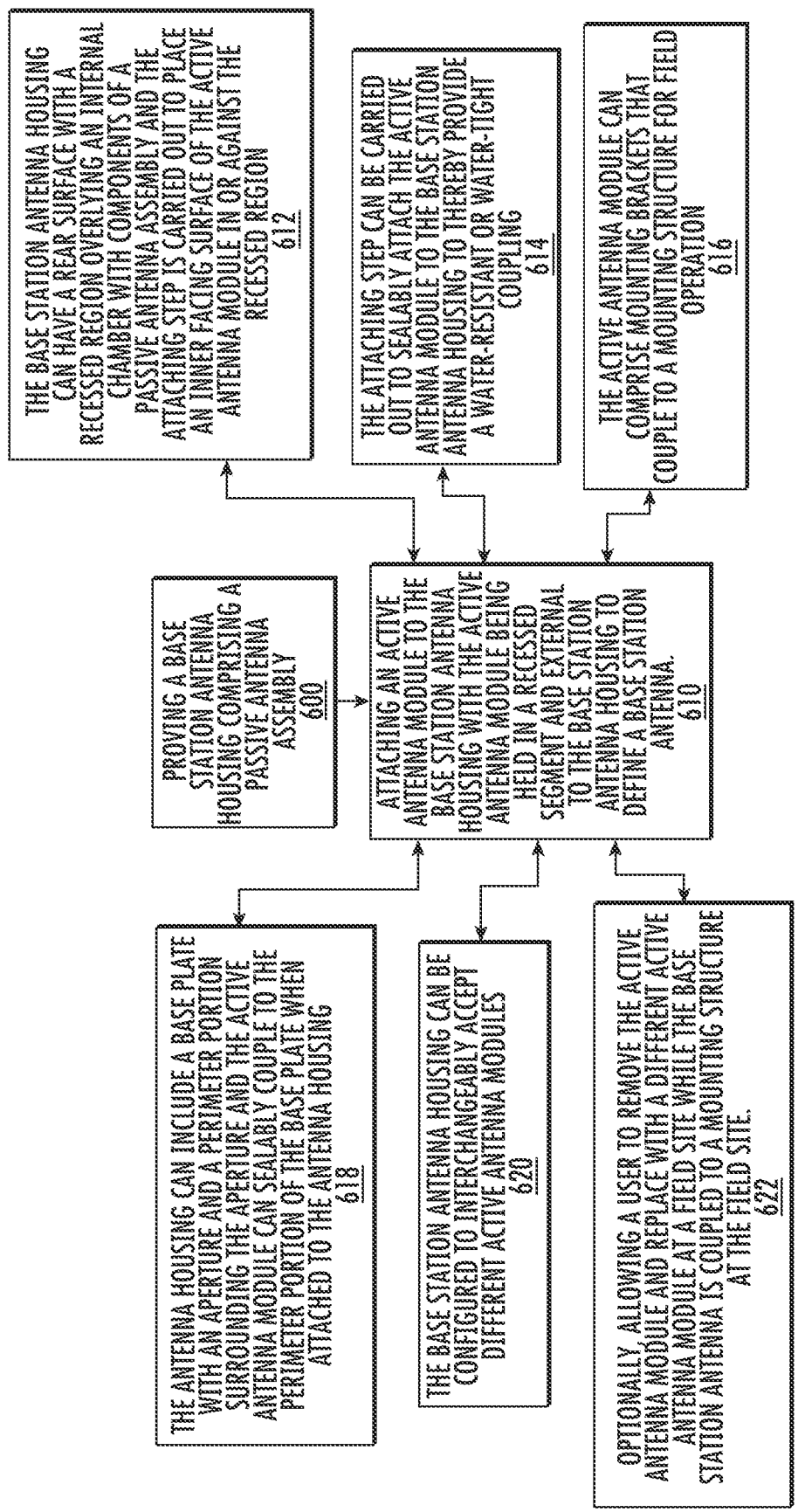
FIG. 15 is an example flow chart of actions that can be used to assemble a base station antenna according to embodiments of the present invention.
Figure 16A:
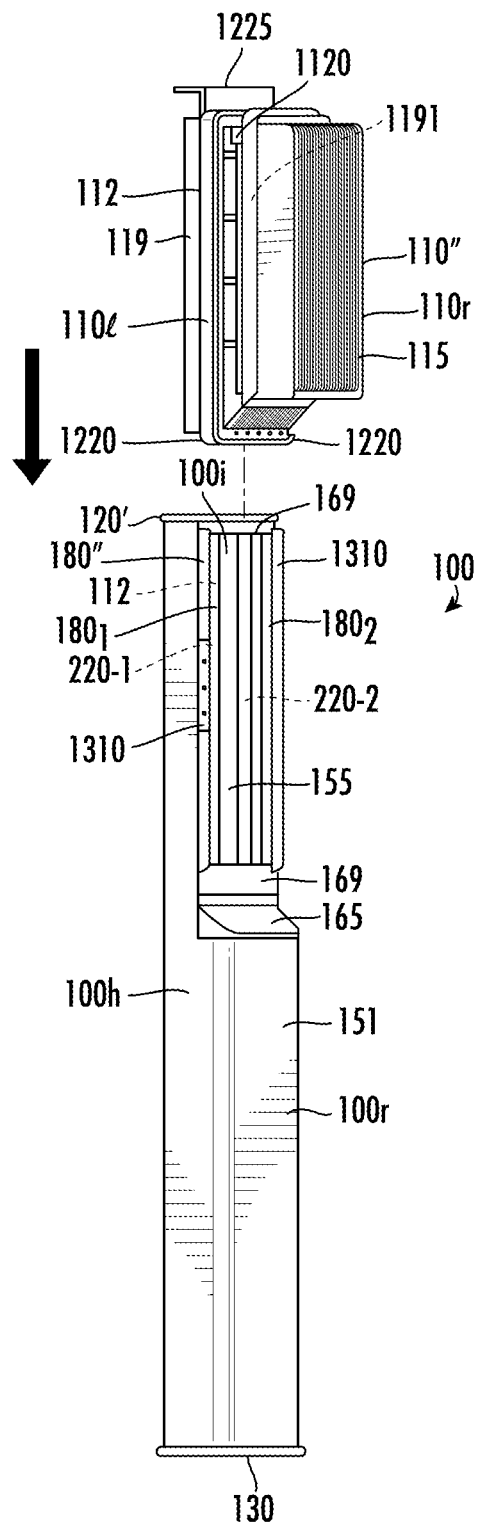
FIG. 16A is a rear, side perspective view of another embodiment of a base station antenna and corresponding active antenna module, shown aligned for assembly, according to embodiments of the present invention.
Figure 16B:
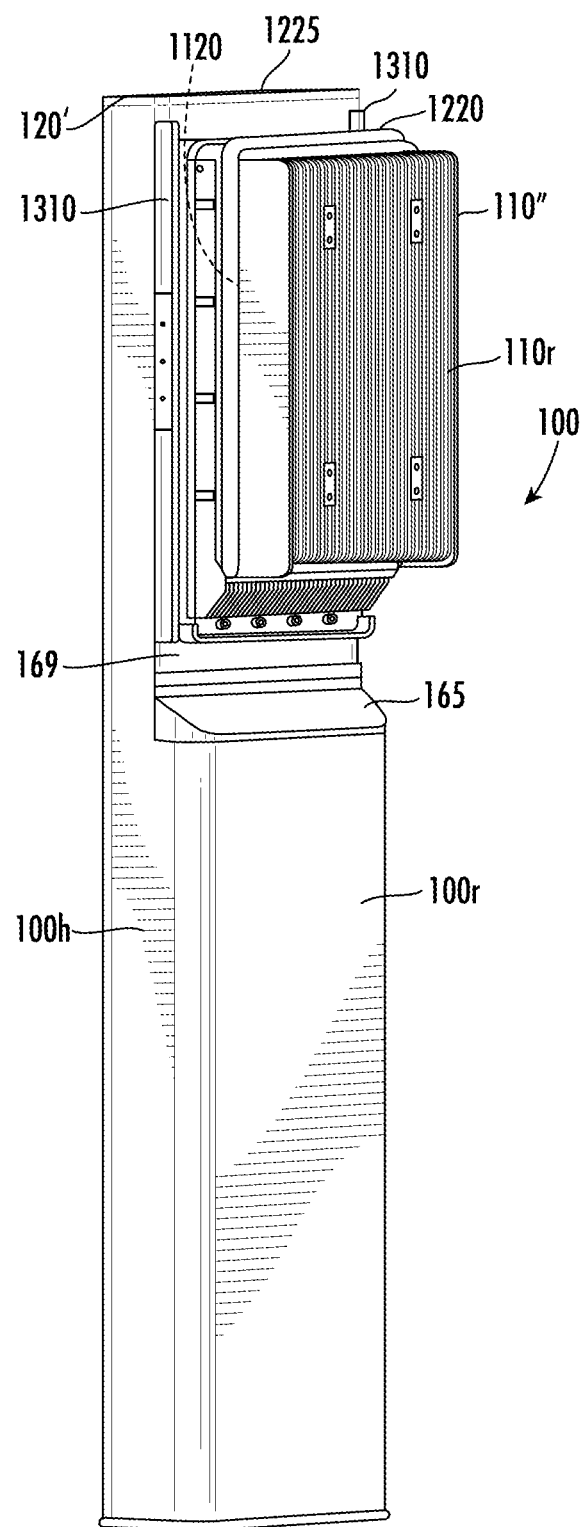

Turning now to FIG. 15, a flow chart of example actions that can be used to install a base station antenna is shown. A base station antenna housing comprising a passive antenna assembly is provided (block 600). An active antenna module is attached to the base station antenna housing with the active antenna module being held in a recessed segment and with at least a rear portion thereof being external to the base station antenna housing to define a base station antenna (block 610).

The base station antenna housing can have a rear surface with a recessed region overlying an internal chamber with components of a passive antenna assembly and the attaching step is carried out to place an inner facing surface of the active antenna module in or against the recessed region (block 612).

The attaching step can be carried out to sealably attach the active antenna module to the base station antenna housing to thereby provide a water-resistant or water-tight coupling (block 614).

The active antenna module can comprise mounting brackets that couple to a mounting structure for field operation (block 616).

The base station antenna housing can include a base plate with an aperture and a perimeter portion surrounding the aperture and the active antenna module can sealably couple to the perimeter portion of the base plate when attached to the antenna housing (block 618).

The base station antenna housing can be configured to interchangeably accept different active antenna modules (block 620).

A user can be allowed to remove the active antenna module and replace it with a different active antenna module at a field site while the base station antenna is coupled to a mounting structure at the field site (block 622).

Turning now to FIGS. 16A, 16B, 17A, 17B and 18, the active antenna module 110" can be configured to be slidably inserted and coupled to the base station antenna 100 from the top 100t of the base station antenna. The rails 180₁, 180₂ can be exposed external rails 180" (prior to assembly with the active antenna module 110") that slidably (matably) couple to longitudinally extending rail couplers 1220. The rail couplers 1220 are provided as a pair, one that extends along a respective right or left side 110r, 110l, of the active antenna module 110". The rail couplers 1220 can reside between the (inner) radome 119 and the rear surface 110r of the active antenna module 110". Other sliding detachable configurations may be used, including sliding from a bottom 100b instead of the top 100t or sliding from both top and bottom ends, one form each direction, if more than two active antenna modules 110 are used.

Similar to the embodiment shown in FIGS. 8A-8F, upon assembly, the active antenna module 110" is (sealably) coupled to the upper portion of the base station antenna 100. However, no screws or pins are required to mount the active antenna module 110' to the seal perimeter interface 100i surrounding the receiving cavity 155. This top-slide-to-couple configuration may facilitate field assembly and/or reduce alignment issues when retrofitting in the field.

First and second arrays (columns) 220-1, 220-2 of low band radiating elements 222 reside on right and left side portions of the base station antenna on each side of the receiving recessed region of a rear of the housing 100r and/or chamber or cavity 155 (see also, FIGS. 9A, 23C, 25C). The outer perimeter shape of the radome 119 can be configured to slide past some of these radiating elements and extend adjacent thereto. A seal member 112 can reside on one or both of an inner facing surface of the active antenna module 110" and the seal interface 100i of the base station antenna housing 100h surrounding the receiving chamber or cavity 155.

The base station antenna housing 100h can include cross-segments 169 extending across lower and upper ends of the receiving chamber/cavity 155, which may optionally form part of the housing seal interface 100i.

In some embodiments, the active antenna module 110" comprises an inwardly projecting top member 1225 that can couple to and/or define part of the top 120 of the base station antenna 100 and provide a moisture resistant seal and/or top end cap. The top member 1225 can extend inward a further distance than the radome 119.

Figure 30A:
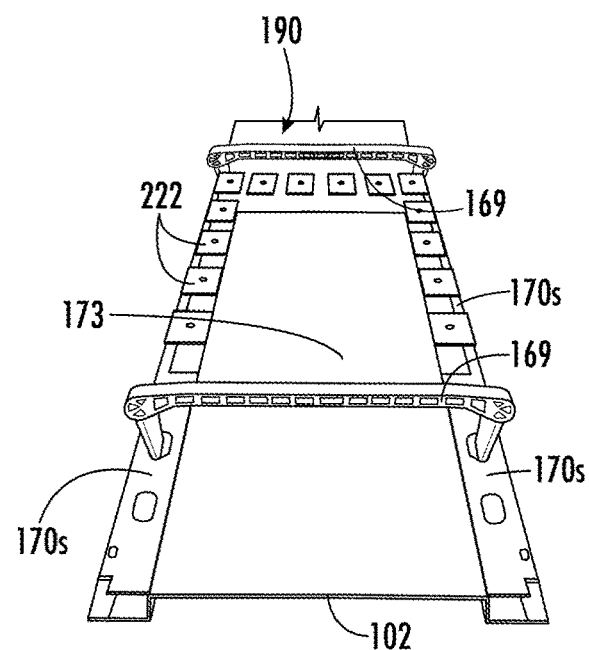
FIG. 30A is a top end perspective view of the passive antenna housing shown in FIG. 29 but without the external front radome.

A length of the housing 100h, typically including the top 100t of the base station antenna housing 100h can have an open or closed "U" like-shape that slidably receives the active antenna module 110". The sides of the "U" shape correspond to the rearwardly projecting side walls 101, 103 (FIG. 5) of the housing 100h and extend a distance that is less than the lateral extent of the bottom of the "U" shape and with the bottom defined by a front 100f of the housing 100h. The top of the U shape can be closed across one or more locations using a cross-member 169 for increasing structural rigidity (FIG. 30A).

The top of the active antenna module 110" can be configured in other manners as can the top of the base station antenna housing to provide a suitably water-tight seal. For example, a removable end member with a seal such as a gasket or a pivoting top member with a seal such as gasket can be attached to the top of the base station antenna to open to allow the active antenna module 110" to be slidably inserted or removed (not shown).

FIGS. 16A, 16B, 17A and 17B illustrate that the base station antenna housing 100h can further include rearwardly projecting side members 1310 that extend rearward of the rails 180₁, 180₂ and that also extend longitudinally for a sub-length of the antenna housing 100h, one on each side of the receiving cavity 155. The side members 1310 couple to mounting hardware 310. The active antenna module 110" can be fully supported by the antenna housing 100h when mounted to the mounting structure 300 without requiring mounting hardware attached to the active antenna module 110" itself.

The mounting hardware 310 can include arms 310a that project outwardly (toward a rear 100r of the housing 100h) a distance sufficient to define a small clearance gap between a rear surface 110r of the active antenna module 110" and the mounting structure 300 to thereby allow the active antenna module 110' to be slidably advanced (or retracted for replacement) between the mounting structure 300 and the mounting hardware 310 when the base station antenna housing 100h is mounted in a field use orientation.

Figure 18:
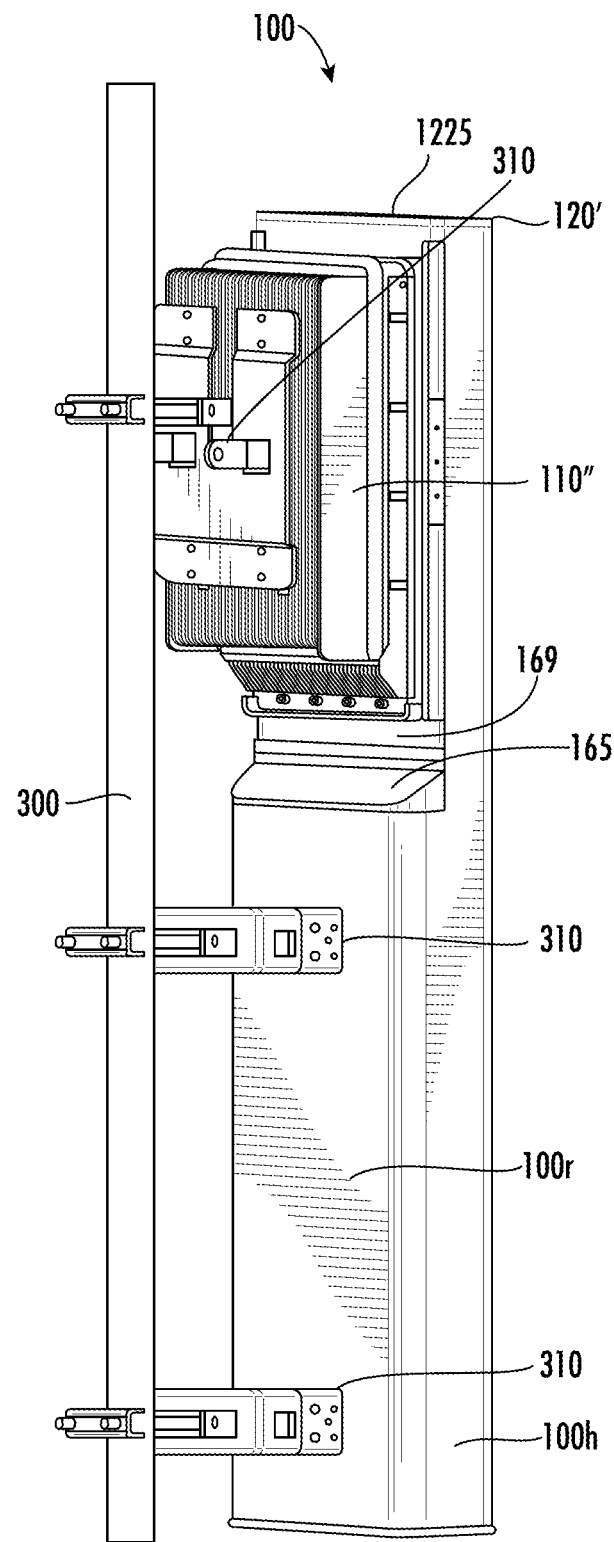
FIG. 18 is a rear, side perspective view of another embodiment of the base station antenna of FIG. 16A showing an alternative hardware configuration for mounting the base station antenna to a mounting structure according to embodiments of the present invention.

FIG. 18 illustrates that the active antenna module 110" can include mounting hardware 310 coupled to its rear surface 100r and this mounting hardware 310 can be used to mount it to the mounting structure 300 after it is attached to the base station antenna 100.

Figure 17A:
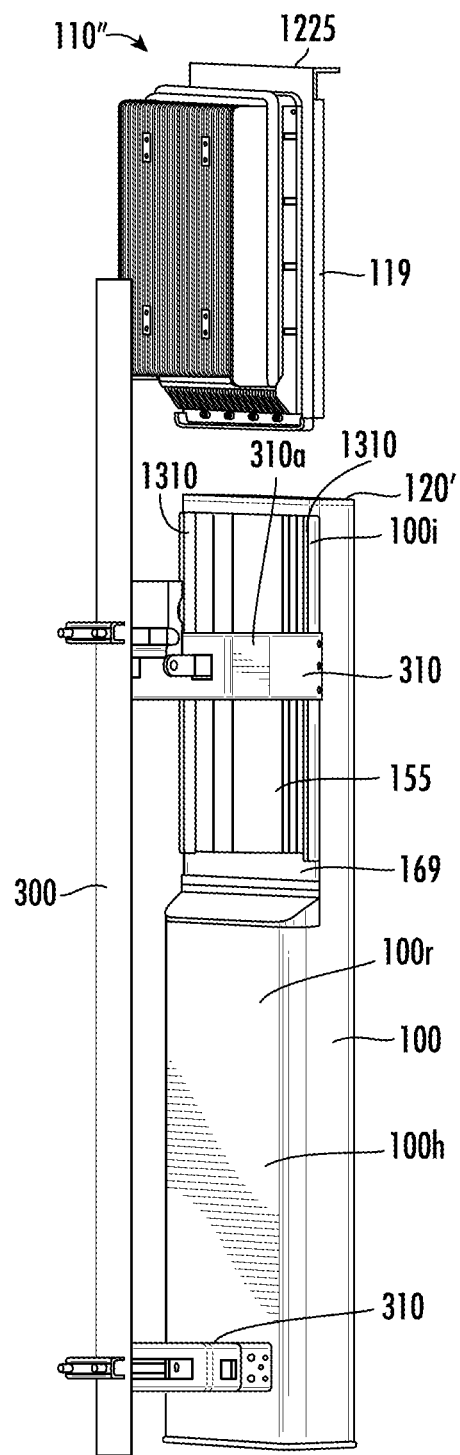
FIG. 17A is a rear, side perspective view of the base station antenna shown in FIG. 16A illustrating an example mounting hardware configuration for a mounting structure and with the active antenna module aligned for assembly according to embodiments of the present invention.
Figure 17B:
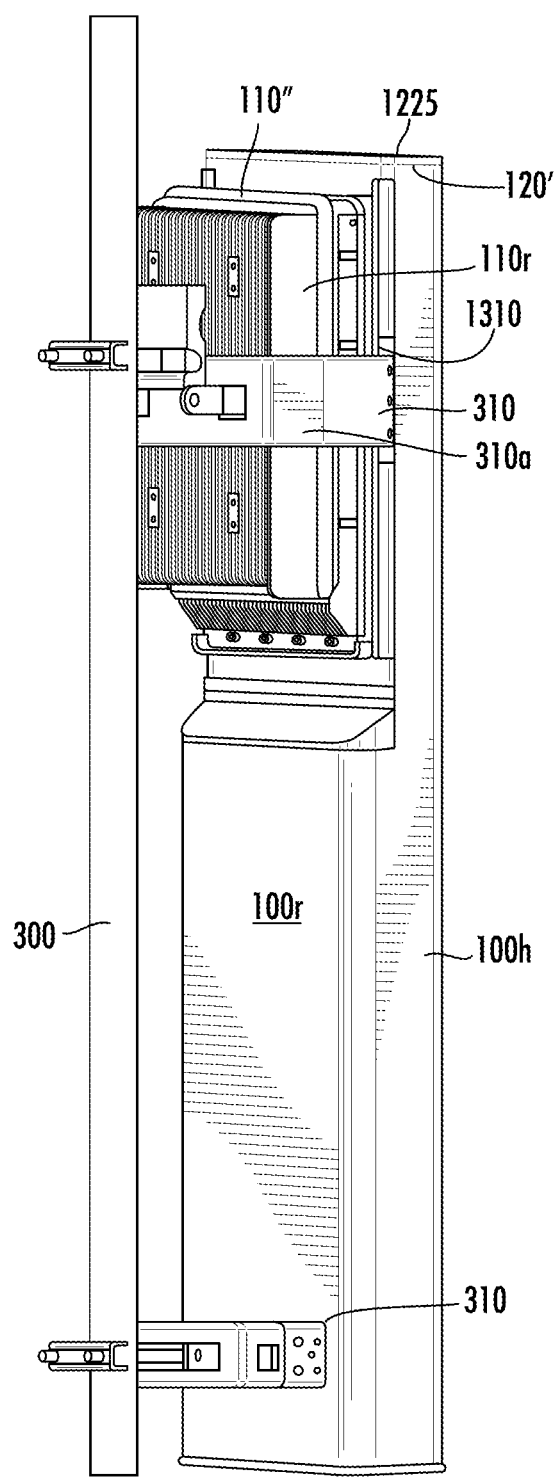
FIG. 17B is a rear, side perspective assembled view of the base station antenna shown in FIG. 17A.

Combinations of the mounting configurations shown in FIGS. 17A, 17B and 18 for mounting the active antenna module 110" to the mounting structure 300 may also be used.

At least one of the first reflector 170 or the second reflector 1172 can be provided by a frequency selective surface and/or substrate that is configured to allow RF energy (electromagnetic waves) to pass through at one or more first defined frequency range and that is configured to reflect RF energy at a different second frequency band. The frequency selective surface and/or substrate may be interchangeably referred to as a "FSS" herein. Thus, a reflector, such as one or both of the passive reflector 170 and/or the active antenna reflector 1172, of the base station antenna 100, can reside behind at least some antenna elements and can selectively reject some frequency bands and permit other frequency bands to pass therethrough by including the frequency selective surface and/or substrate to operate as a type of "spatial filter". See, e.g., Ben A. Munk, Frequency Selective Surfaces: Theory and Design, ISBN: 978-0-471-37047-5; DOI.10.1002/0471723770; April 2000, Copyright© 2000 John Wiley & Sons, Inc. the contents of which are hereby incorporated by reference as if recited in full herein.

The frequency selective surface and/or substrate material 1500 of a respective reflector can comprise metamaterial, a suitable RF material or even air (although air may require a more complex assembly). The term "metamaterial" refers to composite electromagnetic (EM) materials. Metamaterials may comprise sub-wavelength periodic microstructures.

The FSS material can be provided as one or more cooperating layers. The FSS material can include a substrate that has a dielectric constant in a range of about 2-4, such as about 3.7 and a thickness of about 5 mil and metal patterns formed on the dielectric substrate. The thickness can vary but thinner materials can provide lower loss.

The first reflector 170 and the second reflector 1172 can be parallel, optionally co-planar, and one or both can comprise an FSS.

The first reflector 170 (of the passive antenna housing 100h) can comprise a frequency selective substrate 170f and can be physically (e.g., integral with) and/or electrically coupled to the primary reflector 214 of the passive antenna assembly 190.

The first reflector 170 of the passive antenna 100 can comprise the frequency selective surface or substrate 170f and can reside forward of the reflector 1172 of the active antenna module 110, e.g., closer to the front 100f of the housing 100h than the reflector 1172 of the active antenna module 110.

In some embodiments, the second reflector 1172 can reside closer to the front 100f of the housing 100h than the reflector 170 of the passive antenna assembly 190, when assembled to the passive antenna assembly housing 100.

Turning now to FIGS. 19A and 19B, the reflector 170 of the passive antenna assembly 190 in the base station antenna 100 can be configured to have a FSS material 1500 to define a frequency selective substrate and/or surface 170f. This configuration does not require electrical, e.g., capacitive, coupling between the second reflector 1172 (reflector of the active antenna module 110) and the first reflector 170 (a reflector of the passive antenna assembly 190).

Optionally, the second reflector 1172 may be configured to have a frequency-selective surface and/or substrate 1172f.

In some embodiments, the FSS material 1500 of the frequency selective substrate/surface 170f of the reflector 170 of the passive antenna assembly 190 can be configured to act like a High Pass Filter essentially allowing low band energy to completely reflect (the FSS can act like a sheet of metal) while allowing higher band energy, for example, about 3.5 GHz or greater, to completely pass through. Thus, the frequency selective substrate/surface is transparent or invisible to the higher band energy and a suitable out of band rejection response from the FSS can be achieved. The FSS material 1500 may allow a reduction in filters or even eliminate filter requirements for looking back into the radio 1120.

In some embodiments, the reflector 170 with the FSS 170f may be implemented by forming the frequency selective surface on a printed circuit board, optionally a flex circuit board. In some embodiments, the reflector 170, for example, may be implemented as a multi-layer printed circuit board, one or more layers of which formed with a frequency selective surface 170f configured such that electromagnetic waves within a predetermined frequency range cannot propagate through the reflector 170, and wherein one or more other predetermined frequency range associated with the one or more layers of the multi-layer printed circuit board is allowed to pass therethrough.

Figure 20A:
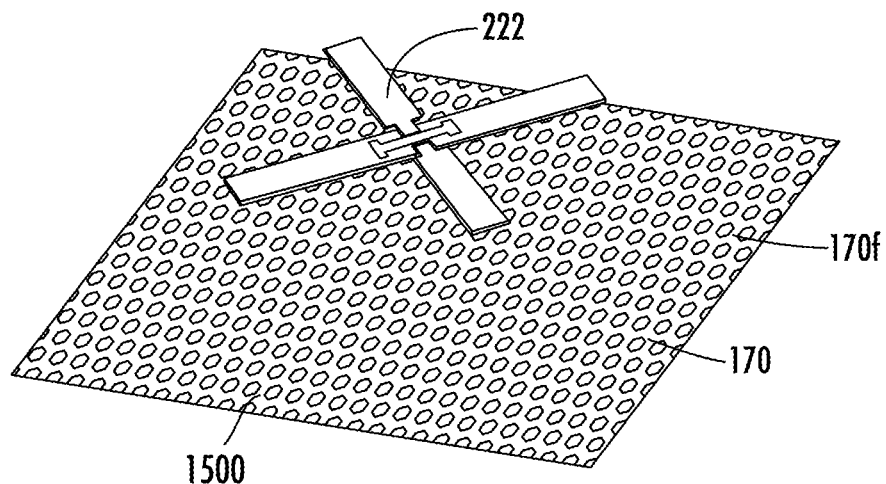
FIG. 20A is a front perspective view of an example frequency selective surface and/or substrate providing a reflector of the passive antenna of the base station antenna according to embodiments of the present invention.
Figure 20B:
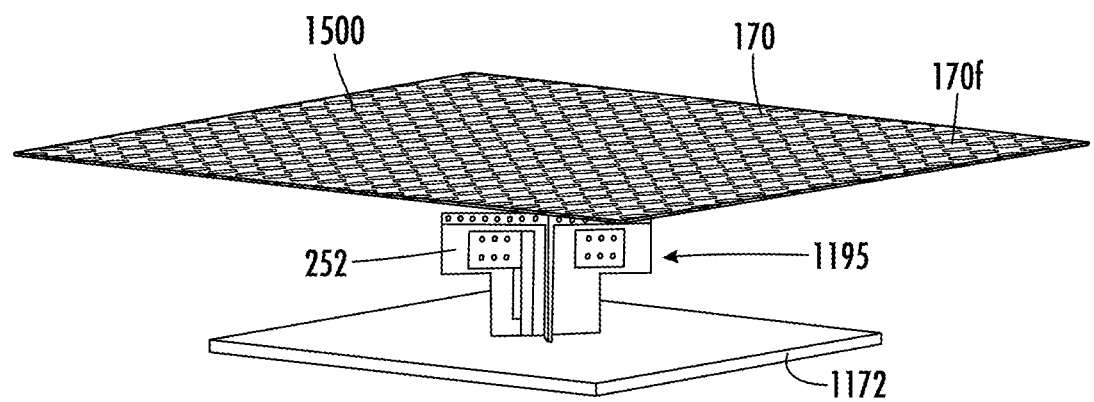
FIG. 20B is a top perspective view of a portion of the frequency selective surface and/or substrate shown in FIG. 20A also illustrating a reflector of the active antenna module and example antenna element between the two reflectors according to embodiments of the present invention.

FIG. 20A shows an example low band antenna element 222 with dipole arms residing in front to the frequency selective substrate and/or surface 170f. FIG. 20B shows an example high band antenna element 252 residing behind the frequency selective substrate and/or surface 170f and in front of the reflector 1172 of the active antenna module 110. This configuration can avoid electrically coupling a passive reflector 170 for the low-band arrays 220 and an active reflector 1172 for the higher band arrays. Instead, the frequency selective substrate and/or surface 170f can extend a full width of the antenna and the higher band/high band active antenna 1195 (e.g., HB/3.5 GHz) forward of the active reflector 1172 can transmit RF energy through this frequency selective substrate and/or surface (FSS) 170f.

The frequency selective substrate and/or surface 170f can reside a distance in a range of ⅛ wavelength to ¼ wavelength of an operating wavelength behind the low band dipoles 222, in some embodiments. The term "operating wavelength" refers to the wavelength corresponding to the center frequency of the operating frequency band of the radiating element, e.g., low band radiating element 222.

Figure 20C:
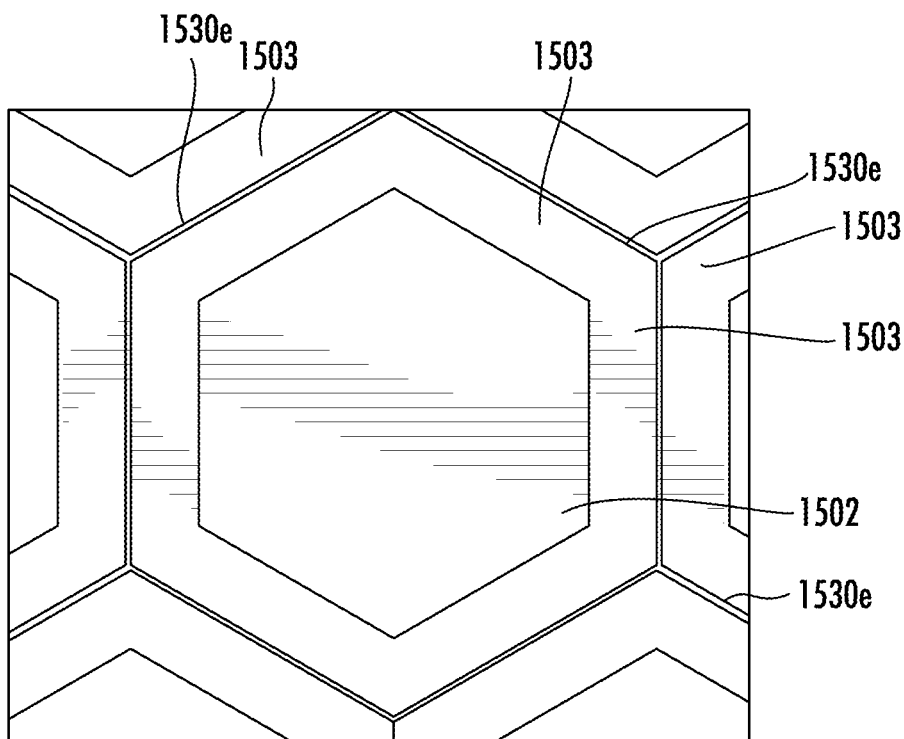
FIG. 20C is a greatly enlarged front view of an example patch element of a frequency selective surface and/or substrate according to embodiments of the present invention.
Figure 20D:
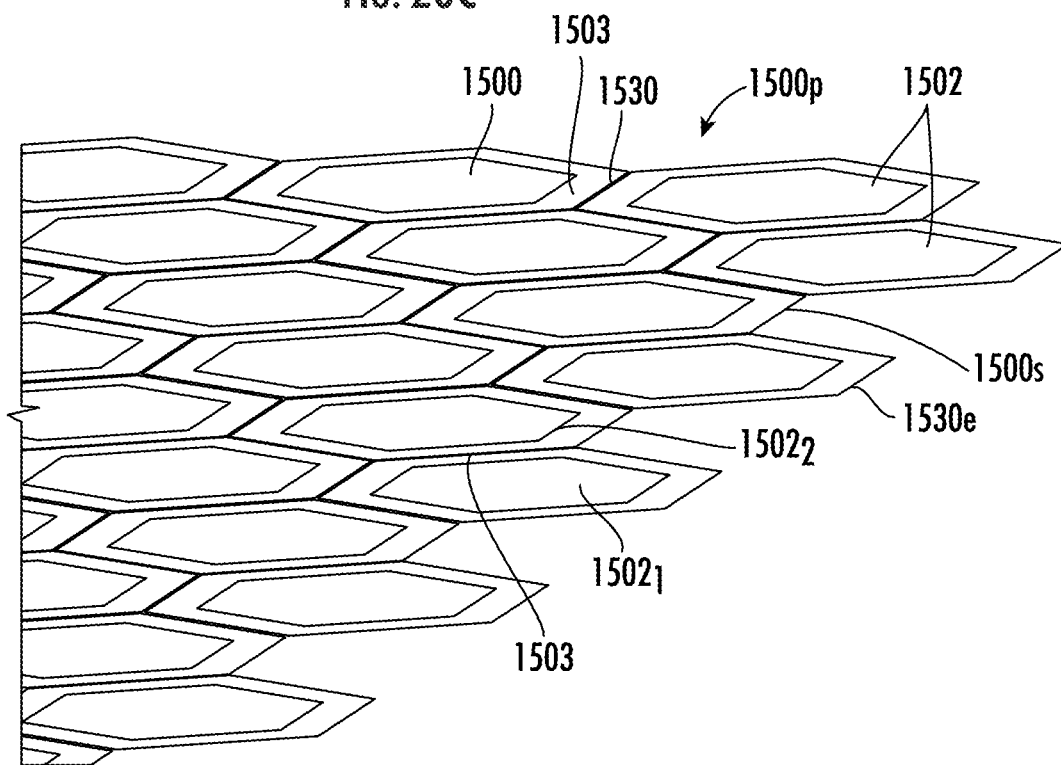
FIG. 20D is a greatly enlarged side perspective view of a portion of an example frequency selective surface and/or substrate (FSS) forming at least part of a reflector for a base station antenna according to embodiments of the present invention.

Referring to FIGS. 20C and 20D, the FSS material 1500 of a respective reflector 170 of the passive antenna housing 100h and/or reflector 1172 of the active antenna module 110, for example, can comprise a substrate 1500s having a layer or layers thereon that can have partial or full patterns 1500p of patches 1502 and a metallic grid 1530 to provide frequency selection characteristics for a FSS reflector. As shown, the substrate 1500s is a dielectric material with metal patterns of patches 1502 and the metallic grid 1530. The patterns 1500p can be configured to allow some frequencies to go through the reflector and some frequencies to be reflected to thereby provide frequency selective surfaces and/or substrates. The pattern 1500p may change in different areas of the FSS material 1500 of a respective reflector, such as the passive antenna reflector 170, and in some areas there may be no pattern and a full or partially full metal subsurface area or full or partially full metal layer can exist in those areas.

The pattern 1500p provided by the FSS material 1500 can be the same or different in size and/or shapes of patches 1502 over respective areas or sub-areas and/or on different layers. The shapes of patches 1502 and the shape of the elements of the metallic grid 1530 can be, e.g., polygonal, hexagonal, circular, rectangular or square and each can be formed of metal.

The pattern 1500p can be configured so that there is a perimeter gap space 1503 separating neighboring patches $1502_1$, $1502_2$, for example. The grid 1530 may subdivide the gap space 1503 into "islands" of dielectric material that surround each patch 1502. The gap spaces 1503 may comprise regions of a dielectric substrate on which no metal is deposited. The metallic grid 1530 can be embedded inside the gap spaces 1503 between patches 1502. This metallic grid 1530 can be printed on the opposite side of the substrate 1500s and does not need to be on the same side of the substrate that patches 1502 are on.

The pattern 1500p can be provided by one layer or by different layers that cooperate to provide the frequency selective characteristics that can substantially prevent the electromagnetic waves within a first operational frequency band from passing through the reflector material 1500 while allowing the electromagnetic waves within a second operational frequency band to pass through the reflector material 1500.

In some embodiments, the pattern 1500p of patches 1502 can be provided as an array of closely spaced apart geometric shaped patches 1502.

The patches 1502 can be provided by copper etched on the substrate 1500s. In some embodiments, the pattern 1500p of patches 1502 can be configured so that the patches 1502 are held by a honeycomb or web of material to suspend the patches 1502 without requiring a physical overlying or underlying base substrate.

The FSS material 1500 can comprise two structures which are printed on the same side or on opposing sides (opposing primary surfaces) of the substrate 1500s. One structure can be a pattern of hexagons forming the patches 1502 and the other structure can be a mesh or grid 1530 that looks like a honeycomb structure.

The grid 1530 can optionally be positioned in front of, behind or between one or more adjacent layers providing the pattern 1500p of patches 1502. Where a grid 1530 is used, it can be metallic and can be placed or formed on a top or bottom layer of the substrate 1500s and/or behind a rearwardmost patch 1502 (closest to the rear 100r of the housing 100h) or in front of a forwardmost patch 1502 (closest to the front 100f of the housing). The term "grid" means an open cell or lattice type structure. The term "thin grid" means that the grid has a thickness (e.g., width in a lateral dimension and/or a depth in a front to back direction of the housing 100h of the base station antenna 100) that is in a range of about 0.01 mm and 0.5 mm, such as, for example, about 0.1 mm.

As shown, the relatively large patches 1502 are metal, e.g., copper, and the adjacent region is the gap 1503 which can be defined by an exposed substrate. The grid element 1530e is spaced apart from neighboring patches 1502 by a grid element 1530e. The patches 1502 are metal and the thin grid 1530 is also metal, typically the same metal but different metals can be used. The area between the patches 1502 and the grid elements 1530e is the gap 1503 and the area of the gap 1503 between adjacent patches 1502 can have a lateral extent that is less than the area of the patch 1502 and greater than the grid element 1530e.

Figure 21A:
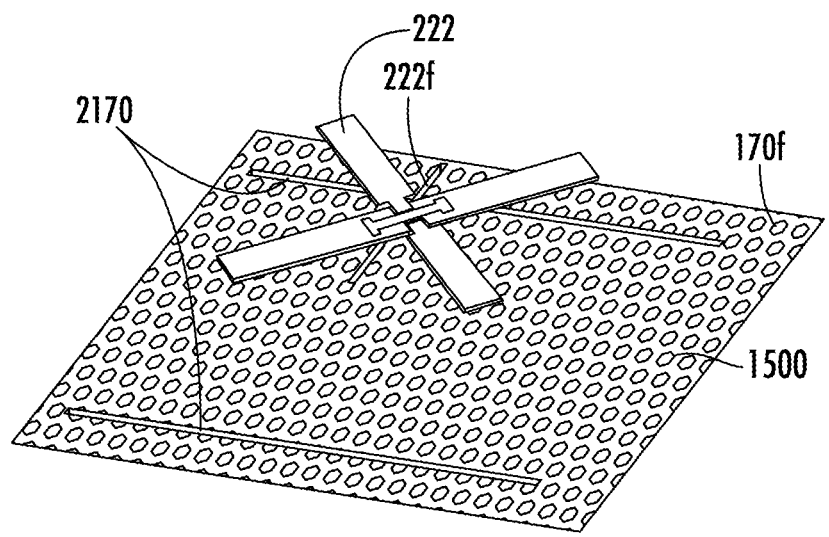
FIG. 21A is a front perspective view of another embodiment of a frequency selective substrate/surface providing a reflector of the base station antenna according to embodiments of the present invention.
Figure 21B:
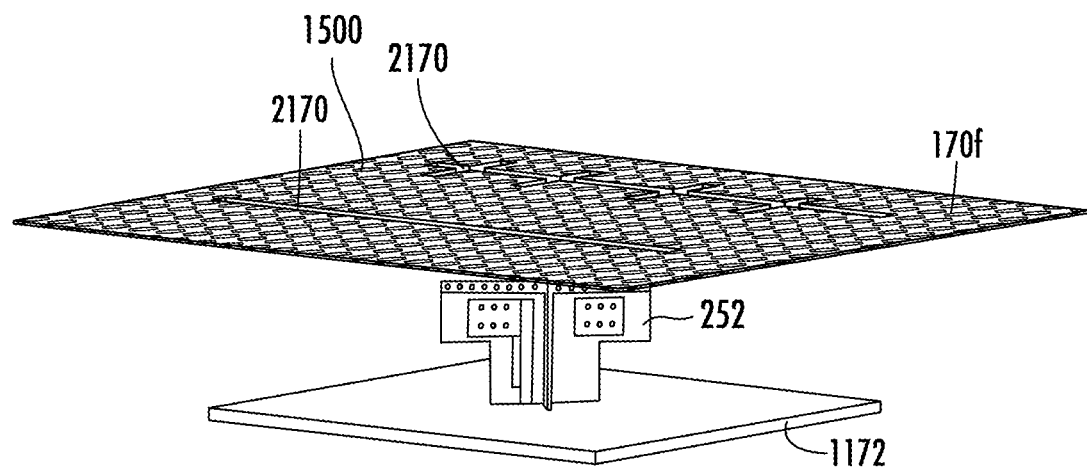
FIG. 21B is a top perspective view of a portion of the frequency selective substrate/surface shown in FIG. 21A also illustrating a reflector of the active antenna module and example antenna element between the two reflectors according to embodiments of the present invention.

FIGS. 21A and 21B illustrate that the frequency selective substrate/surface 170f can be configured with cutouts or channels 2170 that allow the substrate 170f to be slid into place or otherwise assembled about the feed boards 1200 and/or feed stalks 222f of the dipole antenna elements 222. The frequency selective substrate/surface 170f can be provided as single piece device or as a multiple piece device. For example, the FSS reflector 170f can be provided as a plurality of segments that can be assembled together and shaped with cutouts for the stalks 222f.

As shown in FIGS. 19A/19B, the frequency selective substrate/surface 170f can reside closer to a front 100f of the housing 100h than the main reflector 214 of the passive antenna assembly 190. The reflector 1172 of the active antenna module 110 can be stacked behind the frequency selective substrate/surface 170f and may reside inside or adjacent the rear surface of the housing 100h. The FSS 170f can be capacitively coupled to the main reflector 214.

Figure 22C:
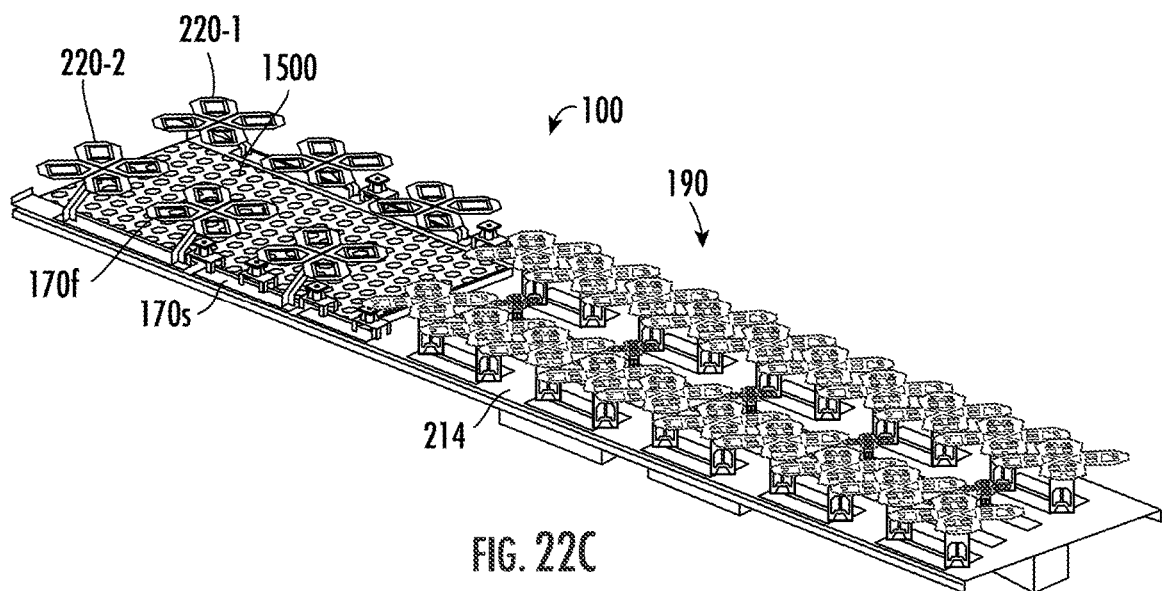
FIG. 22C is a front, side perspective view of a portion of a base station antenna comprising a frequency selective substrate/surface according to embodiments of the present invention.
Figure 22D:
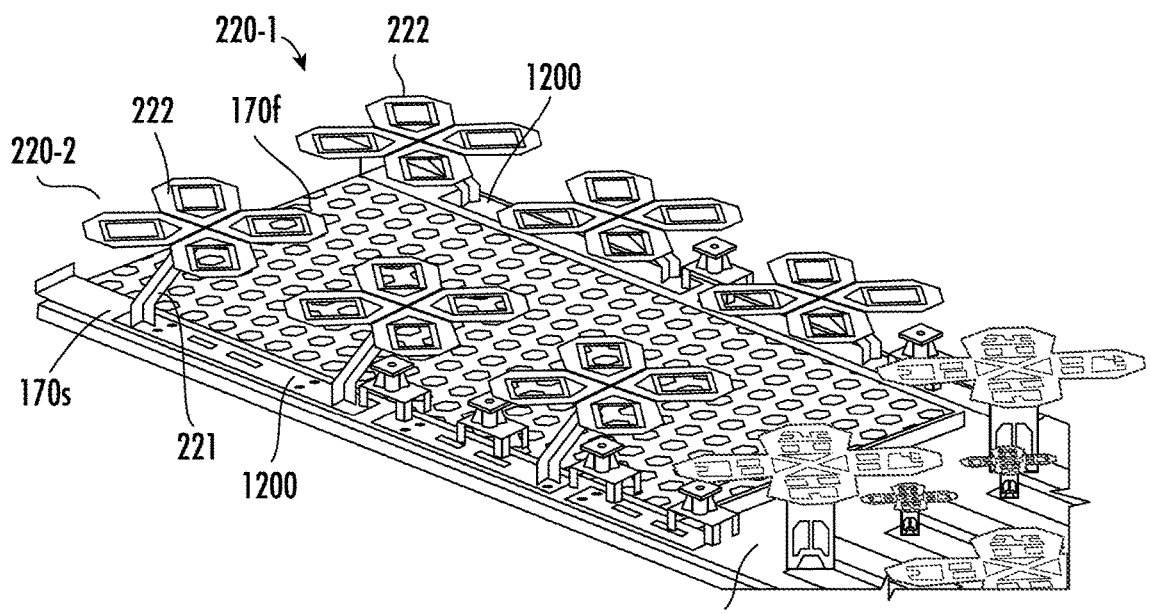
FIG. 22D is an enlarged, front, side perspective view of a portion of the device shown in FIG. 22C.

In other embodiments, referring to FIGS. 22A and 22B, the frequency selective substrate/surface 170f can be coplanar with the main reflector 214. The active antenna module 110 can reside a further distance outside the rear surface 100r of the housing 100h. The reflector 1172 in the active antenna module 110 can reside outside the housing 100h, stacked behind the frequency selective substrate/surface 170f. The dipole radiators of the low-band radiating elements 222 can reside in front of the frequency selective surface. In some embodiments, no channels for the feed stalks 222f are required to be formed in the frequency selective substrate 170f.

Figure 21C:
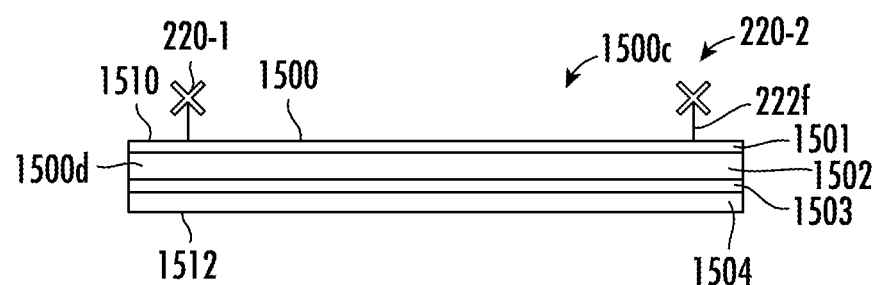
FIG. 21C is a schematic, partial side view of an example FSS provided by a multi-layer substrate comprising a dielectric board and/or printed circuit board according to embodiments of the present invention.

Referring to FIG. 21C, the FSS material 1500 can be provided as a printed circuit board 1500c. The FSS material 1500 can be configured so that predetermined frequency ranges that are passed or blocked by the one or more metal layers 1501, 1502, 1503, 1504 of the multi-layer printed circuit board 1500c may be different from one or more other layers. In some embodiments, the predetermined frequency ranges passed or blocked by the one or more layers of the multi-layer printed circuit board may not overlap with one another. In some embodiments, the predetermined frequency ranges passed or blocked by the one or more layers of the multi-layer printed circuit board may at least partially overlap with one another. In such embodiments, each layer in the multi-layer printed circuit board that is formed with a frequency selective surface is equivalent to a "spatial filter", and the entire multi-layer printed circuit board equivalently comprises a plurality of cascaded "spatial filters", wherein each "spatial filter" is configured to either allow or stop (i.e., passes or substantially attenuates and/or reflects) a part of the first operational frequency band, thereby collectively substantially allowing or preventing the electromagnetic waves within a respective defined operational frequency band to either passing through or be blocked/reflected by the reflector. As such, the design for the frequency selective surface of each layer of the multi-layer printed circuit board 1500c may be simplified while ensuring that the electromagnetic waves within defined one or more operational frequency bands are reflected/substantially blocked by the reflector material 1500 or allowed to pass through the reflector material 1500.

In some embodiments, the reflector material 1500 may comprise a dielectric board 1500d having opposed first and second primary surfaces 1510, 1512 that both reside behind the radiators of respective columns of first radiating elements 220-1, 220-2 where one or both primary surface 1510, 1512 can comprise a periodic conductive structure that forms the frequency selective surface. The periodic conductive structures can be on both the first and second primary surfaces to form the frequency selective surface of the reflector material 1500.

In some embodiments, the FSS material 1500 may comprise a plurality of reflector units that are arranged periodically, where each unit may comprise a first unit structure forming the periodic conductive structure on the first primary surface of the dielectric board and a second unit structure forming the periodic conductive structure on the second primary surface of the dielectric board. A position of the first unit structure may correspond to a position of the second unit structure. In some embodiments, as viewed from a direction perpendicular to the first and second primary surfaces, the center of each first unit structure coincides with the center of corresponding second unit structure.

In some embodiments, the first unit structure may be equivalent to an inductor (L), the second unit structure may be equivalent to a capacitor (C), thereby the reflector unit comprising the first unit structure and the second unit structure that are correspondingly disposed may be equivalent to an LC resonant circuit. In some embodiments, the reflector unit may be configured to be equivalent to a parallel LC resonant circuit. A frequency range that the frequency selective surface allows to pass therethrough may be adjusted to a desired frequency range by designing the equivalent inductance of the first unit structure and the equivalent capacitance of the second unit structure.

In some embodiments, the traveling radio frequency wave that goes through the FSS material 1500 can see a shunt LC resonator and a transmission line (substrate having an impedance $Z_0$ depending on its thickness). The capacitance of each unit cell can be made/defined by or formed from the coupling across the gap between the grid and the patch. The inductor can be made out of the metallic thin lines of the grid.

The mesh/grid can define a high pass filter and the patches can define a low pass filter, together defining a band pass filter. A multiple layer printed circuit board having multiple FSS structures can be used for a sharper filter response.

In some embodiments, the periodic conductive structure on the first primary surface of the dielectric board comprises a grid (array structure) 1530, the first unit structure comprises a grid element 1530e serving as a repetition unit in the grid array structure 1530, and the periodic conductive structure on the second primary surface of the dielectric board comprises a patch array pattern and/or structure 1500p, the second unit structure comprises a patch 1502 serving as a repetition unit in the patch array structure 1500p. For example, the grid element 1530e of the first unit structure may have an annular shape of a regular polygon such as a square, the patch 1502 of the second unit structure may have a shape of a regular polygon such as a square.

Several exemplary configurations of the frequency selective surface material 1500 of the reflector 170f of base station antennas 100 according to some embodiments of the present disclosure are described in detail below with reference to FIG. 21D.

Figure 21D:
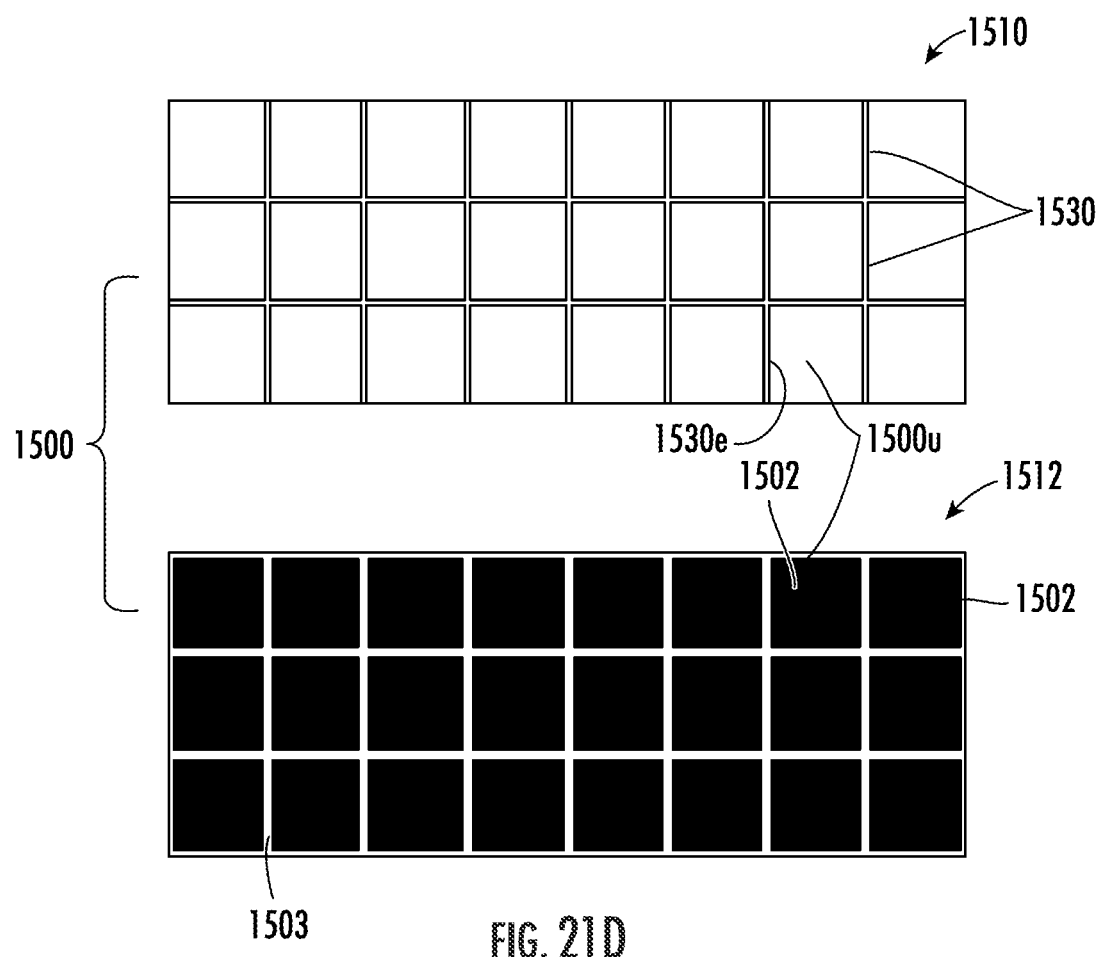
FIG. 21D illustrates an example FSS comprising top and bottom primary surfaces of aligned cooperating patch elements according to embodiments of the present invention.

For example, as shown in FIG. 21D, the reflector material 1500 can comprise a set of reflector units 1500u. A respective reflector unit 1500u can be configured to have a periodic (conductive) and/or unit structure on a first primary surface 1510 and a periodic (conductive) and/or unit structure on the second primary surface 1512. The unit structure on the first primary surface 1510 can be a grid element 1530e of a metal grid 1530 and the unit structure on the second primary surface 1512 can be a metal patch 1502. The shapes and sizes of aligned pairs of the unit structures of a respective reflector unit 1500u can be the same or different, shown as the same size and shape. For example, the reflector unit 1500u can have a square grid providing square grid elements 1530e and a square patch 1502 (second unit structure) at corresponding positions on both sides/primary surfaces 1510, 1512 of a dielectric board. As viewed from a direction perpendicular to the first and second primary surfaces 1510, 1512, the center of the square grid 1530 coincides with the center of the square patch 1502. Such a reflector unit 1500u may be configured to be equivalent to a parallel resonant circuit formed by an inductor (the square grid) and a capacitor (the square patch). The magnitudes of the inductance of the inductor and the capacitance of the capacitor of the equivalent parallel resonant circuit may be determined based on desired frequency selectivity of the frequency selective surface, and then the sizes of the grid elements 1530e and the patches 1502 can be determined accordingly. In the example of FIG. 21D, the reflector material 1500 is shown to include reflector units 1500u in three rows and eight columns, however, it will be appreciated that this is a non-limiting example, the arrangement of the reflector units may be determined based on designed sizes of the unit structures.

In the example patterns shown in FIG. 21D, conductive materials are present at positions of black lines (metal grid 1530) and black patches (blocks) 1502 and are not present at white positions. Conductive materials may be deposited at both sides of a dielectric board and then respective patterns may be formed by etching technologies such as photolithography or FIB milling, thereby forming periodic conductive structures to realize the frequency selective surface. Any other suitable methods currently know or developed later in the art may be employed to form desired periodic conductive structures on the dielectric board. The periodic conductive structures may be formed using any suitable conductive materials, typically using metal such as copper, silver, aluminum, and the like. The dielectric board may employ, for example, a printed circuit board. The thickness, dielectric constant, magnetic permeability and other parameters of the dielectric board may affect the reflective or transmissive properties at desired operating frequencies.

Referring to FIGS. 22C-22H, a portion of a base station antenna 100 is shown with the passive antenna assembly 190 comprising a primary reflector 214 and the FSS material 1500 that is adjacent the primary reflector 214 providing passive reflector 170f. The primary reflector 214 of the passive antenna assembly 190 can be configured to have upper extensions forming metal reflector side segments 170s that can be coupled to the FSS material 1500. Feed boards 1200 can be provided in front of or behind the side segments 170s. The feed boards 1200 connect to feed stalks 222f of radiating elements 222 (such as low band elements). The feed stalks 222f can be angled feed stalks 221 that project outwardly and laterally inward to position the front end of the feed stalks 221 closer to center of the reflector 170f than a rearward end. The feed boards 1200 can be coupled and/or connected to the FSS material 1500.

The feed boards 1200 can sit behind or in front of the FSS 1500 and can be capacitively coupled to the metal passive reflector(s) 170s, 214. The FSS material 1500 can be installed in front of or behind the reflector segments 170s and may be capacitively coupled to the passive reflector 170s, 214.

The FSS material 1500 can extend parallel to the side walls 103 of the base station antenna housing 100h. The reflector side segments 170s can have an "L" shape and/or orthogonal segments as shown in FIG. 22H, for example, and the "L" shaped and/or orthogonal segments can both comprise the FSS material 1500. The FSS material 1500 can form part of any reflector or interior side wall supporting radiating antenna elements, particularly where there are antenna elements in front and/or behind the FSS material 1500.

Figure 22F:
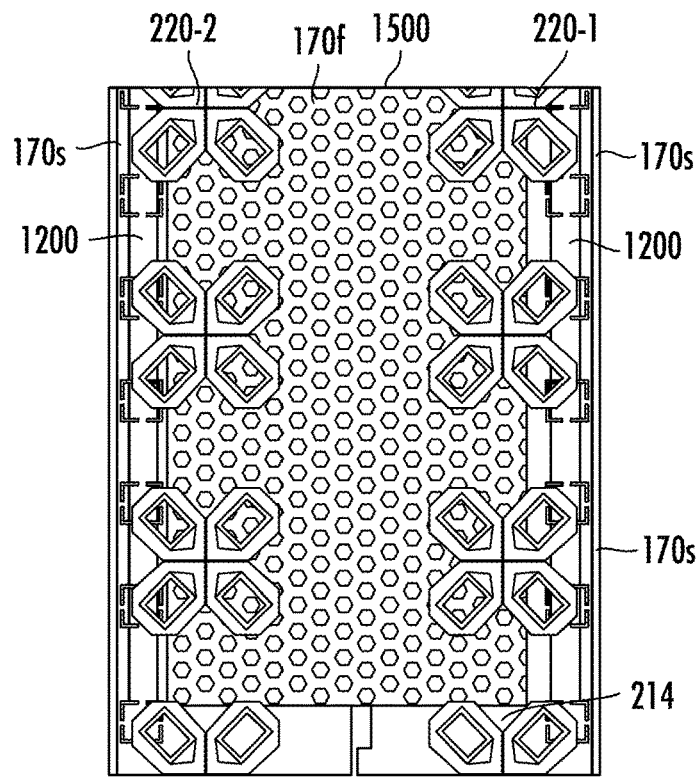
FIG. 22F is a front view of a portion of the base station antenna shown in FIG. 22C.
Figure 22G:
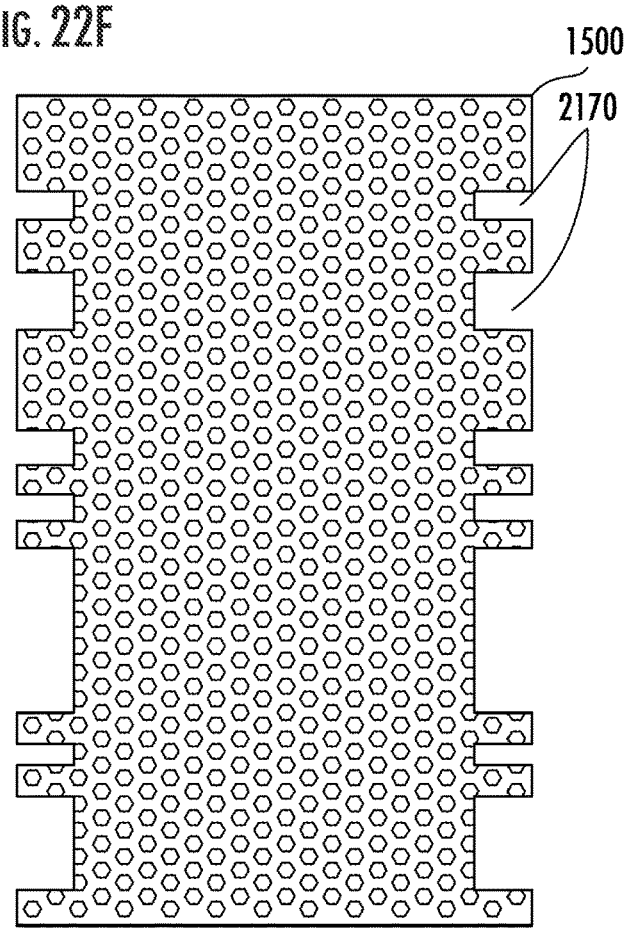
FIG. 22G is a front view of the frequency selective substrate/surface shown in FIG. 22C according to embodiments of the present invention.

FIG. 22G illustrates that the FSS material 1500 can have a perimeter with sides having channels (or cut outs) 2170, some having a greater length dimension than others, that allow connectors and/or cables of the feed boards and/or the feed stalks 222f to extend from the feed boards through the channels 2170. Referring to FIGS. 22E and 22F, the left and right-side longitudinally extending perimeters of the FSS material 1500 can extend in front of or behind the corresponding (right and left) side segments 170s of the metal passive reflector 170/214. In some embodiments, the passive reflector 170 can have elongate, longitudinally extending openings 1170 on each side that can be configured to allow the feed stalks 222f to extend forward therethrough.

Feed boards 1200 can be provided that extend a distance in front of the side segments 170s and that can connect to feed stalks 222f of radiating elements 220 (such as low or mid band radiating elements). The feed stalks 222f can be angled feed stalks that project outwardly and laterally inward to position the front end of the feed stalks 222f closer to a lateral center of the reflector 170f than a rearward end. The feed boards 1200 can be connected to the reflector 170f and/or metal side segments 170s. The feed boards 1200 can be parallel to the reflector 170f and positioned laterally on each side thereof as shown.

Figure 22I:
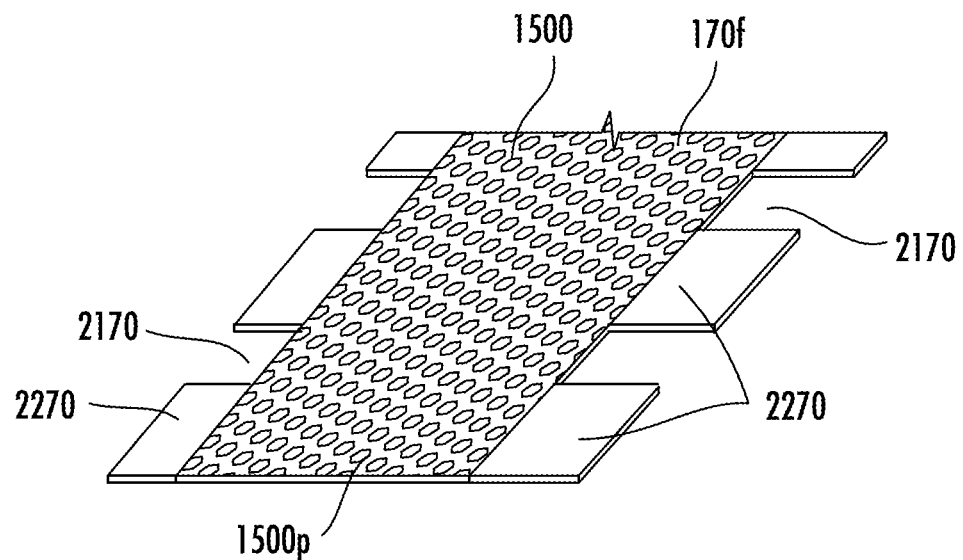
FIG. 22I is a front, side partial perspective view of another example reflector comprising an FSS and full metal outer perimeter sides according to embodiments of the present invention.

In some embodiments, as shown in FIG. 22I, the reflector 170f can be configured with a metal pattern 1500p that merges into side segments or areas of full metal 2170 which may be shaped as laterally extending metal tabs with front and/or back surfaces fully metallized. The areas of full metal 2270 can couple, for example, capacitively couple, to the longitudinally extending side segments 170s of the passive (primary) reflector 214 residing on right and left sides of the base station antenna.

Figure 22J:
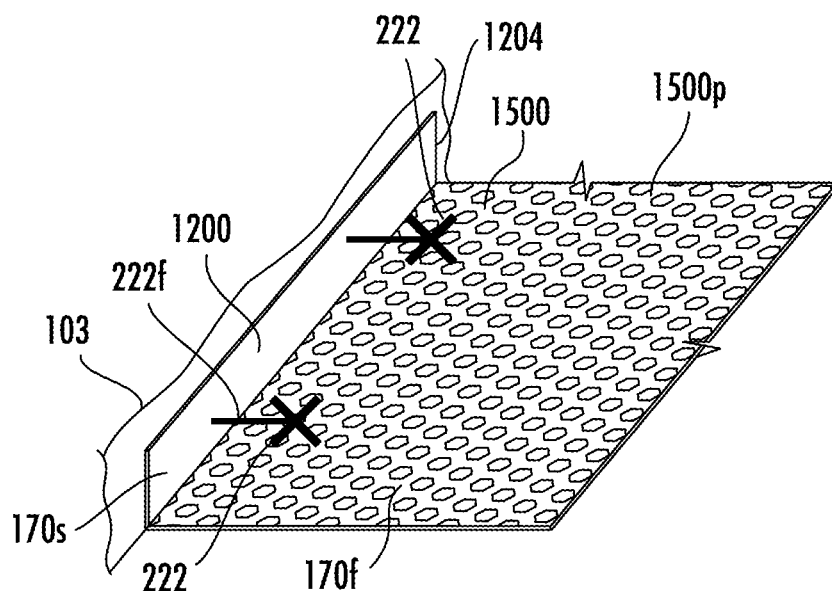
FIG. 22J is a front, side partial perspective view of a portion of a base station antenna comprising feed boards that are parallel to and adjacent sidewalls of the base station antenna according to embodiments of the present invention.

In some embodiments, as shown in FIG. 22J, the feed boards 1200 can be orthogonal or substantially orthogonal (+/−15 degrees) to the reflector 170f with the patches 1500p. In this orientation, the feed boards 1200 can be positioned adjacent and parallel to or substantially parallel to (+/−30 degrees) the side walls 103 of the base station antenna joining the front radome 150 and the back 100r of the base station antenna. Antenna elements 222 can extend laterally inward over the reflector 170f. This configuration may reduce blockage of high band energy at high scan angles. A laterally wide, e.g., whole width or substantially whole width (substantially full width meaning +/−15% of a full width of the base station antenna), reflector 170f may be used so that the FSS reflector material 170f extends laterally outward a distance corresponding to a lateral width of the base station antenna.

It is also noted that feed boards 1200 are not required and small or miniature power dividers with cables can be used in lieu of feed boards.

Turning now to FIGS. 23A-23C, 24, 34 and 35A-35C, the active antenna module 110 can comprise at least one adapter member 2900. As shown, the at least one adapter member 2900 can be provided as a pair of adapter members, one attached to each of the right and left sides of the active antenna module 110. The radome 119 of the active antenna module 110 can reside in front of the at least one adapter member 2900. As shown, the at least one adapter member 2900 includes a planar surface 2904 that projects laterally out from the active antenna module 110. The planar surface 2904 resides on the rail 180 of the antenna housing 100h. Fixation members 2903 that extend through apertures 2902 in the adapter member 2900 can be used to attach the adapter member 2900 to the active antenna module 110.

Figure 24:
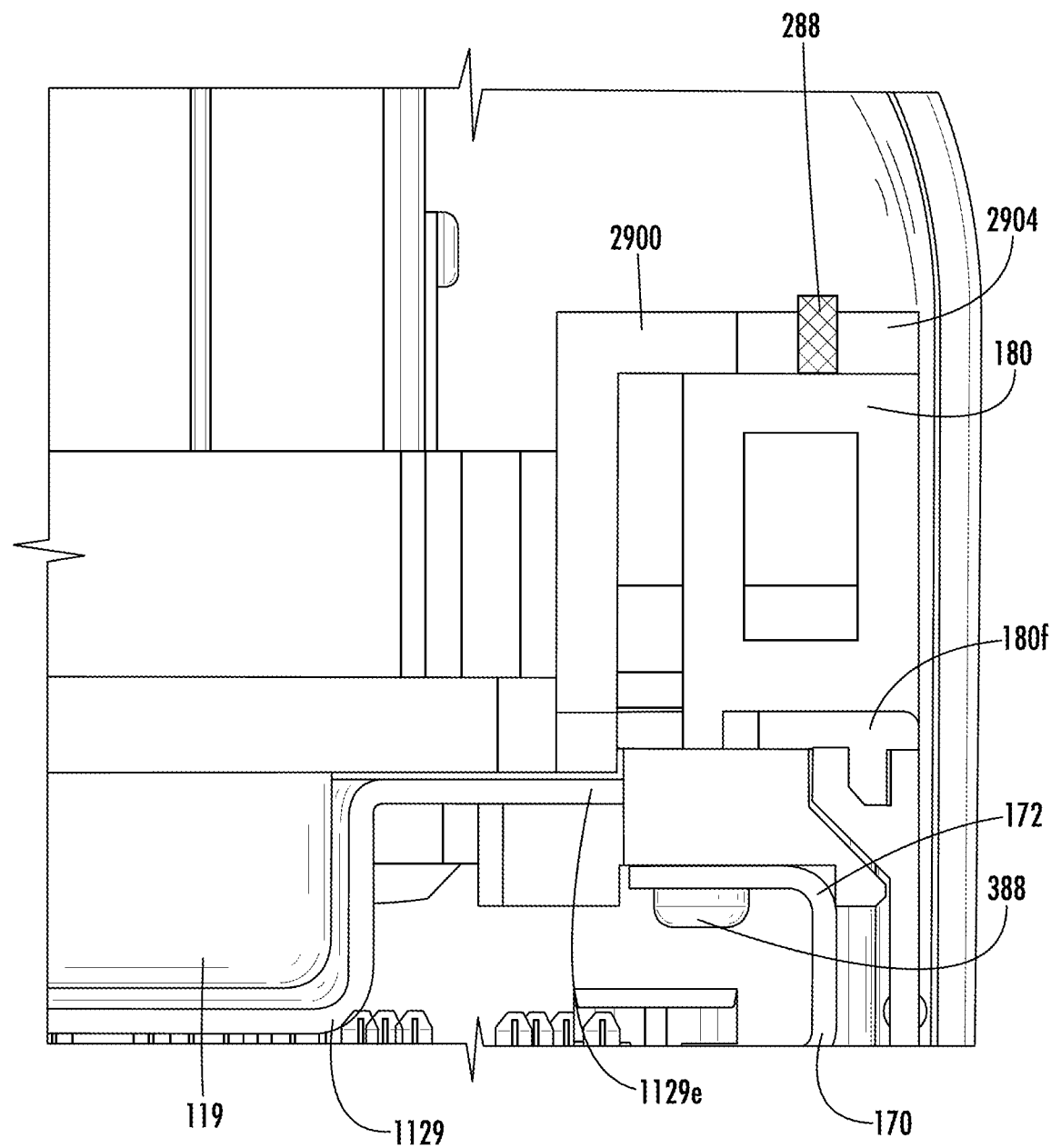
FIG. 24 is a greatly enlarged section view of a portion of the base station antenna with the assembled active antenna shown in FIG. 23C.

In some embodiments, a lower edge 2901 of the adapter member 2900 can comprise a pair of spaced apart prongs 2901p with a gap space 2901g that slidably receives a pin 189 that projects inwardly from a respective rail 180 (FIG. 35A). This lower edge 2901 can define a support point and a rotation center for assembling the active antenna module 110 to the housing 100h for ease of field installation. The pin 189 can have a polymeric jacket 189j to avoid metal to metal contact with the active antenna module 110. The active antenna module 110 can be provided at a number of different angles relative to the housing 100h, and as indicated by arrow "A", slid down until the lower edge 2901 engages the pin 189 and defines a stop, at which time, the active antenna module 110 can be rotated into position, as indicated by arrow "B", optionally with at least the radome 119 thereof positioned in the receiving chamber 155 of the housing 100h. Once in position, fixation members 288 can be inserted through the flat surface 2904 into the rail 180 (FIG. 24).

Figure 26:
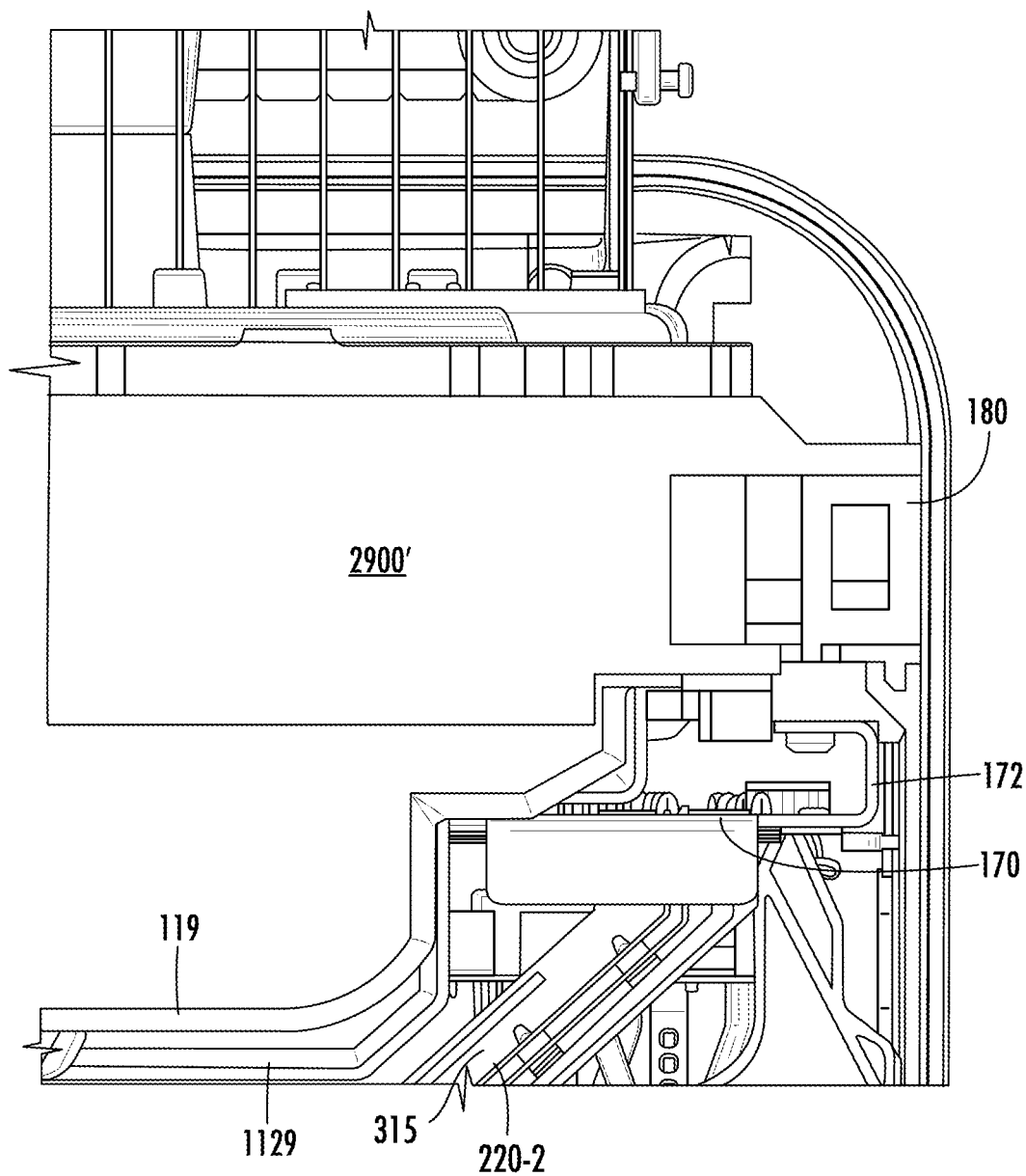
FIG. 26 is a greatly enlarged section view of a portion of the base station antenna with the assembled active antenna shown in FIG. 25C.

FIGS. 25A-26 show another configuration of the active antenna module 110 and another configuration of the at least one adapter member 2900'. As shown, the at least one adapter member 2900 can be provided as single adapter member that defines a frame body with a lower end 2909 and an upper end 2910. Right and left sides of the adapter member 2900' comprise at least one outwardly extending planar surface 2904. In the embodiment shown, there are two laterally outwardly extending, parallel planar surfaces 2904 on each of the right and left side. As shown in FIGS. 25C, 28B, the first surface $2904_1$ (facing the front of the housing 100h) has a greater laterally extending length than the second surface $2904_2$ and resides on the rail 180 and can be affixed to the rail 180 via fixation member 288. A first end 2909 of the adapter 2900' can have a pair of outwardly extending lips 2909l. One lip 2909l can project out further than the other and can attach to the body of the active antenna module 110 while the other lip 2909l attaches to the radome 119. The second opposing end 2910 can be planar and devoid of any lips or outwardly projecting surfaces as shown in FIG. 25A.

The adapter 2900' can surround a calibration circuit board 2980 (FIG. 25B) that can be held between the radome 119 and the radio 1120 of the active antenna module 110.

Referring to FIGS. 23C and 25C, the rails 180 can be provided with a rail frame 180f with a first rear facing surface 182 that abuts the planar surface 2904 of the adapter 2900, 2900'. The rail frame 180f can also include a second front facing, laterally inwardly extending planar surface 184 that extends inwardly a distance greater than the first, rear facing, surface 182. This second surface 184 can couple to the second planar surface $2904_2$ of the adapter 2900'.

Referring to FIGS. 27B, 28B and 40, the rail frame 180f can be configured to sealably couple to the intermediate radome 1129. A curvilinear laterally extending extension 1129c of the intermediate radome 1129 can extend in a curvilinear channel 186 of the rail frame 180f.

The rail frame 180f can releasably or detachably attach to a number of different shaped adapter members 2900, 2900' allowing for different shapes and size and configurations of the active antenna module 110 to be coupled to the antenna housing 100h. FIGS. 23C, 25C, 27A and 28A illustrate that depending on the adapter member 2900, 2900' and the active antenna module 110, the rear 110r of the active antenna module 110 can project out of the rear surface 100r of the housing 100h at different distances D1, D2, as shown, while placing the radome 119 of the active antenna module 110 at substantially the same position (+/−1 mm-5 mm) in the housing 100h facing the external radome 150 of the front 100f of the housing. The distance D2 can be 2-6 inches greater than D1 in some embodiments.

Still referring to FIGS. 23C and 25C, the base station antenna 100 can also include arrays of low band radiating elements 220-1, 220-2 on each side of the inner radome 119, and additional radiating elements 232 residing between the front of the housing 100h/external radome 150 and the intermediate radome 1129 and radome 119 of the active antenna module.

As shown in FIGS. 23C and 25C, pursuant to embodiments of the present invention, low-band radiating elements 220-1, 220-2 are provided that include "tilted" or "angled" feed stalks 221 that can have at least one segment that extends at an oblique angle from the reflector 170. Generally stated, a first end 221e of the feed stalk 221 of low band radiating element 220-1 can be positioned laterally outward of the outermost radiating element of the antenna assembly 1195 of the active antenna module 110 (e.g., a massive MIMO array) and can reside at a right side or a left side of the reflector 170. A feed circuit 315 on the feed stalk 221 comprises RF transmission lines that are used to pass RF signals between the dipole arms of the cross-dipole radiating elements and a feed network of a base station antenna 100. The feed stalk 221 may also be used to mount the dipole arms at an appropriate distance in front of the reflector 170 of base station antenna 100, which is often approximately 3/16 to 1/4 of an operating wavelength. The "operating wavelength" refers to the wavelength corresponding to the center frequency of the operating frequency band of the radiating element 220. The radiating elements 220 can be dipole elements configured to operate in some or all the 617-960 MHz frequency band. The feed circuit 315 typically comprises a hook balun provided on the feed stalk 221. Further discussions of example antenna elements including antenna elements comprising feed stalks can be found in co-pending U.S. Provisional Patent Application Ser. No. 63/087,451 and 62/993,925, the contents of which are hereby incorporated by reference as if recited in full herein.

Figure 29:
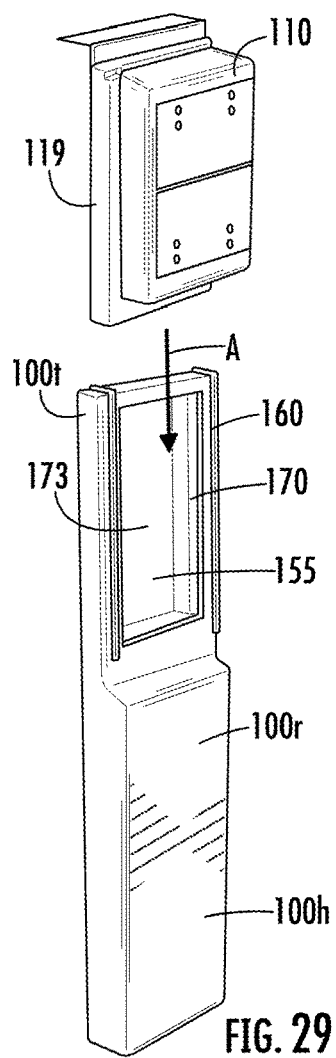
FIG. 29 is a side perspective view of an active antenna module aligned for installation to a base station antenna housing from a top end thereof according to embodiments of the present invention.
Figure 30B:
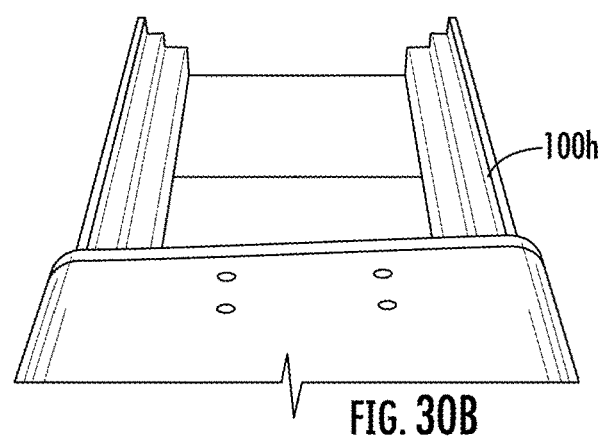
FIG. 30B is a partial bottom perspective view of the passive antenna housing shown in FIG. 29.

Turning now to FIGS. 29, 30A and 30B, a first embodiment of a field installation configuration is shown. The active antenna module 110 can be simply inserted from the top 100t of the housing and slides into the top cap and middle cap regions as shown by arrow A. The active antenna module 110 is a sealed unit comprising an array of antenna elements 1195 and radio circuitry 1120 and with the radome 119 as discussed above.

Figure 31A:
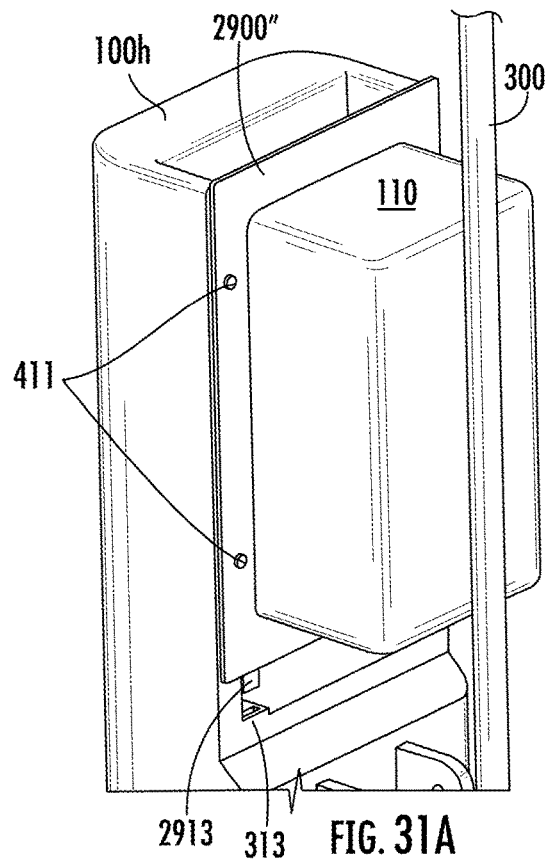
FIG. 31A is a side perspective view of an active antenna module aligned for installation to a base station antenna housing according to embodiments of the present invention.
Figure 31B:
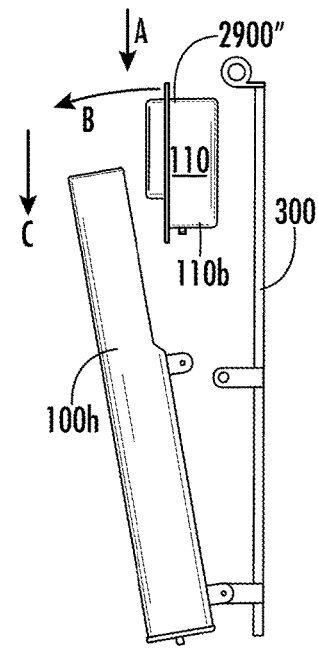
FIG. 31B is an enlarged top, side perspective view of a portion of the base station antenna shown in FIG. 31A with the active antenna module assembled thereto.
Figure 32A:
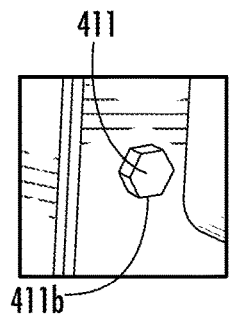
FIGS. 32A and 32B are examples of fixed attachment configurations for the assembled base station antenna shown in FIG. 31B.
Figure 32B:
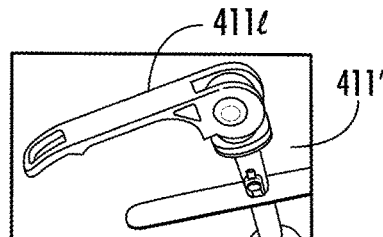
Figure 33A:
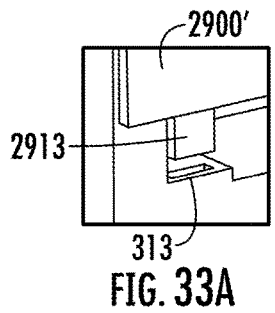
FIGS. 33A-33C are enlarged bottom side perspective views of the active antenna module and bottom support features according to embodiments of the present invention.
Figure 33B:
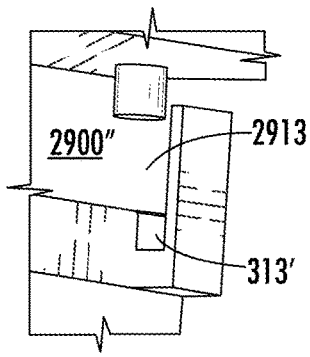
Figure 33C:
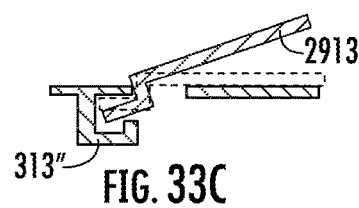
Figure 36:
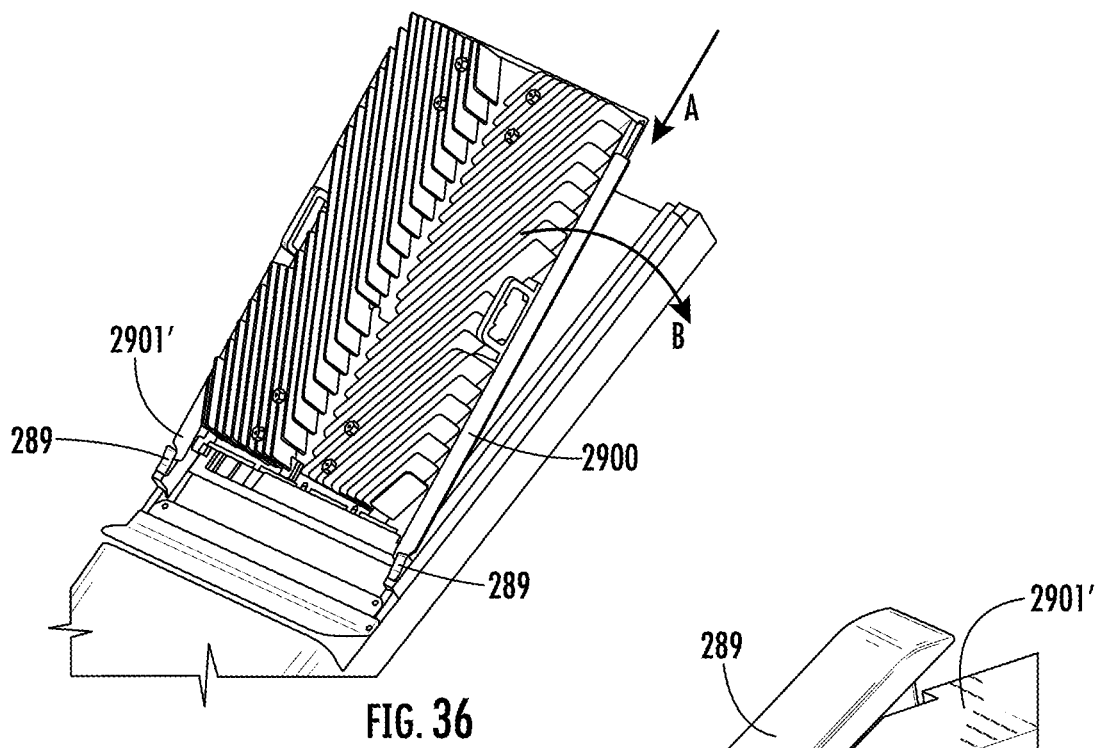
FIG. 36 is a side perspective view of a portion of a base station antenna with an active antenna module for installation thereto according to additional embodiments of the present invention.
Figure 37A:
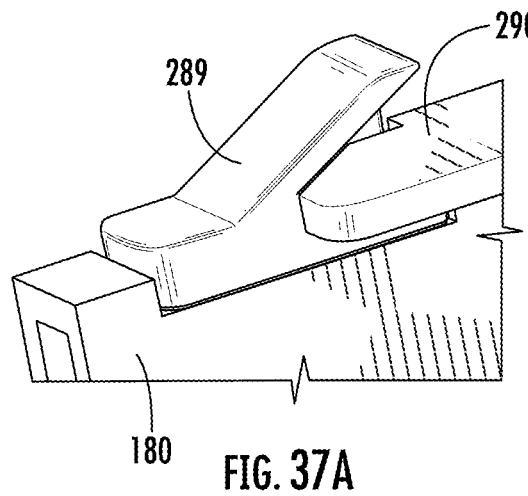
FIG. 37A is an enlarged side perspective view of the bottom portion of the adapter plate shown in FIG. 36.
Figure 37B:
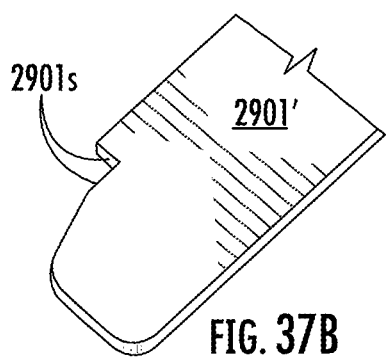
FIG. 37B is an enlarged side perspective view of a bottom portion of the adapter plate shown in FIG. 37A.
Figure 37C:
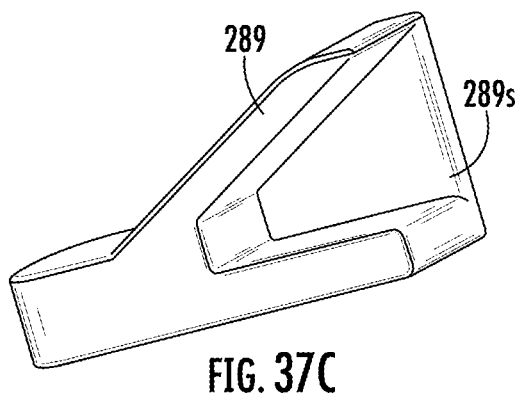
FIG. 37C is an enlarged side perspective view of the stop block shown in FIG. 37A.
Figures 38, 39A:
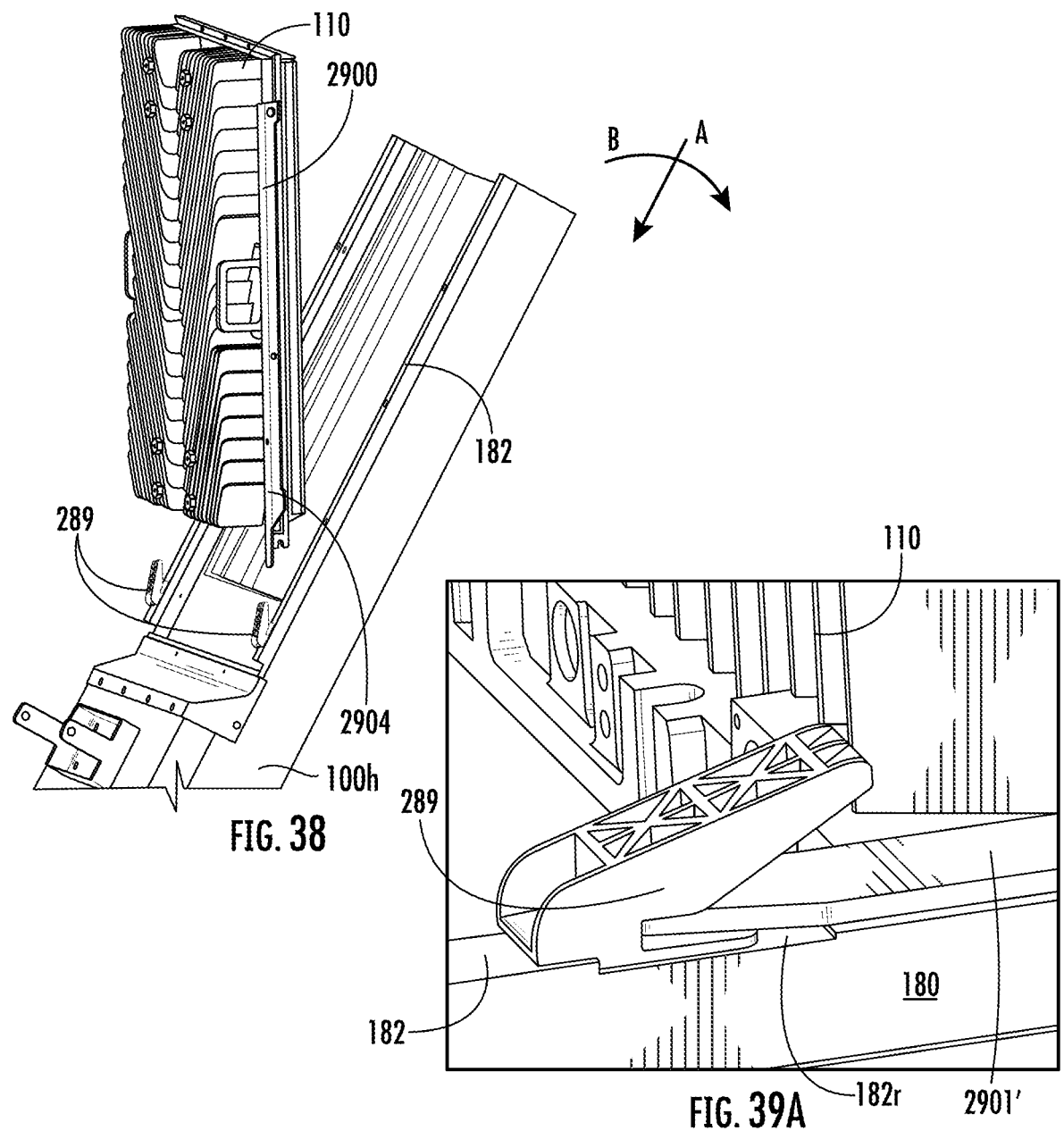
FIG. 38 is a side perspective view of a portion of a base station antenna with an active antenna module for installation thereto according to additional embodiments of the present invention.
FIG. 39A is an enlarged side perspective view of a bottom portion of the adapter plate and stop block shown in FIG. 38.
Figure 39C:
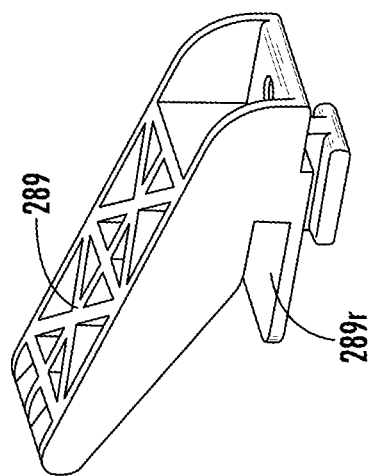
FIG. 39C is an enlarged side perspective view of the stop block shown in FIG. 39B.
Figure 39B:
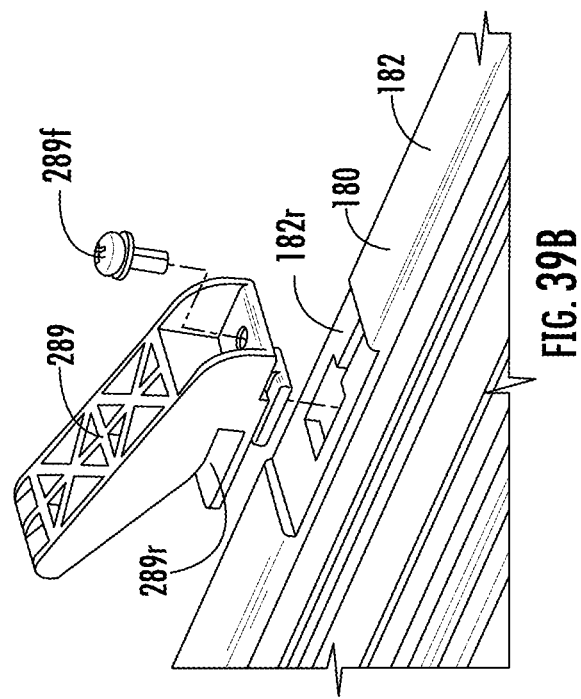
FIG. 39B is an enlarged side perspective, partially exploded, view of the stop block and rail frame of the passive antenna shown in FIG. 38.

Turning now to FIGS. 31A, 31B, 32A, 32B, 33A-33C, another installation configuration using a bottom support 313 in antenna housing 100h can be used. As shown in FIG. 31B, this allows for the active antenna module 110 to be assembled at various angles relative to the housing 100h which may facilitate ease of field installation. The bottom 110b of the active antenna module 110 can engage the housing 100h first, then rotate inward at the desired longitudinal stop location or slide downward to fully engage the lower stop location (indicated by arrows A, B, C). The adapter member 2900" can be provided with a support feature 2913 at the bottom, extending a distance under the bottom 110b of the active antenna module 110. The adapter member 2900" can then be affixed to the housing 100h using fixation members 411 which can be bolts 411b (FIG. 32A) or latches 411l (FIG. 32B) or other fixation devices. FIGS. 31A, 33A illustrate a tab configuration of the support feature 2913, which can be provided on right and left sides or in a middle region at the rear 100r of the housing 100h. FIG. 33B illustrates a channel with an open top and closed bottom (such as an extruded channel) that engages the support feature 2913. FIG. 33C illustrates a snap fit configuration of the support feature 2913 and bottom support 313" provided by the housing 100h.

Turning to FIGS. 34, 35A, 35B, 35C, as discussed above, the bottom support structure can comprise a bolt 189 that engages a lower edge 2901 of the adapter member 2900.

FIGS. 36 and 37A-37C illustrates a stop block 289 extending upward from the rail 180 instead of a laterally extending bolt 189 and the lower edge 2901' of the adapter member 2900' can comprise a planar configuration with a stepped perimeter that engages the stop sidewall 289s of the stop block 289 while the planar lower edge 2901' extends into the stop block 289. The stop block 289 can comprise a polymer to avoid metal to metal contact.

FIGS. 38 and 39A-39C illustrate another embodiment of the stop block 289 which does not require the side stop wall shown above. The stop block 289 can be fixed via a fixation member 289f such as a bolt or threaded screw the first surface 182 of the rail 180 to position the rear surface 289r of the stop block 289 to be flush with the first surface 182 of the rail 180.

Figure 40A:
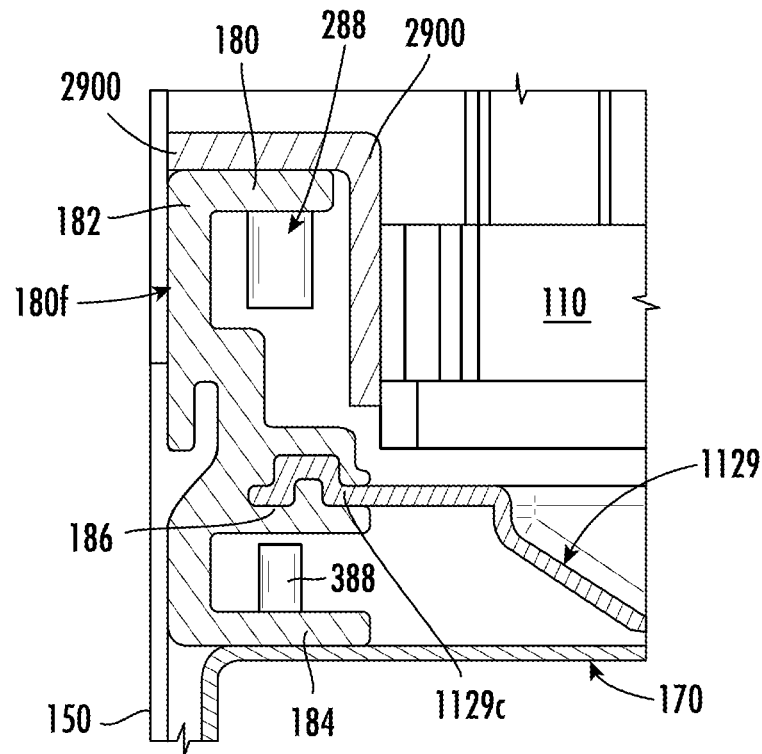
FIG. 40A is an enlarged simplified section view of a portion of an optimized rail assembly of a passive antenna with a cooperating adapter plate of an active antenna module according to embodiments of the present invention.
Figure 40B:
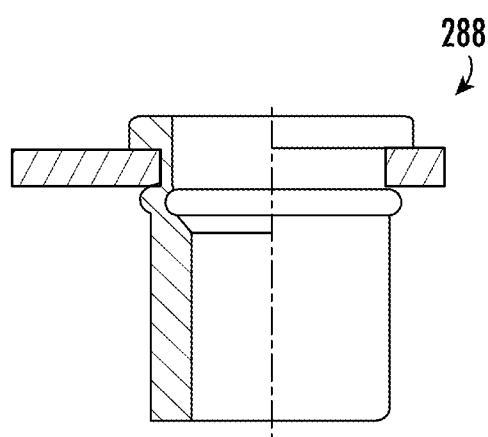
FIG. 40B is an enlarged partial section view of a rivet nut used to strengthen the structure of the antenna rail assembly shown in FIG. 40A according to embodiments of the present invention.

FIGS. 40A and 40B illustrate the rail frame 180f which is configured to provide support and sealing functionality (sealing to the intermediate radome or skin 1129) as discussed above. The passive reflector 170 can be fixed to the frame 180f using a fixation member 388 such as a rivet. The adapter 2900 can be fixed to the rail frame 180f with a rivet nut 288 to strengthen the rails 180 when certain materials having light weight (e.g., aluminum) are used.

Figure 41A:
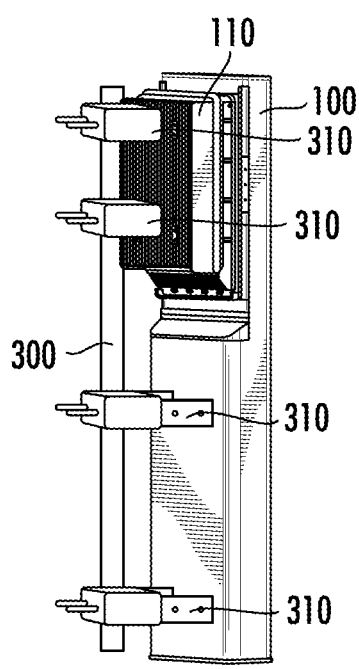
FIG. 41A is a side perspective view of a fixed tilt mountable base station antenna configuration according to embodiments of the present invention.
Figure 41B:
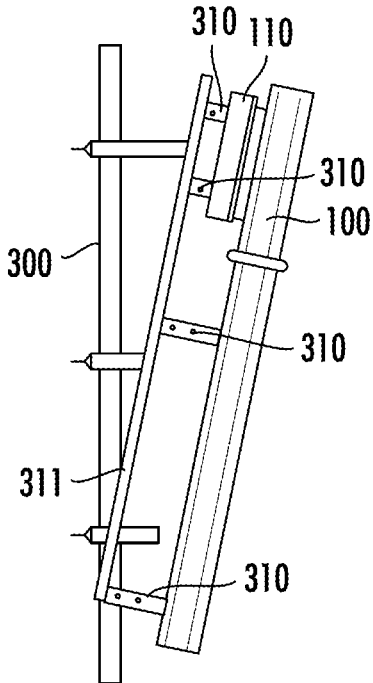
FIG. 41B is a side perspective view of an adjustable tilt mountable base station configuration according to embodiments of the present invention.
Figure 41C:
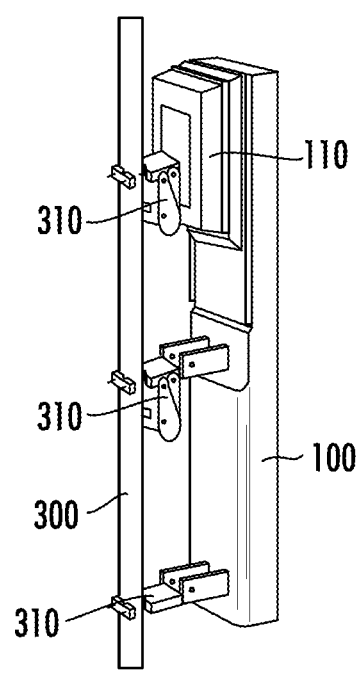
FIG. 41C is a side perspective view of another adjustable tilt mountable base station configuration according to embodiments of the present invention.

FIGS. 41A and 41B illustrates fixed and adjustable tilt configurations, respectively, of the base station antenna 100 with associated mounting hardware. In these embodiments, there can be four attachment locations between the base station antenna 100 and three or four attachments to the mounting structure 300, such as a pole as shown. For the adjustable tilt configuration shown in FIG. 41B, a tilt rod fixture 311 can be used. FIG. 41C illustrates an adjustable tilt configuration using three direct attachment points provided by mounting hardware/brackets 310 between the base station antenna 100 and mounting structure 300 without requiring the tilt rod fixture 311. The base station antenna and mounting structure 300 components can be mechanically attached allowing for only three longitudinally spaced apart mount brackets 310 and a full tilt range while reducing weight of the mounting hardware by 20% or more over the configuration shown in FIG. 41B and 8% over the fixed tilt configuration shown in FIG. 41A.

Figure 41D:
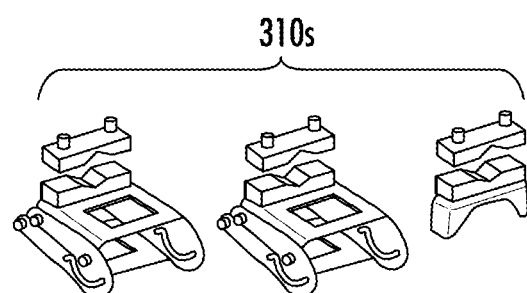
FIG. 41D is a set of mounting hardware allowing for 0-10 degrees of adjustable tilt according to embodiments of the present invention.
Figure 41E:
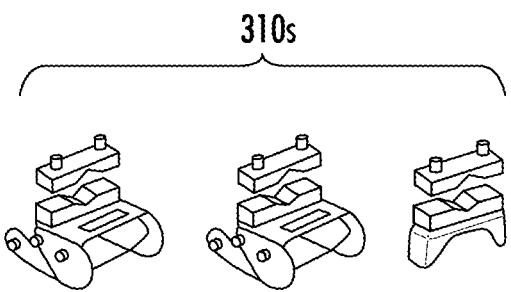
FIG. 41E is a set of mounting hardware allowing for 0-5 degrees of adjustable tilt according to embodiments of the present invention.

FIGS. 41D and 41E illustrate sets 310s of three pieces of mounting hardware 310 configured for providing 0-10 degree tilt (FIG. 41D) and a 0-5 degree tilt (FIG. 41E) mounting orientation of the base station antenna 100. Only one mounting bracket 310 of the set of the mounting hardware 310s is required to be affixed to the active antenna unit 110 as shown in FIG. 41C.

Turning now to FIGS. 42, 43, 44A-44C, 45A and 45B, the adapter 2900''' of the active antenna module 110 can be configured to first couple to a top support feature 1311 allowing the active antenna module 110 to be placed at a number of angles relative to the housing 100h, then slid down to couple to the top support feature (arrow A), then rotated inward (arrow B), then optionally slid further down a distance (arrow C). Fixation members 411 can then be used to attach the active antenna module 110 to the housing 100h. The top support feature 1311 can provided as a hook channel 1311 that captures a hook 2923 of the adapter member 2900' (FIG. 44A), an extruded channel 1312 that receives a segment 2924 of the adapter member 2900''' or even a longitudinally extending bolt channel 2925 with a bolt opening at one end sized to receive the head of the bolt 1313 that merges into a narrower segment. The bolt channel is shown as provided in the adapter member 2900''' but the reverse configuration can be used with the bolt channel 2925 can be provided in the housing 100h and the bolt 1313 in the adapter 2900′″. Again, the fixation members 411 can be bolts 411b or latches 411l or other members.

Figure 46A:
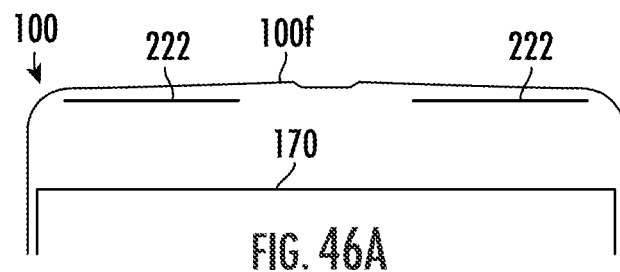
FIG. 46A is a simplified section view of a portion of a base station antenna according to embodiments of the present invention.
Figure 46B:
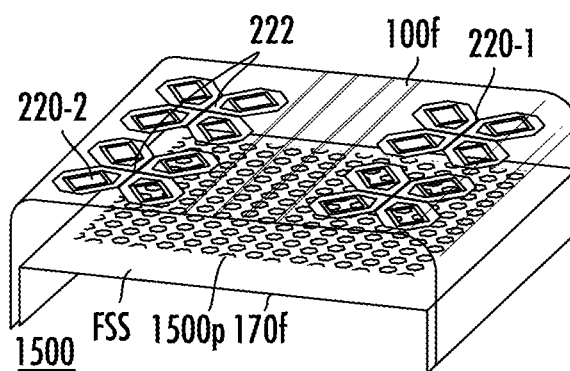
FIG. 46B is a simplified perspective view of the portion of the base station antenna shown in FIG. 46A with the reflector provided as a frequency selective surface and/or substrate ("FSS") according to embodiments of the present invention.
Figure 46C:
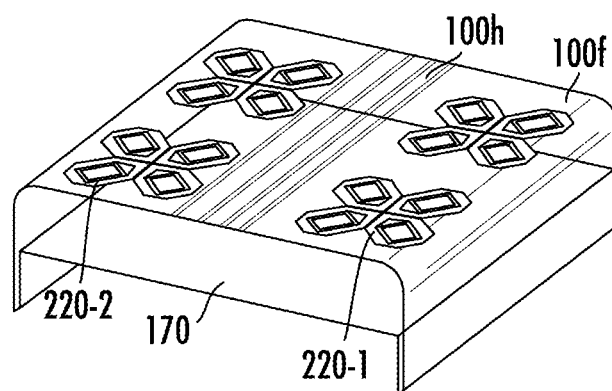
FIG. 46C is a simplified perspective view of the portion of the base station antenna shown in FIG. 46A with the reflector provided as a metal reflector according to embodiments of the present invention

Turning now to FIGS. 46A-46C, a portion of a base station antenna 100 with a passive antenna reflector 170 and radiating elements 222 inside an external radome defined by a front 100f of the base station antenna housing 100k according to some embodiments of the present invention is shown. As discussed above, the radiating elements 222 can be low band radiating elements provided in a plurality of linear arrays (columns) 220-1, 220-2. FIG. 46B illustrates the passive antenna reflector 170 can be provided as a frequency selective surface and/or substrate ("FSS") 170f comprising an FSS material 1500. FIG. 46C shows the reflector 170 provided as a metal reflector.

Figure 47A:
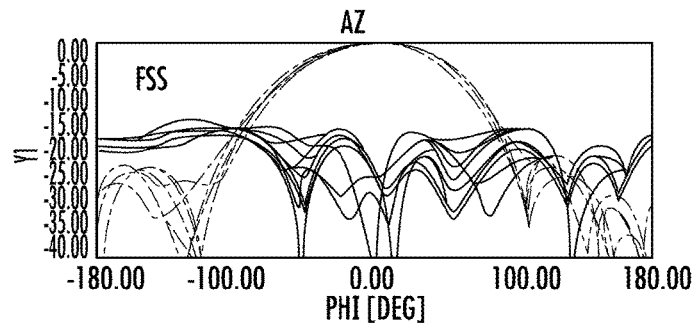
FIG. 47A is a graph of the azimuth pattern for an antenna beam generated by one of the lower-band linear arrays included in the base station antenna of FIG. 46B, as generated by a computational model.
Figure 47B:
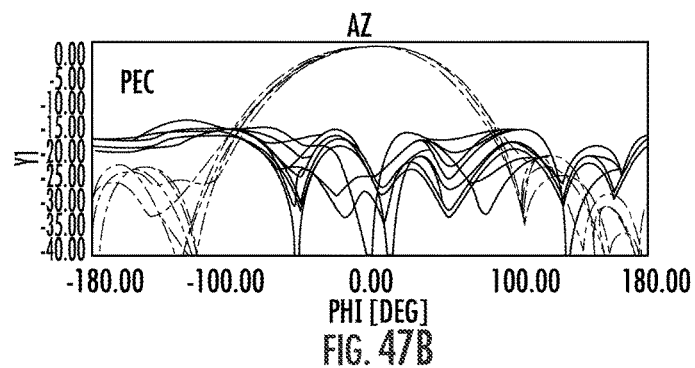
FIG. 47B is a graph of the azimuth pattern for an antenna beam generated by one of the lower-band linear arrays included in the base station antenna of FIG. 46C, as generated by a computational model.
Figure 47C:
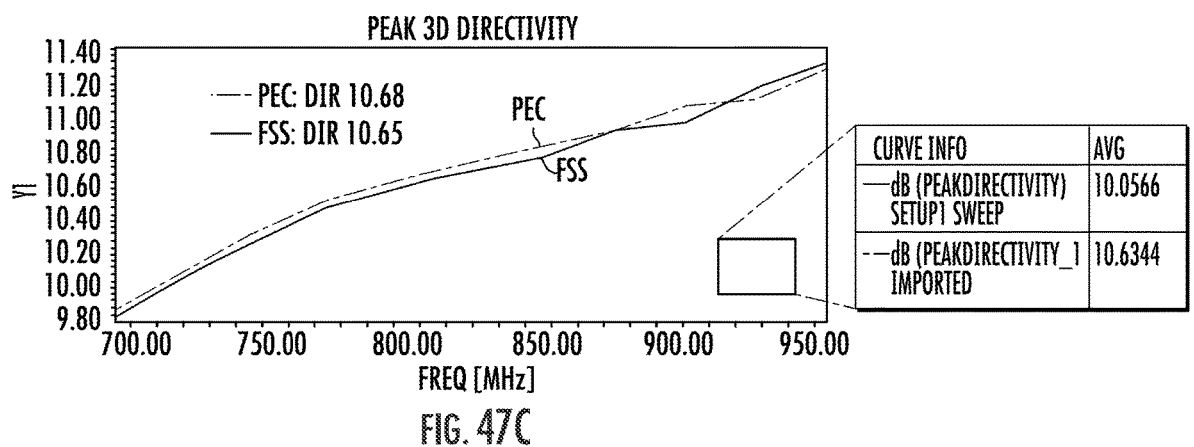
FIG. 47C is a graph of peak three-dimensional directivity comparing the reflectors shown in FIGS. 46B and 46C.
Figure 47D:
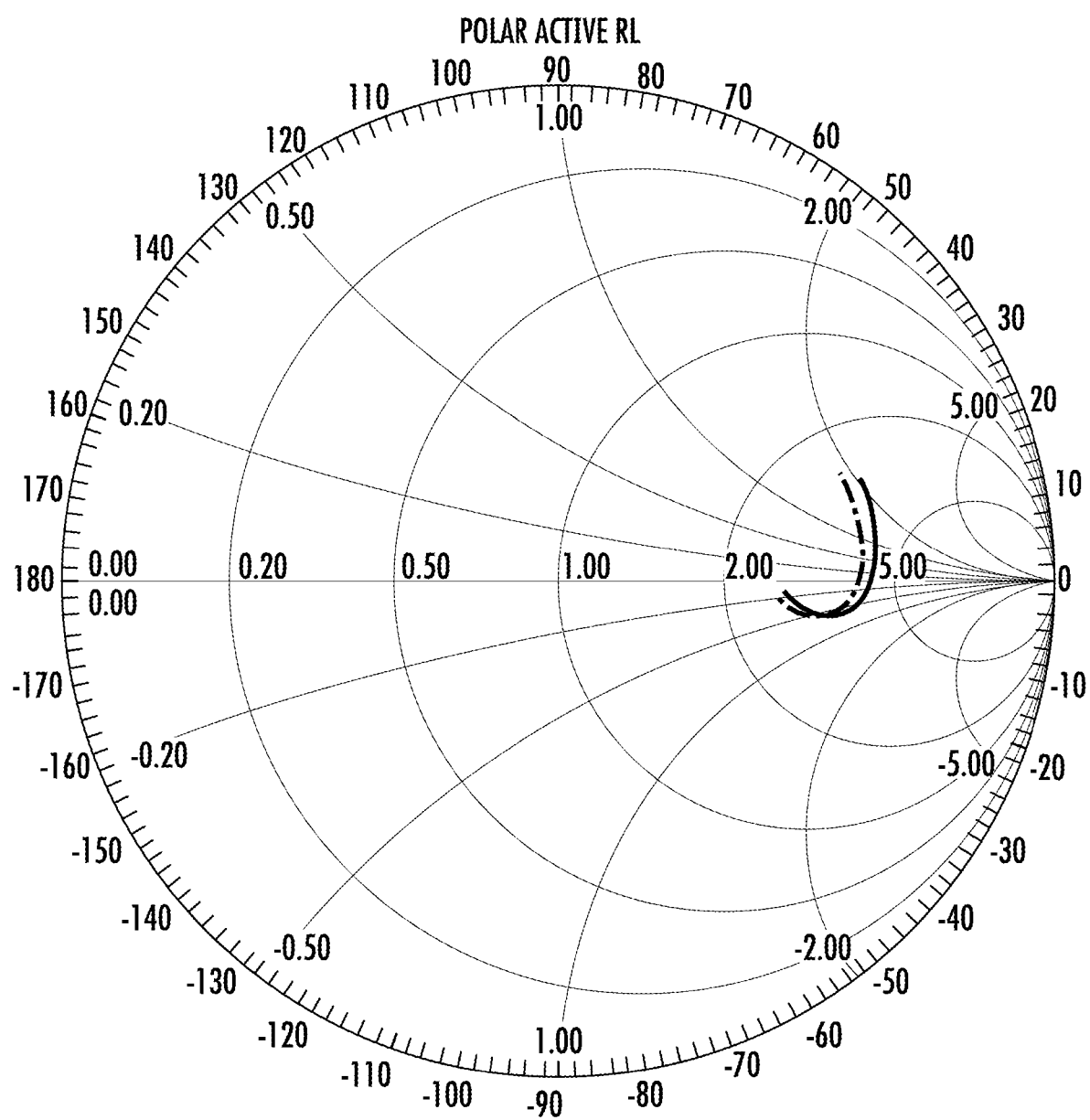
FIG. 47D is a polar active chart comparing performance of the reflectors shown in FIGS. 46B and 46C, as generated by a computational model.
Figure 48A:
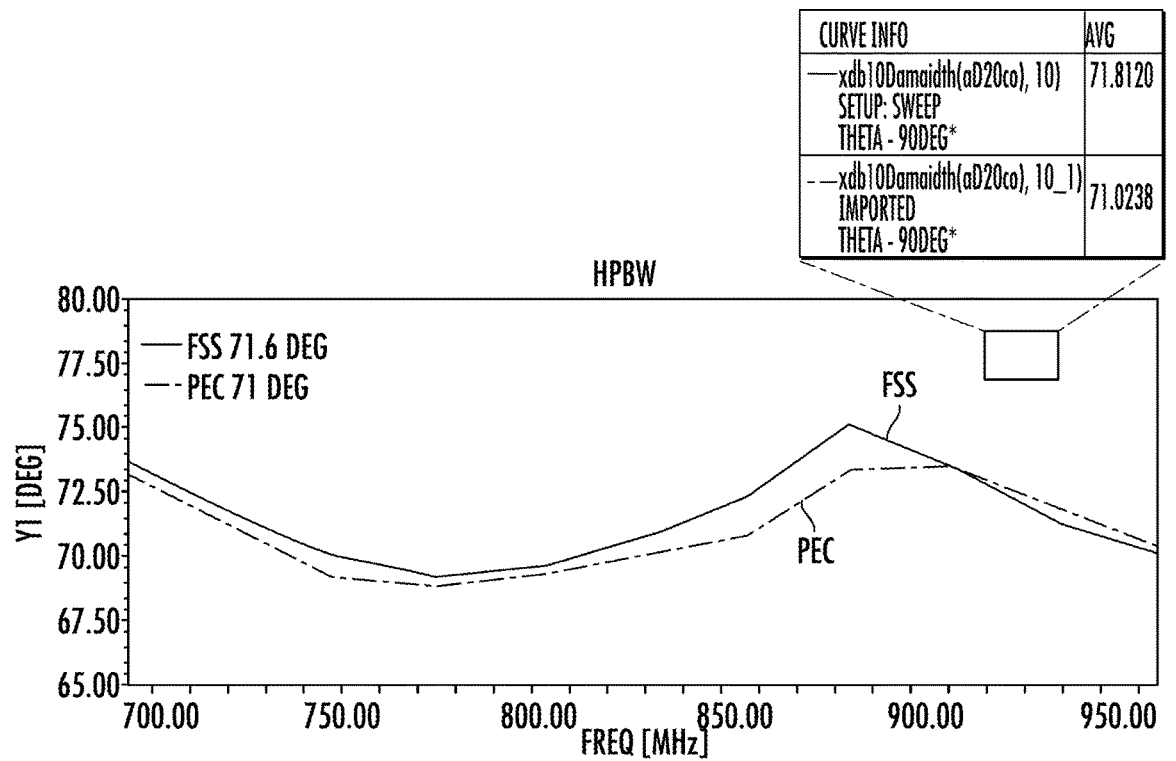
FIG. 48A is a graph of the azimuth half power beamwidth (deg) versus frequency (MHz) for one of the low band arrays for antennas that use the FSS reflector shown in FIG. 46B and the metal (PEC) reflector shown in FIG. 46C, as generated by a computational model.
Figure 48B:
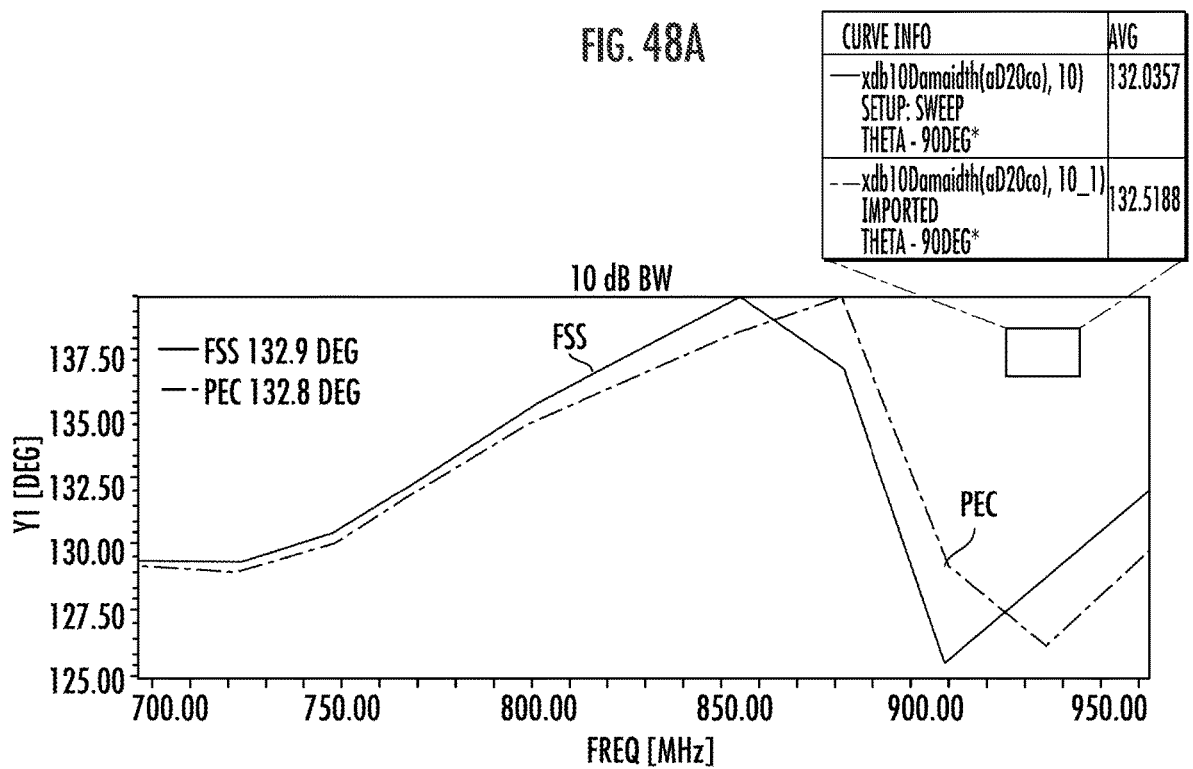
FIG. 48B is a graph of the azimuth 10 dB beamwidth (deg) versus frequency (MHz) for one of the low band arrays for antennas that use the FSS reflector shown in FIG. 46B and the metal (PEC) reflector shown in FIG. 46C, as generated by a computational model.

FIG. 47A is a graph of the azimuth pattern for an antenna beam generated by one of the lower-band linear arrays included in the base station antenna of FIG. 46B, as generated by a computational model. The reflector 170f illustrated comprises a dielectric constant of 3.7. However, it is contemplated that materials with lesser or greater dielectric constants can be used. FIG. 47B is a graph of the azimuth pattern for the antenna beam based on a metal reflector (PEC refers to perfect electric conductor, e.g., the ideal case for a conductor) as shown in FIG. 46C, as generated by a computational model. FIGS. 47C, 47D, 48A and 48B are additional graphs comparing the low band performance of the configurations of FIGS. 46B and 46C. The computational model(s) show that low band performance of both configurations is substantially similar.

Figure 49A:
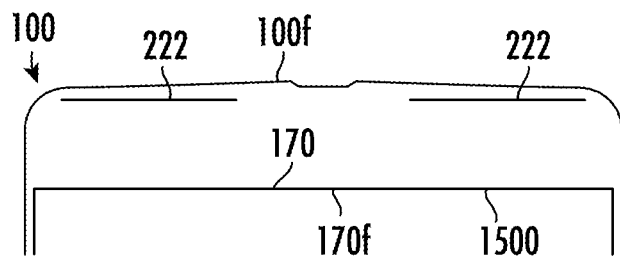
FIG. 49A is a simplified section vie of a portion of a base station antenna according to embodiments of the present invention.
Figure 49B:
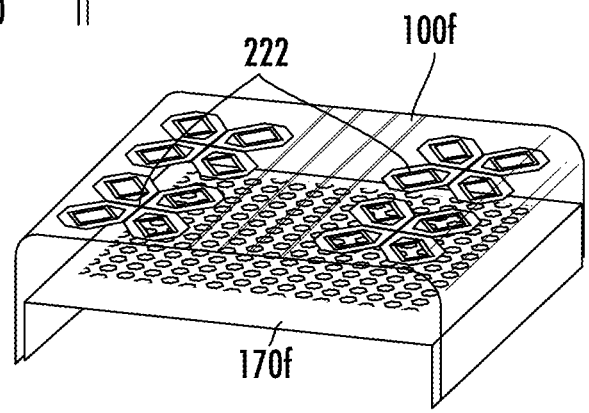
FIG. 49B is a simplified perspective view of the portion of the base station antenna shown in FIG. 49A with the reflector provided as a frequency selective surface and/or substrate ("FSS") according to embodiments of the present invention.

FIG. 49A and FIG. 49B illustrate a portion of a base station antenna 100 with the passive antenna reflector 170 provided as a frequency selective surface and/or substrate ("FSS") 170f with the FSS material 1500 according to embodiments of the present invention.

Figure 50A:
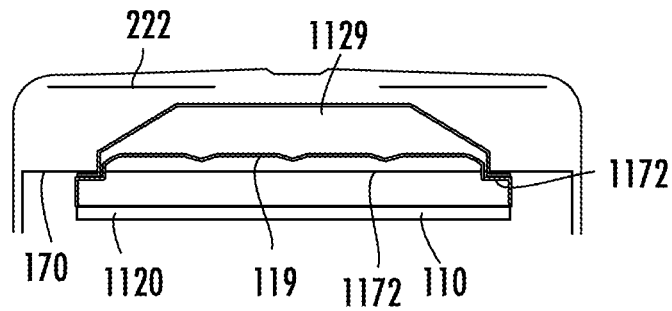
FIG. 50A is a simplified section view of a portion of a base station antenna according to embodiments of the present invention.
Figure 50B:
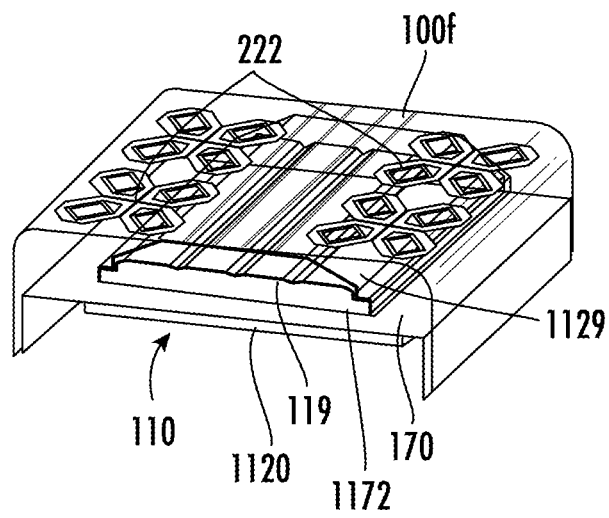
FIG. 50B is a simplified perspective view of the portion of the base station antenna shown in FIG. 50A with two internal radomes residing between an active antenna reflector (capacitively coupled to a metal passive antenna reflector) and the external radome of the base station antenna according to embodiments of the present invention.
Figure 51:
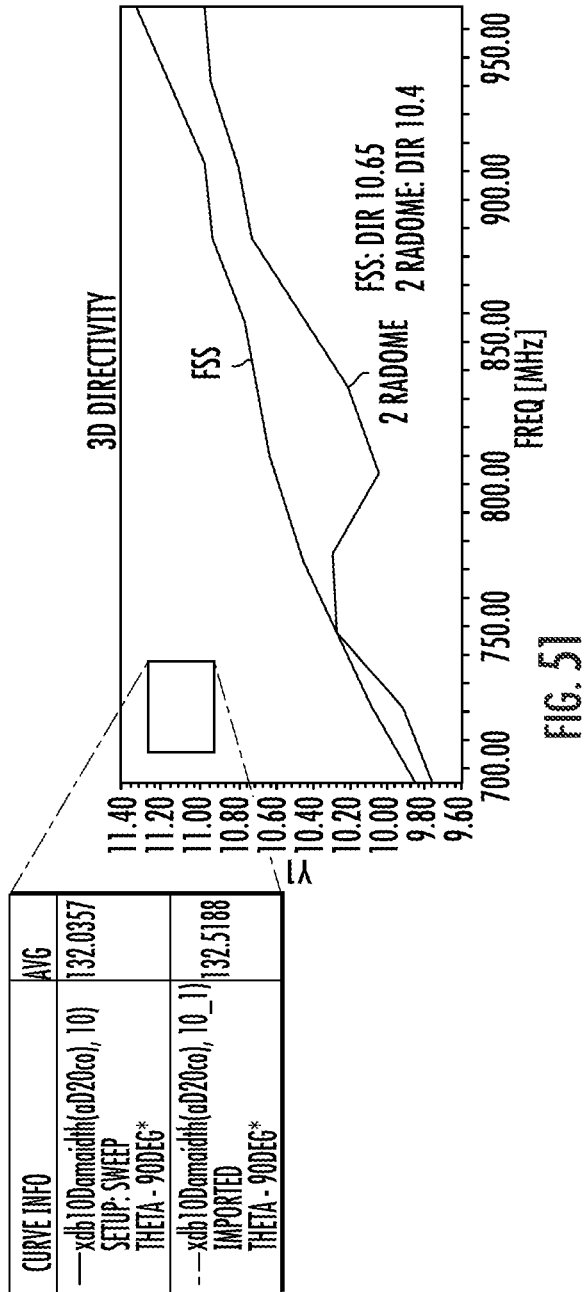
FIG. 51 is a graph of the directivity (in dB) of the low-band arrays versus frequency (MHz) for the base station antennas shown in FIGS. 50A and 50B according to embodiments of the present invention.
Figure 52A:
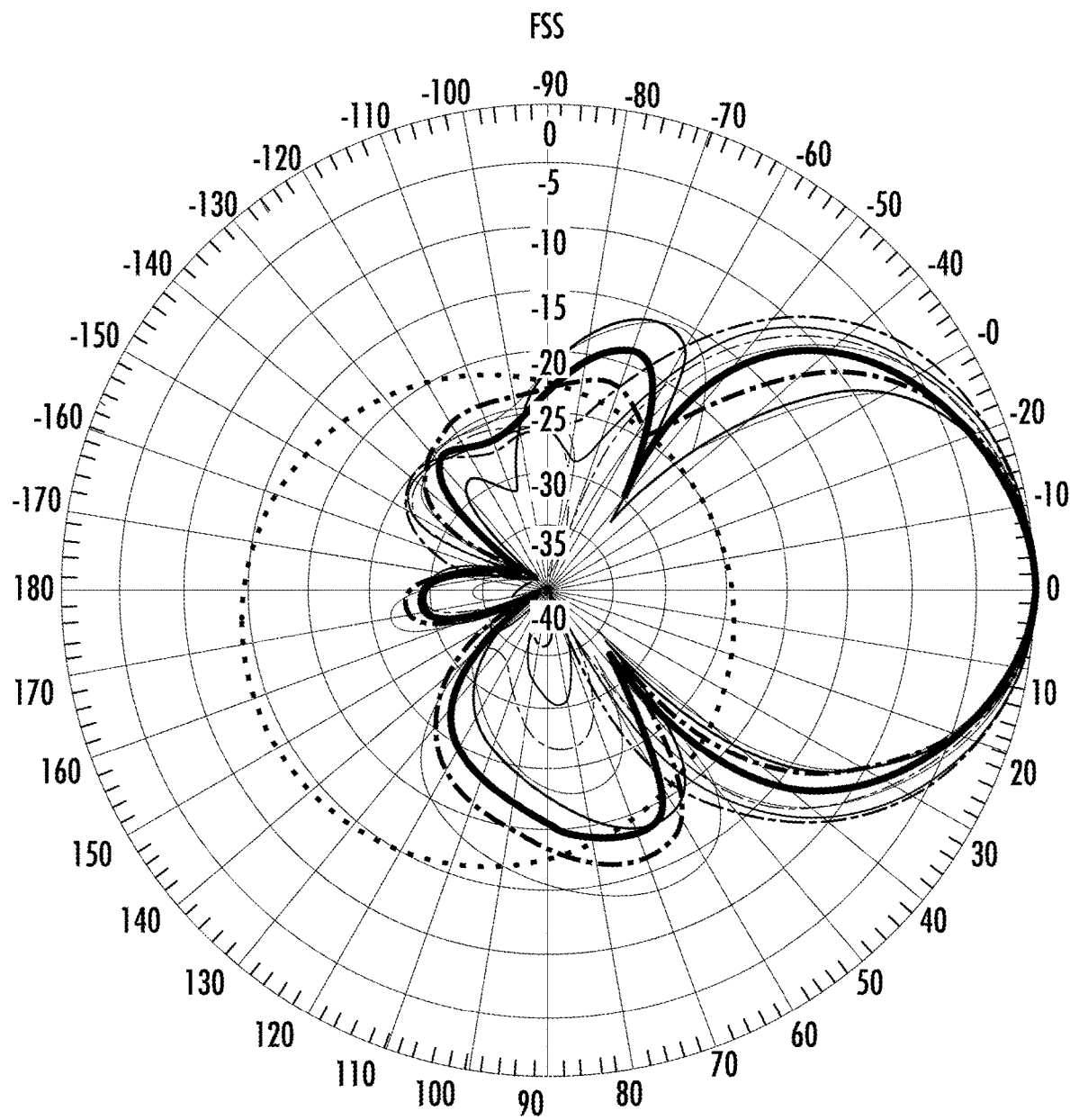
FIGS. 52A and 52C are active Smith charts of one of the lower-band linear arrays included in the base station antenna shown in FIG. 49B, as generated by a computational model.
Figure 52B:
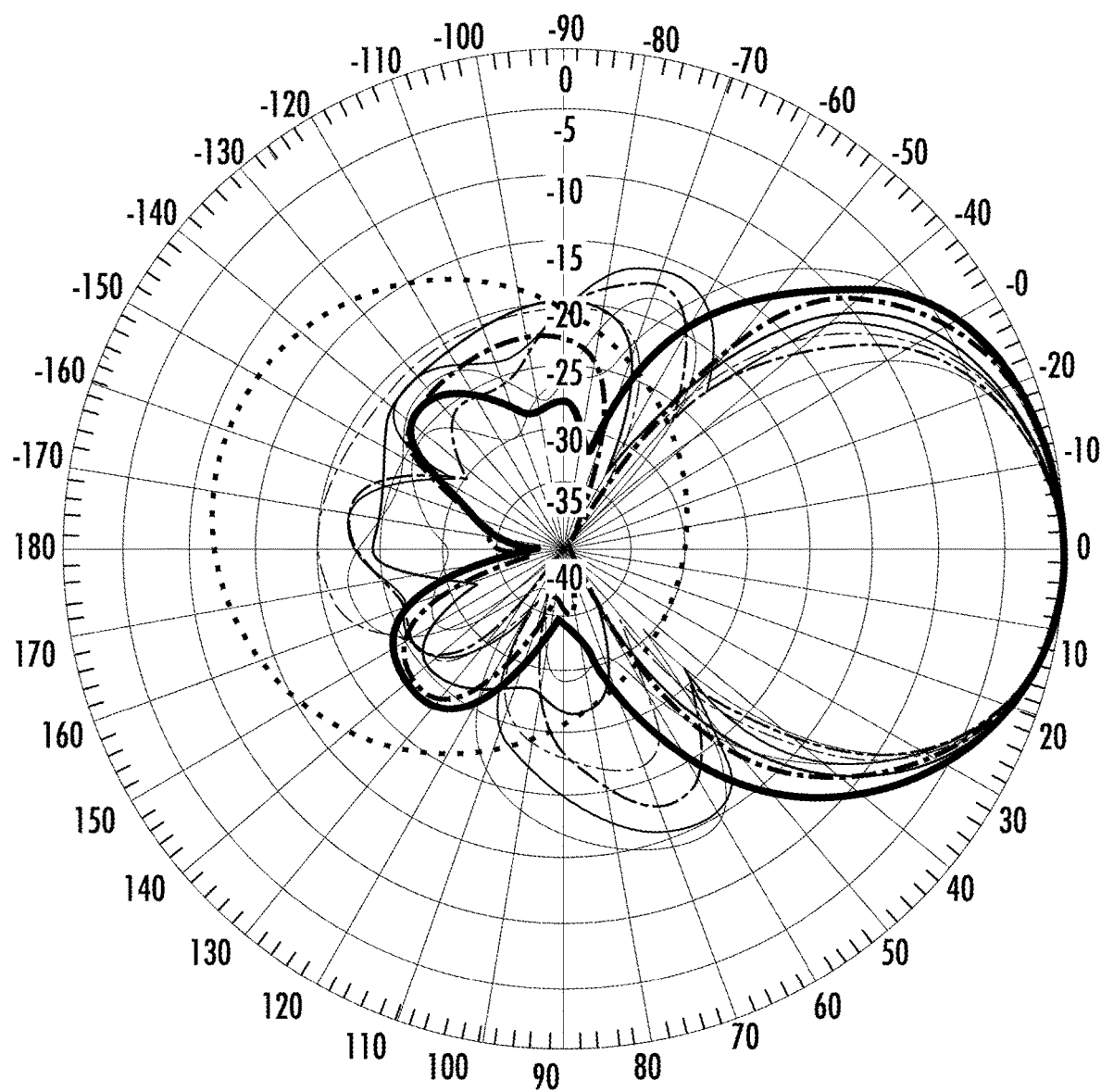
FIGS. 52B and 52D are active Smith charts of one of the lower-band linear arrays included in the base station antenna shown in FIG. 50B, as generated by a computational model.
Figure 52C:
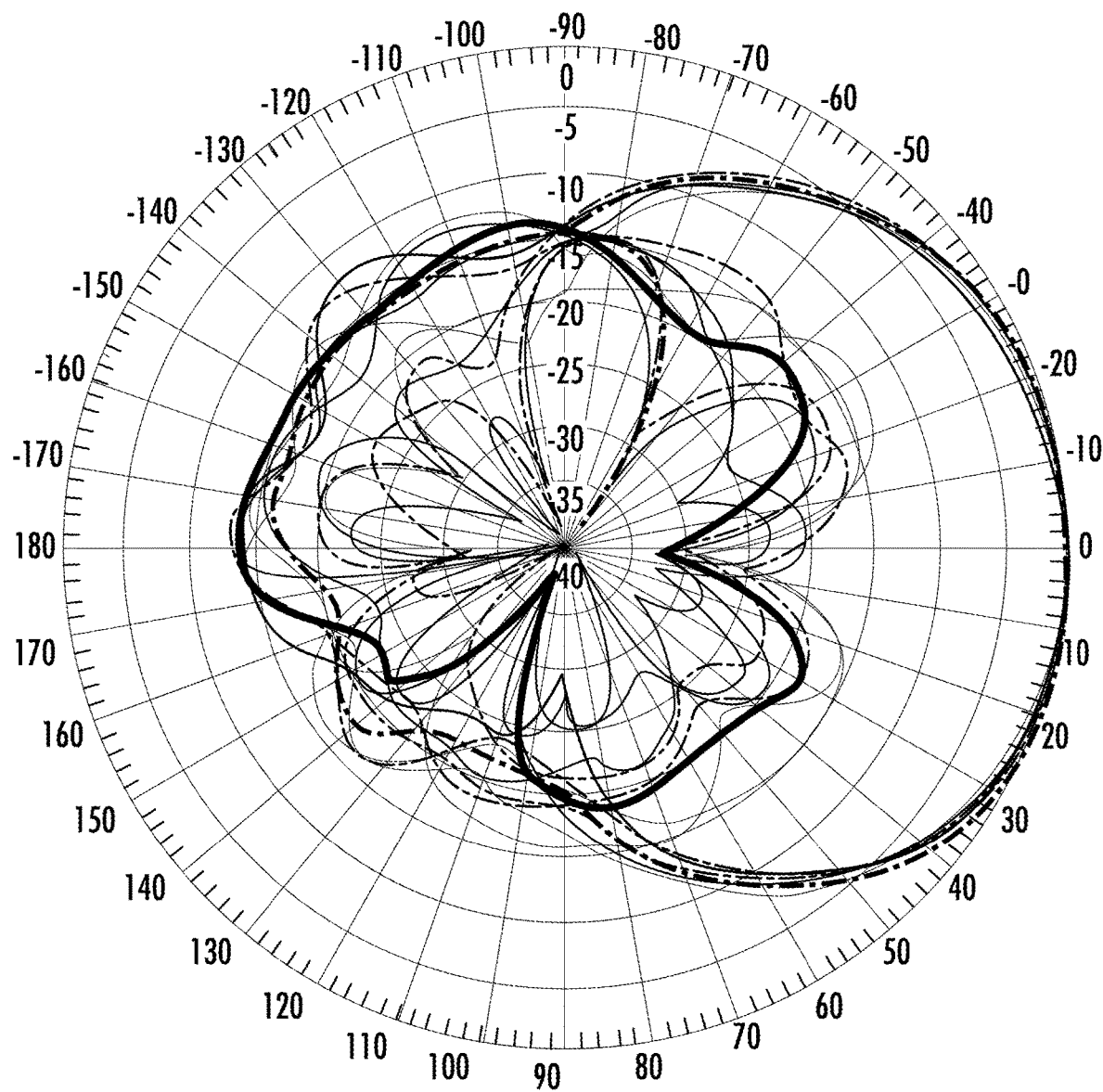
Figure 52D:
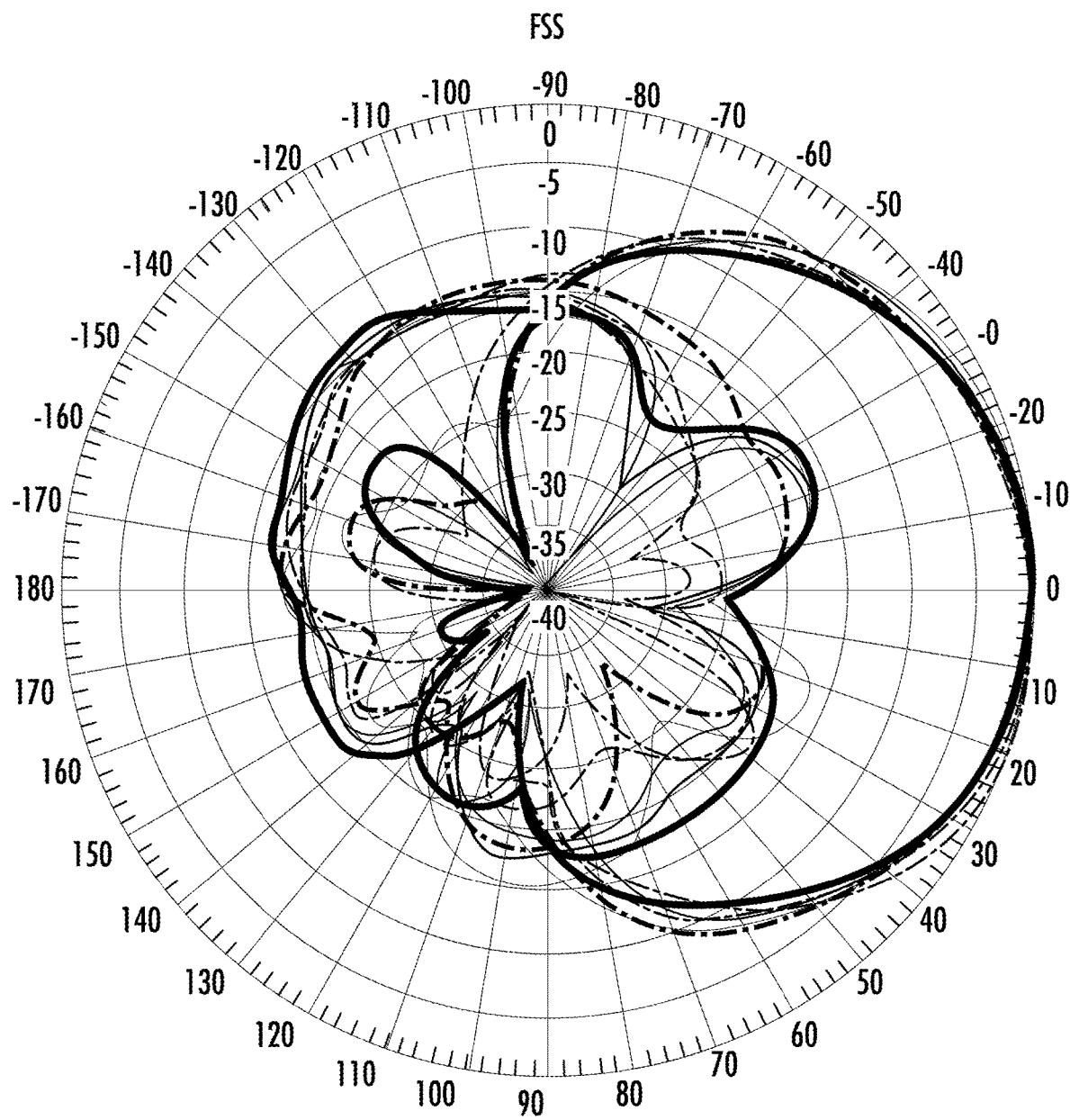
Figure 53A:
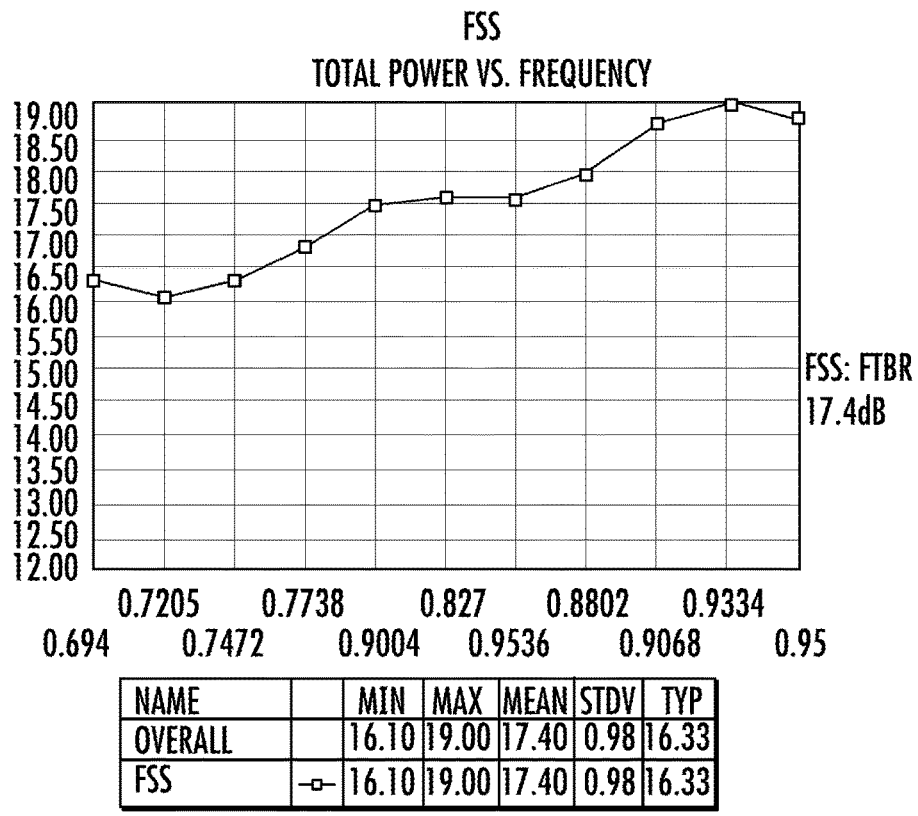
FIG. 53A is a graph of the front-to-back ratio versus frequency (at 180 deg, +/−30 deg) of the base station antenna shown in FIG. 49B, as generated by a computational model.
Figure 53B:
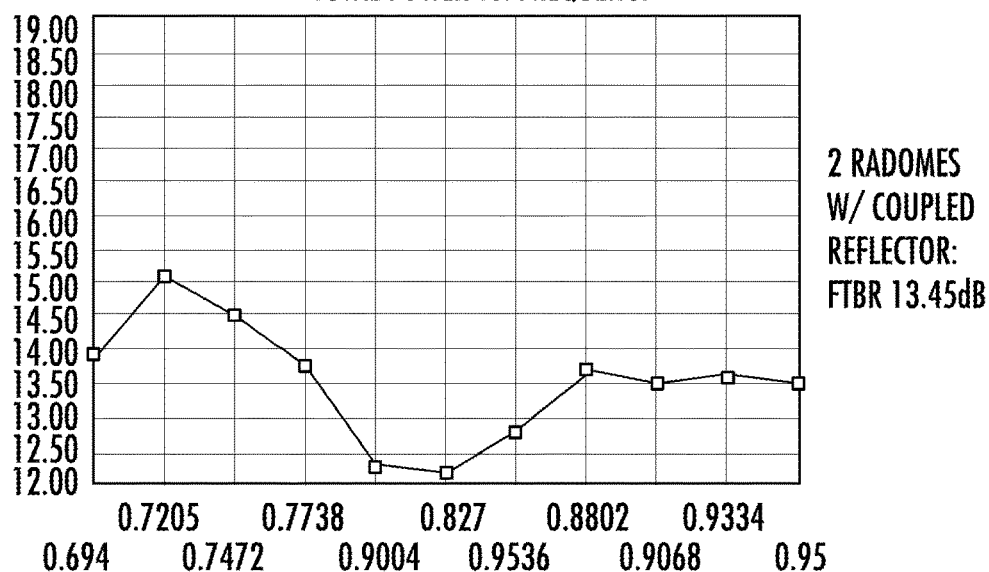
FIG. 53B is a graph of the front-to-back ratio versus frequency (at 180 deg, +/−30 deg) of the base station antenna shown in FIG. 50B, as generated by a computational model.

FIG. 50A and FIG. 50B illustrate a portion of the base station antenna 100 with two internal radomes 119, 1129, residing between an active antenna reflector 1172 of the active antenna module 110 comprising radio circuitry 1120 and the external radome defined by the front 100f of the base station antenna 100 according to embodiments of the present invention. The active antenna reflector 1172 can be (capacitively) coupled to a metal passive antenna reflector 170.

FIGS. 51, 52A-52D, 53A and 53B are graphs generated by a computational model(s) comparing (low band) performance of the devices shown in FIGS. 49A and 50A. The front-to-back ratio for the antenna with the FSS reflector 170f is about 17.4 dB verses a front-to-back ratio of 13.45 dB for the two intermediate radomes configuration with the active antenna reflector 1172 coupled to the (metal) reflector 170.

Figure 54A:
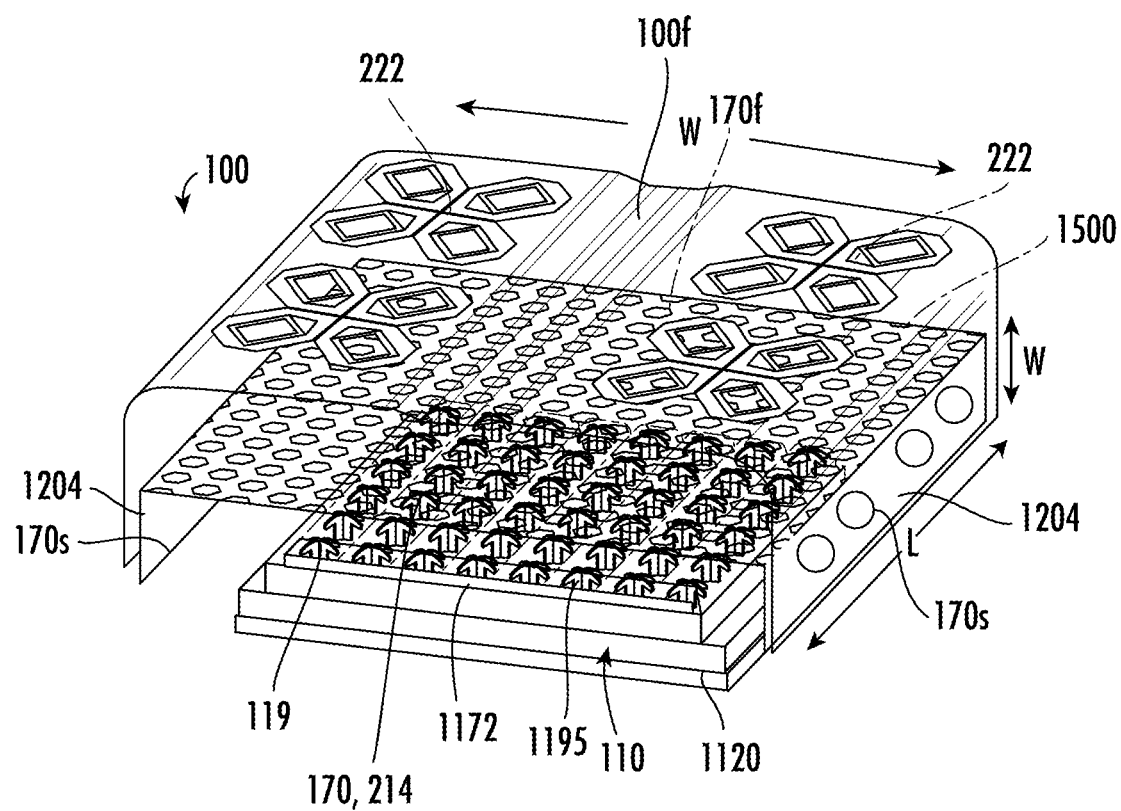
FIG. 54A is a partially transparent, perspective, simplified section view of a portion of a base station antenna with an active antenna module and spaces for one or more feed boards that extend adjacent a passive antenna reflector (in a front to back direction of the base station antenna) according to embodiments of the present invention.

Turning now to FIGS. 54A, 54B, 55A and 55B, a portion of a base station antenna 100 with an active antenna module 110 and one or more (side) feed boards 1200 (FIG. 54B) that extend in a front to back direction of the base station antenna 100. The one or more feed boards 1200 are not required to be parallel with the passive antenna reflector 170 and can reside at an angle (e.g., between 90-120 degrees) from the primary surface of the FSS material 1500, the passive antenna reflector 170, 214 and/or the active antenna reflector 1172 according to embodiments of the present invention. As shown in FIGS. 54B and 54C, the feed boards 1200 can extend perpendicular to the passive reflector 170 and/or FSS material 1500.

In some embodiments, referring to FIGS. 54A, 54B, the FSS material 1500 can extend laterally across an entire width W dimension of the front 100f of the housing 100h and/or the external radome. In contrast to the embodiment shown in FIG. 22C, there is no front surface reflector space for the feed boards 1200 to be installed on. The extended width of the FSS material 1500 may minimize the possible effect of passive reflector side segment edges 170s on massive MIMO array 1195 performance, when installed behind the FSS material 1500 and/or passive reflector 170f.

The one or more feed board 1200 can be configured to be perpendicular to and reside adjacent to an outer perimeter portion of the passive antenna reflector 170 and/or active antenna reflector 1172. The passive reflector side segments 170s can have (metal or FSS) wall segments 1204 that that are perpendicular to the primary surface of the FSS material 1500 and the primary surface of the primary passive antenna reflector 214 and can have an inwardly or outwardly extending dimension defining a width "W" and a longitudinally extending dimension "L". The passive reflector 170 can be provided as a laterally extending metal segment 1202 that joins a longitudinally extending right side wall segment 1204 and a longitudinally extending left side wall segment 1204 that extend about a perimeter of the FSS material 1500.

Referring to FIGS. 54B, 54C, the feed boards 1200 can be coupled to and/or held in position by the wall segments 1204 of the (metal) reflector side segments 170s and coupled to one or more feed stalks of radiating antenna elements. The feed stalks may be feed stalks of low and/or mid band elements such as radiating elements 222 and/or 232. The feed boards 1200 can be capacitively coupled to the side segments 170s of the passive reflector 170. The feed boards 1200 can reside inside or outside of the wall segments 1204.

The passive antenna reflector 170 can, but is not required to, comprise the FSS 170f with the FSS material 1500. Some or all of the low or mid-band radiating elements 222, 232, respectively, may be mounted on the feed boards 1200 and can couple RF signals to and from the individual radiating elements 222, 232. Cables (not shown) and/or connectors may be used to connect each feed board to other components of the base station antenna 100 such as diplexers, phase shifters, calibration boards or the like.

Figure 55A:
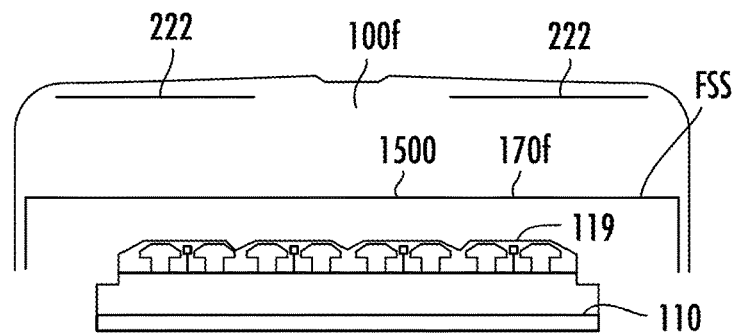
FIG. 55A is a simplified section view of a portion base station antenna with a passive antenna reflector provided as an FSS reflector in front of an active antenna module and with side feed board(s) extending behind and/or in front of a primary surface of the FSS reflector according to embodiments of the present invention.
Figure 55B:
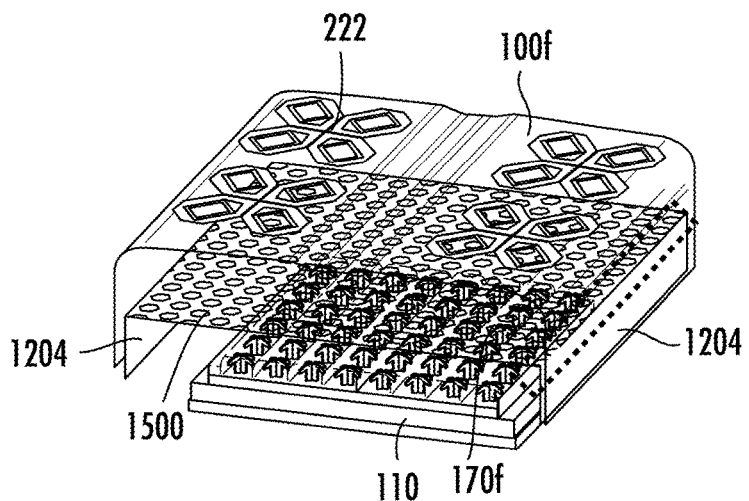
FIG. 55B is a side perspective view of the device shown in FIG. 55A.
Figure 56A:
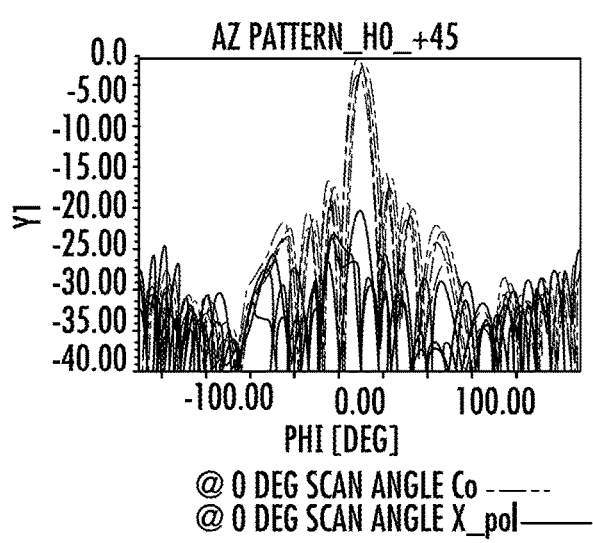
Figure 56B:
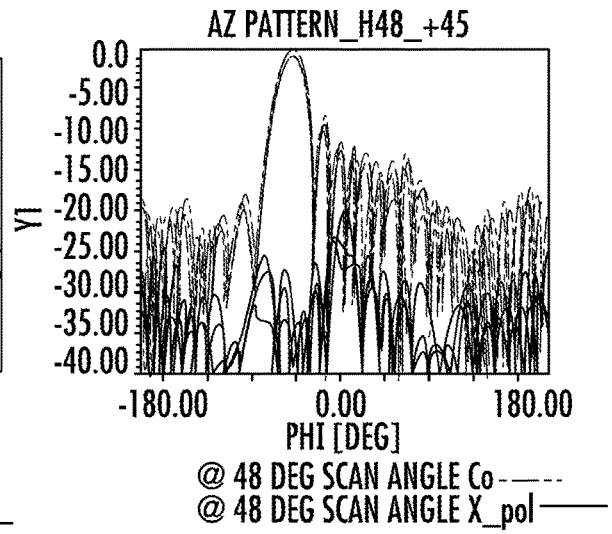
Figure 56C:
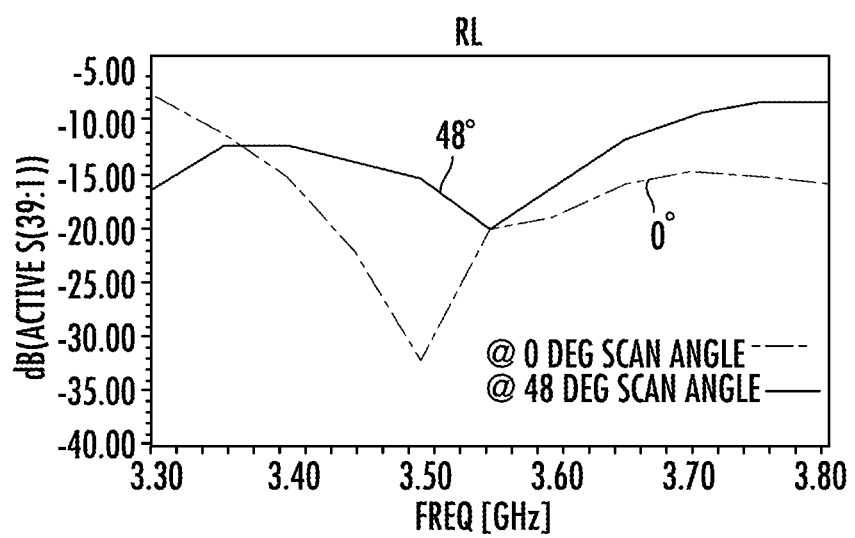
Figure 56D:
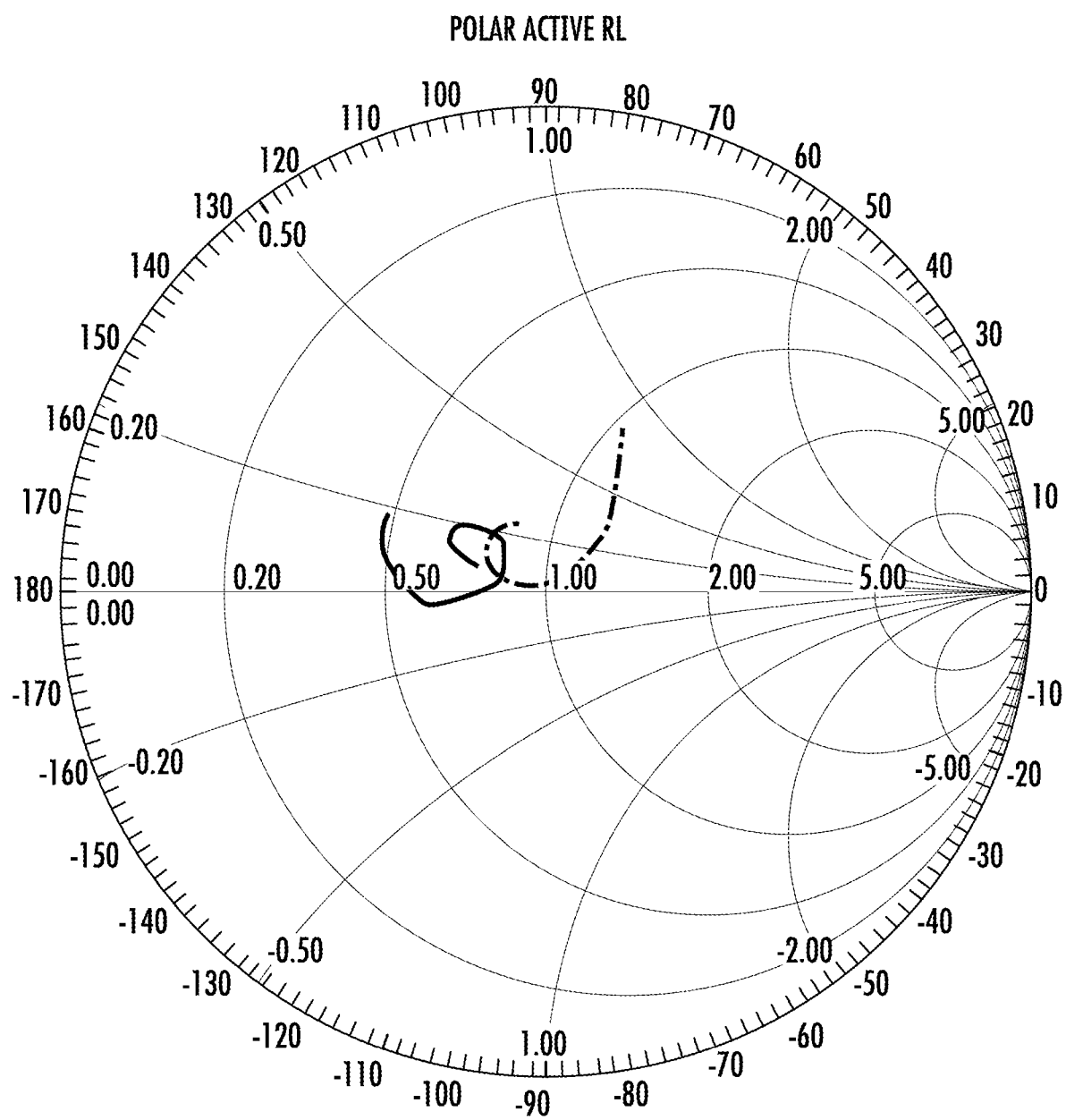

FIGS. 56A and 56B are graphs of the azimuth pattern (scan angles of 0 deg, 48 deg, respectively) for an antenna beam generated by one of the lower-band linear arrays included in the base station antenna of FIGS. 55A, 55B, as generated by a computational model with a top radome removed, 15 mm pushed back, and horizontal cut (in the orientation shown in FIG. 55A) at about 30 mm. FIG. 56C is a graph of return loss (dB) versus frequency (GHz) at 0 and 48 degree scan angles for an antenna beam generated by one of the lower-band linear arrays included in the base station antenna of FIGS. 55A, 55B, as generated by a computational model with a top radome removed, 15 mm pushed back, and horizontal cut (in the orientation shown in FIG. 55A) at about 30 mm. FIG. 56D is a polar active (RL) chart of 0 and 48 degree scan angles of one of the lower-band linear arrays included in the base station antenna of FIGS. 55A, 55B, as generated by a computational model with a top radome removed, 15 mm pushed back, and horizontal cut (in the orientation shown in FIG. 55A) at about 30 mm.

FIG. 56E is a graph of gain (dB) versus frequency (GHz) at 0 and 48 degree scan angles of one of the lower-band linear arrays included in the base station antenna of FIGS. 55A, 55B, as generated by a computational model.

FIGS. 57A and 57B are graphs of the azimuth pattern (scan angles of 0 deg, 48 deg, respectively) for an antenna beam generated by one of the lower-band linear arrays included in the base station antenna of FIGS. 55A, 55B and taken at a horizontal (in the orientation shown in FIG. 55A)

Figure 57D:
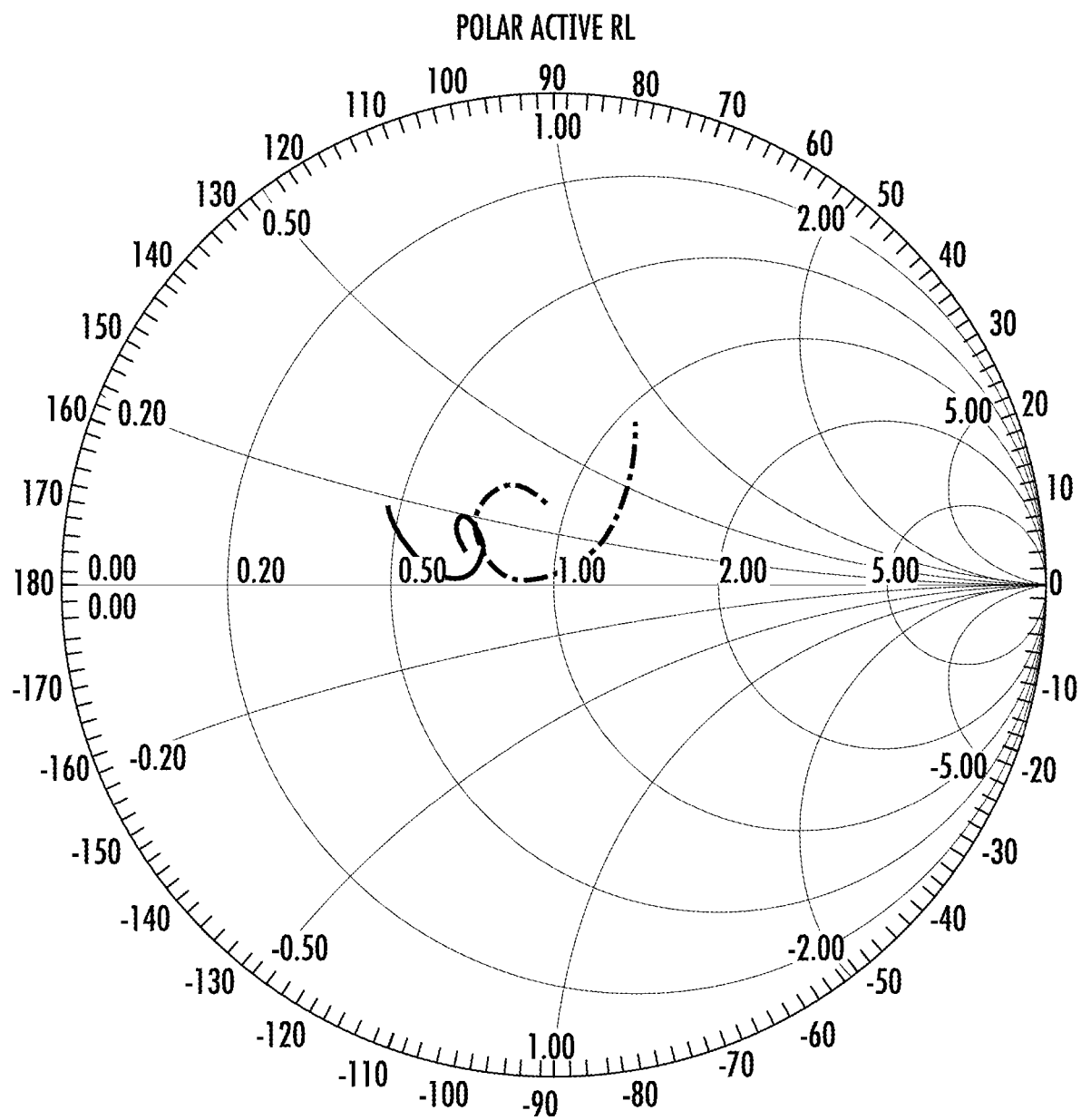
Figure 57E:
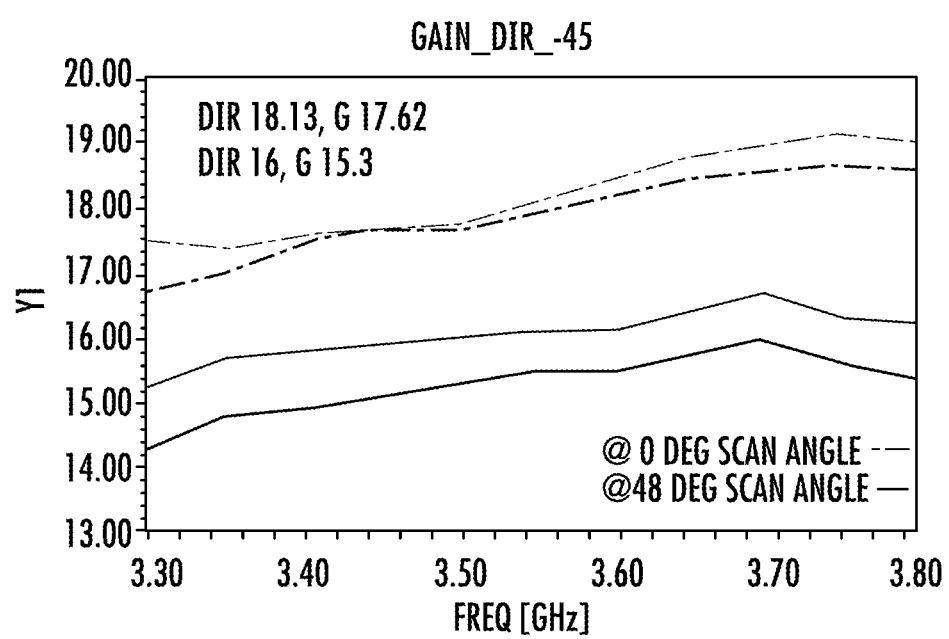

60 mm cut position, as generated by a computational model. FIG. 57C is a graph of return loss (dB) versus frequency (GHz) at 0 and 48 degree scan angles for an antenna beam generated by one of the lower-band linear arrays included in the base station antenna of FIGS. 55A, 55B, taken at the 60 mm cut position, as generated by a computational model. FIG. 57D is a polar active (RL) chart of 0 and 48 degree scan angles of one of the lower-band linear arrays included in the base station antenna of FIGS. 55A, 55B taken at the 60 mm cut position from that of FIG. 56D, as generated by a computational model. FIG. 57E is a graph of gain (dB) versus frequency (GHz) at 0 and 48 degree scan angles of one of the lower-band linear arrays included in the base station antenna of FIGS. 55A, 55B, taken at the 60 mm cut position from that of FIG. 56E, as generated by a computational model.

Turning now to FIGS. 58A, 58B, 59A and 59B, a portion of a base station antenna with an active antenna module 110 and with a guide member 1300 that releasably holds a FSS material 1500 that can form a reflector 170f is shown according to yet other embodiments of the present invention. The guide member 1300 can be slidably removed via the top 100t (FIG. 19A).

Figure 58A:
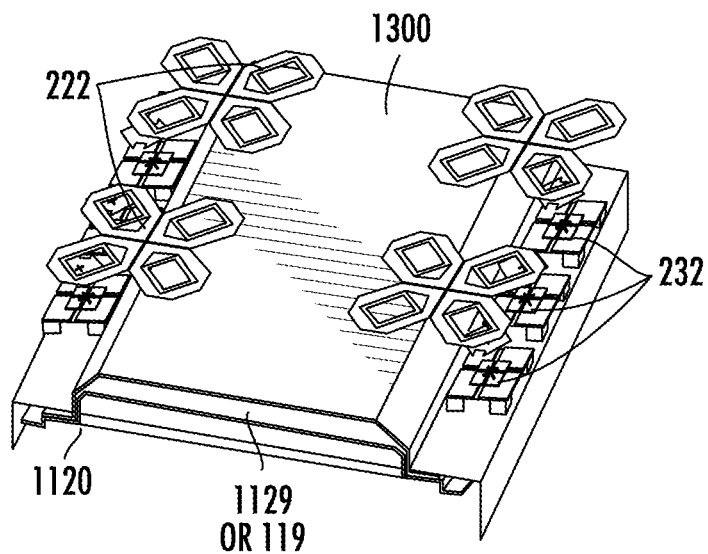
Figure 58B:
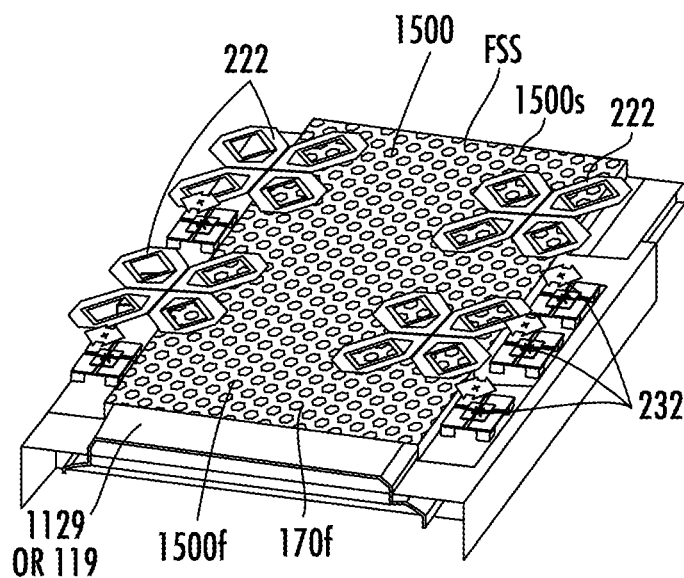
Figure 59A:
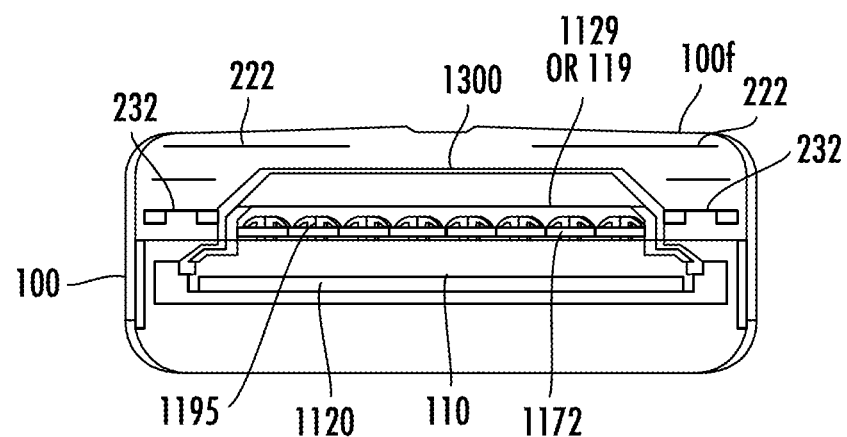
Figure 59B:
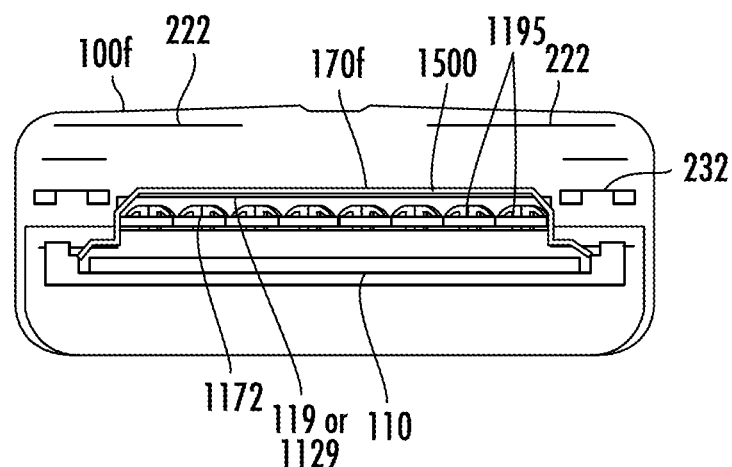

FIGS. 58A and 59A show the active antenna module 110 coupled to the base station antenna 100 with the guide member 1300 held behind the front 100f of the base station antenna 100. The guide member 1300 can hold the FSS material 1500, optionally configured as a flexible substrate 1500s such as a flex circuit 1500f. The flexible substrate 1500s can be laid on and/or pressed against a target surface and released from the guide member 1300 to (conformably) attach to the target internal surface. In some embodiments, the target internal surface can be the passive intermediate radome 1129 that seals the rear 100r of the housing 100h of the passive antenna 100 or can be the radome 119 of the active antenna module 110. The flexible substrate 1500s can be attached to the passive radome 1129 or the active antenna module radome 119 using the guide member 1300.

The guide member 1300 can be semi-rigid so as to be able to retain a defined three-dimensional shape in absence of an applied compressive force but can be compressed to push the flexible substrate 1500s against the target surface, e.g., radome 1129 or radome 119, for example. The flexible substrate 1500s can be adhesively attached to the target internal surface, such as passive antenna intermediate radome 1129 and/or active antenna module radome 119 and/or attached by other attachment configurations such as, for example, rivets or hook and loop (VELCRO) arrangements.

In some embodiments, the guide member 1300 can be provided as the intermediate radome 1129 that is attached to the rear 100r of the housing and is not required to be removed. Thus, the guide member 1300 can define both the intermediate radome 1129 and the reflector 170f. The flexible substrate 1500s can be attached to an internal facing primary surface of the guide member 1300. The guide member 1300 can be malleable so as to have a first configuration with the primary surface closer to a front 100f of the housing 100h and a second configuration where the primary surface resides further away from the front 100f of the housing. In the second configuration, the primary surface is adjacent to, optionally abutting the radome 119 of the active antenna module 110.

The intermediate radome 1129 can be positioned between the active antenna reflector 1172 and the passive antenna reflector 170f according to embodiments of the present invention.

Turning now to FIGS. 60A-60C, another embodiment of a base station antenna housing 100h is shown. In this embodiment, the base station antenna housing 100h includes a pair of longitudinally extending rails $180_1$, $180_2$ that reside inside a rear wall 100w of the housing, defining internal rails 180, laterally spaced apart across the cavity 155. The base station antenna housing 100h also includes a pair of longitudinally extending external rails $1280_1$, $1280_2$. The external rails $1280_1$, $1280_2$ are laterally spaced apart and reside on opposing sides of the cavity 155. The internal rails $180_1$, $180_2$ are coupled to corresponding external rails $1280_1$, $1280_2$. The internal rails 180 can be, and typically are, longer than the external rails 1280. The internal rails can provide structural rigidity for the housing 100h.

The rear 100r of the housing 100h can be configured with a closed surface of the rear wall 100w extending over sides 101, 103 and the cavity 155, covering and parallel to the front 100f. No seal cap 165 (FIG. 5) is required. Rather, the rear wall 100w of the housing 100h can be continuous from the top 100t to bottom of the housing 100h and between both side portions 101b, 103b.

The rear wall 100w of the housing 100h can have a rearward projecting shoulder 105 that extends between the internal rail 180 and the external rail. The shoulder 105 can have a narrow width, typically between 5-20% of a width of the recess 155.

The closed surface of the wall 100w at the rear 100r of the housing 100h can define a "skin" and/or second inner facing radome 1129 that extends between the radome 119 of the active antenna module 110 and the front external radome 150, when the active antenna module 110 is in position thereat.

A laterally and longitudinally extending primary portion of the rear wall 100w can project further distances rearward at successive longitudinally spaced apart segments, shown as a first segment 100r1 adjacent the cavity 155, then to a second segment 100r2 that is longitudinally spaced apart from the first segment 100r1, then to a third segment 100r3. The second segment 100r can be provided to accommodate radio cable routing on longer radios, longer active antenna modules 110. The adapter member 2900, 2900', such as an adapter frame, rails or plate, of the active antenna module 110 can reside over the cavity 155 and have a longitudinal extent that fits within the first segment 100r1 or the first and second segments 100r1, 100r2, for example.

FIG. 61 illustrates that the depth or front to back dimension of different active antenna modules 110 can vary, but respective radomes 119 of each can be configured to fit in the cavity 155. A respective adapter member 2900, 2900' can be configured to accommodate different active antenna modules 110 or different radios 1120 thereof as shown in FIGS. 63A-63E. The adapter member 2900, 2900", for example, can be configured to mount a respective radio 1120 with dimensions within about 440 mm by 10000 mm (width times length), in some particular embodiments.

Turning now to FIGS. 62A and 62B, the base station housing 100h can be provided as a first housing member 100h1 defining a front 100f of a housing of the base station antenna 100h and a second housing member defining a back 100r of the base station antenna housing 100h. As shown, the first and second housing members 100h1, 100h2 extend laterally and longitudinally and are sealed together along longitudinally extending side wall interfaces 100i.

The first housing member 100h1 comprises a front surface 100f that merges into right and left side portions, 101a, 103, respectively, that extend rearward. The second housing member 100h2 comprises a rear wall 100w that merges into right and left side portions 101*b*, 103*b*, respectively, that extend forward. The right and left side portions 101*a*, 103*a*, of the first housing member 100*h*1 are coupled to the right and left side portions 101*b*, 103*b*, of the second housing member 100*h*2 along a joint interface 100*j* that can extend longitudinally a length of the housing 100*h*. The left and right side portions 101*a*, 103*a* of the first housing member 100*h* can extend rearward a distance that is less than a shortest depth that the left and right side portions 101*b*, 103*b* extend forward. The first housing member 100*h*1 and the second housing member 100*h*2 can be vacuum formed providing a lightweight but sufficiently rigid structure with relatively complex shapes.

The second housing member 100*h*2 provides at least one laterally and longitudinally extending recess 155 (which can also be interchangeably described as a cavity) adjacent a lower and/or upper end of the housing 100*h*. The recess 155 can extend along a sub-length of the housing 100*h*. The recess 155 can have a lateral extent that is 60-99% of a lateral extent of the housing 100*h*.

The second housing member 100*h*2 comprises at least one external stepped region 100*r*1 that rises above (projects rearward of) the recess 155 and extends laterally and longitudinally about another sub-length of the housing 100*h*.

Referring to FIG. 62C, the base station antenna 100 can include at least one support member 1400 that resides between the first and second housing members 100*h*1, 100*h*2, typically residing adjacent a top 100*t* and/or bottom end portion 100*b* of the housing 100*h*.

The support member 1400 has a front 1400*f* that faces the first housing member 100*h*1 and a back 1400*b* that faces an inner surface of the second housing member 100*h*2. The back 1400*b* has a laterally extending medial segment 1400*m* that is recessed relative to right and left sides 1400*s* of the support member 1400. The front 1400*f* of the support member 1400 can have a shape that corresponds to a shape of the external radome 150 and/or front 100*f* of the housing 100*h*. The right and left sides 1400*s* of the support member 1400 can extend between the right and left sides 101*a*, 101*b* and 103*a*, 103*b* of the first and second housing members 100*h*1, 100*h*2.

FIG. 64A illustrates a base station antenna housing 100*h* comprising two longitudinally spaced apart cavities 155, each cavity 155 sized and configured to receive a corresponding one active antenna module 110 (FIG. 64B). The housing 100*h* includes two pairs of external rails 1280*p*₁, 1280*p*₂, one pair residing on opposing lateral sides of the first cavity 155 and the other pair residing on opposing lateral sides of the other cavity 155. As shown in FIG. 64B, each respective active antenna module 110 can have an adapter member(s) 2900 that couples to the external rails 1280₁, 1280₂ at the corresponding cavity 155. Each module 100 can have a different adapter member 2900 and each module 110 can have a different radio configuration and/or body configuration rearward of and/or outside the housing 100*h*.

FIGS. 65 and 66 illustrate a base station antenna housing 100*h* with an external reflector 1450 extending about the cavity 155. The external reflector 1450 can be coupled to, and extend external to, the rear wall 100*w* of the housing 100*h*. Thus, the term "external" with respect to "external reflector" means that the reflector 1450 is exposed and externally visible when an active antenna module 110 is not mounted on the housing 100*h* thereat. Typically, the external reflector 1450 is coupled to the external rails 1280₁, 1280₂. The external reflector 1450 can have a width and length that corresponds to the width and length of the cavity 155 but may have a greater width and a greater length, e.g., about 10-20% greater, in some embodiments. As shown, the external reflector 1450 can have a primary forward surface 1450*f* that merges into left and right sides 1451 that project rearward and extend longitudinally and that merge into laterally extending lips 1453 that couple to the external rails 1280₁, 1280₂.

The reflector 1450 can comprise a metal surface and/or a frequency selective surface as discussed.

In some embodiments, the external reflector 1450 can be removed before the active antenna module 110 is mounted in the corresponding cavity 155 (FIG. 66).

FIG. 67A illustrates a conventional reflector comprising radiating (antenna) elements. FIG. 67B illustrates a reflector 170 of the base station antenna comprising reflector sides 170*s* in the shape of elongate thin strips. The term "thin" with respect to strips of the reflector means 1-20% of an overall width of the base station antenna 100.

Use of the external reflector 1450 can facilitate operation of the radiating elements 222 that extend in front of the reflector 170*s* and that also extend in front of the external reflector 1450 or aperture 173, particularly when the active antenna module 110 with associated reflector 1172 is not in position.

In some embodiments, as shown for example, in FIGS. 65 and 68A, the external reflector 1450 is detachably coupled to the housing 100*h*, such as to the external rails 1280₁, 1280₂, and is removed before installing a module 110 to the cavity 155 thereat.

In some embodiments, as shown for example in FIG. 68B, the external reflector 1450 can remain in position when the active antenna module 110 is coupled to the housing 100*h*. This configuration can allow for (additional) radiating antenna elements 1222 to be positioned forward of the external reflector 1450. In this configuration, the external reflector becomes a first internal reflector that is forward of the passive antenna reflector 170/170*s*, closest to the external radome 150, and also forward of the reflector 1129 of the active antenna module 110.

Referring to FIGS. 69, 70A, 70B, an external rail 1280 can be coupled to the internal rail 180 of the base station antenna housing 100*h*. The rear wall 100*w* of the housing 100*h* can have a rearward projecting shoulder 105 that extends between the internal rail 180 and the external rail. The internal rail 180 can be sealably coupled to the external rail 1280 to thereby inhibit water flow into the (radome) housing 100*h*.

The internal rail 180 can be provided as a pair of laterally spaced apart rails 180₁, 180₂ that are covered by/reside inside the radome/housing 100*h* and arranged on two longitudinal edges of the reflector 170*s* to increase the stiffness thereof. The external rail 1280 can also be provided as a pair 1280*p* of external rails 1280₁, 1280₂ that are laterally spaced apart. In some embodiments, the external rails 1280₁, 1280₂ are disposed outside the top portion of the housing 100*h* at positions corresponding to those of the two longer internal rails 180₁, 180₂ to support an active antenna 110. In some embodiments, the external rails 1280₁, 1280₂ are provided as two pairs of external rails, one coupled to a top portion of the housing 100*h* and one coupled to a bottom portion of the housing (FIG. 64A).

At least one bolt 1286 can extend through an aligned bolt channel 185 of an internal rail 180, an aperture 106 in the rear wall 100*w* of the housing 100*h* and a bolt channel 1282 in an external rail 1280. A spacer 1340 with a bolt hole 1343 can between the aligned bolt channels 1282, 185. Typically, a first bolt 1286 is provided at one end portion of the external rail 1280 and a second bolt 1286 is provided at a longitudinally spaced apart opposing end portion.

The spacer 1340 can have a first portion 1341 that comprises the bolt hole 1343 and a second portion 1342 of different material relative to the first portion 1341 that surrounds the first portion 1341. The spacer 1340 can provide increased contact surface area and can facilitate consistent compression of the second portion 1342. The first portion 1341 and the second portion 1342 can be elongate and can extend along a length dimension of the rails 180, 1280. The first portion 1341 can have increased rigidity relative to the second portion 1342. The second portion 1342 can comprise rubber or other suitable seal material and may comprise a resiliently compressible material. The first portion 1341 can comprise metal such as aluminum or aluminum alloy, for example.

The first portion 1341 of the spacer 1340 can be defined as a metal ring and the second portion 1342 can be defined by a sealing pad surrounding the metal ring. The first portion 1341 can be fixed in the center of the second portion 1342 by interference fit or other suitable attachment configurations.

The second portion 1342 of the spacer 1340 can be configured to seal the gap between the short rail 180 and the rear wall 100w of the housing 100h and can be compressed between these two components. The second portion 1342 can comprise a plurality of discontinuous curved grooves 1342g. The first portion 1341 of the spacer 1340 can be configured to control a compression height of the second portion 1342 so that the second portion 1342 is not overcompressed during assembly.

Before compression, a height of the second portion 1342 can be larger than that of the first portion 1341 (FIG. 70B). After compression, at assembly, the second portion 1342 can be compressed by about 20-60%, typically about 40%, and thereby the compressed, installed, height of the second portion 1342 can be less than that of the first portion 1341, resulting in that the first portion 1341 partially sits into the aperture 106 of the rear wall 100w/radome, and abuts the longer internal rail 180 and the external rail 1280 with its opposing primary surfaces, respectively, as shown in FIG. 74. The aperture 106 can be configured to be large enough to adapt the positional tolerance of the corresponding bolt holes 185, 1283 of the rails 180, 1280 in the longitudinal direction of the housing 100h.

As shown in FIGS. 70A, 70B, for example, the outer perimeter of the first portion 1341 can be oval, so as to adapt the narrow edge of the shoulder 105 of the rear wall 100w in the transverse direction, and to increase the structural strength in the longitudinal direction. The outer perimeter of the second portion 1342 of the spacer 1340 can also be oval and can ride behind the aperture 106 of the shoulder 105 of the rear wall 100w of the housing 100h.

Thus, the first portion 1341 of the spacer 1340 can reside in the aperture 106 in the rear wall 100w of the housing 100h. The aperture 106 can have a shape that corresponds to the first portion 1341 of the spacer 1340. The bolt 1286 extends through the bolt channel 1282 in the external rail 1280, then through the bolt hole 1343 of the spacer 1340, then into the bolt channel 185 of the internal rail 180. The second portion 1342 of the spacer 1340, 1340' can abut, and be compressed between, an inner facing surface 1280i of the external rail 1280 and a rear facing surface 105r of the shoulder 105 as shown in FIG. 74.

FIGS. 71A, 71B illustrate another embodiment of a spacer 1340' with two bolt holes 1343 and correspondingly shaped apertures 106 in the shoulder 105 of the rear wall 100w of the housing 100h. The spacer 1340' has two circular or ring shaped first portions 1341 and one elongate second portion 1342 that surrounds both bolt holes 1343. Use of two or more circular first portions 1341, spaced longitudinally apart, can disperse the compression force felt by a single circular one.

As discussed with respect to the spacer of FIG. 70A, the second portion 1342 of the spacer 1340, 1340' can comprise a resilient compressible material and can reside against an outer surface of the rear wall 100w of the housing 100y with the first, more rigid, e.g., metal, portion 1341 of the spacer, 1340, 1340' in a respective and correspondingly shaped hole 106 in the rear wall 100w/shoulder 105 of the housing 100h.

Referring now to FIGS. 72A-72C, the external rail 1280 can be sealed from the housing 105 at an interface behind the spacer 1340. As shown, the bolt channel 1282 of the external rail 1280 can comprise a groove 1285 that surrounds a bolt aperture 1283. A seal member 1288 such as an O-ring or gasket can be held in the groove 1285. The bolt head 1286 or a bolt collar 1286c extending forward of the head 1286h can be configured to reside against the seal member 1288 with the bolt body extending forward thereof. The groove 1285 can surround the bolt hole 1283 with a resilient seal member 1288 in the groove 1285. The bolt 1286 extends through the bolt hole 1283 with the head 1286h of the bolt 1286 and/or a collar 1286c extending forward of the head 1286h configured to compress the resilient seal member 1288 thereby sealing the external rail 1280 from the shoulder 105 of the rear wall 100w of the housing 100h.

FIG. 73 illustrates another embodiment of a bolt 1286' with an integrated or coupled seal member 1288' that does not require the groove 1288 shown in FIGS. 72A-72C. The seal member 1288' can be provided as an O-ring that is in front of the head 1286h and collar 1286c (in the assembled orientation). The collar 1286c can slope in a direction toward the shoulder 105 of the rear wall 100w of the housing 100h so that the O-ring 1288' can be housed within the sloping collar 1286c after assembly.

FIG. 74 shows the bolt 1286, 1286' in the bolt channel 1282 of the external rail 1280 with the seal member 1288, 1288' compressed against a surface of the external rail behind the spacer 1340, 1340' with the second portion 1342 of the spacer 1340, 1340' compressed between the inner facing surface 1280i of the external rail 1280 and the outer surface 15r of the shoulder 105 of the housing 100h. The first portion 1341 of the spacer 1340, 1340' can about the inner facing surface 1280i of the external rail 1280 and a rear facing surface 181 of the internal rail 180.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.)

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The term "about" used with respect to a number refers to a variation of +/−10%.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna, comprising:
   a passive antenna assembly comprising a housing and a first reflector, wherein the housing comprises a rear wall; and
   a separate active antenna module comprising a second reflector coupleable to or coupled to the housing of the passive antenna assembly, wherein, in position, the second reflector resides adjacent or inside the rear wall of the housing.

2. The base station antenna of claim 1, wherein the housing comprises a front that defines an external radome with an internal chamber between the front and the rear wall, wherein the rear wall comprises or defines a recess, and wherein the second reflector resides adjacent the first reflector inside the recess.

3. The base station antenna of claim 1, wherein the first reflector comprises an aperture, and wherein at least a portion of the second reflector is positioned in the aperture of the first reflector.

4. The base station antenna of claim 3, wherein the first reflector has a longitudinal and lateral extent and defines a reflector wall with wall segments that at least partially surrounds the aperture thereof.

5. The base station antenna of claim 1, wherein the first reflector is capacitively coupled to the second reflector.

6. The base station antenna of claim 1, wherein at least one of the first reflector or the second reflector is provided by a frequency selective surface and/or substrate that is configured to allow RF energy to pass through at one or more defined frequency range and that is configured to reflect RF energy at a different frequency band.

7. The base station antenna of claim 6, wherein the first reflector comprises the frequency selective surface and/or substrate and is configured to reflect RF energy at a low band and pass RF energy at a higher band, and wherein the frequency selective surface and/or substrate resides in the housing behind low band dipole radiating antenna elements.

8. The base station antenna of claim 6, further comprising a third reflector that is an extension of the first reflector or that is coupled to the first reflector, wherein the third reflector extends in a longitudinal direction and has a lateral extent, wherein the third reflector resides in the housing and extends longitudinally a distance greater than the first reflector.

9. The base station antenna of claim 1, wherein the first reflector has a longitudinal and lateral extent, wherein the second reflector has a longitudinal and lateral extent, and wherein the longitudinal extent of the second reflector is less than the longitudinal extent of the first reflector.

10. The base station antenna of claim 3, wherein the aperture of the first reflector and the recess provided by or in the rear wall of the housing are aligned and each has a rectangular perimeter.

11. The base station antenna of claim 3, further comprising an intermediate radome extending over the aperture of the reflector.

12. The base station antenna of claim 1, wherein the active antenna module comprises a radome coupled thereto, and wherein the radome of the active antenna module resides inside a recess provided by or in a rear wall of the housing, facing a front of the housing.

13. The base station antenna of claim 1, further comprising first and second rails that extend in a longitudinal direction inside the housing, wherein the active antenna module is releasably coupled to the first and second rails, wherein the first and second rails are first and second internal rails, the base station antenna further comprising first and second external rails that extend longitudinally and that are coupled to corresponding first and second internal rails, and wherein the active antenna module comprises an adapter member, and wherein the external adapter member is attached to the first and second external rails.

14. The base station antenna of claim 1, wherein the active antenna module comprises a first sub-module comprising radio circuitry and a second sub-module comprising a massive MIMO antenna element array, and wherein the first and second sub-modules are stackable and attached to each other.

15. The base station antenna of claim 1, further comprising:
   a reflector having an opening extending longitudinally and laterally between spaced apart left and right side portions of the reflector; and
   a removable reflector portion having a length and width that are +/−20% of a length and width of the opening and extends across and along the opening.

16. The base station antenna of claim 13, further comprising a spacer with a first portion comprising a bolt hole surrounded by a second portion of a different material, wherein the first portion of the spacer resides in a hole in a rear wall of the housing that has an opening with a shape that corresponds to the first portion of the spacer, and wherein a bolt extends through the external rail, through the bolt hole of the spacer and into the internal rail, and wherein the first portion of the spacer has increased rigidity relative to the second portion, and wherein the second portion comprises a resilient, compressible seal material.

17. The base station antenna of claim 6, wherein the frequency selective surface and/or substrate resides in the housing behind low band dipole radiating antenna elements.

18. The base station antenna of claim 6, further comprising low band dipole antenna with feed stalks, wherein the feed stalks project forward of the frequency selective substrate.

19. The base station antenna of claim 8, wherein the frequency selective surface and/or substrate is co-planar with the third reflector.

20. The base station antenna of claim 8, wherein the frequency selective surface and/or substrate is parallel to the third reflector and resides closer to an external, front radome of the housing than the third reflector.

21. The base station antenna of claim 13, wherein the first and second rails are first and second internal rails, the base station antenna further comprising first and second external rails that extend longitudinally and that are coupled to corresponding first and second internal rails, and wherein the active antenna module comprises an adapter member, and wherein the external adapter member is attached to the first and second external rails.

22. The base station antenna of claim 21, wherein the first and second external rails are configured to couple to different configurations of the adapter member whereby different configurations and/or sizes of adapter members and/or active antenna modules are interchangeably, serially attachable to the first and second rails.

23. The base station antenna of claim 1, wherein the active antenna module comprises an integrated module of radio circuitry and a massive MIMO antenna element array residing in front of the second reflector.

24. The base station antenna of claim 1, wherein the passive antenna assembly comprises feed boards on right and left sides of the base station antenna that are perpendicular to the second reflector of the active antenna module.

25. The base station antenna of claim 1, further comprising first and second rails that extend in a longitudinal direction, wherein the first and second rails each provide a flat rail surface with a stop block coupled thereto at a location corresponding to a lower portion of the recess in the housing, wherein the active antenna module comprises an external adapter member with a lower edge portion that releasably engages the stop block.

* * * * *